United States Patent [19]

Loatman et al.

[11] Patent Number: 4,914,590
[45] Date of Patent: Apr. 3, 1990

[54] NATURAL LANGUAGE UNDERSTANDING SYSTEM

[75] Inventors: Robert B. Loatman, Vienna; Stephen D. Post, McLean, both of Va.; Chih-King Yang, Rockville, Md.; John C. Hermansen, Catharpin, Va.

[73] Assignee: Emhart Industries, Inc., Indianapolis, Ind.

[21] Appl. No.: 195,237

[22] Filed: May 18, 1988

[51] Int. Cl.$^4$ .................. G06F 15/21; G06F 15/18; G06K 9/62

[52] U.S. Cl. .................. 364/419; 364/200; 364/274.8

[58] Field of Search .............. 364/200, 900, 274.8, 364/419, 917.92

[56] References Cited

PUBLICATIONS

Loatman, R. B. & McCown, M. G., Information Extraction from Natural Language Messages, Reprint from Proceedings of ESIG—Third Annual Expert Systems in Government Conference, Oct. 19-23, 1987.
Loatman, R. B., A Hybrid Architecture for Natural Language Understanding, Reprint from Proceedings of SPIE—International Society of Optical Engineering, May 18-20, 1987.
R. B. Loatman article, Natural Language Text Understanding, at pp. 2-5 of Jul. 1986, Technology Newsletter (Assignee-Internal Publication).
Undated Brochure of Assignee, "Innovative Solution for AMHS", (author unknown).
M. Bates, 1987, "The Theory & Practice of Augmented Transition Network Grammers", in L. Bolc (ed.) Natural Language Communication with Computers, New York, Springer.
Winograd, T., 1983, Language as a Cognitive Process, vol. 1: Syntax, Reading, Mass: Addison-Wesley, (Chapter 5, Appendix D), 195-271, 583-599.
Quirk, R., Greenbaum, S., Leech, G., & Svartvik, J., 1985, A Comprehensive Grammer of the English Language, New York: Seminar Press (excerpts from Chapter 10, Appendix I).
Sager, N., 1981, Natural Language Information Processing: A Computer Grammar of English and Its Applications, Reading, Mass.: Addison-Wesley (excerpts from Appendix I).
Wilks, V., Haung, X., & Fass, D., 1985, "Syntax, Preference, and Right Attachment", Proceedings of the Ninth IJCAI.
Loatman, R. B., 1988, "Natural Language Text Understanding", Article to be published in assignee Newsletter, (cf. reference AT).
Dept. of Navy, NOSC, May 21, 1987, Memo Concerning Conference Later Held (at which various NLU Systems were eventually demonstrated).
Schank, R., 1985, Conceptual Information Processing, New York: North-Holland, (excerpts from Chapter 3).
Cook, W., 1979, Case Grammer: Development of the Matrix Model, Washington, D.C.: Georgetown University Press, (excerpts).
Laffal, J., 1973, A Concept Dictionary of English, Essex, Conn.: Gallery Press, (excerpts).
Marcus, M., 1980, Theory of Syntactic Recognition for Natural Language, Cambridge, Mass.: MIT Press, (excerpts).

Primary Examiner—Clark A. Jablon
Attorney, Agent, or Firm—Carl A. Forest

[57] ABSTRACT

A hybrid natural language understanding (NLU) system which is particularly designed for processing natural language text. Primary functional components of the NLU system include a preprocessor; a word look-up and morphology module which communicates with a lexicon and a learning module; a syntactic parser which interfaces with an augmented transition network (ATN) grammar; a case frame applier, which converts the syntactic structure into canonical, semantic "case frames"; and a discourse analysis component which integrates explicit and implied information in the text into a conceptual structure which represents its meaning. This structure may be passed on to a knowledge based system, data base, to interested analysts or decision makers, etc. Significant feedback points are provided, e.g., the case frame applier may notify the syntactic parser of a semantically incorrect parse, or the syntactic parser may seek a semantic judgment based on a fragmentary parse. This system incorporates a novel semantic analysis approach based largely on case grammar.

65 Claims, 104 Drawing Sheets (GRAPH FROM (L ↑ Noun) ALONG (FM)

```
Agenda

UR1561
UR2561
UR4561
UR5561
UR3140
VRR3561 No. 1
VRR3561 No. 2
HypMod  No. 2
```

```
(UR3140 Frame)

Priority ——— 6495191
UR3140 ←——— LastEvaluation ——— 522334477
              AKO ——— XX3140
```

FIG. 6B

TOP LEVEL SENTENCE GRAMMAR

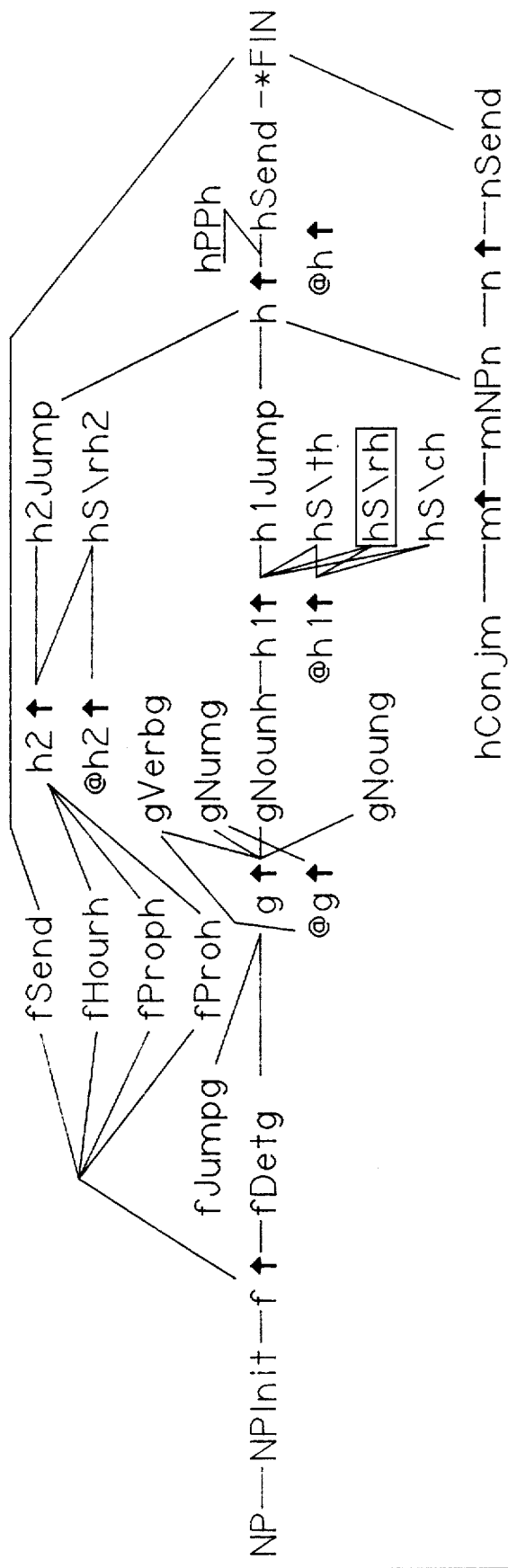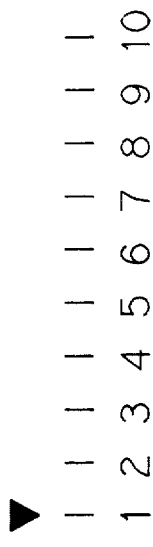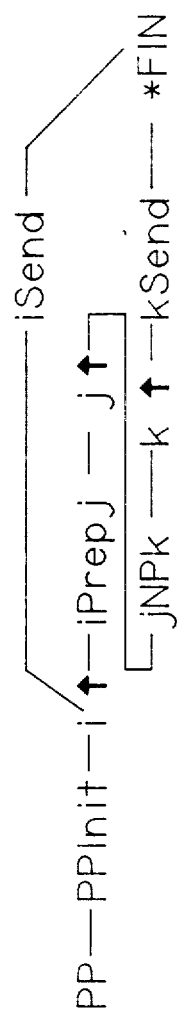
FIG. 8B

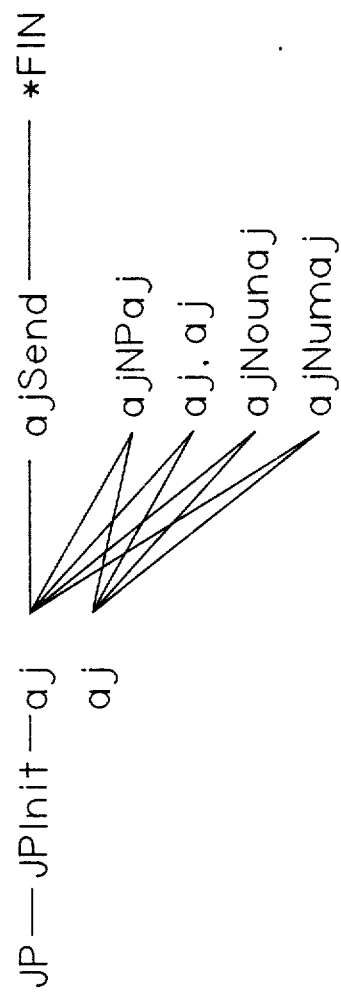
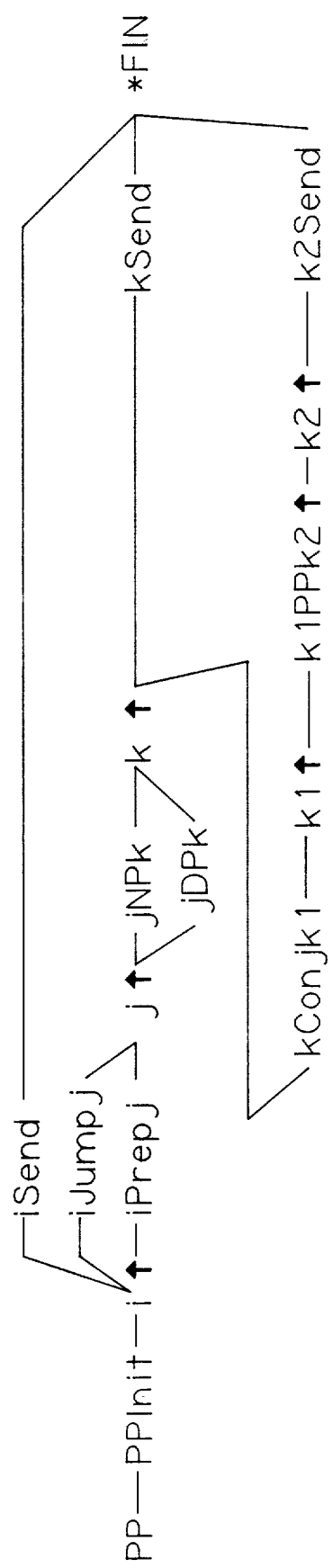
FIG. 12F

Specify the link by selecting the FROM and TO nodes.

```
TTV window for MOUSE

Frame tJumpa is AKO: Arc

Slot Name ? Label

Facet name (VALUE is default) ?
] VALUE

New Data for tJumpa/Label./VALUE: Jump

Slot Name ? Rule

Facet name (VALUE is default) ?
] VALUE

New Data for tJumpa/Rule/VALUE: L ↑ S33Rule
```

FIG. 15B

```
TTV window for MOUSE
Frame L↑S33Rule is AKO: L↑SRule
Current value for L↑S33Rule/Context/VALUE: NIL
New Data for L↑S33Rule/Context/VALUE:
(↑.MainVerb.Lex.IsConCat (QUOTE C↑Info))
    [LAMBDA
        (NODE VALUE)
        (IsConCat
            (FRAME GET! (FRAME GET! NODE
                            (QUOTE Parent)).
                        (FRAME GET! NODE
                            (QUOTE MainVerb))
                        (QUOTE Lex))
            VALUE]
New Data for L↑S33Rule/context/VALUE: ]

New Data for L↑S33Rule/Then/Facts: ]
Current value for L↑S33Rule/Then/Actions: NIL
New Data for L↑S33Rule/Then/Actions: (↑.Mood←Bound)
New Data for L↑S33Rule/Then/Actions:
```

FIG. 16A

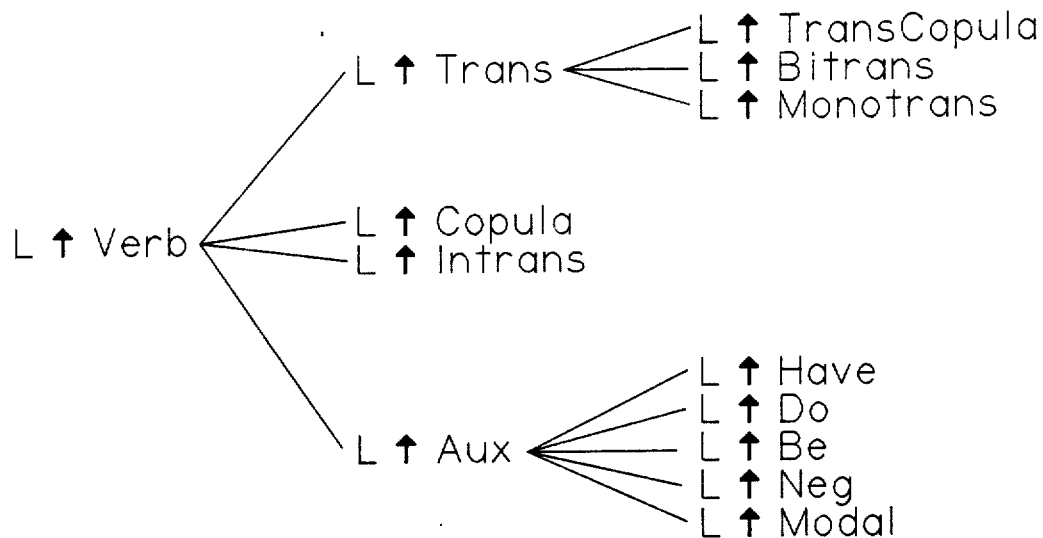

FIG 18 dirty not recognized.

| Please Verify parse of dirty |
|---|
| OK |
| (DIRTL↑ Material L↑ Having Base C↑ Has) |
| (DIRTL↑ Material L↑ Like Base C↑ BeLike) |

Any other (irregularly derived) definite meanings for dirty ?
Synonym or Root word is ?
      ]

Any other unlikely but possible meanings for dirty ?

Synonym or Root word is ?
      ]

((DIRTL↑ Material L↑ Having Base C↑ Has)
 (DIRTL↑ Material L↑ Like Base C↑ BeLike))

98 ←
    ^          FIG 19 general not recognized

| Is General a Primitive ? |
|---|
| YES |

| L↑ Adj general is: |
|---|
| OK |
| NewSubCategory |
| L↑ SubstCert |
| L↑ Color |
| L↑ Metric |
| L↑ TimeRel |
| L↑ SubstDegree |
| L↑ Numerative |
| L↑ SubstCompar |

| L↑ SubstCompar general is: |
|---|
| OK |
| NewSubCategory |

| L↑ Noun general is: |
|---|
| OK |
| NewSubCategory |
| L↑ Proper |
| L↑ Common |

| L↑ Agent general is: |
|---|
| OK |
| NewSubCategory |
| L↑ Person |
| L↑ Organization |
| L↑ Animal |
| L↑ System |
| L↑ User |
| L↑ Member |

| L↑ Person general is: |
|---|
| OK |
| NewSubCategory |
| L↑ Female |
| L↑ Male |

| general is: |
|---|
| OK |
| L↑ Det |
| L↑ Pro |
| L↑ Prep |
| L↑ Particle |
| L↑ Conj |
| L↑ Rel |
| L↑ Binder |
| L↑ Punct |
| L↑ Noun |
| L↑ Verb |
| L↑ Adv |

| L↑ Common general is: |
|---|
| OK |
| NewSubCategory |
| UnknownWord |
| L↑ Adj |
| L↑ Info |
| L↑ Abstract |
| L↑ Activity |
| L↑ Agent |
| L↑ BodyPart |
| L↑ Garb |
| L↑ Food |
| L↑ NatPhenom |
| L↑ Material |
| L↑ Object |
| L↑ ObjectFeature |
| L↑ Structure |
| L↑ ObjectPart |
| L↑ Equipment |
| L↑ Location |
| L↑ Time |

FIG. 20A

Current concept for GENERAL ↑ SubstCompar is:

Which subcon of C ↑ Primitive
is GENERALL ↑ SubstCompar ?

| GENERALL ↑ SubstCompar Type is: |
|---|
| OK |
| LeftAdjofN |
| VerbComp |
| RightAdjOfN |
| GroupUncount |
| Plural |
| NonGradable |

| GENERALL ↑ SubstCompar Num is: |
|---|
| OK |
| Pl |
| Sing |

| GENERALL ↑ SubstCompar Case is: |
|---|
| OK |
| Subj |
| Obj |
| Pos |

| GENERALL ↑ SubstCompar Complement is: |
|---|
| OK |
| ToInf |
| ThatClause |
| zeroThat |
| WhClause |
| WhToInf |
| DescPhr |

NewSubConcept
C ↑ Bond
C ↑ Change
C ↑ Truth
C ↑ Life
C ↑ Artifact
C ↑ Stuff
C ↑ Info
C ↑ InterRel
C ↑ SelfRel
C ↑ Grade
C ↑ Physic
C ↑ Unknown
C ↑ NonVerbal

FIG. 20B

```
┌─────────────────────────────────────┐
│ Please verify parse of general      │
├─────────────────────────────────────┤
│ OK                                  │
│ GENERAL L ↑ Person                  │
│ GENERAL L ↑ SubstCompar             │
└─────────────────────────────────────┘

FIG. 20D

┌──────────────────────────┐
│ GENERALL ↑ Person Complement is: │
├──────────────────────────┤
│ OK                       │
│ ToInf                    │
│ ThatClause               │
│ zeroThat                 │
│ WhClause                 │
│ WhToInf                  │
│ DescPhr                  │
└──────────────────────────┘

┌─────────────────────────┐
│ GENERALL ↑ Person Case is: │
├─────────────────────────┤
│ OK                      │
│ Subj                    │
│ Obj                     │
│ Pos                     │
└─────────────────────────┘

┌─────────────────────────┐
│ GENERALL ↑ Person Num is: │
├─────────────────────────┤
│ OK                      │
│ Pl                      │
│ Sing                    │
└─────────────────────────┘

┌─────────────────────────┐
│ GENERALL ↑ Person Type is: │
├─────────────────────────┤
│ OK                      │
│ Count                   │
│ LeftAdjofN              │
│ RightAdjofN             │
│ GroupCount              │
│ GroupUncount            │
│ Vocative                │
│ Plural                  │
│ Singular                │
│ Mass                    │
│ Terminal                │
│ Namelike                │
└─────────────────────────┘

Current concept for GENERAL ↑ Person is:

Which subcon of C ↑ Primitive
is GENERALL ↑ Person ?

┌─────────────────┐
│ NewSubConcept   │
│ C ↑ Bond        │
│ C ↑ Change      │
│ C ↑ Truth       │
│ C ↑ Life        │
│ C ↑ Artifact    │
│ C ↑ Stuff       │
│ C ↑ Info        │
│ C ↑ InterRel    │
│ C ↑ SelfRel     │
│ C ↑ Grade       │
│ C ↑ Physic      │
│ C ↑ Unknown     │
└─────────────────┘

FIG. 20C
```

Is KNOWLEDGE
an exact synonym (same FORM and Concept)
for any of: (KNOWL ← Monotrans
KNOWL ← Intrans)?

KNOWLEDGE identical with ?
OK
KNOWL ← Monotrans
KNOWL ← Intrans

Please verify parse of knowledge
OK
(KNOWL ← Monotrans L ← Abstract Base C ← IsObjOf)
(KNOWL ← Intrans L ← Abstract Base C ← IsObjOf)

FIG 21B

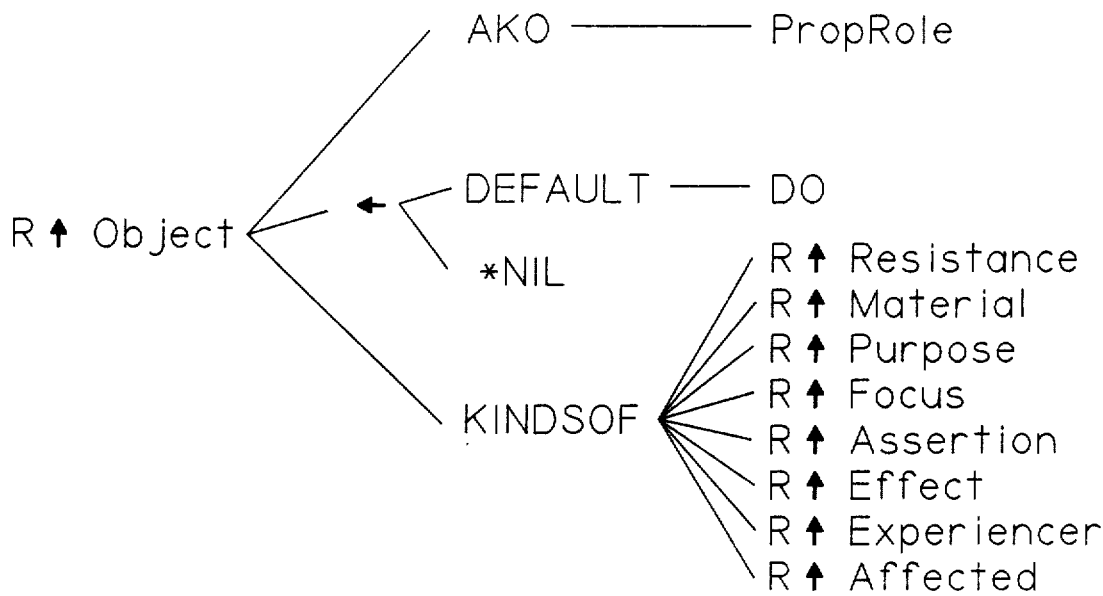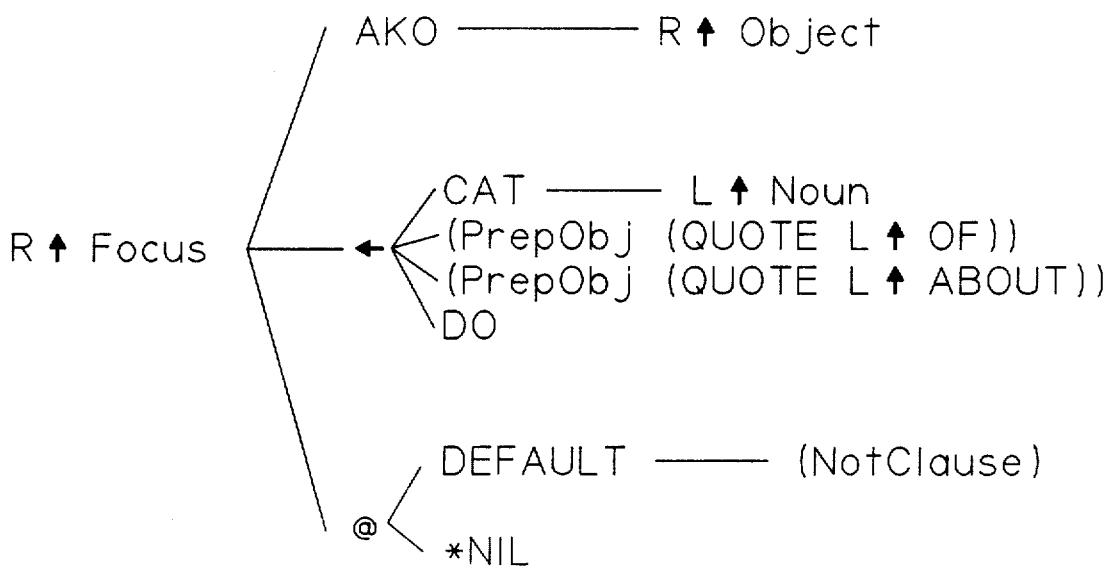
FIG. 25

(R↑ Recipient Frame)
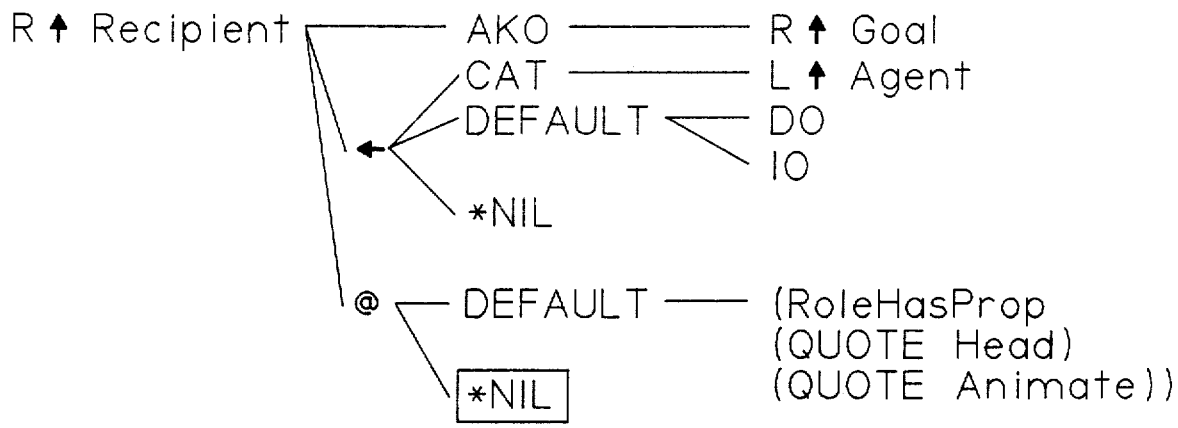
(C↑ ATRANS Frame)
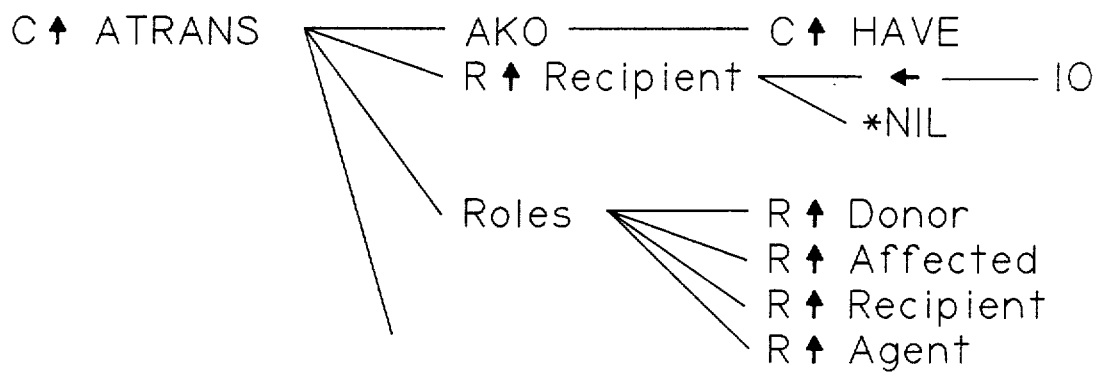
(L↑ TAKE Frame)
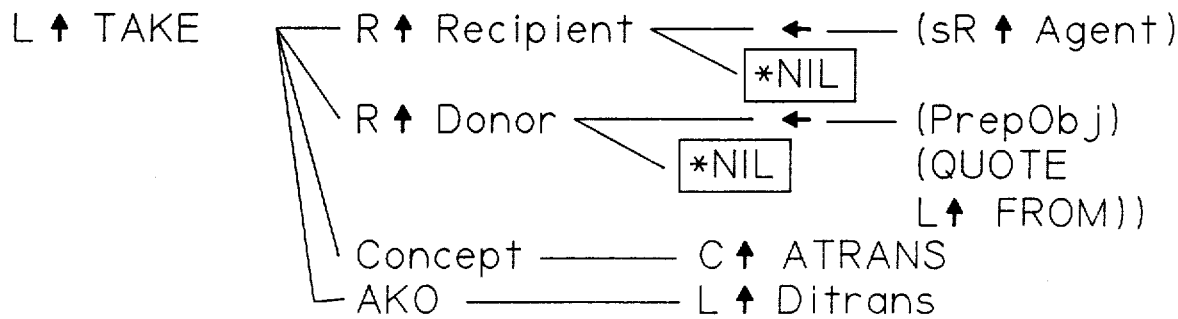
FIG. 26

| Is explore a primitive ? |
|---|
| Yes |

| L ↑ Verb explore is: |
|---|
| OK |
| NewSubCategory |
| L ↑ Aux |
| L ↑ Intrans |
| L ↑ Copula |
| L ↑ Trans |

| L ↑ Trans explore is: |
|---|
| OK |
| NewSubCategory |
| L ↑ Monotrans |
| L ↑ Britans |
| L ↑ TransCopula |

| explore is: |
|---|
| OK |
| L ↑ Def |
| L ↑ Pro |
| L ↑ Prep |
| L ↑ Particle |
| L ↑ Conj |
| L ↑ Rel |
| L ↑ Binder |
| L ↑ Punct |
| L ↑ Noun |
| L ↑ Verb |
| L ↑ Adv |

| L ↑ Monotrans explore is: |
|---|
| OK |
| NewSubCategory |
| UnknownWord |
| L ↑ TofO |

| EXPLOREL ↑ Monotrans Complement is: |
|---|
| OK |
| BareInf |
| ToInf |
| ingForm |
| ThatClause |
| zeroThat |
| So . . |
| Subjunctive |
| WhClause |
| WhToInf |
| PastPart |
| NP |
| NeedsAdv |

FIG. 27

```
┌─────────────────────────────┐
│ EXPLOREL                    │
│ ↑Monotrans                  │
│ Roles ?                     │
├─────────────────────────────┤
│ OK                          │
│ R ↑ Agent                   │
│ R ↑ Instr                   │
│ R ↑ Affected                │
│ R ↑ Experiencer             │
│ R ↑ Companion               │
│ R ↑ Result                  │
│ R ↑ Attribute               │
│ R ↑ Event                   │
│ R ↑ Proposition             │
│ R ↑ Focus                   │
│ R ↑ Purpose                 │
│ R ↑ Material                │
│ R ↑ Opponent                │
│ R ↑ Opposition              │
│ R ↑ Place                   │
│ R ↑ Owner                   │
│ R ↑ Origin                  │
│ R ↑ Donor                   │
│ R ↑ Dest                    │
│ R ↑ Recipient               │
│ R ↑ Path                    │
│ R ↑ Extent                  │
└─────────────────────────────┘
```

```
┌──────────────────────────────┐
│ Which subcon of C ↑ IDEA     │
│ is EXPLOREL ↑ Monotrans ?    │
├──────────────────────────────┤
│ NewSubConcept                │
│ C ↑ Believe                  │
│ C ↑ Study                    │
│ C ↑ Know                     │
│ C ↑ RegardAs                 │
│ C ↑ Examine                  │
│ C ↑ Identify                 │
│ C ↑ Perceive                 │
│ C ↑ ATTEND                   │
│ C ↑ BeAbout                  │
└──────────────────────────────┘
```

```
┌──────────────────────────────┐
│ Which subcon of C ↑ Info     │
│ is EXPLOREL ↑ Monotrans ?    │
├──────────────────────────────┤
│ NewSubConcept                │
│ C ↑ HEAR                     │
│ C ↑ VIEW                     │
│ C ↑ IDEA                     │
│ C ↑ MEASURE                  │
│ C ↑ TALK                     │
│ C ↑ WRITE                    │
│ C ↑ MUSIC                    │
│ C ↑ COMPUTE                  │
│ C ↑ Estimate                 │
└──────────────────────────────┘
```

```
┌──────────────────────────────┐
│ Which subcon of C ↑ Primitive│
│ is EXPLOREL ↑ Monotrans ?    │
├──────────────────────────────┤
│ NewSubConcept                │
│ C ↑ Bond                     │
│ C ↑ Change                   │
│ C ↑ Truth                    │
│ C ↑ Life                     │
│ C ↑ Artifact                 │
│ C ↑ Stuff                    │
│ C ↑ Info                     │
│ C ↑ InterRel                 │
│ C ↑ Grade                    │
│ C ↑ Physic                   │
│ C ↑ Unknown                  │
│ C ↑ NonVerbal                │
└──────────────────────────────┘
```

FIG. 28

```
┌──────────────────────────────────────────┐
│ Which subcon of C ↑ Examine is EXPLOREL ↑ Monotrans ? │
├──────────────────────────────────────────┤
│ NewSubConcept                            │
└──────────────────────────────────────────┘
```

Default source of EXPLOREL ↑ Monotrans
R ↑ Agent is: subject

EXPLOREL ↑ Monotrans R ↑ Agent source ? ]
Default restriction for EXPLOREL ↑ Monotrans
R ↑ Agent: Animate EXPLOREL ↑ Monotrans R ↑ Agent restriction ?
Default source of EXPLOREL ↑ Monotrans
R ↑ Focus: DO
    (PrepObj (QUOTE (ABOUTL↑ Prep
    OFL ↑ Prep
    FORL ↑ Prep)))

EXPLOREL ↑ Monotrans R ↑ Focus source ? DO

EXPLOREL ↑ Monotrans R ↑ Focus source ?
    (PrepObj AROUNDL ↑ Prep)

EXPLOREL ↑ Monotrans R ↑ Focus source ? ]
Default restriction for EXPLOREL ↑ Monotrans
R ↑ Focus is: Info EXPLOREL ↑ Monotrans R ↑ Focus restriction ?
    -Animate EXPLOREL ↑ Monotrans R ↑ Focus restriction ? ]
Global Role requirement ? ]

| EXPLOREL ↑ Monotrans Modelities ? | |
|---|---|
| OK | Please verify parse of explore |
| MODE | OK |
| | EXPLOREL ↑ Monotrans |

Any other (irregularly derived) definite meanings for explore ?
Synonym or Root word is ? ]
Any other unlikely but possible meanings for explore ?
Synonym or Root word is ? ]
(EXPLOREL ↑ Monotrans)
24 ←

FIG. 29

73 ← (VerifyParse BURN)

| Any other (irregularly derived) definite meanings for BURN? |
|---|

| Synonym or Root word is? |
|---|
| BURN2 |

| Is BURN2 a primitive? |
|---|
| YES |

| BURN2 is: |
|---|
| OK |
| L ← Det |
| L ← Pro |
| L ← Prep |
| L ← Particle |
| L ← Conj |
| L ← Rel |
| L ← Binder |
| L ← Punct |
| L ← Noun |
| L ← Verb |
| L ← Adv |

| Please verify parse of BURN |
|---|
| OK |
| BURNL ← Monotrans |
| BURNL ← Intrans |

| L ← Verb BURN2 is: |
|---|
| OK |
| NewSubCategory |
| L ← Aux |
| L ← Intrans |
| L ← Copula |
| L ← Trans |

| L ← Intrans BURN2 is: |
|---|
| OK |
| NewSubCategory |
| UnknownWord |

| BURN2L ← Intrans Complement is: |
|---|
| OK |
| Toinf |
| ingForm |
| ThatClause |
| zeroThat |
| So |
| Subjunctive |
| WhClause |
| WhToinf |
| Zero |
| NeedsAdv |

FIG. 30A

| Which subcon of C ↑ Primitive BURN2L ↑ Intrans? | | Which subcon of C ↑ Info is BURN2L ↑ Intrans? |
|---|---|---|
| NewSubConcept | | NewSubConcept |
| C ↑ Bound | | C ↑ HEAR |
| C ↑ Change | | C ↑ VIEW |
| C ↑ Truth | | C ↑ IDEA |
| C ↑ Life | | C ↑ MEASURE |
| C ↑ Artifact | | C ↑ TALK |
| C ↑ Stuff | | C ↑ WRITE |
| C ↑ Info | | C ↑ MUSIC |
| C ↑ InterRel | | C ↑ COMPUTE |
| C ↑ SelfRel | | C ↑ Estimate |
| C ↑ Grade | | |
| C ↑ Physic | | Which subcon of C ↑ View is BURN2L ↑ Intrans? |
| C ↑ Unknown | | NewSubConcept |
| C ↑ NonVerbal | | |

| New Concept Name? C ↑ Enable View |
|---|

| Which subcon of C ↑ Enable View is BURN2L ↑ Intrans? |
|---|
| NewSubConcept |

Is BURN
an exact synonym (same FORM and Concept) for any of:
(BURNL2L ↑ Intrans)?

| Please verify parse of BURN |
|---|
| OK |
| BURNL ↑ Monotrans |
| BURNL ↑ Intrans |
| BURN2L ↑ Intrans |

| BURN identical with? |
|---|
| OK |
| BURN2L ↑ Intrans |

FIG. 30B (TGTCOM Frame)

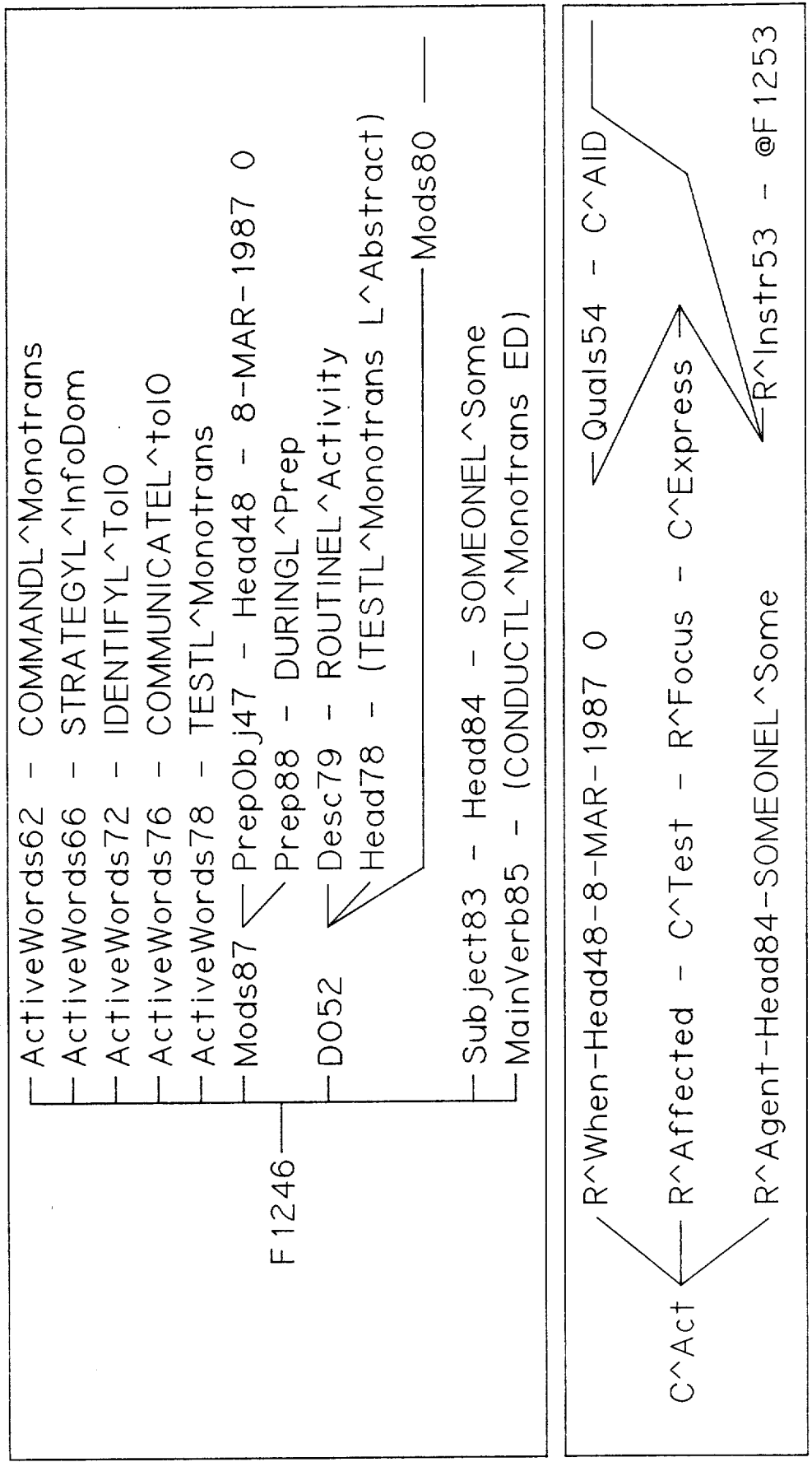

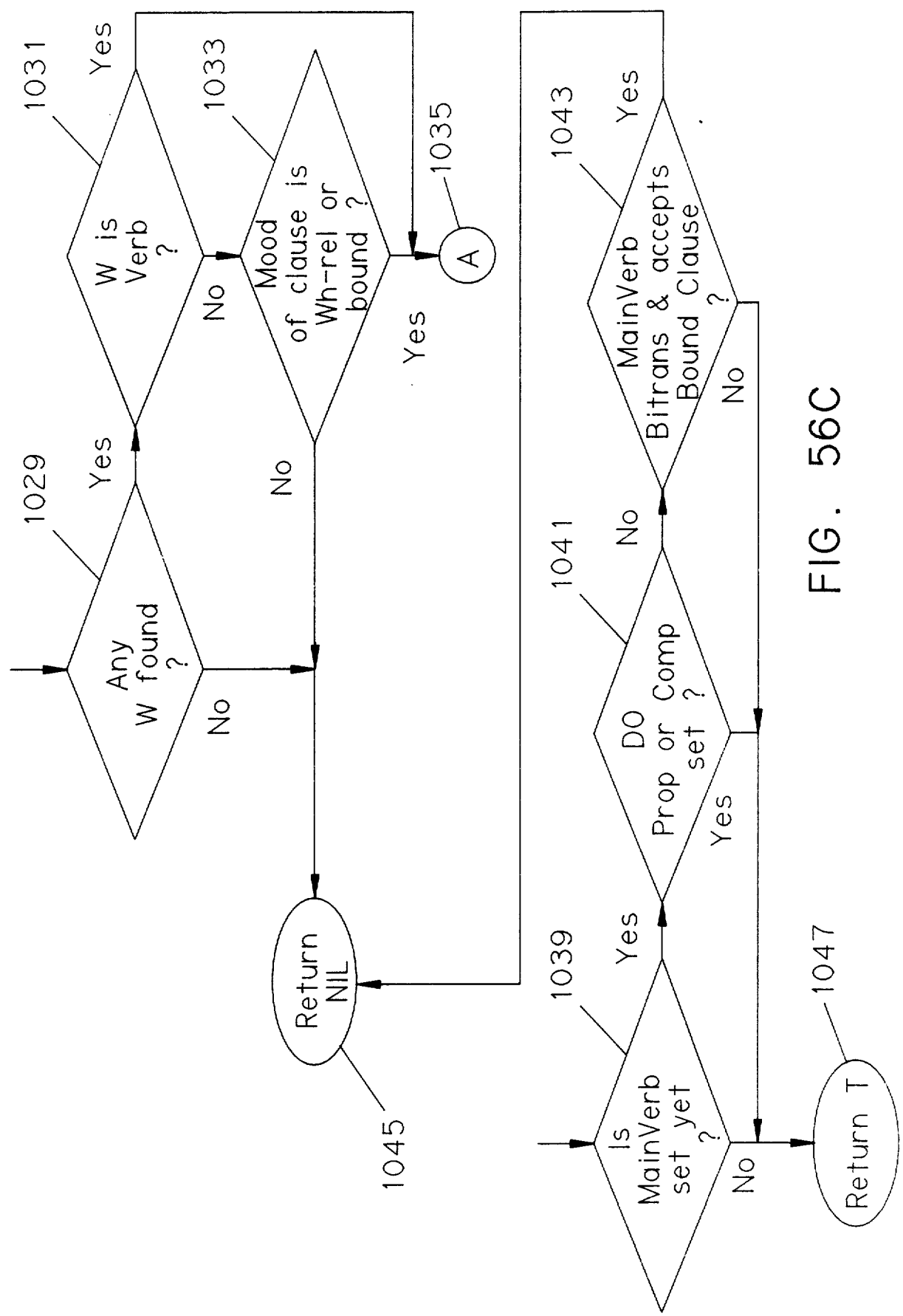

NATURAL LANGUAGE UNDERSTANDING SYSTEM

BACKGROUND OF THE INVENTION

The present invention relates to natural language understanding (NLU) systems, and more particularly to systems for understanding natural language Reference is made herein to various prior art references:

(1) Bates, M. 1978. "The Theory and Practice of Augmented Transition Network Grammars". In L. Bolc (ed.), *Natural Language Communication with Computers*. New York: Springer.

(2) Boguracv, B. 1983. "Recognizing Conjunctions within the ATN Framework. In K. Sparck Jones and Y. Wilks (Eds.), *Automatic Natural Language Parsing*. New York: Halsted Press (3) Cook, W. 1979. *Case Grammar: Development of the Matrix Model*. Washington DC: Georgetown University Press (4) Cruse, D. A. 1986. *Lexical Semantics*. Cambridge University Press, Cambridge, England.

(5) Dyer, M. 1983. *In-Depth Understanding*. Cambridge, MA: MIT Press (6) Jespersen, O. 1964. *Essentials of English Grammar*. University, AL: University of Alabama Press (7) Laffal, J. 1973. *A Concept Dictionary of English*. Essex, CT: Gallery Press (8) Lebowitz, M. 1983. "Memory-Based Parsing", *Artificial Intelligence*, Vol. 21, pp 363-404.

(9) Marcus, M. 1980. *Theory of Syntactic Recognition for Natural Language*. Cambridge, MA: MIT Press.

(10) Quirk, R., Greenbaum, S., Leech, G., and Svartvik, J. 1985. *A Comprehensive Grammar of the English Language*. New York: Seminar Press

(11) Sager, N. 1981. *Natural Language Information Processing: A Computer Grammar of English and Its Applications*. Reading, MA: Addison-Wesley

(12) Schank, R. 1975. *Conceptual Information Processing*. New York: North-Holland.

(13) Wilks, V., Huang, X., and Fass, D. 1985. "Syntax, Preference, and Right Attachment", *Proceedings of the Ninth IJCAI*.

(14) Winograd, T. 1983. *Language as a Cognitive Process*, vol. 1: *Syntax*. Reading, MA: Addison-Wesley.

(15) Winston, Morton E.; Chaffin, Roger; and Herrmann, Douglas. 1987. "A Taxonomy of Part-Whole Relations" in *Cognitive Science*, Vol. 11, pp. 417-444.

(16) Winston, P. and Horn, B. 1984. *LISP*. 2nd ed. Reading, MA: Addison-Wesley.

(17) Woods, W. 1970. "Transition Network Grammars for Natural Language Analysis". *Communications of the ACM*, Vol. 13, No. 10, pp. 591-606.

(18) Woods, W., Kaplan, R. and Nash-Weber, B. 1972. *The Lunar Sciences Natural Language Information System: Final Report*. Cambridge, MA: Bolt Beranek and Newman, Inc.

(19) Xerox Corporation 1986. *Interlisp-D Reference Manual*. Pasadena, CA: Xerox Artificial Intelligence Systems Division.

In the last decade, some headway has been made in the area of data bases to provide information online. This allows for the easy application of statistical and other algorithmic aids to the data. Much of the current work to enhance the usefulness of these systems, to make them more "user friendly", is being performed under the broad heading of Artificial Intelligence. A subdomain of this technology is the area of Natural Language Understanding (NLU). The assumption is that communication with machines would be much easier if only one could use natural language in accessing information. This field is called data base retrieval (or data base query) and is the area to which most NLU work is being applied.

However, there is another NLU application that is less publicized but much more important. Even if the information in a data base is readily accessible, how accurate and timely is that information For example, in message processing applications, many messages arrive at an intelligence center in an unformatted, "free text" form (i.e., natural language). No present NLU system can account for all of English, and in order to accomplish any useful work with such a system, it is built with a specific, limited task in mind. The linguistic structures and vocabulary that a system can handle are specifically targeted to an application domain and expected text input format. A special use of language peculiar to a domain is often referred to as a "sublanguage", a term encompassing dialects and jargons. A significant part of an NLU developer's job is to discover the characteristics of a sublanguage and specify them for the requirements of an NLU development system.

Various NLU methodologies have been proposed. Many of these center on one particular aspect of a problem, such as conceptual analysis, syntax, or knowledge about specific words. The present invention involves a hybrid approach incorporating all of these aspects.

Quirk et al. 1985 contains a useful discussion of word morphology. This reference, Jespersen 1964 and Sager 1981 all provide significant information concerning grammar specification in natural language processing. Particularly pertinent to the technique of using augmented transition networks (ATN) for grammar specification are Bates (1978) and Winograd (1983). Neither reference, however, discloses a methodology for adapting ATNs to a graphical programming environment.

Prior art references dealing with conceptual analysis include Schank 1975 and Lebowitz 1983 (which discuss conceptual dependency); Cook 1979 (dealing with case grammar); Wilks et al. 1985 (semantic preferences); and Laffal 1973 (psychology). Dyer 1983 discloses domain-specific pattern matchers for NLU systems.

Accordingly, it is a principal object of the invention to provide an improved approach to the development of NLU systems, particularly as applied to text processing. Such approach should be adaptable to a broad range of linguistic domains, as well as to a variety of applications such as monitoring and sorting electronic mail.

SUMMARY OF THE INVENTION

In fulfilling the above and additional objects, the invention provides a hybrid natural language understanding system combining grammar development and application tools embodied in Augmented Transition Networks (ATNs), and novel semantic processing techniques. In the underlying process, a series of "words" (in the preferred embodiment, from a source text) are examined with reference to a lexicon, the entries of which include syntactic and semantic information. Then, an ATN grammar specification is used to attempt a syntactic parse. The syntactic structure thus derived is converted to "case frames" (by a case frame applier) which are canonical, language-independent semantic structures. These case frames are then submitted to discourse analysis, to derive domain-specific knowledge.

In accordance with one aspect of the invention, the process flow described above is not always followed sequentially. The case frame applier may notify the parser that a proposed parse is semantically incorrect. "Look ahead" capabilities in the ATNs permit the syntactic parser to ask the case frame applier for a semantic judgment based upon a fragmentary parse, when confronted with two computationally expensive paths.

Another aspect of the invention is the novel semantic technique utilizing a concept network of "case frame templates". A case frame represents a proposition about the world, i.e., a state, process, or action. Each case frame points at the fillers of propositional (intrinsic) and modal (extrinsic) roles. Case frame templates in the concept network store essential information about roles, including: which propositional roles may participate in a concept; which role fillers occur in a syntactic structure (mapping from syntactic registers to case roles); and restrictions on participation of candidate role fillers on a concept.

The NLU system of the invention incorporates a powerful, novel learning module. New words may be learned by context or from interaction with a dictionary officer. This system acquires templates for new case frames via menus and user prompting, and organizes the concepts into a coherent network. New words may be recognized as an inflected form of a known root word, may be obtained by regular morphological derivation, or in the most difficult cases, may be acquired through mixed-initiative interaction with a dictionary officer.

A preferred discourse analysis component uses domain knowledge templates to spawn demons which specify pattern matches based upon knowledge of the specific domain. Thus, both explicit and implied information in the text under analysis is integrated into conceptual structures to represent its meaning. These structures may be sent to a knowledge based system, used to update a database, or forwarded to appropriate analysts or decision makers.

BRIEF DESCRIPTION OF THE DRAWINGS

The above and additional aspects of the invention are illustrated in the following detailed description of the preferred embodiment, which should be taken together with the drawings in which:

FIGS. 6A through 6C show a screen image of the PIKS Agenda and certain associated objects;

FIGS. 8A and 8B show a screen image obtained during a graphic program trace;

FIGS. 12A through 12H are screen images of the primary PAKTUS grammar networks; FIGS. 12A through 12C show the left, middle and right sides, respectively, of the top level (sentence) network, FIGS. 12D and 12E show the left and right sides, respectively, of the noun phrase network while FIGS. 12F through 12H show four further networks;

FIGS. 15A and 15B show the addition of a label and a rule to the ATN graph of FIG. 14;

FIGS. 16A and 16B show the interactive generation of a rule for Arc Jump;

FIG. 18 shows a set of verb categories;

FIG. 19 is a screen image of a PAKTUS request for user verification of its analysis of a new word;

FIGS. 20A through 20D show various screen images illustrating the acquisition of two senses of the word "general";

FIGS. 21A and 21B show a screen image showing the acquisition of an irregular word;

FIG. 25 is two windows showing a specific case role over-riding the mapping default of its category;

FIG. 26 is three windows showing case role mappings over-ridden in a specific concept and then in a specific verb;

FIG. 27 is a screen image illustrating the initial interaction in learning a new verb;

FIG. 28 is a screen image of a case frame specification for "explore";

FIG. 29 illustrates role source and constraint specification for the verb "explore";

FIGS. 30A and 30B show various screen images illustrating the entry of a new sense of the verb "burn";

FIGS. 35A and 35B show a window image corresponding to that of FIG. 34, for a second sentence;

FIGS. 56A through 56C show a flow chart schematic diagram of a look-ahead test for the presence of a relative clause with a relative pronoun or noun phrase.

DETAILED DESCRIPTION

The following detailed description of a natural language text understanding system according to a preferred embodiment of the invention is organized according to the following major sections:

(1) An overview of the system architecture;

(2) The object-oriented programming language underlying the preferred embodiment of this NLU system;

(3) The ATN-based grammar specification used in this system, and the graphic programming techniques used to develop this;

(4) The system lexicon, i.e., data base for lexical information about words;

(5) The semantic analysis and use of conceptual case frames in this analysis;

(6) Conceptual integration to produce domain-specific output; and (7) Examples of the processing of a message by this NLU system.

1. SYSTEM OVERVIEW

Figure 1:
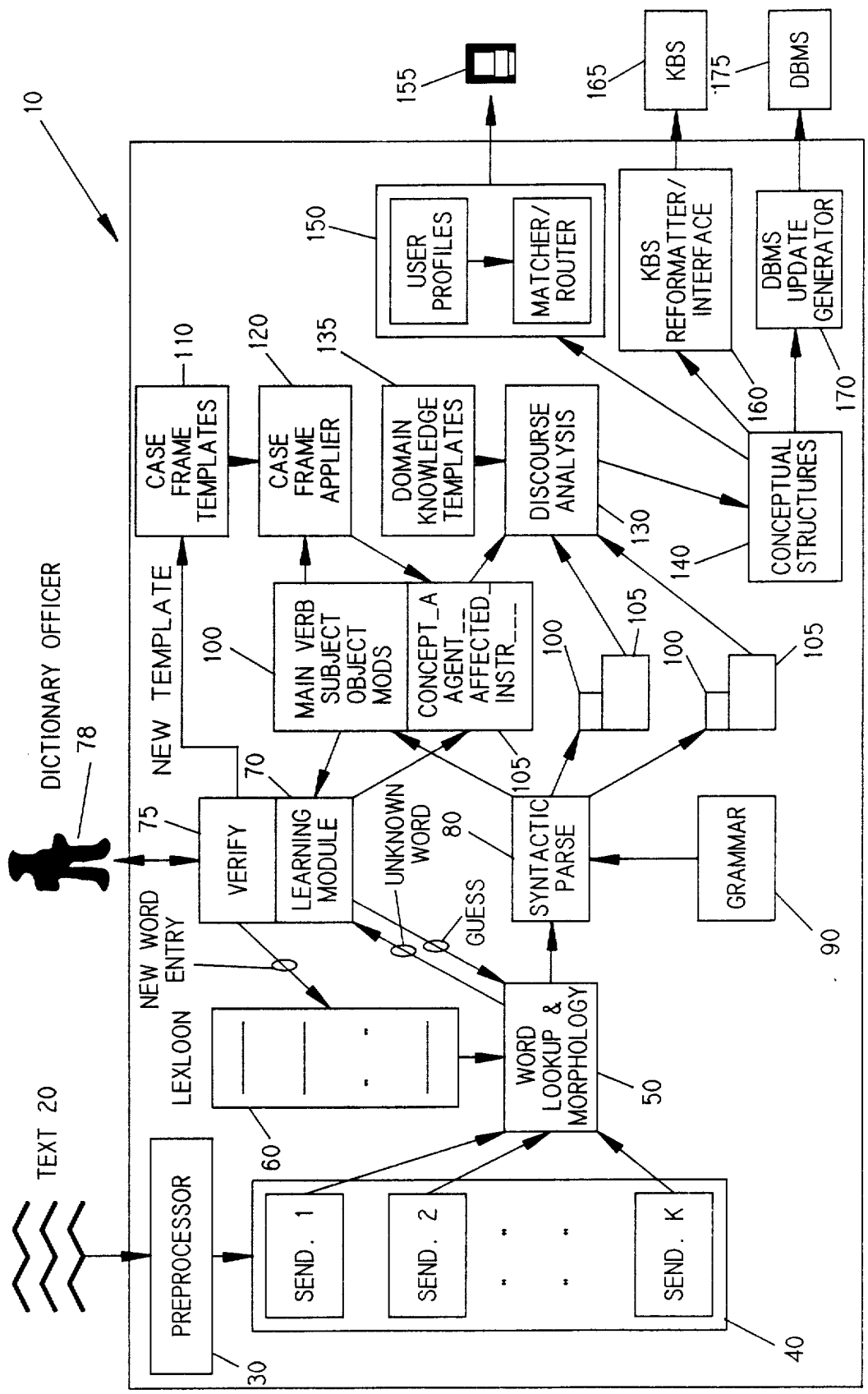
FIG. 1 is a block schematic diagram of the PAKTUS architecture (i.e., of a preferred NLU system in accordance with the invention)

The NLU system of the preferred embodiment is often referred to in this patent specification as PAKTUS (PRC Adaptive Knowledge-based Text Understanding System). PAKTUS is a hybrid system. It integrates syntactic and semantic NLU methods that have had partial success in the prior art, and augments these with novel semantic processing and powerful new programming tools for building grammars. The PAKTUS architecture is summarized in FIG. 1. Its primary functional components are represented within the large box, with interfaces to the external environment indicated by arrows into and out of the box. Processing begins with the arrival of an electronic stream of text, indicated at 20. Such a stream might be produced by a speech recognition device or an optical character scanner, but more likely would be a pre-existing message stream. In any case, the first function performed, by the preprocessor 30, is the decomposition of the stream of characters into individual words, sentences, and messages (at 40).

The "words" identified by the preprocessor 30 are actually just "tokens" that suggest entries in a lexicon 60 which contain information about the meaning and usage of actual words. Often, words are encountered that have never been seen previously by PAKTUS. It tries to analyze these morphologically, with frequent success. If this fails, it deduces as much as it can from the current context, later verifying its deductions through mixed initiative interaction of the learning module 70 with a dictionary officer 78 (a person with substantial linguistic knowledge and an understanding of the structure and function of the PAKTUS lexicon).

The next step in processing the text is for module 80 to parse the sentences syntactically, according to a grammar specification 90 embodied in PAKTUS as an Augmented Transition Network (ATN). This parse identifies the subject, main verb, direct and indirect objects (if any), prepositional phrases, relative clauses, adverbials, etc. for each sentence. Then the syntactic structure 100 is converted to canonical, language-independent semantic structures called "case frames". A case frame 105 represents a proposition about the world (a state, process, or action) and points at the fillers of its "propositional" (intrinsic) and "modal" (extrinsic) "roles". Modal roles include time, place, etc., and are independent of all but a few concepts. They are optional in almost any sentence and represent "meta-propositions" that predicate something about the basic sentential proposition.

If the parse cannot be put into any case frame, it is rejected and the syntactic parser tries alternatives. In some situations, the syntactic parser may fail, in which case alternative methods for handling ill-formed input are tried. Such methods tend to be application specific. The case frames are collected by a discourse analysis component 130, which applies knowledge (templates 135) about the particular domain of the application system to integrate all the information, both explicit and implied, of the message into conceptual structures 140 representing its meaning. These structures 140 may be passed to a knowledge based system (at 160, 165) which will act according to its goals. Alternatively, they might be matched against analysts' and decision makers' interest profiles cast in terms of conceptual templates, and routed accordingly (at 150, 155); or they might be reformatted into a data base update (at 170, 175).

The above discussion was framed as though processing proceeded sequentially from preprocessor through morphology, syntactic parse, case frame application, discourse analysis, and final transmission to the intended person or system. While that does represent the basic flow of control, there are important feedback points. For example, the case frame applier 120 may notify the syntactic parser that a proposed parse is semantically incorrect, so an alternative parse should be attempted. This may happen at the end of a clause or even within a clause; the system saves prior successful configurations and may return to such a configuration in the event that further parsing leads to a semantically unacceptable configuration. In addition, when confronted with two computationally expensive paths, the syntactic parser 80 may ask the case frame applier 120 to make a semantic judgment based on a fragmentary parse, before deciding which to try first.

The learning module 70 of PAKTUS is quite powerful, although it is not designed for an untrained user. In addition to learning new words either from context or from interaction with a dictionary officer, it acquires templates for new case frames via menus and user prompting, and it organizes the concepts into a coherent network. Words and conceptual case frames are not entered into PAKTUS in advance. PAKTUS was designed to acquire new words as encountered, as a human child does. It can learn words in a variety of ways and with varying confidence. The simplest consists of recognizing an inflected form of a known root word; for example, recognizing "symbols" as the plural form of "symbol" or "shaking" as the present participle of "shake". This type of word recognition is so simple, reliable, and efficient that PAKTUS need not even both to ask the dictionary officer for confirmation, nor does it clutter the lexicon 60 with a permanent record of the inflected form. At the next level is regular morphological derivation such as recognizing "symbolize" as meaning "to be a symbol for something". Such derivations are less reliable, due to the ever changes nature of natural languages (e.g., what was once a regularly derived word may later take on a new meaning), so PAKTUS preferably asks for verification of these by the dictionary officer 78.

The most difficult case, and the most interesting, occurs when a word is encountered that cannot be morphologically decomposed, either because its root is unknown or it is irregularly derived. The invention provides different modes of operation wherein PAKTUS will either ask to be taught the definition (including any associated case frame) immediately, acquiring it through mixed-initiative interaction with the dictionary officer; or it will "guess" as much as it can from the context in which the word is used, and proceed with its task. In the latter case, it stores its guesses in a special list. Periodically, the dictionary officer asks to see these lists and verifies, supplements, and corrects them through mixed-initiative interaction, after which PAKTUS stores the results permanently. As an NLU system's capabilities are developed, it may become increasingly more active in this learning process.

2. PIKS OBJECT PROGRAMMING SYSTEM

2.1 Introduction

The following discussion comprising Section 2 of this application describes a shell for developing and using knowledge-based systems, known by applicants and referred to herein as PIKS (PRC Integrated Knowledge-Programming System). It supports a variety of programming techniques which are utilized in the interactive graphic natural language programming system of the invention. The PIKS embodiment discussed in Section 2 of this application was implemented in Common Lisp and Interlisp D, the latter being used to support graphics functions.

2.2 Summary

Subsection 2.3 discusses object programming in PIKS. PIKS incorporates a network of frame data structures, in which objects may inherit attributes and behavior along any path. Subsection 2.4 explains a system browser facility in PIKS which provides intelligent interactive windows into objects and the knowledge network. Subsection 2.5 discusses the use of PIKS for rule-based programming to support inferencing. Subsection 2.6 discusses the PIKS object-oriented data base.

2.3 Object Programming In PIKS

2.3.1 Introduction

Figure 2:
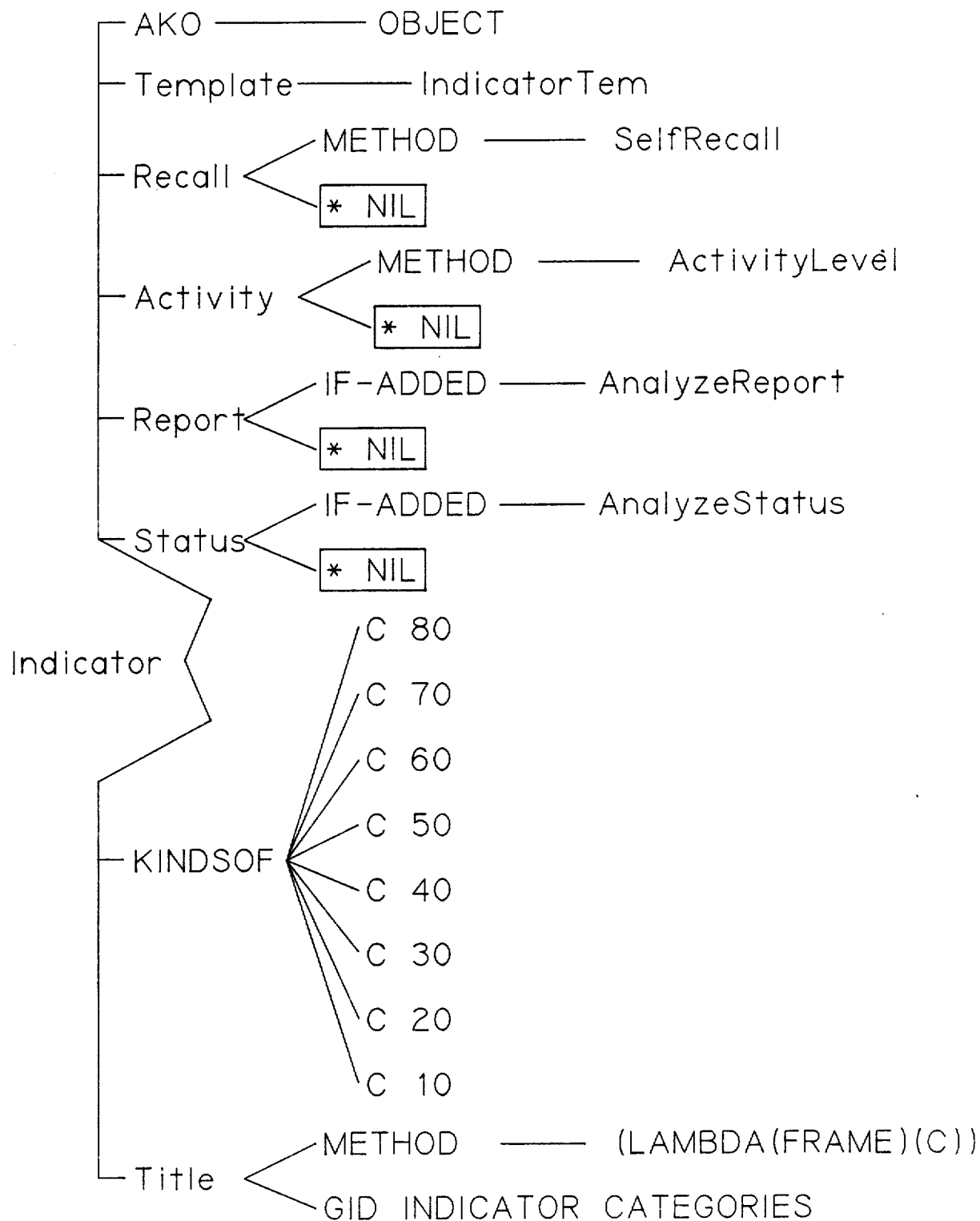
FIG. 2 is a screen image of an object in the PIKS object-oriented programming system.

PIKS supports object-oriented programming. this programming style, objects serve to organize information about the application domain. Objects are data structures with associated procedures. The basic structure of objects in PIKS is similar to that described by Winston and Horn (1984), and the term "frame" as used in this application is used in the same sense as in that prior art reference. Each object has a name and a set of slots. Each slot has an associated value and a set of other facets. The names of non-value facets appear within the object. The fillers of the value or other facets are lists of arbitrary LISP objects, including the names of other PIKS objects; therefore, the equivalent of any data structure can be constructed from these objects. An example of an object as displayed in a PIKS Browser window (see section 2.4) is shown in FIG. 2; note that this is an example of an object used for an expert systems application rather than natural language processing.

The facets other than the value of a slot may represent anything the user chooses, but PIKS supports certain facets that, in effect, monitor the value facet. These are often referred to as demons. In FIG. 2, the Report and Status slots have IF-ADDED demons, which monitor the addition of values to these slots. Other non-value facets recognized by PIKS are methods, which name procedures that are invoked in response to messages to objects; defaults and if-needed facets, which are used in retrieving information from objects; and modes, which associate properties with objects. These are explained in detail in the following sections.

2.3.2 Accessing and Modifying Objects

The user may interact directly with objects using the System Browser described in section 2.4. Programs, however, will normally use the primitive access functions described in this section.

(Note on notation: All function specifications in Section A of the present application consist of a "." followed by the function name in boldface, the arguments in square brackets, and an explanation of the function. All functions are Lambda expressions (i.e., they evaluate their arguments), unless otherwise noted.)

2.3.2.1 Basic Functions for Putting Information in an Object

FRAMEPUT [Frame Slot Facet Value Nomark Noaudit]
  Adds Value at the end of the Facet facet of the Slot slot of Frame, if it is not already there. Notifies the PIKS database system or the Interlisp file package that Frame is changed unless Nomark is non-NIL. Stores audit information (date, time, manner of creation or update) in Frame unless Noaudit is non-NIL or the globalvar PIKSAUDIT is NIL. If (EQ Facet 'VALUE) and Slot has an inverse, Slot', then also stores Frame in VALUE facet of Slot' of Value, notifies the PIKS database system or the Interlisp file package that Value is changed unless Nomark is non-NIL, and stores audit information (date, time, manner of creation or update) in Value unless Noaudit is non-NIL or the globalvar PIKSAUDIT is NIL. Nomark and Noaudit have these same effects in all the functions below that use them. FRAMEPUT returns Value if it was stored, NIL otherwise.
  Note: Frame must be an atom. Slot and Facet should also be atoms, although FRAMEPUT will still create the specified structure if they are not. However, if Slot of Facet is not an atom, the PIKS functions that fetch information (FRAMEGET, etc.) will not recognize it. Value may be any LISP expression unless it is being put in the VALUE facet of a slot that has an inverse (see subsection 2.3.3), in which case it must be an atom.

FRAMEPUT! [Frame Slot Facet Value Nomark Noaudit]
  Like FRAMEPUT, but first removes any existing value(s) from Frame Slot Facet. This is for use when Facet should have a unique value. If (EQ Facet 'VALUE) and Slot has an inverse, Slot', then Frame is removed from the Slot'VALUE of each element of Frame Slot's VALUE. Returns Value.

2.3.2.2 Basic Functions for Getting Information from an Object

FRAMEGET [Frame Slot Facet]
  Returns the list of values stored on the Facet facet of the Slot slot of Frame. If Facet is not specified (or NIL), the VALUE facet is returned. Note that (a pointer to) the actual list within the frame is returned, not a copy. If surgery is performed (e.g., by NCONC, join, etc.), then the frame itself is changed.

FRAMEGET! [Frame Slot Facet]
  Returns the same value as (CAR (FRAMEGET Frame Slot Facet)) but is slightly more efficient.

FRAMEGET.V.D [Frame Slot]
  Returns the list of values stored on the VALUE facet of the Slot slot of Frame, if any; otherwise, returns list of values on the DE639 FAULT facet of the Slot slot of Frame.

FRAMEP [Object]
  Returns Object's FRAME property, if any; otherwise NIL.

GETFACETS [Frame Slot]
  Returns list of facets for Slot slot of Frame.

GETSLOTS [Frame]
  Returns list of slots defined for Frame.

HasSlot [Frame Slot]
  Returns the tail of Frame's slot list beginning with Slot if Frame has Slot; otherwise NIL.

IsRoot [Frame]
  Returns (Frame) if Frame has an AKO value (see Subsection 2.3.3.2 below); otherwise NIL.

@[Frame Slot Facet Value Nomark Noaudit]
  Behaves like FRAMEPUT if the first four arguments are non-NIL or like FRAMEGET if only the first three are non-NIL. If only Frame and Slot are given, returns the contents of Slot. If only Frame is given, returns its contents.

2.3.2.3 Functions for Removing Information from Objects

FRAMERMOVE [Frame Slot Facet Value Nomark Noaudit Noinv]
  Deletes Value from Facet of Slot of Frame (inverse of FRAMEPUT). If (EQ Facet 'VALUE) and Slot has an inverse, Slot', and Noinv is NIL. removes Frame from Slot' VALUE of Value. Returns Value if it wad deleted, NIL otherwise (i.e., Value was not there).

FREVALS [Frame Slot Facet Nomark Noaudit]
  Deletes entire Facet from Slot of Frame. Returns Facet if it was deleted, NIL otherwise. If (EQ Facet 'VALUE) and Slot has an inverse, Slot', then Frame is removed from the Slot' VALUE of each element of Frame Slot's VALUE.

FRESLOT [Frame Slot Nomark Noaudit]
  Deletes entire Slot from Frame. Returns Slot if it was deleted, NIL otherwise. If Slot has an inverse, Slot', then Frame is removed from the Slot' VALUE of each element of Frame Slot's VALUE.

KillNode [Frame Nomark Noaudit Noprompt]
  First sends an AboutToBeDestroyed message to Frame. Certain objects (e.g., CONCEPT) will not permit their destruction, and they will so inform the user and return "DONT" to KillNode, which will refuse to proceed. Otherwise, if Noprompt is NIL (the default), first asks for confirmation in a pop-up window. If the user confirms, KillNode destroys Frame and removes any links to it from other objects if the links (slot-VALUES) have INVERSEs. If this results in the other objects being "orphaned" (see section 3.3.3), the user is asked to supply a new parent but may respond NIL. Returns NIL.

2.3.3 Relationships among Objects

2.3.3.1 Slots Viewed as Assertions about Relationships

When the value of a slot of an object contains the name of another object, the two objects are in a relationship named by the slot. Formally: for any slot S, the set $R_s$, of all pairs $(O_1, O_2)$ of objects such that $O_2$ is a member of the value of slot S of object $O_1$, is a relation. Since relations may be ewed as predicates, links between objects often represent assertions about the things being represented. Furthermore, following links from object to object is a form of deduction, so that from one point of view, object networks together with the inheritance mechanisms to be described below provide a significant part of predicate calculus. PIKS also provides for non-monotonic reasoning, using inheritance with exceptions, as explained in section 2.3.7.

Although the user is free to associate any interpretation to the relations implicit in slot linkages, PIKS was designed under the assumption that all predicates of the form $R_j$ above are uniformly true, that is, allowing no exceptions. when exceptions are desired, property inheritance, as explained in section 2.3.7, should be used. Nothing in PIKS forces the user to accept this convention, but Certain design details of the inheritance mechanisms will be better understood if this is kept in mind.

2.3.3.2 The AKO Network

The AKO slot is treated specially by PIKS. It specifies subclass and instance relationships between objects. As such, it is the default link used for inheritance (see section 2.3.3.5). Every object should have a value for its AKO slot. PIKS does not prevent the creation of objects that lack this slot, but it will refuse to perform certain operations on them. In addition, it is probably a good idea to ensure that all objects are descended from the OBJECT object.

Of course, many objects may be linked to the same parent by their AKO slot. It is also permissible for an object to have more than one AKO value. In other words, the relation defined by AKO links is a network; it need not be a hierarchy. The only restriction on the structure of the network is that there should be no AKO cycles (e.g., X is AKO Y, Y is AKO Z, and Z is AKO X). The user must enforce this restriction; PIKS does not (for efficiency). (Actually, cycles Will not necessarily cause problems; see the discussion of FRAMEGET-Z in section 2.3.3.5.)

It is often necessary to use the inverse of the AKO relation. In PIKS this inverse relation is called KINDSOF (if BOY is AKO (i.e., A Kind Of) PERSON, then KINDSOF PERSON includes BOY). Because this inverse relation must be known so frequently, it is explicitly and automatically stored by PIKS. (It could be computed whenever needed, but at great cost in computation time.) Whenever PIKS establishes an AKO link from object X to object Y, it immediately establishes a KINDSOF link from Y to X. Conversely, if a KINDSOF link is added from Z to W, then PIKS immediately establishes an AKO link from W to Z. In addition, if an AKO or a KINDSOF link is deleted, the inverse link is also deleted by PIKS.

2.3.3.3 Other Special Links

There are several additional object links treated specially by PIKS. Each of these has an inverse which is automatically maintained. These links and their respective inverses are: Parts and PartOf; Instances and AIO; Location and IsHere; and INVERSE and INVERSE. One other special PIKS link is Has. It does not have an inverse. Objects representing each of these slots exist as KINDSOF the object SLOT.

Note that the Instances and AIO slots are provided for the convenience of users who want to distinguish between classes and instances. Many knowledge representation systems do this. PIKS does not itself recognize this distinction, however, since its users have not found any compelling reason to do so in their applications to date.

2.3.3.4 User-Defined Links

Users may define any links (or slots in general) they desire. PIKS supports user-defined inverse link pairs. To cause PIKS to maintain such bi-directional links, one defines objects for each link as KINDSOF the object SLOT and lists each link object as the INVERSE value of the other. For example, suppose one wants PIKS to recognize the Parent and Child relations as inverses. One can do this with the Browser (see section 2.4), or directly, by the function calls:
(FRAMEPUT 'SLOT 'KINDSOF 'VALUE 'PARENT)(*makes Parent AKO SLOT)
FRAMEPUT 'SLOT 'KINDSOF 'VALUE 'Child)(*makes Child AKO SLOT)
(FRAMEPUT 'Parent 'INVERSE 'VALUE 'Child)(*makes Parent and Child inverses of each other)

Certain links may be considered essential. That is, one may want all objects of a certain type to have these links. PIKS has a facility for identifying links that should normally be maintained. If an object that had such links subsequently loses all of them as a result of a KillNode operation, PIKS will prompt the user to supply new links, unless the Noprompt option to KillNode is non-NIL. This link monitoring is established by storing the atom MAINTAIN in the MODE facet of the INVERSE slot of the link object. In the example of the preceding paragraph, (FRAMEPUT 'Parent 'INVERSE 'MODE 'MAINTAIN)(*maintain the Parent link) will cause PIKS to prompt for new Parent(s) whenever a node becomes "orphaned" by KillNode (unless Noprompt is non-NIL). The PIKS links AKO and Location have the MAINTAIN mode.

2.3.3.5 Inheritance of Slot-Facet Values

Slot-facet values may be inherited through object relations. The basic information fetching functions described in section 2.3.2.2 access only the specified object. sometimes, however, information may be common to many objects. In that case, rather than redundantly storing the information in each object, it may be stored in a common ancestor (i.e., an object that can be reached by traversing links of some relation) and inherited by its progeny (i.e., all objects that can be reached from ancestor by traversing links of the inverse relation).

PIKS provides an alternative fetching function, FRAMEGET-Z, that implements this inheritance. Thus inheritance will occur only where the PIKS user wants it. It would be slightly simpler to always look for inherited values, but this search incurs great computational cost, and in practical applications, the system developer almost always knows in advance whether or not a value should be found in the object accessed, or inherited. Nevertheless, if one feels that simplicity outweighs efficiency, one has the option of always using FRAMEGET-Z instead of FRAMEGET for information fetching.

The default relation for inheritance is AKO, but the user may supply any path. The PIKS implementation of this inheritance takes the information from the first object encountered in the depth-first search along the specified path that has it. If no slot-facet value is found in this search, it is retrieved, if available, from the object that represents the slot. The information may be inherited as a specified value, or, alternatively, a procedure may be invoked to compute the result. The procedure must be defined by the PIKS user and stored in the appropriate place. The details are as follows:
FRAMEGET.Z [Frame Slot Facet Path Focus]
 Returns same list as FRAMEGET, unless Frame has no Slot-Facet values, in which case a depth-first search is made along the Path relation (default Path is AKO) from Frame until Slot-Facet values are found and these are returned. If Facet is NIL, searches for VALUE, DEFAULT, or IF- NEEDED facet of Slot, in that order; if IF-NEEDED values are found first, they are APPLIED to (Frame Slot), and the list of results is returned. Each IF-NEEDED function should return a list. If more than one is present, the resulting lists are joined together. If this search does not result in any value, then another search for a VALUE, DEFAULT, or IF-NEEDED facet is initiated, beginning with the Facet slot of the Slot object and following AKO paths. Note that (FRAMEGET-Z Frame Slot 'VALUE) may not return the same value as (FRAMEGET-Z Frame Slot). The former will not notice any DEFAULT or IF-NEEDED facets; the latter will.

2.3.4 Some Useful Functions Based on Object Relations

Figure 3:
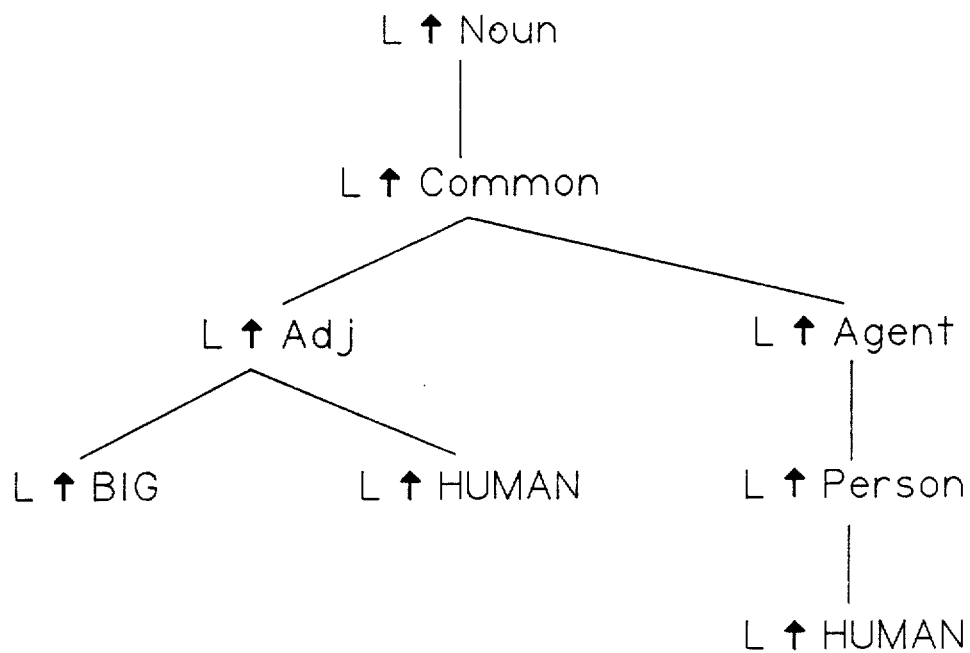
FIG. 3 is a screen image of a fragment of the AKO network.

Is [It Thing Path BlockCat]
  Thing may be an atom or a list. Returns non-NIL if, following Path links, It is a descendant of Thing, if thing is an atom, or of a member of Thing if thing is a list. The default path is AKO. The search along Paths will ignore BlockCat. For example, in the PAKTUS natural language application, which includes the AKO relationships depicted in FIG. 3, it is sometimes necessary to know whether a word is a substantive (i.e., a common noun which is not also an adjective). One can use, for example, (Is 'BIG "Common NIL 'Adj) which returns NIL since there is no AKO path from BIG to Common that does not pass through the Adj category. As another example, (Is 'HUMAN 'Common NIL 'Adj) returns non-NIL since there is a path to Common that does not pass through the blocked Adj category.
  Note: Do not write programs that use the value returned by Is. Is should be used only as a predicate (the value returned is either NIL or tru (non-NIL)). The specific non-NIL value returned may change in the future. (It has changed several times in the past.) If there is a compelling reason to return some particular value, that may be implemented later. (Currently, Is returns the parent of It which is at the start of the path to Thing, assuming that It is not itself a Thing; e.g., (Is 'HUMAN 'Common NIL 'Adj) returns Person.)
Has [It Thing Path]
  Returns the first member of It's Has value that Is Thing, if any; otherwise the first member of It's Parts slot that Has Thing, if any; otherwise NIL. Path is passed to Is (the default is AKO). For example, in one application (Has 'UR5thAirReconRgt 'Tactical Aircraft) returns UR8thReconSqdn because UR8thReconSqdn is one of UR5thAirReconRgt's Parts, and it Has BREWER-D, which Is a TacticalAircraft.
Contains [It Thing Path]
  Returns the first object in It's Has value that Is Thing, if any; otherwise NIL. Path is passed to Is (the default is AKO). For example, in the application just mentioned (Contains 'KyzlArvat 'TacticalAircraft) returns UR8thReconSqdn because UR8thReconSqdn is in KyzlArvat's IsHere Value, and it Has BREWER-D, which Is a TacticalAircraft.
InvSlot [Slot]
  Returns the inverse of Slot, if any; otherwise NIL.

2.3.5 Active Values (Demons)

Active values are slots that trigger attached procedures (i.e., demons) when their value is accessed. The procedures that maintain inverse link relationships, for example, are demons. These are deeply embedded, within the object-access functions, however, and are not associated with particular objects. The demons that monitor active values are stored in objects, and different (classes of) objects may have different demons for the sale slot. The IF-NEEDED functions discussed in section 2.3.3.5 are such demons. They are an integral part of the PIKS inheritance mechanism. This section describes the PIKS support for other demons.

PIKS provides demons that monitor the addition, deletion, or fetching of values. The demons are invoked by the functions FRAMEPUT+, FRAMEREMOVE+, and FRAMEGET+. These return the same values and have the same effects as FRAMEPUT, FRAMEREMOVE, and FRAMEGET, respectively, if no demons are associated with the object and slot being accessed.

Section 3 of this application describes the definition and storage of demons for the ATN-based NLU interactive programming technique of the invention. Demons for monitoring the addition of values are normally put on the IF-ADDED facet of the slot being monitored; those monitoring value deletion are on the IF-REMOVED facet; and those monitoring value fetching are on the IF-FETCHED facet. Demons are inherited through the AKO network and are not usually stored on leaf nodes. Unlike inheritance of other facets, all inherited demons are invoked, not just the first one found. Also, if no demons are found on AKO ancestors, PIKS will invoke any demons found on the slot object instead. These should be stored on the IF-ADDED, IF-REMOVED, and IF-FETCHED facets of the appropriate slot (as defined belo)) of the slot objects. Demons may also monitor non-VALUE facets of slots, but these are limited to global demons on the slot object. (They are global in the sense that a single demon monitors the slot-facet value of all objects.)

FRAMEPUT+ [Frame Slot Facet Value DupFlg Nomark Noaudit]
  Same as FRAMEPUT, but if Facet is VALUE and Value is a new value or DupFlg is non-NIL, also searches along AKO links for IF-ADDED facets; values in IF-ADDED facets are APPLIED to the list (Frame Value Slot Facet). If Facet is not VALUE or no IF-ADDED facets were found, any values in the IF-ADDED facet of the Facet slot of Slot are used instead. Returns value if it was added or DupFlg is non-NIL, NIL otherwise. The demons are invoked after the Value is stored in Slot. Note that the demons are not invoked if Value was already there, unless DupFlg is non-NIL.
FRAMEREMOVE+ [Frame Slot Facet Value Nomark Noaudit Noinv]
  Same as FRAMEREMOVE, but if Facet is VALUE, also searches along AKO links for IF-REMOVED facets; values in IF-REMOVED facets are APPLIED to the list (Frame value Slot Facet). If Facet is not VALUE or no IF-REMOVED facets were found, any values in the IF-REMOVED facet of the Facet slot of Slot are used instead. Returns Value if it was deleted, NIL otherwise. Noinv is passed on to FRAMEREMOVE. The demons are invoked before the Value is deleted from Slot.

FRAMEGET+ [Frame Slot Facet]
Same as FRAMEGET, except that if Facet is NIL or VALUE, also searches along AKO links for IF-FETCHED facets; values in IF-FETCHED facets are APPLYed to the list (Frame Slot Facet). If Facet is not NIL or VALUE or no IF-FETCHED facets were found, any values in the IF-FETCHED facet of the Facet slot of Slot are used instead. Returns the result of (FRAMEGET Frame Slot Facet). The demons are invoked before the Value is fetched from Slot.

2.3.6 Messages to Objects

Another way to evoke action from an object is to send it a message. This is somewhat like the use of demons in that procedures are attached to objects. However, it is different in that the procedures are explicitly invoked, and they may take any number of arguments in addition to the name of the object receiving the message. The functions that are invoked in response to messages are called methods. They are usually stored on the METHOD facet of the slot whose name is the same as the message (thus, messages must be atoms). They are inherited through the AKO network (they are fetched with FRAMEGET-Z). Alternatively, a method may be stored on an object whose name is the same as the message, on its METHOD slot, VALUE or DEFAULT facet. Another alternative is that an object may have a private method, which it uses but does not pass on to its progeny. These are stored on the My-METHOD facet. The message passing function is "←" (left arrow). The calling syntax is as follows:

← [Frame Message $Arg_1 \ldots Arg_n$]
  The method is the first element of the MyMETHOD facet of the Message slot of Frame, if any; otherwise (CAR (FRAMEGET-Z Frame Message 'METHOD)). Raises an error if the method is not function. APPLYs the method to the list (Frame $Arg_1 \ldots Arg_n$) and returns the result.

As with demons, the PIKS user must define the methods and install them in the appropriate places. The PIKS kernel recognizes three messages Default methods for responding to these messages are stored in the message objects These messages and their associated methods are described below. For examples of how methods are installed, the user is advised to use the PIKS Browser (see section 2.4) to look at the object's SLOT (which holds a method that is inherited by its progeny), CONCEPT (which has a private method), and AboutToBeDestroyed (which holds a global default method).

AboutToBeDestroyed
  This message is sent to an object by KillNode (see section 2.3.2.3). The default method for objects descended from CONCEPT via AKO links is the function ProtestIfNot Gensym, which warns the user if the object does not appear to have been created by a GENSYM (i.e., it does not look like a temporary object). The default method (stored in the AboutToBeDestroyed object) for other objects is the function ProtestIfOldEnough, which informs the user if the object is more than 30 minutes old, assuming that PIKS object auditing was on when the object was created (see section 2.3.2.1). Most of the PIKS kernel objects have the function No as their method for this message. It prints (and speaks, if a Votrax is active) a message, inverts the screen a few times, and returns the atom DONT to the calling function.

AboutToBeRenamed
  This is sent to an object by RenameNode (see section 2.3.5). The default method permits renaming. (It simply returns T.)

DescribeYourself
  This is used by the Browser (see section 2.4). The default response is to print (and speak, if a Votrax is active) a description of the object. This description consists of lists of the values of each slot that has an inverse (these are assumed to contain the most interesting data), preceded by whatever is stored in the Meaning facet of the My slot of the slot object. For example, the current value of AKO'S My Meaning is the string "I am a kind of". Thus, if X is AKO Z and W, part of its response to the DescribeYourself message is "I am a kind of (Z W)", unless, of course, the default method is overridden by another one stored in X or one of its ancestors.

2.3.7 Properties and PropertyInheritance with Exceptions

Several forms of inheritance are discussed above: inheritance of slot-facet values, of demons that monitor values, and of methods for responding to messages. The property inheritance discussed in this section is different. An object generally inherits values, demons, and methods from the first ancestor found possessing the attribute, in a depth-first search. This is sufficiently flexible for most applications. However, occasionally it is necessary to consider alternatives. PIKS provides a more powerful form of inheritance with exceptions. The attributes to be inherited in this way are called properties to distinguish them from others.

In PIKS, property values must be stored on a special facet, called MODE, of the AKO slot. Normally, progeny of an object with such a property will inherit the property bust as they inherit demons and methods. When appropriate, however, property inheritance can be explicitly blocked. This is done in a way that specifies both the ancestor and the property whose inheritance is blocked. For example, in the natural language system of the invention, there is a class of objects called Agent, which has the properties Animate and Concrete. One subclass of Agent is Person, which inherits these properties. Another descendant of Agent is the object PIKS, which inherits the Concrete property but not the Animate property. This is accomplished by storing the atom-Agent animate on the AKO MODE of the object System. This prevents progeny of System, such as PIKS, from inheriting the Animate property from Agent. Note that progeny of System may still inherit the Animate property from some other object. This provides for exceptions to exceptions, etc.

This inheritance with exceptions is incorporated into the function HasProp.

HasProp [Frame Property]
  Returns the first ancestor, Source, found in a depth-first search from Frame along AKO links, which includes property in its AKO MODE and for which no AKO ancestor of Frame as −Source-Property (the result of packing together the symbol "−", Source, and the value bound to Property) in its AKOMODE. In addition, Frame must not have −Property in its own AKO MODE.

2.4 The System Browser

The PIKS System Browser is an interactive graphic database interface. It was implemented using certain functions of the Interlisp-D Graphic package (Node Create, Layout Graph, Show Graph, Flip Node, Dump Graph, and Read Graph) as well as certain additional features designed by applicants. With it, one can examine, create, modify, destroy, and find things. Interaction is normally through the mouse in PIKS windows, but there may be occasion for a program to invoke the Browser functions directly. Section 2.4.1 explains the interactions that take place in the Browser windows, and section 2.4.2 and 2.4.3 describe the underlying functions that might be useful in other programs.

2.4.1 Using Browser Windows

Figure 4A:
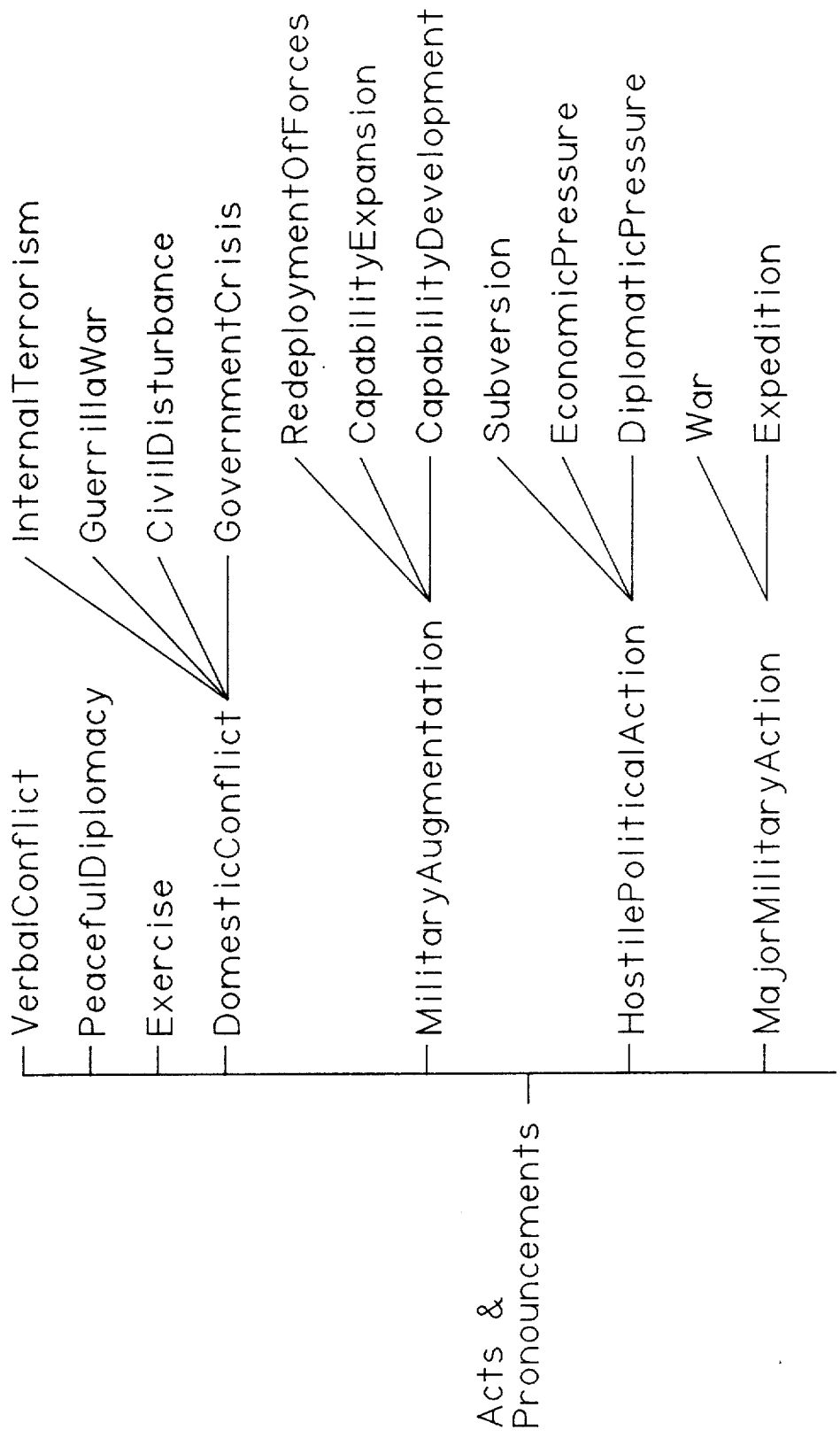
FIGS. 4 and 4B show a screen image of a PIKS browser network window.
Figure 4B:
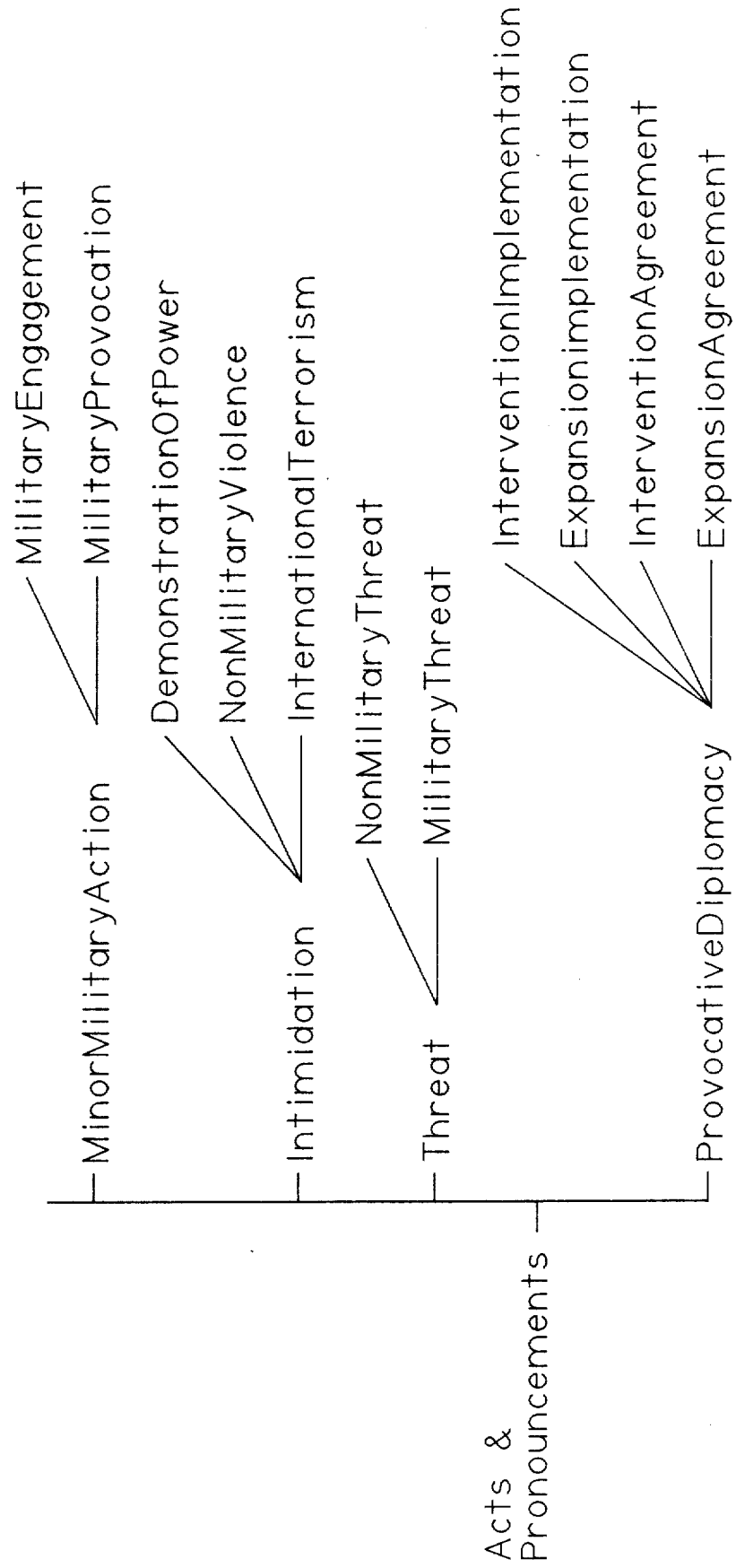

PIKS Browser windows act as menus in which one selects any displayed node to be operated on. There are two types of Browser windows: network windows, which show the graph of part of the network defined by slot relations; and frame windows, which graph the internal structure of individual objects. A frame window was shown FIG. 2. A network window is shown in FIGS. 4A and 4B. (Note: This window was generated for an expert systems application rather than natural language processing.) The nodes in Browser windows usually are the names of PIKS objects but, in frame windows, may be any LISP expression. When a node is selected with the left or middle mouse button, a submenu of operations relevant to that node pops up. Generally, the left button menus relate to examining and modifying things, whereas the middle button menus provide database search functions. In addition, when depressed anywhere in the window, the right button brings up a menu for editing the window's graph, with corresponding changes being made to the PIKS database automatically.

2.4.1.1 Left Button Menu

Selecting a node with the left button causes the Browser to examine the item to determine whether it has a frame, a function definition, and a binding, and also whether it is a root node of the window. Depending on which of these characteristics are different actions on the item are meaningful. A list of all such actions is constructed. If it has only one element, that action is taken immediately; otherwise the list is displayed in a pop-up menu for the user to select one. The possible actions are as follows.

Display Frame displays the selected node's frame.

SEDIT It calls SEDIT on the selected node's frame.

Edit Prompt prompts for changes to the object. First a menu of the object's slots is displayed, then when a slot is selected a menu of its facets will pop up; when one of these is selected (or if none is selected then the VALUE facet is assumed) a menu of its values will appear. Selecting one of these will cause it to be deleted and a new value will be prompted for in the mouse process window. To delete the old value without a replacement, enter NIL (or "]"); otherwise, type the new value. The slot, facet, and value menus contain entries for NEWSLOT, NEWFACET, and NEWDATA, respectively, in case one wants to add rather than change something. This prompting will cycle until nothing is selected from the slot or the value menu (i.e., the mouse is clocked with the cursor outside the menu window).

Fillin stores values of items as specified by the node's Template, which may be inherited from an AKO ancestor. If the selected node did not have any AKO VALUE, the user is first prompted to supply one. Fillin will not proceed further without this information. When it is filled in, the frame is displayed in another Browser window. If the node has no Template, Fillin is equivalent to Display Frame. Template definition and application are explained in section 2.4.1.1.1.

Instantiate prompts for the name of a new instance of the selected node and stores the name of the node in the AKO VALUE of the new instance, creating the new frame in this process. However, if the selected node did not itself have any AKO VALUE, the user is first prompted to supply one. Instantiate will not proceed further without this information. It will also refuse to proceed if the new instance already has an AKO VALUE. After the new instance is created, each item in its inherited Template, if any, is filled in as described in section 2.4.1.1.1. Finally, the new frame is displayed in a Browser window.

Make Template instantiates the object Template and installs the resulting object as the value of the selected node's Template slot.

Rename first sends an AboutToBeRenamed message to the selected node. If the response is DONT, the Browser will not proceed further. Otherwise, the user is prompted for a new name. If the name given is already that of a frame, the user is so advised and processing halts. Otherwise, the frame is renamed, and for each object named as a VALUE of any slot in the frame that has an inverse, the old name of the frame is replaced by the new name in the inverse slot VALUE in that object. Finally, the node's frame is displayed in a Browser window.

Destroy performs (KillNode Node) on the selected node (see section 2.3.2.3).

Recompute Graph recomputes the graph (which may have become invalid because of changes made by a user program) in the window and then redisplays it. This option appears only for root nodes.

Recomp&Preserve recomputes the graph and redisplays it, preserving the positions of any nodes that were in the original graph. This is useful for complex graphs whose topology has been modified by manual interaction.

Edit Fn appears in the menu if the node has a function definition. Selecting this item brings up a DEDIT window on the function. (Functions will typically appear in windows that display rule frames or frames holding demons or methods.)

Value appears if the node has a binding. Selecting this item causes the bound value to be printed in a TTY window.

Shift Selection is not a menu entry; it refers to selecting a node while the left shift key is down. This causes the name of the node to be unread into the current TTY buffer.

2.4.1.1.1 Template Definition and Application

Figure 5A:
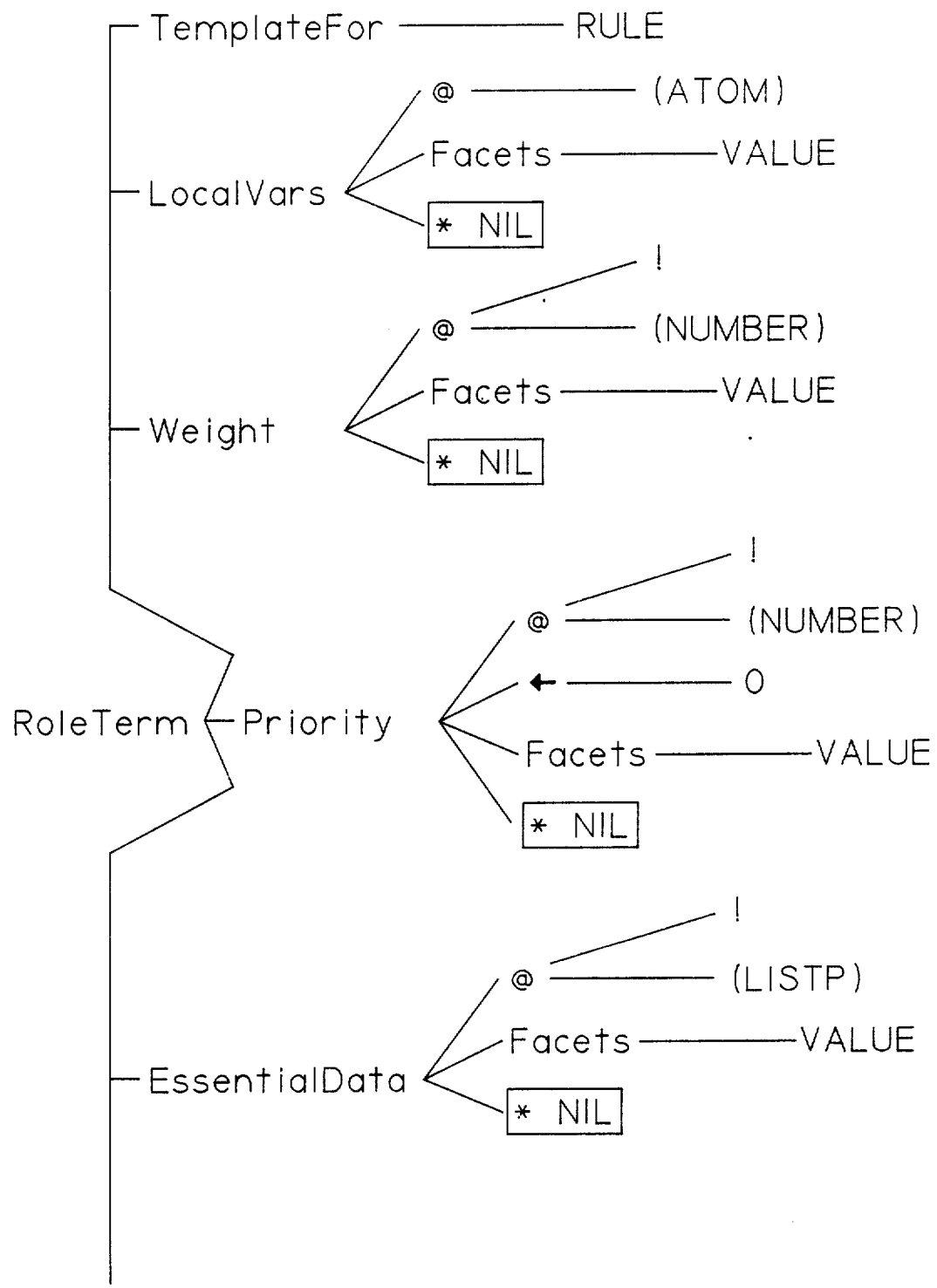
FIGS. 5A and 5B show a screen image of a template for RULES.
Figure 5B:
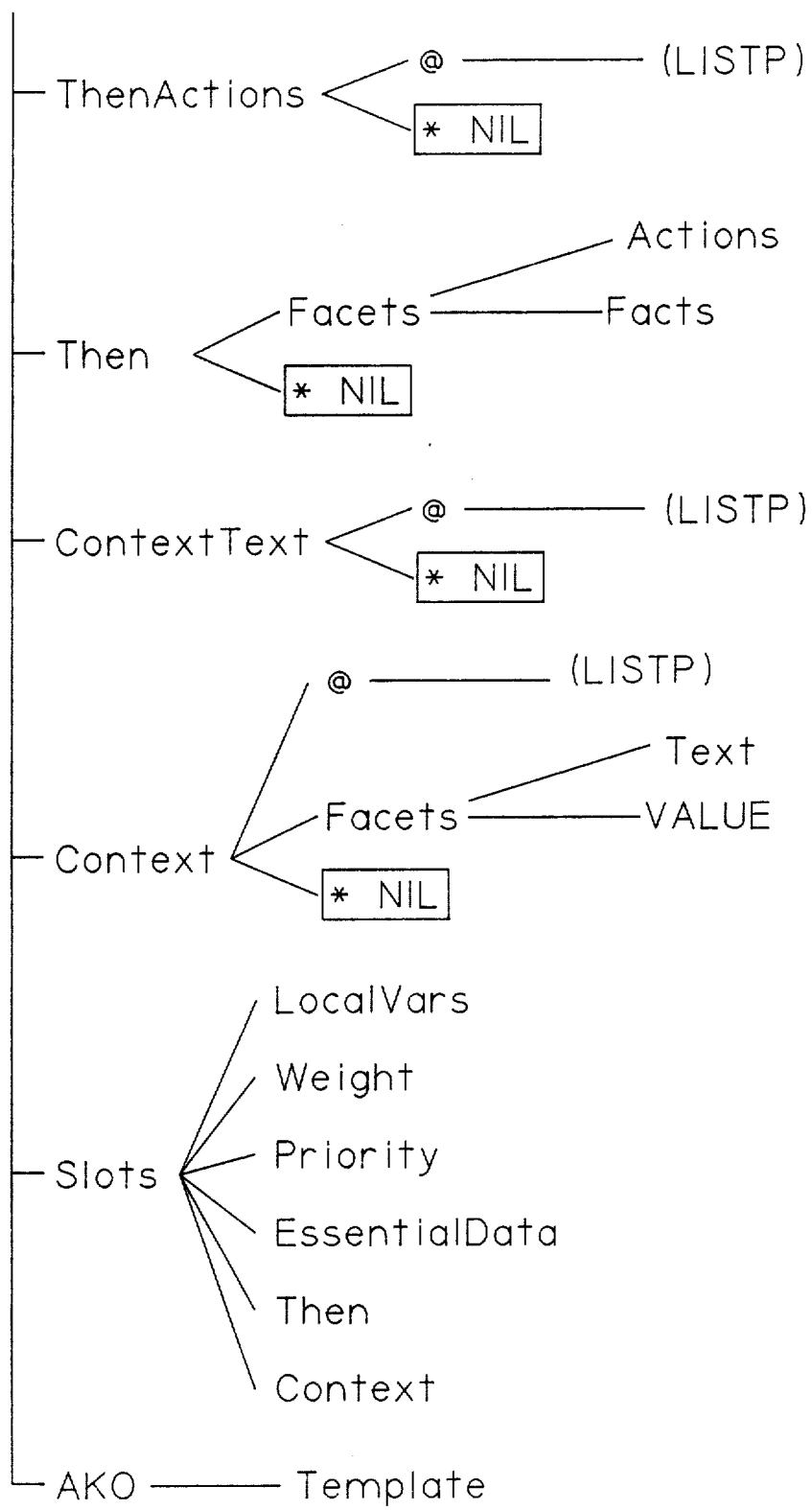

Templates are used in the Instantiate and Fillin actions. They specify the normal slots and facets for descendants of an object along KINDSOF paths. A template may be created by selecting Make Template from the left button menu, or by instantiating the object Template (which is its own template) or any of its KINDSOF progeny. A template may contain two items of information for each facet of each slot: (1) the source of the value(s) and (2) tests (predicates) that each value must satisfy. The default source for any slot and facet is the function AskUserForVals, which prompts the user. There are no default restrictions, except that when instantiating a Template, any tests must be lists or the atom "!". An example of a template is given in FIG. 5. This is the default template for PIKS rules (see section 2.5).

A template is applied to an object Frame by Instantiate or Fillin as follows. First, the template is fetched (using FRAMEGET-Z) from Frame. Then information is fetched from Frame by FRAMEGET-Z, following AKO paths and with the template as Focus. This implies that object-specific information will override that in a template, and also that the information need not all come from one template. There may be a network of templates having information of varying degrees of specificity and for different slots and facets; some information may even be inherited from the slot objects.

The information fetched is: (1) a list of slots for Frame, in the case of Fillin, or for instances of Frame, in the case of Instantiate; (2) for each Slot, a list of facets; (3) for each Slot-Facet thus specified, a list of sources; and (4) a list of tests to be run to determine whether a candidate filler of the Slot-Facet is acceptable. All information will have been stored in the template when it was created via Make Template or Instantiate, or else inherited from an ancestor of the template or from the slot objects. The list of slots is stored in the Slots slot; the list of facets for a slot is stored in its Facets facet; potential sources are in the → (left arrow) facet of the Slot (in case of VALUE facets) or SlotFacet (the concatenation of the particular slot and facet names, in case of non-VALUE facets) slot; and tests are in the @ facet of the Slot or SlotFacet slot.

The list of fillers of Slot-Facet is generated from the sources and tests until a non-NIL result is produced. That result becomes the filler, and no further sources are tried. The process operates as follows. Each candidate source is in one of four forms: an atom, a quoted atom, a list of the form (=Slot₂Facet₂), or a list of the form (Gx₁...xₙ). If the source is an atom its current binding is considered and if a quoted atom, then that atom; if that passes all tests, it is stored (using FRAMEPUT) as the only value. This is intended for initialization of a facet with a single value whose name is stored in the template. If it is not a quoted atom, the source should be a strong, number, or variable whose binding can be found in the current stack context (i.e., a globalvar or specvar). If the filler is a list of the form (=Slot₂Facet₂) then Slot₂ and Facet₂ are assumed to be the names of another slot-facet (if Facet is NIL, VALUE is assumed) which is to be filled first, and whose value is to be shared. If the source is of the form (Gx₁...xₙ), G is APPLIED to the list (Frame Slot Facet v₁...vₙ), where v₁...vₙ are the values bound to x₁...xₙ. It is APPLIED as a generator so that the tests may be run on each candidate value. Candidates that pass all tests are added to the slot-facet's list of values. This process loops until the generator Fn terminates, or until one of the tests indicates that there is to be a unique filler. A test may be the atom "!", which means that there is to be only one value, or a list, which is passed along with the candidate filler to TrueP. Fillers of the Slot-Facet value are accepted if TrueP returns non-NIL for all tests. A special case is a list whose first element is the atom Pattern (or Pat). In this case the CDR is assumed to be an Interlisp pattern, and a pattern match function is constructed. Its name will be of the form "Frame-Pat1234". Assigning this function to a file (e.g., during a CLEANUP) will result in its compilation (which makes it more efficient). As described in this section, templates are used by the Browser for interacting with the user to create or fill in an object. They may also be invoked by user-defined functions for automatic instantiation.

2.4.1.2 Middle Button Menu

Selecting a node with the middle button causes the Browser to examine the item to determine whether it has a frame, whether it has or inherits any demons, methods or properties, and whether any explanatory information is associated with it. Depending on which of these characteristics are true, different actions on the item are meaningful. A list of all such actions is constructed. If it has only one element, that motion is taken immediately; otherwise the list is displayed in a pop-up menu for the user to select one. The possible actions are described below.

Show Messages produces a menu of messages to which the object can respond. Selecting an item in this menu with the middle button causes the Browser to search for the frame from which its method is inherited. If that frame is in an active window, the window is brought to the top and the frame blinks; otherwise, the name of the frame is printed in the prompt window. If the item is selected with the left button and it has a method with a function definition, the name of its method is displayed in another menu titled "Edit Fn?". If the user selects the method in this menu, its definition is put in a DEDIT window. In any case, its name is printed in a TTY window. The method also blinks (about twice as fast as the middle button blinking) if it happens to be in any Browser network window or is the root of any Browser frame window.

Show Active Puts produces a menu of slots that have demons monitoring additions of values (via FRAMEPUT+). Left and middle buttoning in this menu have the same effects as for Show Messages, operating on demons instead of methods.

Show Active Dels produces a menu of slots that have demons monitoring deletions of values (via FRAMEREMOVE+). Left and middle buttoning in this menu have the same effects as for Show Messages, operating on demons instead of methods.

Show Active Fetch produces a menu of slots that have demons monitoring fetches of values (via FRAMEGET+). Left and middle buttoning in this menu have the same effects as for Show Messages, operating on demons instead of methods.

Show Variables produces a menu of all slot-facet pairs, including those that are inherits along AKO paths, but excluding methods, demons, and all facts on ancestors+ My, KINDSOF, and INVERSE slots. Left and middle buttoning in this menu have the same effects as for Show Messages, operating on the list of values of the selected slot-facet instead of methods.

Show Properties produces a menu of all properties, including property blockages (see section 2.3.8).

The middle button functions as for Show Messages in this menu, operating on properties instead of methods. The left button has no effect.

Show Paths is used to create new Browser network windows. It puts up a menu of the selected node's slots. Any number of slots may be selected. Selecting OK from this menu notifies the Browser that the selection is complete. The user is then prompted for a restriction, which may be a number, an atom, a list, or NIL (equivalently: "]"). A window is then generated which contains the graph of all progeny along the selected slot links that satisfy the restriction, starting from the selected node. Nodes that lie on the path to such progeny but which do not themselves satisfy the restriction are also displayed, with "@" packed in front of their name. If the restriction was a number, n, then the first n generations of progeny of the node are graphed; if it was an atom, P, only progeny that (HasProp P) pass (P is not evaluated); if it was a list, $(F\ a_1 \ldots a_j)$, only progeny, p, for which $(F\ p\ a_1 \ldots a_j)$ returns non-NIL pass ($a_1 \ldots a_j$ are not evaluated).

Description sends a Describe yourself message to the selected node (see section 2.3.7).

Explain will appear only if the node is in an AuditSlot window and it was changed during rule application while rule auditing was on (see section 2.5.4). It produces a menu of two items: What and Why. Selecting What causes the node's Title (or AKO value if there is no Title) to be printed. Selecting Why produces an explanation of why the node was put where it is, assuming that the user has set up rules properly, as described in section 2.5.4.

2.4.1.3 Right Button Menu

Pressing the right button anywhere in the interior (i.e., not on the border or title bar) of a PIKS Browser window brings up a menu of graph editing options. These are as described in the Interlisp Grapher package documentation (Xerox Corporation 1985), but in addition, adding and deleting links and deleting nodes in the graph have been integrated with the PIKS database system (see Section 2.4.2 below). When a link in the graph is added or deleted, the corresponding frame structures are changed. When a node is deleted, all links to or from it in the graph are deleted, and all frames involved are changed accordingly.

Figure 14:
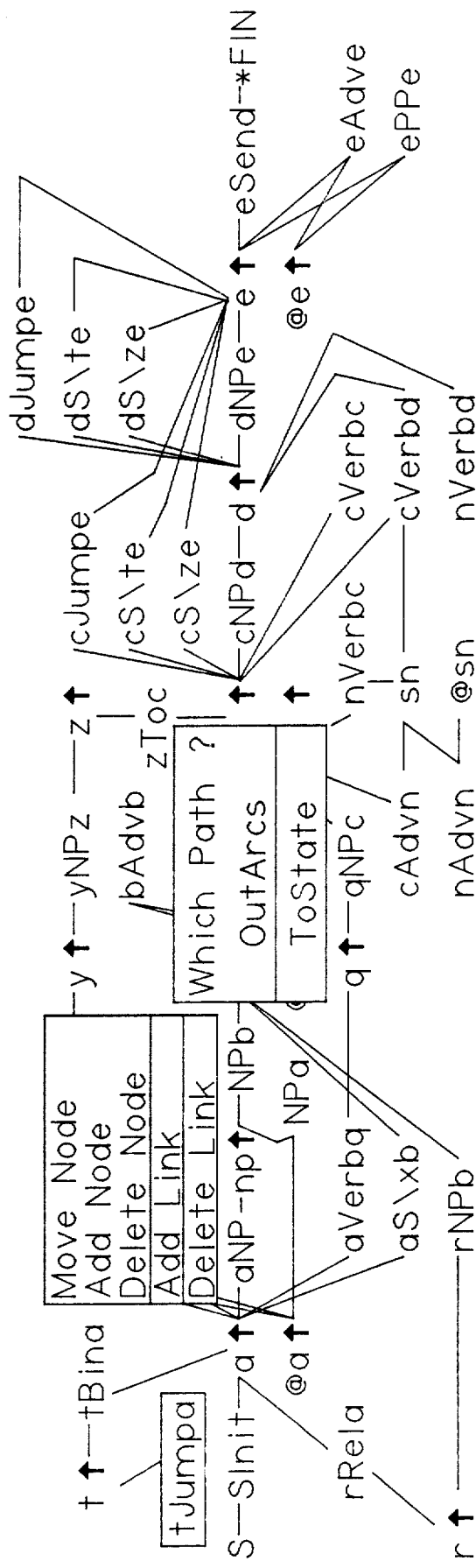
FIG. 14 illustrates the establishment of a transition path from slate t ↑ through Arc Jump, for the ATN graph of FIG. 13.

When adding or deleting a link one first specifies the "from" node and then the "to" node (FIG. 14). In addition, if the window's graph represents more than one type of link, a menu will pop up with each link type; one must be selected (FIG. 14). When adding links in a frame window, the corresponding frame structure is not changed until a path of length 2 or 3 is established. All such path must originate from the root (i.e., the frame name) or no structural change occurs. A path of length 3, say from A to B to C to D, causes D to be stored in the C facet of slot B of frame A. For a path of length 2, say from A to B to C, the user is asked whether C is to be a VALUE or some other Facet of slot B; if a value, then the structure is changed; otherwise, no structural change is made until the next link is added.

Note that PIKS permits arbitrary structures as values of facets. To handle these properly when adding and deleting links through the right button menu, the global variable ShowParens should be set to T. Also note that when adding a node, the label entered is not EVALed.

2.4.1.4 Right Button Background Commands

Occasionally, one wants to display a frame or graph whose root does not appear in any window. Two PIKS items have been added to the Interlisp background menu to provide for such situations. These are SpawnFrameW and SpawnPIKSW. The former has the same effect as Show Frame from the left button menu, except that the user is first prompted for the root node, which must be an atom, and also for the font, format, and label (see section 2.4.2) if global variable FontFmtPrompt is non-NIL. SpawnPIKSW is like Shot Paths from the middle button menu, but the user is prompted for the roots (there may be more than one; enter NIL or "]" to terminate prompting), the paths and, if FontFmtPrompt is non-NIL, the font, format, and label.

2.4.2 PAKTUS Graphic Programming Functions

FIGS. 53A through 55B give flow chart schematic diagrams of various graphic programming functions used in the PAKTUS ATN grammar development (Section 3 of the application). The AddNodeFn function 845 (FIGS. 53A and 53B) adds a node (855) or an entire subnet (863) to a PAKTUS Browser window. A single node can be copied from any existing Browser window by selecting it with the mouse (849), or its label can be typed in (861). An entire subnet can be added (863) by mouse-selecting the subnet root in an existing window (869) and then selecting the node in the original window (877) to which the subnet is to be appended (881, 885, or 889). Tests (879, 883, 887) restrict the resulting structures to be valid PAKTUS frames.

The AddLinkFn function 899 (FIGS. 54A and 54B) adds a link between two nodes in a Browser window. The user is prompted to select the From and To nodes (901) for the link. For the present purpose, there are two types of Browser window (905): a Frame window (915) and a graph window (907). Graph windows hold their linkage path names on a property; if there is more than one path displayed in the window, then the user is prompted to select from a menu the type of link desired (909). In either case, the link is then established (911) in the PAKTUS objects represented by the nodes. For a Frame window, it must be determined whether the from node is a Facet (915), a slot (921), or the frame (937) to determine (923, 927, 931, 941, 945, 949) what paths are valid, and how to add the link (917, 925, 933, 943, 951).

The DeleteLinkFn function 955 (FIGS. 55A and 55B) prompts (957) for the From and To nodes from which to delete the link. If the window holds a graph, the type of link it displays is removed from the nodes (967) after first asking the user which type of path (965) if the window displays more than one (963). For a Frame window, the type of structural change to the frame depends on the type of From node (971, 977, 987) and To node (979).

2.5. Rule-Based Programming in PIKS

2.5.1 Introduction

Rules in PIKS are objects that specify actions to be taken or conclusions to be drawn in a given context. The PIKS kernel contains the object RULE and its template RuleTem. Particular rules can be created as instances of RULE or of any user-defined subclass (i.e., KINDSOF progeny) of RULE. The two most important slots of a rule are Context and Then. context specifies when a rule is relevant. It may be thought of as the "if" part of a rule. A rule can be applied only when every element of its Context value is true. The Then slot specifies what is to be concluded or done when a rule's Context is true and the rule is applied, or "fired".

2.5.2 Rule Base Structure and Rule Invocation

Rules are invoked by being passed to the function TRYRULE, which tests a rule's conditions and executes its actions if all conditions are true. the calling syntax is: TRYRULE [Requestor Rule]. Requestor is an object associated with the rule. The assumption is that rules are partitioned into small sets, each representing expertise about a very specific domain. Requestor is the domain specialist object that holds and processes information about the current state of affairs in that domain. PIKS does not force one to organize rules in this way (one may call TRYRULE [NIL Rule]), but it is often useful to do so.

There are basically two ways to cause a rule to be tested: user programs can invoke TRYRULE directly; or a domain specialist object can be initialized on the PIKS Agenda by invoking SetPriority [Object Weight]. Weight is a numerical index intended as a measure of the relative importance of the reason for putting Object on the Agenda. If the Agenda is to be used, PIKS provides the function ScheduleAgenda, which is a simple algorithm for scheduling the domain specialists on the Agenda based on their intrinsic importance and on how long ago they were last serviced. ScheduleAgenda should be run as a separate process.

The operation of the scheduler and Agenda may besl be explained by reference to an example. FIG. 6 shows the Agenda and a domain specialist object (UR3140, which is a specialist on augmentation of tactical air forces operational structure) and an associated rule from a PIKS application. Items on the Agenda were put there by application specific routines via calls to SetPriority. The scheduler continually cycles through the Agenda items, recomputing their Priority.

On each cycle, the item of highest Priority is selected and its Status Evaluation rules are tested. If none of these rules fire, the item's Priority is lowered by multiplying its current value by its Weight, as a percentage. For example, suppose UR3140's Priority of 0.6495191 is the highest of any item on the agenda in the current cycle. then its Status Evaluation rule, ER3140#1, is tested by the scheduler by calling TRYRULE [UR3140 ER3140#1]. (Note that UR3140 is A Kind Of XX3140, from which it inherits information, and that it is passed to TRYRULE along with the rule; this gives the rule access to all information in UR3140 and its ancestors.) If the rule's conditions are not true, then UR3140's Priority will be lowered to 0.4221874 (=0.6495191 * 65%). Whenever a Status Evaluation rule's conditions are all true, the rule fires (its Then are executed), but the scheduler does nothing else to its associated specialist. In particular, it does not change the priority of the specialist or remove it from the Agenda. It is the responsibility of the rule to do these things, if appropriate. In the example, ER3140's last action is to remove its specialist from the Agenda.

In summary, one may either have PIKS manage rule processing or write programs that call TRYRULE directly. In the former case, the rules must be stored in the Evaluation rules facet of the Status slot of some specialist objects, and user-defined functions must put some of these specialists on the Agenda, using SetPriority.

2.5.3 Internal Structure of Rules and Rule Application

Figure 6A:
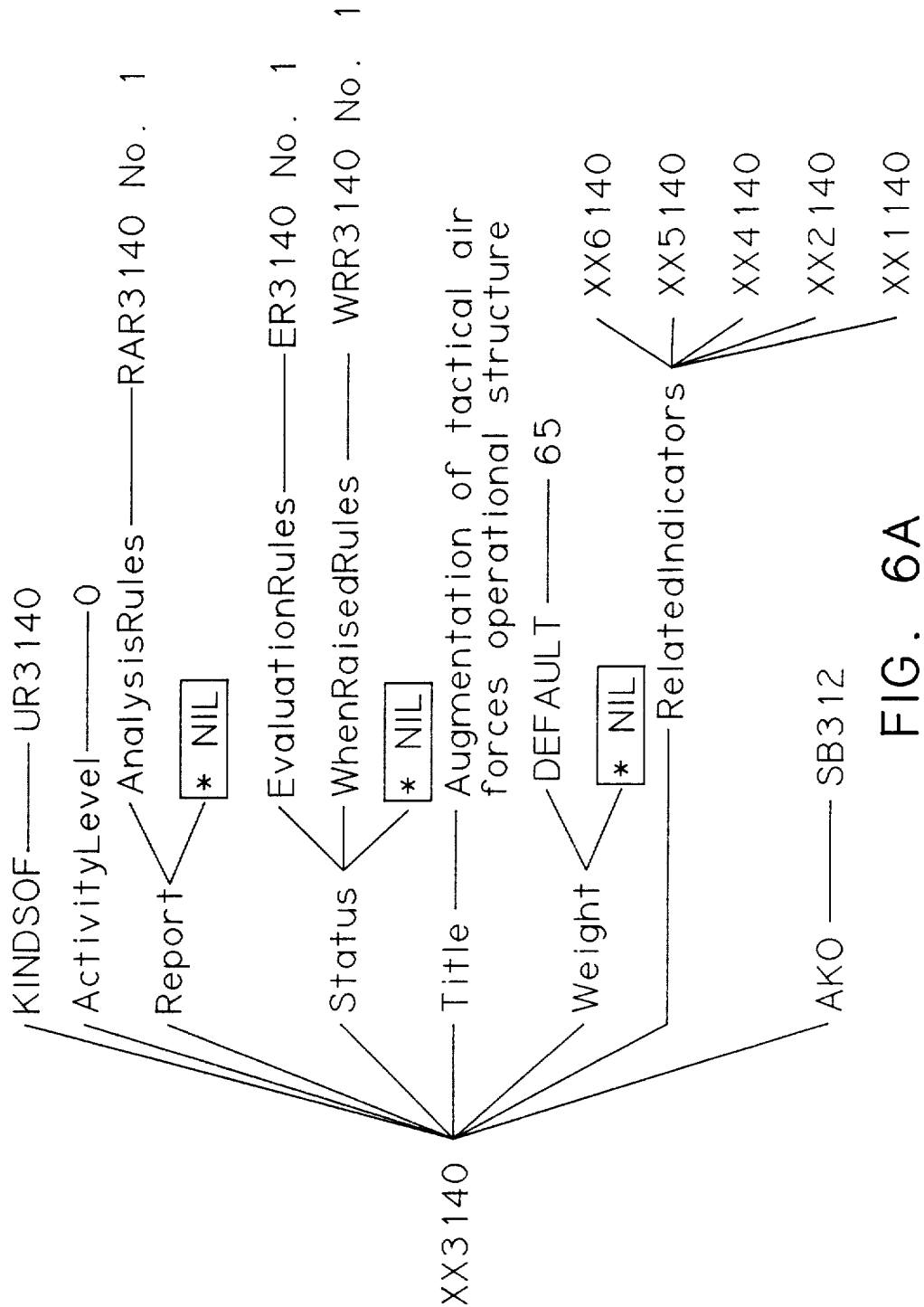
Figure 6C:
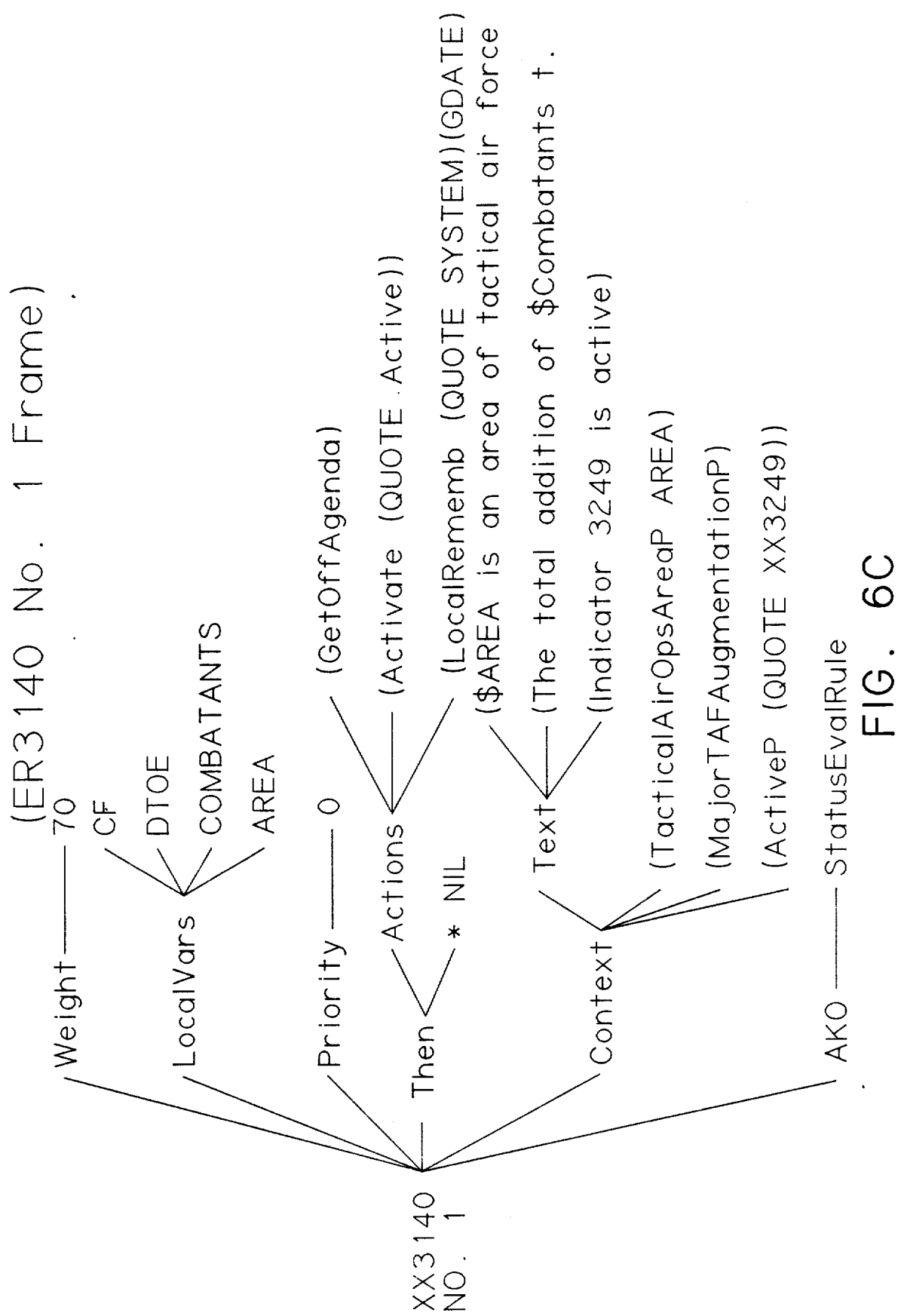
Figure 7A:
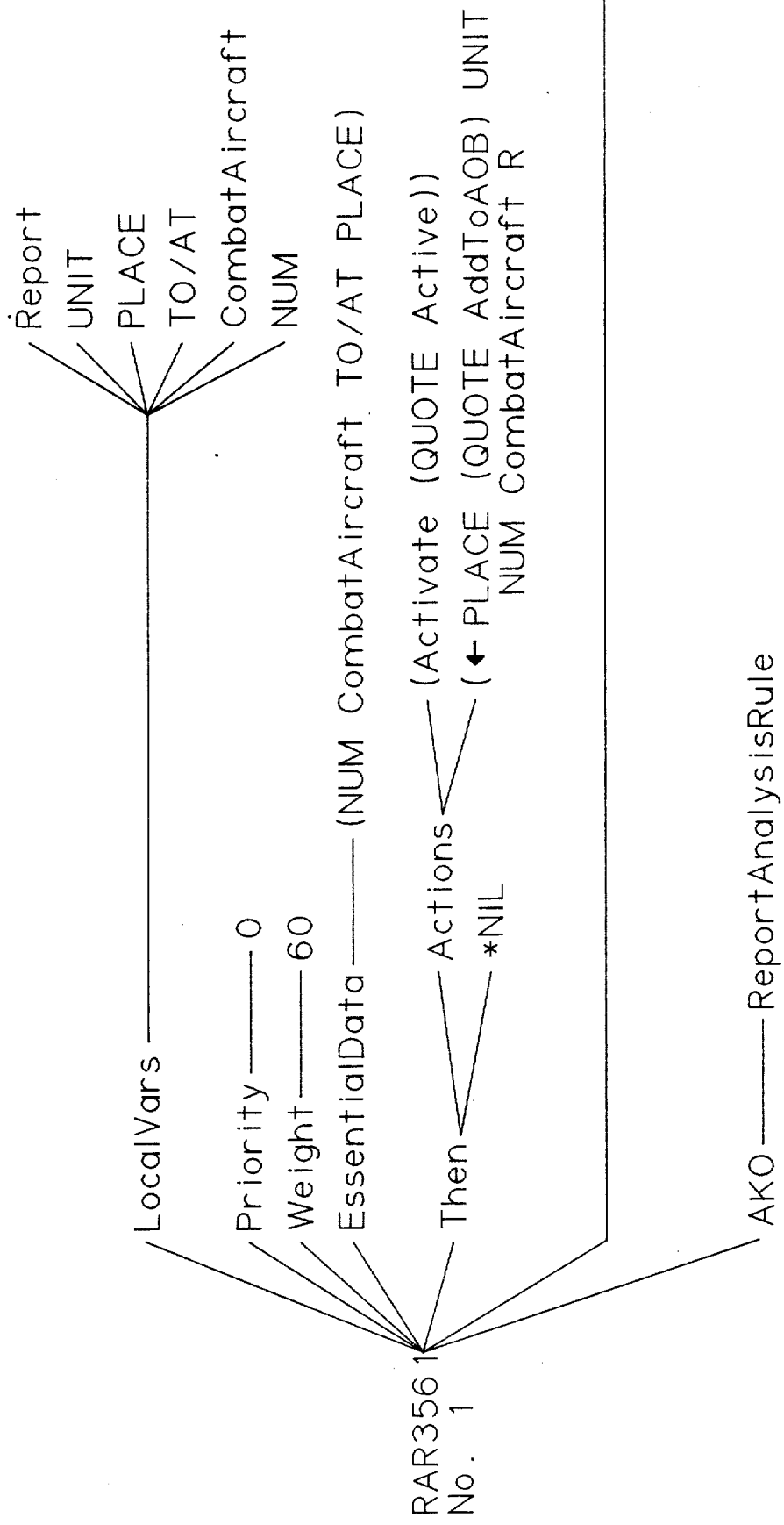
FIGS. 7A and 7B illustrate a screen image of a non-grammar Rule.
Figure 7B:
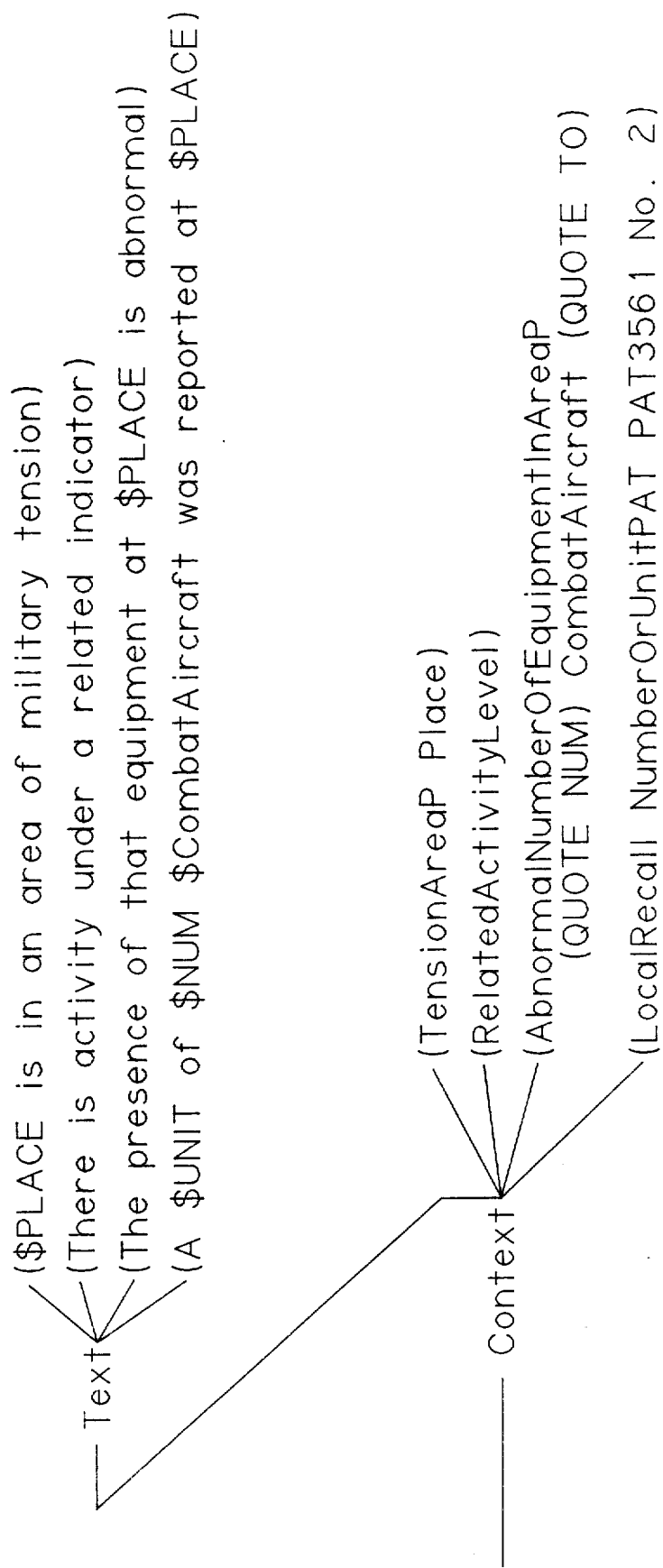

FIG. 6 included the rule ER3140#1, which illustrates the major constituents of a rule. FIG. 7 shows another rule from the same application. The two most important slots of any rule are Context and Then. Weight and Priority are application dependent and not necessary in the basic PIKS rule processing. (They could be used in a rule that is to be put on the Agenda and that has Status Evaluation rules, thus providing the capability for rule activations through a network.) LocalVars should be specified if bindings are to be passed among constituents of the rule (see below) or if rule explanations are desired, in which case the Text facet of the Context should also be supplied (see section 2.5.4). The Then slot has two facets: Facts and Actions, which are explained below (The rules in FIGS. 6A through 7B have only Actions.) Other slots may be added for particular applications (e.g., Essential data in the rule in FIGS. 7A and 7B). The most convenient way to create a rule, ensuring that its components are in the proper format, is to instantiate the object RULE or any of its KINDSOF progeny.

A rule is applied by passing each element of its Context VALUE to the function TrueP, along with the TRYRULE Requestor; if all are true (testing them returns non-NIL) the rule's Then are applied. A test specified in the Context can be in one of the following forms:

(a) (GlobalRecall $F_1 \ldots F_n$)
(b) (LocalRecall $F_1 \ldots F_n$)
(c) (F $x_1 \ldots x_j$)
(d) (OR ($Test_1$) ... ($Test_i$))
(e) (NOT Test)

In case (a), for each F a Recall message is sent to th global object CONTEXT, which contains the Agenda and list of facts deduced or told to the system by the user. CONTEXT has a default method for this message, which is to fetch the DEDUCED and TOLD slots of CONTEXT and APPLY F to each such fact until the result is non-NIL or the lists are exhausted. PIKS was designed on the assumption that each F is an Interlisp pattern function, but any user-defined function may also be Supplied. In case (b), for each F, A Recall message is sent to the TRYRULE Requestor (see section 2.5.2) with F as an argument. The user must define and install Recall methods on objects that are to receive Recall messages In case (c), F is APPLIED to the list (Requestor $x_1 \ldots x_j$) where Requestor is the first argument passed to TRYRULE. In (d) and (e), each Test is one of the forms a) through e) (without the extra parentheses; for example, (OR (LocalRecal F) (NOT G x y z))). The result is true in (d) if any Test is true; and in (e) if Test is not true.

Typically, the LocalRecalls and GlobalRecalls will be stored first in a rule and will be pattern-matching functions that bind variables (which should be listed in the rule's LocalVars if previous bindings are to be restored). The resulting bindings will then be available to other predicates. For example, when the rule RAR3561#1 shown in FIG. 7 is tested, it first applies two pattern matches which bind variables PLACE Combat aircraft, etc. Then the other functions in its Context may use these bindings, such as the predicate TensionAreaP, which is passed the value bound to PLACE.

If all tests in the rule's Context are satisfied, its Then are applied. Items in its Then Facts facet are stored in the DEDUCED facet of CONTEXT (from which they may be retrieved later by a rule's GlobalRecall). Items in the Then Actions facet must be lists in one of the following forms:

(a) (F $x_1 \ldots x_n$)
(b) ($\leftarrow$Self M $x_1 \ldots x_n$) or
(c) ($\leftarrow$Object M $x_1 \ldots x_n$).

2.6 Object-Oriented Database System

PIKS provides for automatic swapping of objects between virtual memory and random access files. The PIKS user must specify (e.g., in the user INIT file) the databases that contain the objects and must initialize the files. The PIKS Browser will then swap objects into virtual memory as needed. PIKS provides user-selectable menu items to write out changed objects PIKS notices changes to database objects if made by PIKS functions. PIKS maintains past instances of objects in such a way that one can roll back to a previous version of a database. One may also browse through different versions of a particular object and reset it to any one of these. A PIKS database requires a hash file for storing objects on disk.

3. INTERACTIVE GRAPHIC PROGRAMMING ENVIRONMENT

3.1 Introduction

In the present invention, applicants have utilized the PIKS programming functions and techniques discussed above to create an interactive graphic programming environment. This programming environment is the subject of commonly assigned U.S. Pat. Application, Ser. No. 195744 filed May 18,1988,R. Bruce Loatman and Chin-King Yang, entitled "INTERACTIVE GRAPHIC NATURAL LANGUAGE PROGRAMMING SYSTEM", filed of even date herewith. Such graphic programming environment comprises an important part of PAKTUS. In such programming environment, nodes represent states and transitions in an augmented transition network ("ATN"). Transition nodes specify stat transitions and can contain arbitrary production rules. They can be created, modified, deleted, and moved through direct user interaction. The internal structure of nodes can also be viewed graphically. An interpreter reads the graph and applies the production rules to the input.

The ATN-based environment of the invention comprises a program, considering both the graph (which defines the overall logical structure) and the information in the nodes. In the ATN application of the preferred embodiment for NLU applications, such programs may be considered a grammar and the interpreter may be called a passer. The ATN programming environment of this invention, however, is a general purpose programming language which may be used for other than NLU applications.

Figure 46:
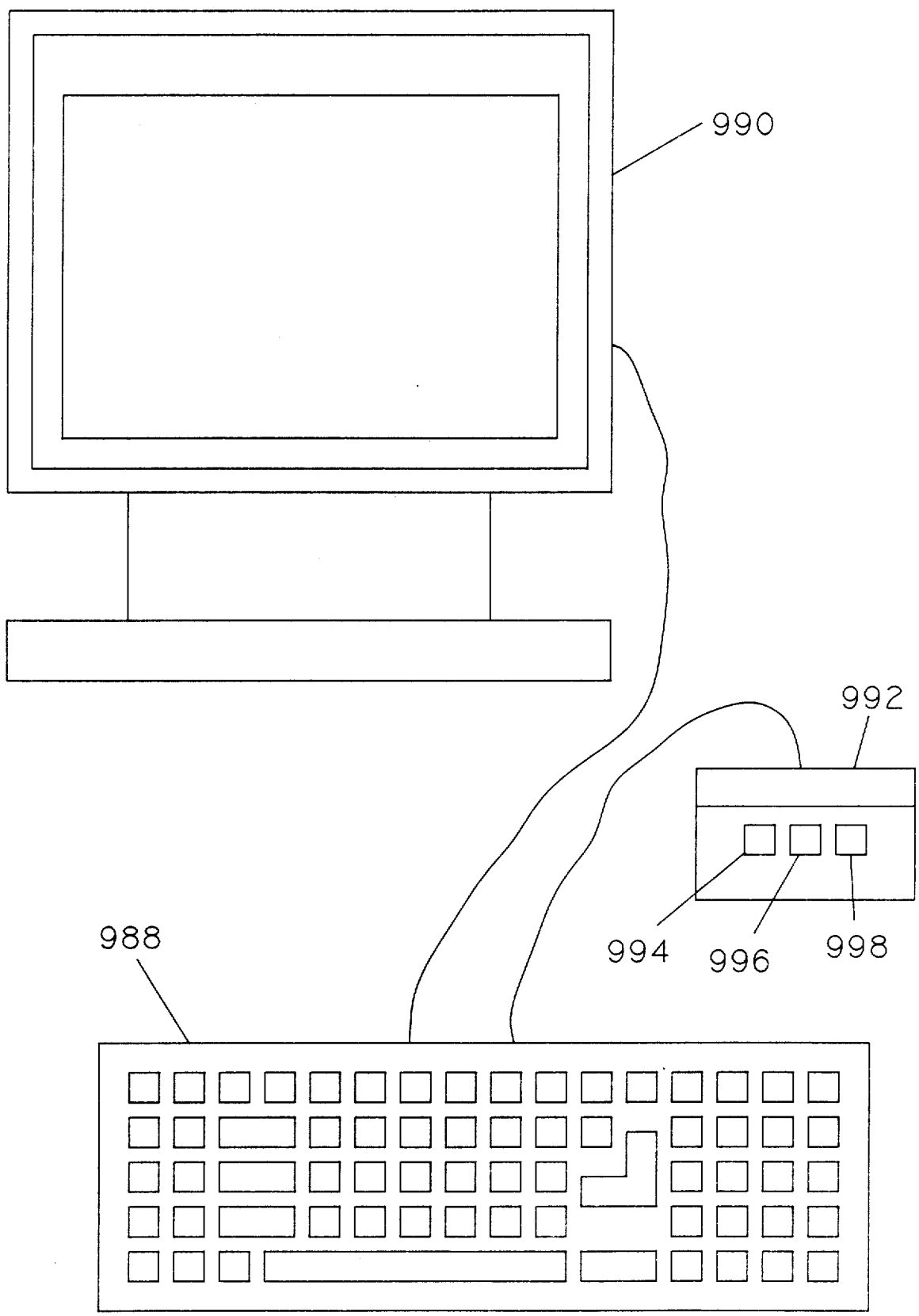
FIG. 46 is a perspective view of an illustrative configuration of hardware devices for PAKTUS.

In an operative embodiment of the invention as illustrated in FIG. 46, the hardware elements of this ATN programming environment included computer 990 (Xerox 1186 of Xerox Corporation, with 3.5 megabytes RAM and 16 megabytes virtual memory), keyboard 988, and optical mouse pointing device 992 with left button 994, middle button 996, and right button 998.

3.2. ATN Grammar

3.2.1 Basic Elements of ATNs

The ATN grammar consists of several networks. Each is a directed graph with labeled states and arcs, including distinguished initial and final states. The states are represented as PIKS objects and have "InArcs" and "OutArcs" slots. The InArcs slot lists the transition arcs that go to the state, and the OutArcs slot lists those that lead out from the state. Some states do not have an InArcs slot. These are entry points into the network containing them. The final state is labeled as "*FIN" for all networks. It as no OutArcs. By convention, the name of a state usually either starts or ends with the symbol "↑" except the initial and final states and a few other exceptions. (This convention is purely for the convenience of the grammar writer.) Each arc is also represented as a PIKS object and must have ToState, FromState, and label slots. It may also have Rule and Init slots. The Label slot of each arc indicates its type as explained below. The Rule slot contains a PIKS object which holds conditions and actions associated with the arc. The name of an arc is not used by PAKTUS.

3.2.1.1 Classification of Arcs

The ATN grammar can contain four different types of arcs, each of which is described below. Reference may be had to Winograd (1983) for a prior art discussion of these arc categories.

Category arcs: If the value of a Label slot is a lexical category or a function, then the arc is a category arc. When a category arc is encountered in parsing with a network, a single input word is matched against the specified category. The match consists of checking that the word is related to the category through AKO (A Kind Of) links or, if the Label is a function, it is APPLIED to the word and the match is successful if the result is non-NIL. In the PAKTUS system, this matching process returns just those senses of the word that match, and this subset replaces the definition of the word for the remainder of the parse. If parsing backs up to this point again, the previous definition is restored. This word definition is typically assigned to an appropriate syntactic register by the actions associated with the arc, and the transition is made to the next state. The input pointer then moves to the next word.

Seek arcs: If the Label is a state, then the arc is a seek arc. When a seek arc is encountered, the register list is pushed onto a stack, a new register configuration is set up, and any initializations in the Init slot are passed to PIKS function TrueP. If no initializations return NIL, the parser branches to the specified state, which may be in the current network or another one. If that network is traversed successfully, Rules on the seek arc are then tested (by TrueP), and if none returns NIL the register list is restored (the stack is popped) and the parser advances to the state to which the seek arc leads.

Send arcs: A send arc is labeled with the symbol "Send". When a send arc is encountered, it means that the network has been traversed successfully. The parser branches back to the seek arc that called the current network. 'Jump arcs: The jump arcs are labeled with the symbol "Jump" and are taken without consuming any elements of the input. The rules associated with the arc must hold. These arcs usually correspond to branches around optional syntactic constituents. Some jump arcs, however, consume the current Hold register or copy some register from the current network or from one that invoked it with a seek arc.

3.2.1.2 The Use of Registers in ATN Grammars

During sentence parsing, the register list is an association list of syntactic name/value pairs such as Subject/NP$_1$ where NP$_1$ is the noun phrase filling the Subject register. The register list is the major data structure holding the information about the parse. The value of a register will normally be a dotted pair of the form (Lex . WordDef$_j$) where WordDef$_j$ is the PAKTUS definition of the word consumed by a category arc, or another register list which was built when traversing a seek arc. Thus, the register list is a network whose topology maps the successful paths taken so far in the parse. The top level, or "root" register is the distinguished symbol "S" and its value is the list of registers for the primary clause of the sentence. Register lists returned by seek arcs are assigned to appropriate registers at the upper level during the pop action. The paths from the leaves to the roots or from the roots to the leaves are available at all times. This provides ready access to any register from any arc during the parse. This facility, which Boguraev (1983) calls "cross-level communication", is a major improvement of the ATN programming technique of the present invention over the prior art (beyond the major advantage, graphic programming capability). It gives great power to the grammar writer to solve difficult syntactical problems like gapping in coordinate conjunctions; see section C3. below.

The functions which are used to manipulate the register list are designed in a space-conserving and efficient manner. The detailed descriptions are as follows:

- GETR [RegList Register] returns the value of the indicated Register from the specified RegList. RegList can be a register list or an atom bound to a register list. The function GETR searches the list from front to back for the most recent occurrence of the named Register and returns the associated value. (The same register may have been set many times, since the grammar is invoked recursively as, for example, when a relative clause is embedded in an NP that is embedded in a PP that is in a clause, etc.) If the register has never been set, it returns the value NIL but does not cause an error.

- SETR [RegList Register Value] sets a register. RegList must be an atom bound to a register list; otherwise, SETR causes an error. The function SETR does not change the name/value pair in the register list but instead adds to the front a new name/value pair. The new pair will effectively hide from the function GETR any old pair with the same name. Only the pointer to the current front of the list needs to be used at any given time, and look-up time is minimized. Subsequent seek arcs can freely change register settings without confusing the previous network if backup should later be required.

- ADDR [RegList Register Value] is the same as SETR except that it takes the previous contents of Register, adds Value to it, and puts the result at the front of RegList. This is provided for registers that may hold more than one value, such as auxiliary verbs, adjectives, prepositional phrases, etc.

3.2.1.3 Conditions and Actions

The conditions and actions are presented in the form of PIKS rule objects (see Section A5 above) and stored under the Rule slot of an arc. In order for the arc to be taken, its conditions must hold for the current state of the parse. When this happens, the associated actions are carried out, usually causing the current network's registers to be filled with structures representing syntactic constituents of the clause recognized by the network. Most conditions and actions are register access functions. These functions are automatically generated by PAKTUS if they are put into a rule by the Instantiate and Fillin options of the PIKS Browser and the rule is descended from the object "RULE" through KIND-SOF links (the inverse of AKO links). Alternatively, they may be produced by invoking code generation functions as follows:

- LexT®st [STR] is a function generator which generates LISP code. Illustratively, this uses the notation adapted from Winograd (1983). STR is a string of symbols separated by periods. the leftmost symbol must be either "*" or " ↑ ". The rightmost symbol must be a function. LexTest generates a function which takes two arguments. The first argument is a register list. The second is a value. The function retrieves a value from the register list through a series of calls to GETR according to the registers specified in STR (e.g., if STR = '*.Subject.Head.-Num.Fn, the value of the Num register of the Head register of the Subject register of the current network's register list is fetched), then APPLYs the rightmost symbol of STR (which must be a function) to the list consisting of the retrieved register value and the second argument. Some of the special notations are explained as follows:

* is a global variable called STAR. It will be bound to a CONS cell of the form (Lex.WordDef) for a category arc, and to the register list of the containing network for other arcs.

↑ refers to the register list which is a level above the * register list (i.e., to the network containing the seek arc that invoked the STAR net). ↑ . ↑ refers to the register list a level above the | register list, ↑ . ↑ . ↑ to the next level, etc.

The symbol "Lex" may be included in STR. In the PAKTUS system, it is a special register that can only be at the second or third position from the right of STR, and it holds the subset of the definition of an input word meeting the contextual specifications of the arc that accepted it. (For example, if the word "saw" was accepted by a Verb arc, its Noun sense is ignored henceforth in the parse unless it backs up to this point later. This helps eliminate ambiguity and prevents inconsistent decisions.) While at the second position from the right, it simply retrieves the word definition. While at the third position from the right, it applies GetForm to the retrieved definition plus the second element from the right, and then passes the result to the function at the rightmost position of STR.

- GetForm [WordParse Dim] fetches the value of the Dim feature (or "dimension") of the word whose senses are listed in WordParse.

- LexSet [STR] is a function generator which generates LISP code in a manner like LexTest, but it is intended for functions that set registers. STR is a string of notations separated by periods. The symbol third from the left is either a SETR sign "←" or an ADDR sign "←←". The symbols on the left hand side of the ← must start with either "*" or " ↑ " and be followed by a period and a register name. LexSet generates a function which takes a register list as argument. The function retrieves the value from the register list specified on the right of the ← and applies SETR or ADDR to the register specified on the left hand side, storing the retrieved value there. For example, LexSet [ ↑ .Subject←*.-PrepObj] constructs a function that sets the Subject register of the parent network to the PrepObj register of the current network.

3.2.1.4 Initializations; Look-Ahead Tests

The seek arcs are the only arcs which have a Init slot. Initializations which are stored in this slot can provide actions and tests. When seek arcs are encountered, the forms on the Init slot are evaluated first. If any of the actions returns NIL, then the seek arc is not taken. Therefore any look ahead actions are always specified on the Init slot. These actions typically look two or three words ahead, or at the context in which the current clause is embedded, to decide whether or not the seek arc is feasible. In the PAKTUS grammar, such look-ahead actions greatly reduce the need for backing up, and almost make the parser deterministic for sentences that can be recognized by the grammar at all. (That is, sentences that are not parsed in linear time usually can not be parsed at all.) Initializations can also be used to set up initial register settings for the network about to be entered.

Figure 56A:
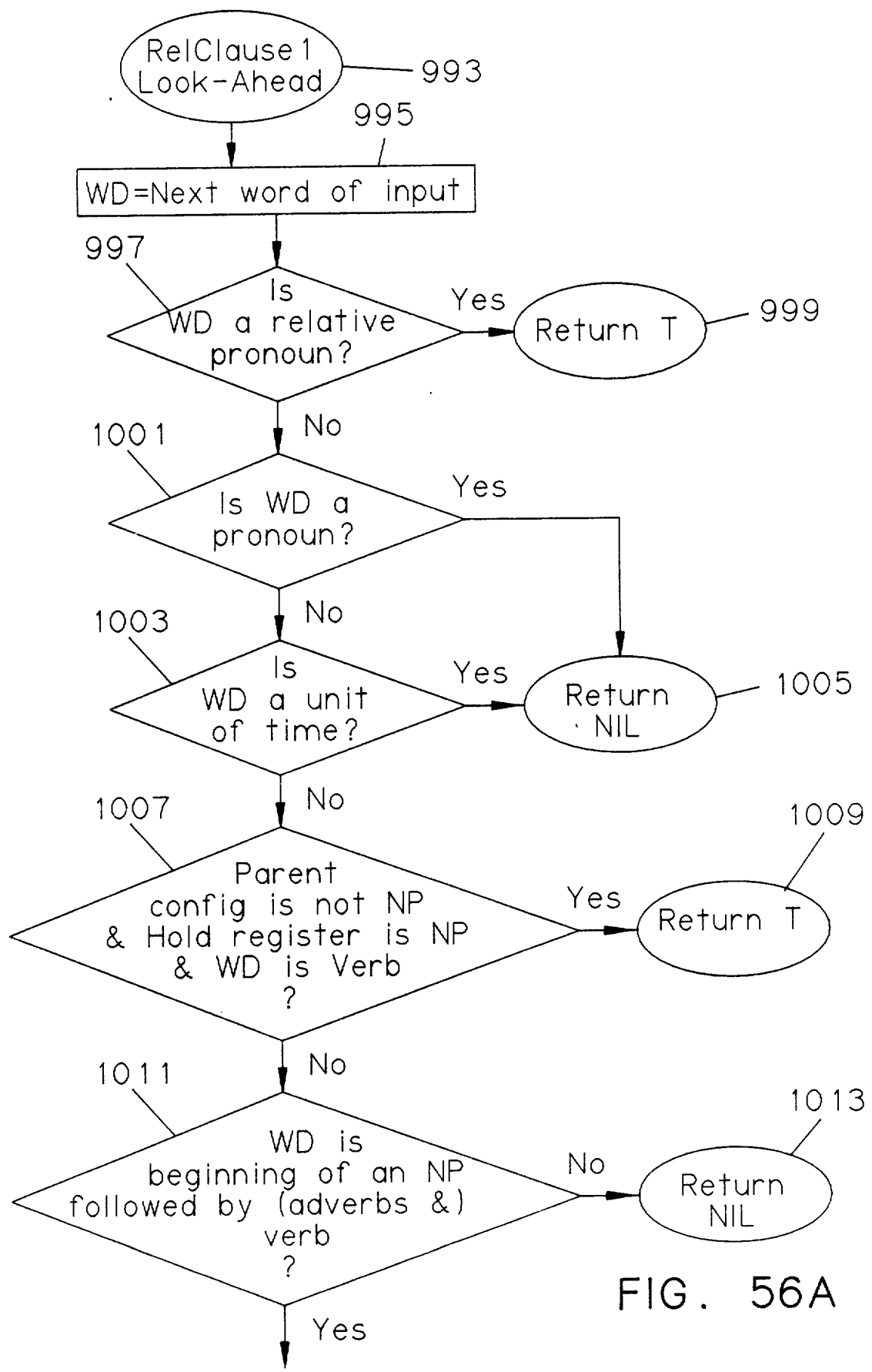
Figure 56B:
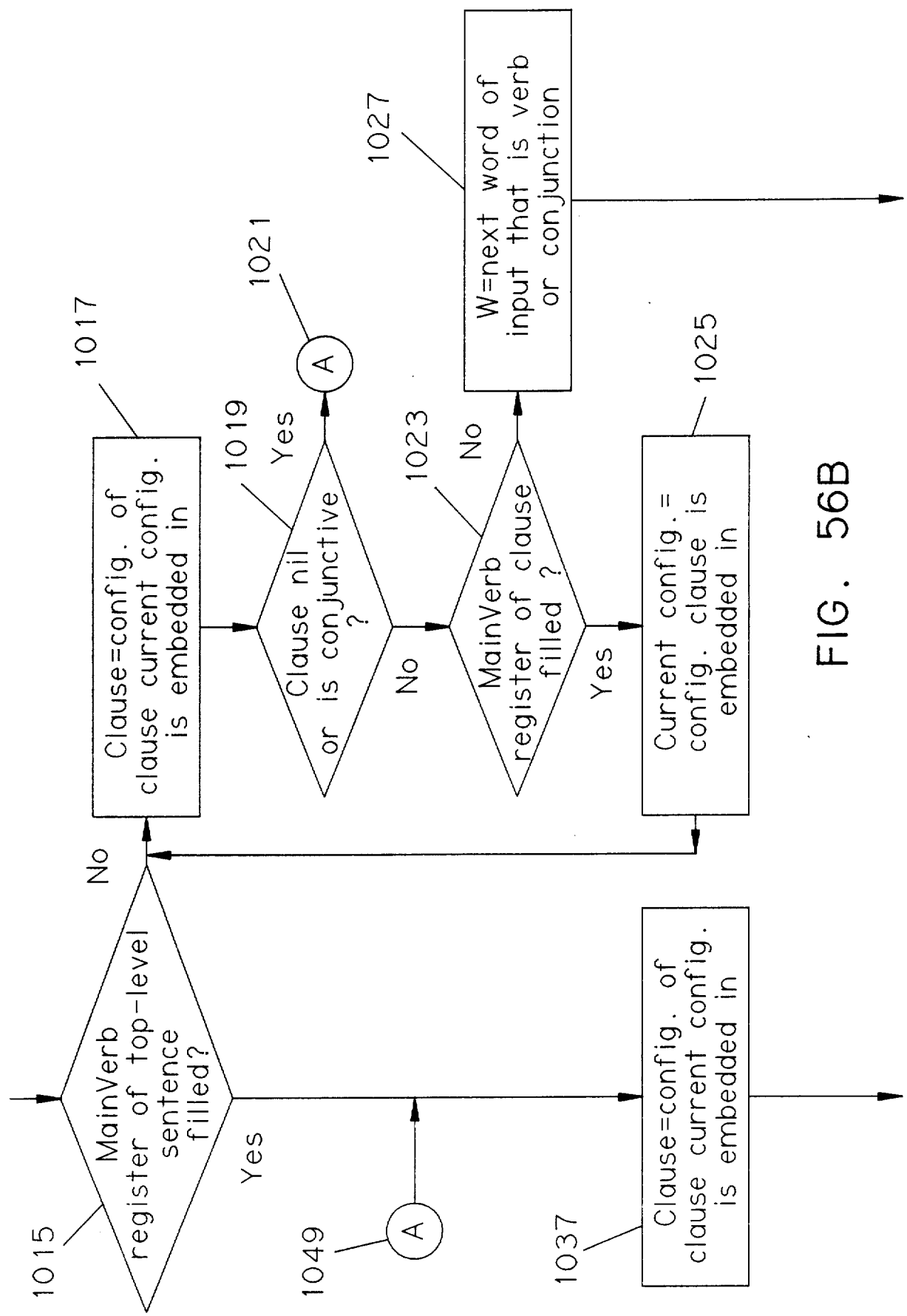

FIGS. 56A through 56C is a flow chart schematic diagram of a look-ahead test invoked by PAKTUS to determine whether the parser should consider whether a relative clause is present. The test 993 of FIG. 56 is invoked in parsing a noun phrase after the parser has encountered the head of the phrase. (Another relative clause look-ahead test, for participle relative clauses, is discussed below.) Routine 993 evaluates one or more subsequent words of the text (unlike the look-ahead test discussed in Marcus (1980), it is capable of handling any number of words) to determine whether (primarily) syntactic features of the text point to the possibility of a relative clause. A positive result,"return T", permits the parser to continue to look for such a clause while a negative result,"NIL", avoids a continued search for a relative clause potentially resulting in a considerable saving of processing time. This routine retrieves the next word of input ("WD") and returns T if WD is a relative pronoun, at 997, 999. At 1001, 1003, 1005, this test returns NIL if WD is a pronoun (not a relative pronoun) or a unit of time. At 1007, the parser looks at the configuration of the phrase in which the noun phrase is embedded and returns T if the tests shown are passed. At 1011, PAKTUS evaluates whether the next word is the beginning of a noun phrase that is followed by a verb, possibly with intervening adverbs, and returns NIL if this test fails.

If the test at 1011 succeeds, the remainder of the routine beginning at 1015 looks at the entire sentence to determine if there are enough verbs remaining for a relative clause to be present (i.e., without consuming the main verb of the sentence). If the MainVerb register of the top-level (sentence) network is filled, clause is set equal to the configuration of the parent clause (at 1037) and one or more of the tests shown at 1039, 1041, and 1043 are effected resulting in either a return T or return NIL decision.

If the test at 1015 fails, the loop at 1017, 1019, 1023, and 1025 tests successively higher level clauses repeating the loop if the MainVerb register of the clause is filled (and test 1019 fails). In these tests, if the clause is NIL or conjunctive (at 1019) the program flow jumps at A to the steps at 1037 and following, discussed above. Otherwise, if the main verb of a clause is not filled, the routine looks for the next verb or conjunction in the sentence, carries out one or more of the tests shown at 1029, 1031, and 1033, and either returns NIL (1045) or jumps at A to the previously discussed branch at steps 1037 and following.

The look-ahead test routine discussed above has only a minor degree of semantic content. PAKTUS also incorporates look-ahead tests embodying significant semantic features, another point of novelty over Marcus (1980). For example, in the test for the presence of a participle relative clause, when a past participle follows a noun, the system evaluates whether it may be part of a participle relative clause. The system considers each concept associated with the verb. For each such concept, PAKTUS carries out a partial instantiation of case frames of the relative clause that would be produced to see whether the noun could play a role which will be appropriate to its inclusion in the case frames for that concept. (See section 5, below, for a discussion of case frames.)

3.2.1.5 Some Useful Context-testing Functions

The following functions are frequently used in context tests on the grammar arcs.

HasFeature [WordParse Feature Clause] returns the senses in WordParse that have Feature, if any; otherwise NIL. Feature is intended to be a list of two elements: a word category (or list of categories) and a complement type (or list thereof). Senses not satisfying the Feature specification are discarded (e.g., a verb may be both monotransitive and bitransitive; if an arc requires a bitransitive verb then the monotransitive sense is"forgotten" for the remainder of the parse to prevent inconsistent decisions later). See arc dS/ze while using PAKTUS for an example of its usage.

IsLexCat [WordParse, CAT CLAUSE BlockCat] is used for matching a specified CAT, which is a lexical category (or list thereof), with WordParse which is the senses for a particular word. It returns a dotted pair whose CAR is the senses which belong to CAT, and whose CDR is the access path to the CAT, if a match is found; NIL otherwise. Paths through BlockCat are not considered.

3.3 The ATN Interpreter

3.3.1 PAKTUS Interpreter

The preferred embodiment of this invention utilizes a top-down, left-to-right, depth-first ATN interpreter or "parser". The interpreter applies the grammar to an input string (a list of words). It keeps a pointer to the current position in the input list, and current context (register configuration). As stated above, each network consists of a set of states and arcs. The arcs specify allowable transitions between states. Each arc has a label indicating the type of transition. Category arcs name (in their Label slot) the category to which the next Word in the input string must belong. When they are traversed, the position pointer is advanced to the next word. Seek arcs specify a recursive call to one of the transition nets, entering at the state indicated in the Label. If that net can be traversed, then processing resumes back in the net containing the seek arc. Jump arcs specify a transition to another state without consuming any input. Finally, the send arcs specify an exit from the net, returning to the net from which the current one was called, if any, or else to the top level. In the latter case, if all input has been consumed, the interpreter returns with successful completion.

Any arc can have rules stored in it. These are run after the arc is traversed (i.e., after a word has been tested for a category arc, or a net has been traversed for a seek arc). The transition to the next state will be completed only if the rules succeed. Each rule can specify context that must be true and actions to be taken in that case. The context specifications and the actions generally test and set registers associated with the current network (in such a way that old settings can be restored if necessary). See Section 2.5 above for further details of rule application.

In general, a state can have several arcs leading out of it to other states (or looping back to itself). When an arc is traversed, the PAKTUS interpreter maintains a stack of alternatives leading out of the same state that have not yet been tried. This stack contains all the information necessary to restart the parser at the point at which the alternative was created. This enables it to back up to this state and restore context if it is unable to successfully process the input along the attempted path. It can back up to this state even if it subsequently exits the current net (i.e., if this net were invoked by a seek arc).

The current interpreter returns as soon as it finds a path through the top-level net that consumes all input. (In an alternative embodiment for other applications, this may be modified to return all acceptable paths.) It returns the register configuration that was built in the course of interpreting the networks and input reformatted into PIKS frames by making register/value pairs into slot/values of frames created to hold this information.

The register configuration is a pure list structure during parsing that is very similar to PIKS frames. The interpreter converts the register configuration to PIKS frames after each complete sentence is parsed. Pure list structures during parsing have been observed to improve processing efficiency.) The function name of the interpreter is Parse.

Parse [Input-string Trace Symbol] returns an atom which is a gensymed name with root Symbol (default is "F") of the frame holding the top-level register configuration, if the sentence is syntactically and sematically acceptable; otherwise it returns NIL. The input string contains the sentence to be parsed. In an alternative embodiment, Parse operates on a list of words rather than an input string. If Trace is not NIL, then the graphic tracer is on, and an animated view of parsing is provided. The trace mechanism blinks each node of the grammar as it is considered and prints the current word of input. The speed of blinking is controlled by the user with the mouse, while the parse is in progress, through the "Blink Wait" window. The trace also boxes seek arcs as they are considered. These are recursive calls to the program. Advantageously, if a seek arc is entered again within a previous call, the border of its box is made one pixel thicker. The boxes are removed from the seek arcs when the network that the seek arc calls is exited. The graphic trace mechanism has been extremely useful in debugging the grammar.

FIGS. 43A through 43D shows the basic sentence parser routine, PARSE. The PARSE function takes as its input an input string of words, as well as various optional parameters such as Trace (which determines whether or not the parse will be displayed as it is effected) and ATN Windows (a list of windows containing displays of the ATN). At 343, Process-Sentence takes a list of words and recognizes word boundaries, returning a list of lexeme strings, Words. In 347, Configuration, which describes the current situation of the parse, is initialized to S, the initial state at the beginning of the sentence. ATNMatch (at 349) is the primary function of the parse; see discussion of FIGS. 44A through 45C below. Its second argument is used to track which word of input the parse has reached and whether the parse has exhausted all Words. ATN Windows is a global variable containing a list of grammar networks such as noun phrase, prepositional phrase, etc.

At 351, a decision is made whether or not the parse succeeds. If the parse was successful, the lists created by ATNMatch are converted to PIKS frames to permit graphic display and in further processing for discourse analysis. The "child links" referred to at 369 are inverse links to the ↑ links. (See the description of the latter in the discussion of the LexTest function in Section B2.1.3.) These child links are used in later processing such as at the discourse analysis stage. At 371, the routine looks for any assumptions made in performing the parse. Assumptions are a list of configurations which are saved for use if a parse fails while enforcing certain tests, i.e., to try again by adopting assumptions in a relaxed mode. Depending on whether or not the system is in AutoLearn mode, the system either seeks user verification of the Assumptions, or adds them to a list of those previously made. The system then displays results of the parse depending on the mode of operation.

The Parse routine includes two branches (353–365 and 383–393) which are operative if the full sentence parse fails at 351. At 353 the system detects whether WFST (a well formed substring table containing portions of the full sentence which were successfully parsed) is empty. If not, step 355 sorts the substrings in order of length, and steps 357–363 test the substrings to see whether the full sentence can be successfully passed as a combination of sentences. If such a successful combination is found (yes at 363), the two substrings are joined together by 'conj (conjunction) at 365 and the routine continues with the post-parse steps 367, et seq.

If WFST is empty (either at 353 or 357), the HoltAlts register is examined to see weather any Assumptions were made. If so, steps 387–393 provide a "relaxed mode" parse (Relax=T), in which the Configuration is set to HoldAlts, and the parse reattempted without enforcing the rules in question.

FIGS. 44A through 45C show ATNMatch, the ATN interpreter routine. At 445, the timer is set up (e.g., to 1.5 seconds per word) to control the maximum time allowed to parse the sentence. After the initialization step 447, the routine enters the major loop F-F (449, 477 or 501 or 517 or 543 or 549 or 561) which is repeated for each successive state traversed. The test 451 will initially be false because Alts have been initialized to Configuration. The Detour Loop 455, 457, which is effected initially and in certain later events, initializes the variables shown. If Trace is true (and if there is BArc and a window), the graphic tracer step 461 removes one pixel from the border around BArc in the window. State is set to the from state of the next arc, and the list of remaining arcs is updated.

If the tests are positive at 465, this signifies that the interpreter has reached the end of the sentence, with no item left on the stack and no further arcs. ATNMatch returns STAR, indicating a successful parse of the sentence.

If the test at 465 fails, the Trace is turned on, and State is bound to some state, the system blinks State in the window.

The subloop G-G (471, 495 or 507 or 513 or 523 or 533 or 571) is repeated for each of the remaining outarcs of the State under examination. If no arcs remain, Detour is initialized and the system returns to the major loop F at 449. If all arcs have not been considered, Arc is updated, the arc is blinked if appropriate in the Trace window, and various local variables are updated at 483. The remaining portion of the ATNMatch routine comprises various branches depending upon the label of the arc under examination. If the arc is a jump arc, steps 491, 493 examine any context tests; a failure results in a return within the minor loop (the jump arc is not traversed). If all rules present were true, and there is a next arc, steps 497 and 499 push the current configuration into Alts in order to permit returning to this point in the parse later on, and updates the configuration before returning to 449 in the major loop without detour. If the arc were a send arc (test 487 positive), the branch at steps 503 and following will set Star and Bregs as shown and fetch Rules from the send Arc. If all the rules fetched from the arc were not true, then the system returns within the minor loop and tries the next arc. If the rules are all true, the system sets BArc to the first position in the stack, W to the second position, and removes one pixel from the BArc border if the preconditions are met. The system then tests the pop rules on the send arc returning within the minor loop if any test fails, otherwise updates the various variables shown at 515 and returns within the major loop.

Figure 45A:
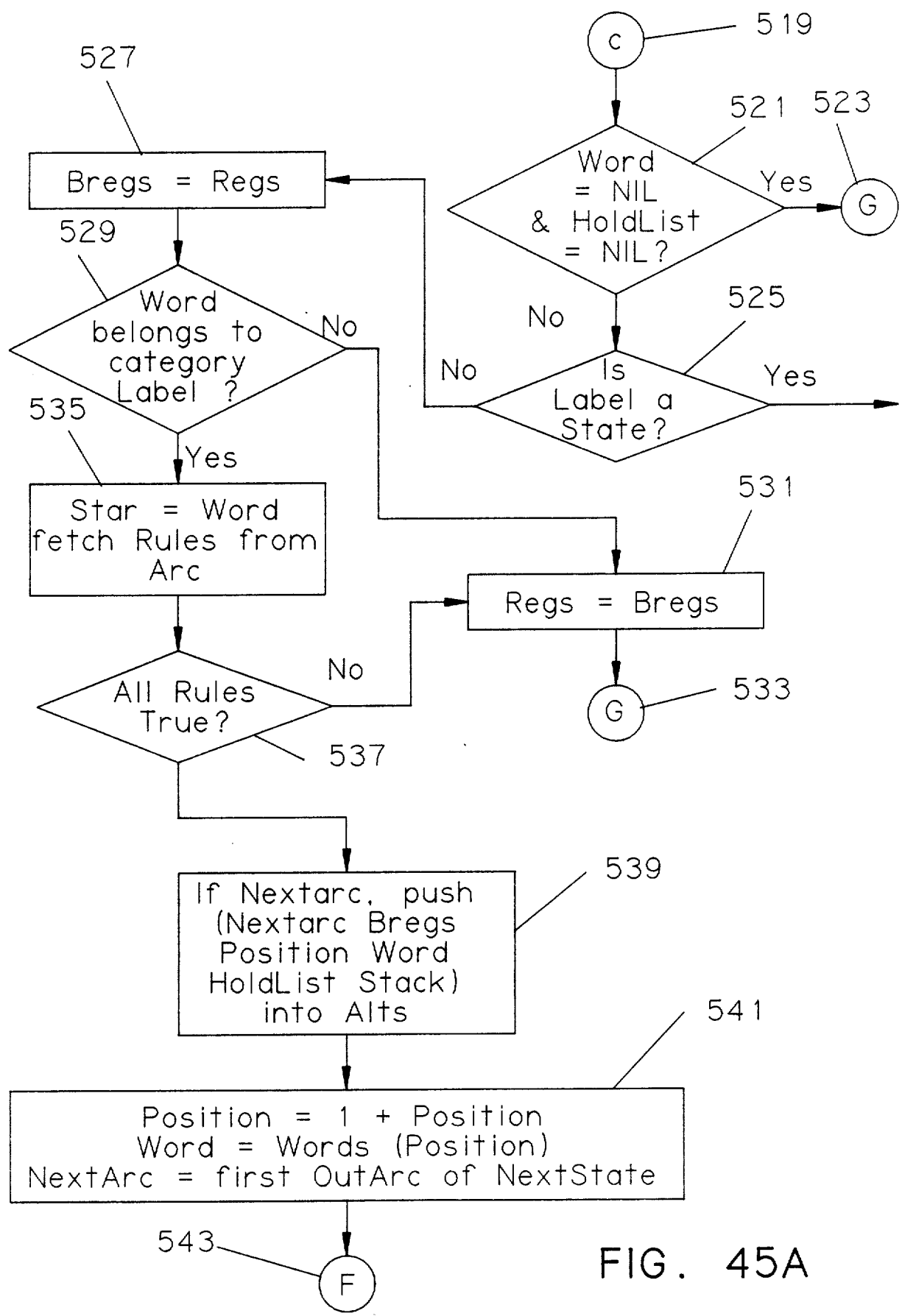
FIGS. 45A through 45C show a flow chart schematic diagram of the remainder of the ATNMatch routine of FIGS. 44A through 44C.
Figure 45B:
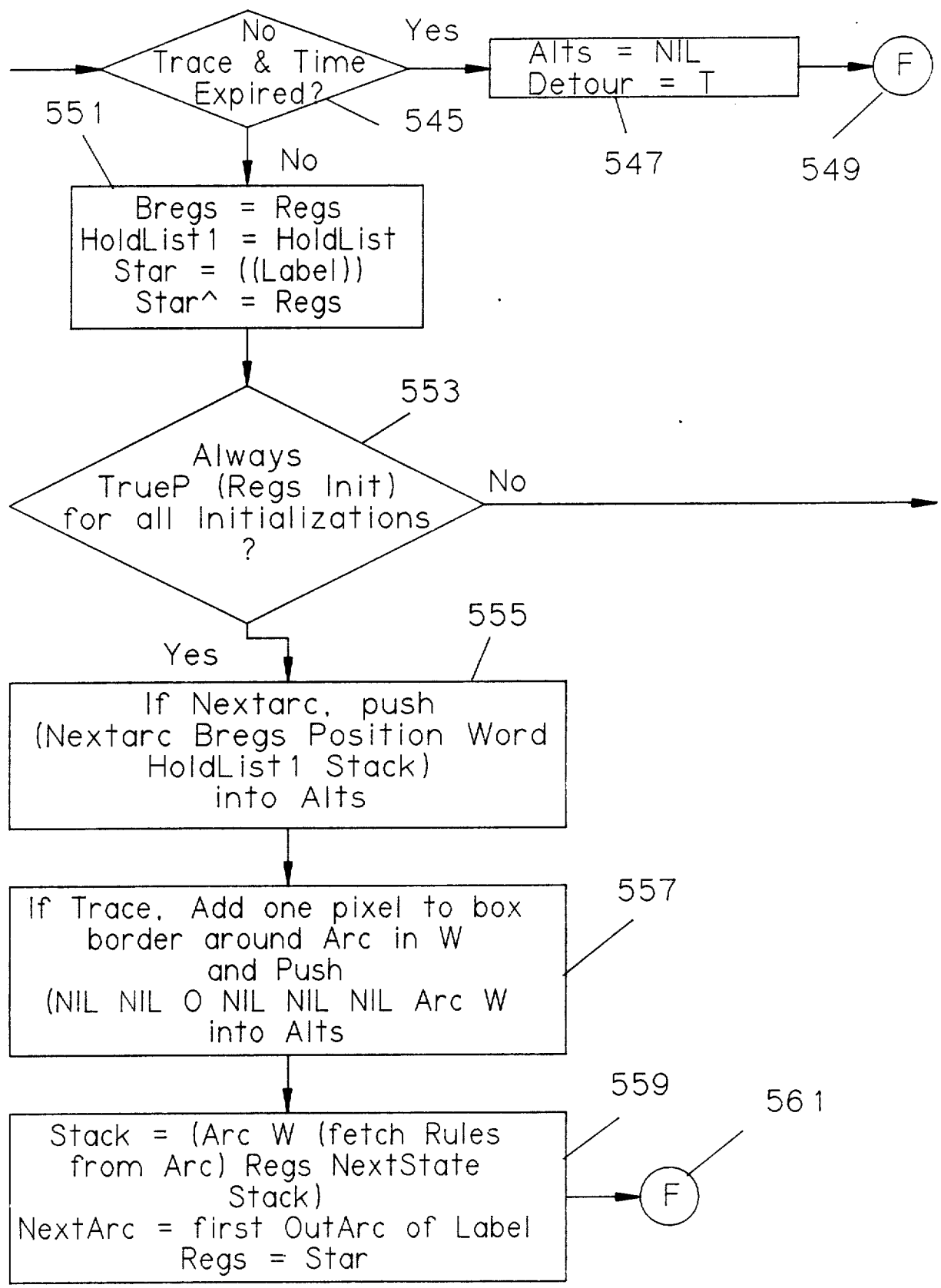
Figure 45C:
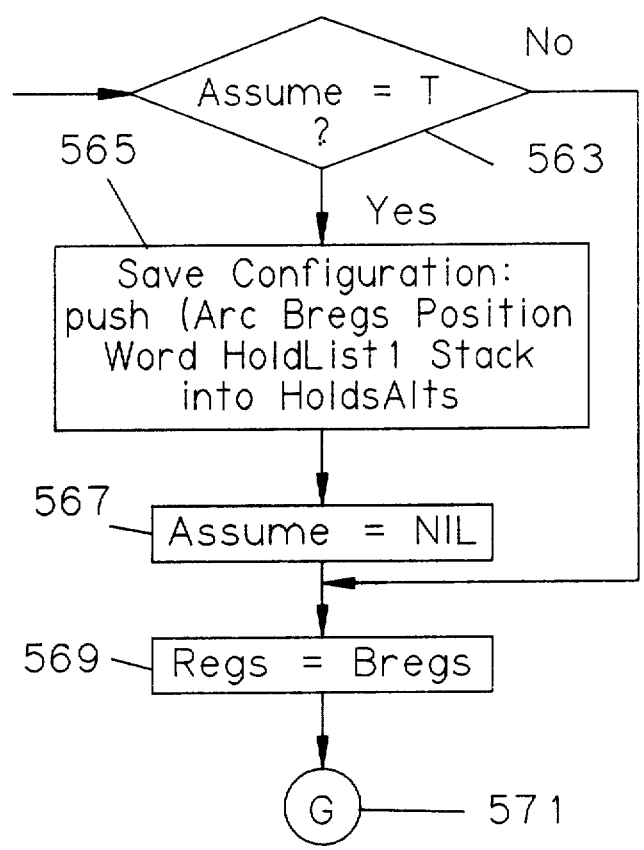

FIGS. 45A through 45C show how the TNMatch routine handles the two other types of arcs, both of which consume input. The test at 521 may determine whether or not there is a failure because all words have been consumed and no item is left in the hold register; if so, the system returns within the minor loop, to take into the account the possibility that only jump arcs remain which jump out of the sentence. If the arc is labeled with a state, the system tests at 545 whether Trace is not on and the time has expired (in which case the system will return within the major loop and a failure will be indicated). Otherwise, various variables are set at 551, and the initialization values are tested with (and registers may be set as side effects) TrueP at 553. If all initialization tests are passed, the current configuration is pushed into Alts if NextArc exists. If the trace is on, one pixel is added to the border around Arc, and Stack, NextArc and Regs are updated as shown at 559 before returning within the major loop. If all initializations were not true at 553, then the system tests as to whether an assumption is to be made at 563, saving the current configuration in HoldAlts, if so, then writes Bregs into Regs and returns within the minor loop.

The last case of ATNMatch, steps 527-543, handels the case in which the arc has a category label and the current word belongs to that category. STAR is set equal to the word, the rules are fetched from the arc and tested. If there is a NextArc, the configuration shown at 539 is pushed into Alts, at 541 Position and Word are updated (i.e., input is consumed) and NextArc is set to the first OutArc of the next state, before returning within the major loop.

3.4 The ATN Compiler

The purpose of the ATN compiler is to translate ATN networks into pure LISP code that can be executed directly. This code can subsequently be compiled to machine language code by the standard LISP compiler. The advantages of compiling an ATN network are the same as those of any compilation process: reduced execution time and storage space. The compiler is able to preserve all of the features available under the interpreter. The disadvantage of compiling an ATN network is that whenever a change is to be made to the grammar, both phases of the compilation must be redone, which is a time consuming process, especially if the grammar is large. A rule compiler is also needed before the ATN grammar is compiled. The purpose of the compiler is to make an application grammar more efficient. It need be compiled only once so the disadvantage cited is not important. The compiler would not generally be used during grammar development. The functions involved in compiling an ATN are as follows:

COMP/RULE [FILE] is the rule compiler which goes through all KINDSOF progeny of the Arc object, gets rules from the Rule slot of each arc, and then generates a function which is the combination of the conditions and actions for each rule. The functions are named by packing the name of the rule with"/COMP". COMP/RULE also gets the forms under the Init slot of each arc and generates functions for each of them. These functions are named by packing the name of the arc with"/INIT". A FILECOMS is generated to hold all the functions that are generated. If FILE is not NIL, then FILE is used to create the FILECOMS; otherwise "COMPRULEFNS" is used. After the function is executed, the functions "MAKEFILE" and"TCOMPL" (or CLEANUP) should be run to save and compile the rule functions. The global variable "FUNCT/LIST" should also be checked. It holds the name of functions which are needed by the rule function but not defined. Note that when arcs are added to the grammar they must be specified to be AKO arc or they will not be noticed.

ATNCOMPILER [Trace] is the function which compiles the ATN grammar into a single LISP function. The compiled function is named S/PROC. If Trace is not NIL, then each node is blinked as it is compiled. S/PROC should then be compiled by the Interlisp compiler.

Figure 39:
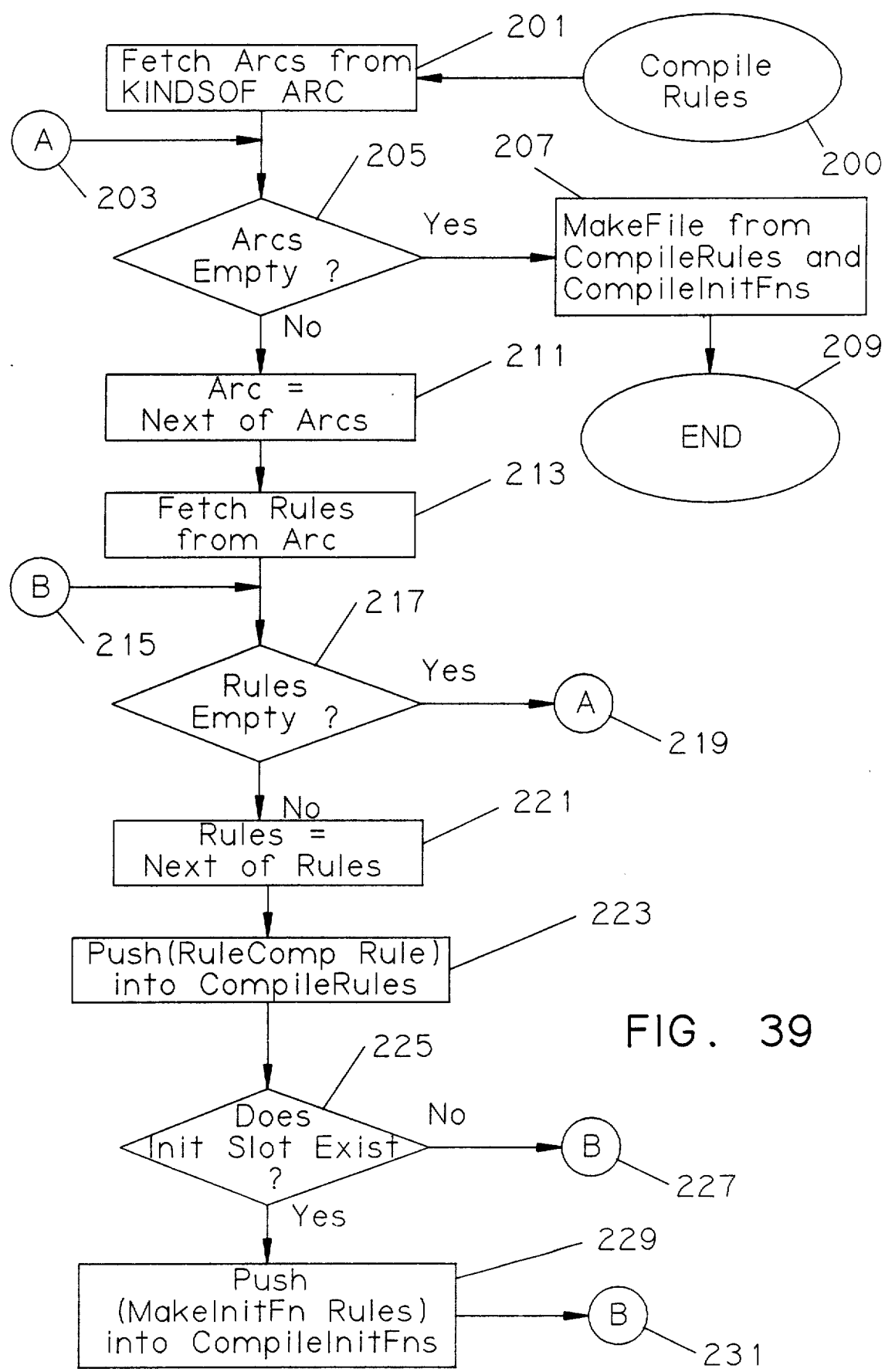
FIG. 39 is a flow chart schematic diagram of the routing for compiling Lisp code from Rules objects.
Figure 40A:
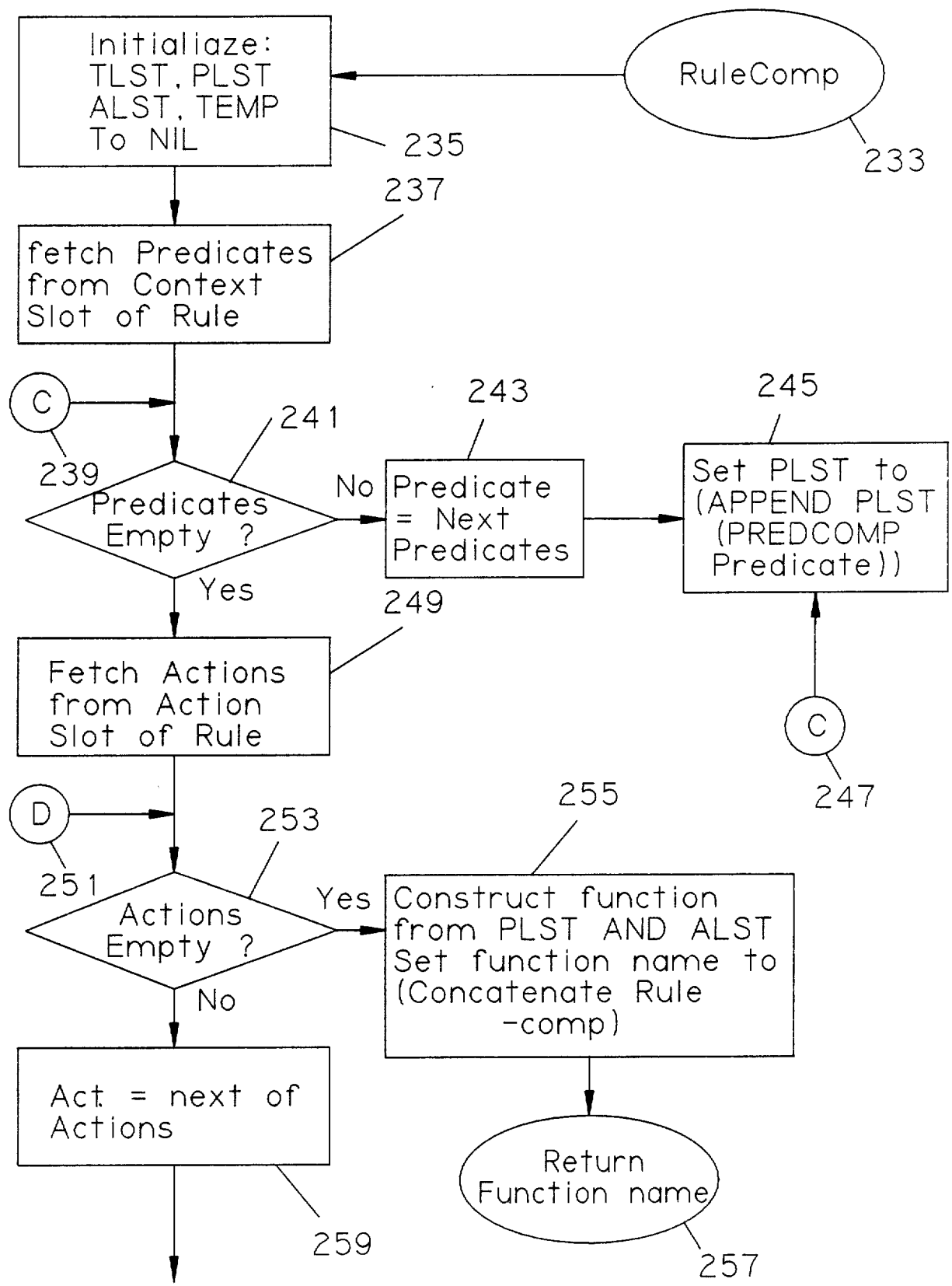
FIGS. 40A and 40B show a flow chart schematic diagram of the RuleComp subroutine of the routine of FIG. 39.
Figure 40B:
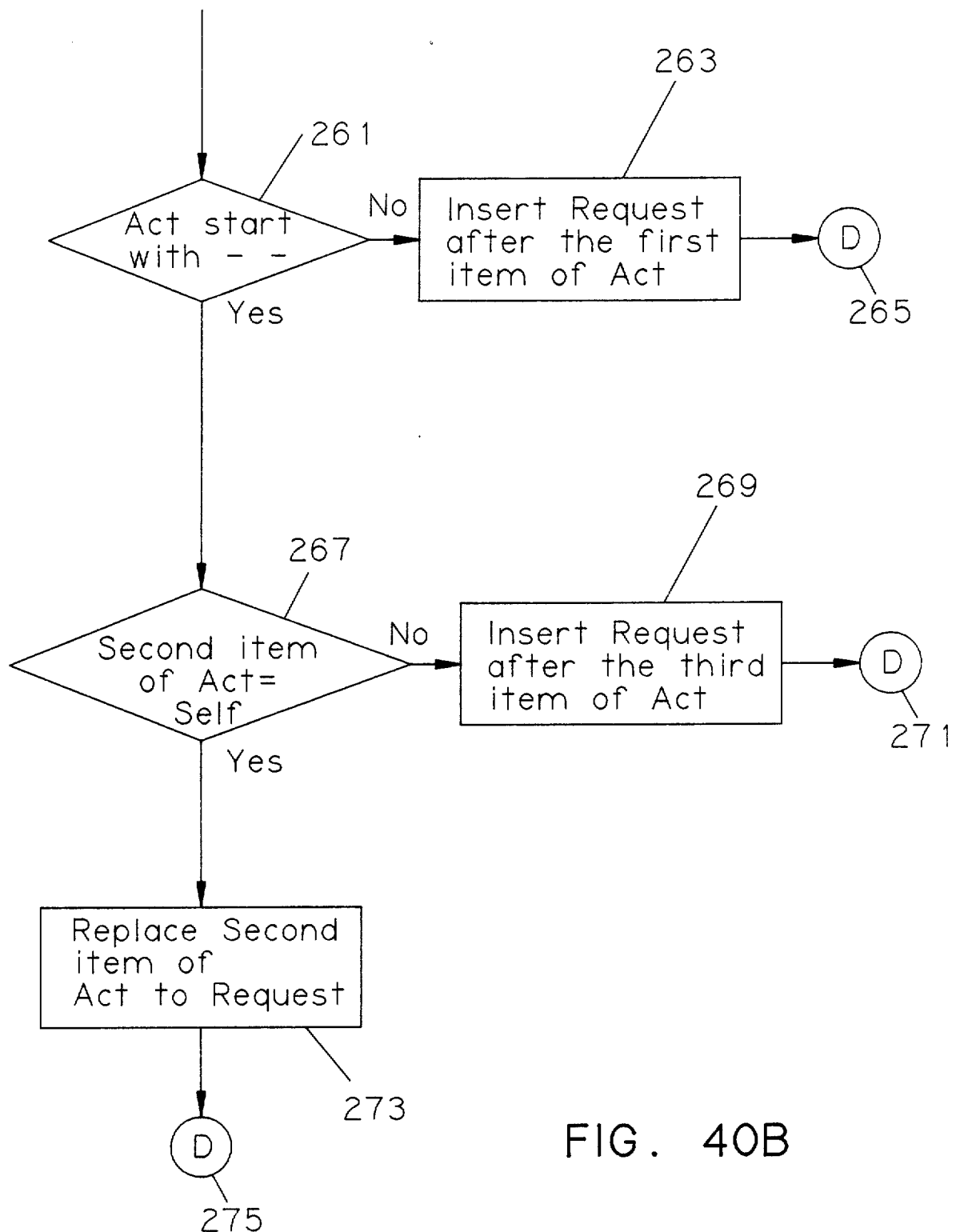

The Compile Rules routine 200 of FIG. 39 complies PIKS rule objects into Lisp code. At 201, all instances of the arcs objects are fetched from the KINDSOF slot. The major loop defined at A—A (203, 219) processes all retrieved arcs, with a test at 205 to see if the Arcs list is empty. Assuming there is one or more further arc, at 211, 213 the Rules of the next Arc are fetched. The loop at B—B (215, 227 or 231) processes all retrieved rules. At 223 RuleComp is applied to the next rule to compile the rule into Lisp (see the discussion of FIG. 40 immediately below) and push the result into the CompileRules file. At 225 there is a test for an initialization arc, which causes a return to step 217 if the test proves negative. If the test proves positive, the initialization is treated like a rule: the forms under the Init slot of that Arc are compiled and the resulting Lisp code is pushed into the CompileInitFns file.

When all rules have been exhausted for the arc (test positive at 217), the routine returns at 203 in the major loop to test for additional arcs. When all arcs have been exhausted (test 205 positive), a file is created from CompileRules and CompileInitFns.

Figure 41A:
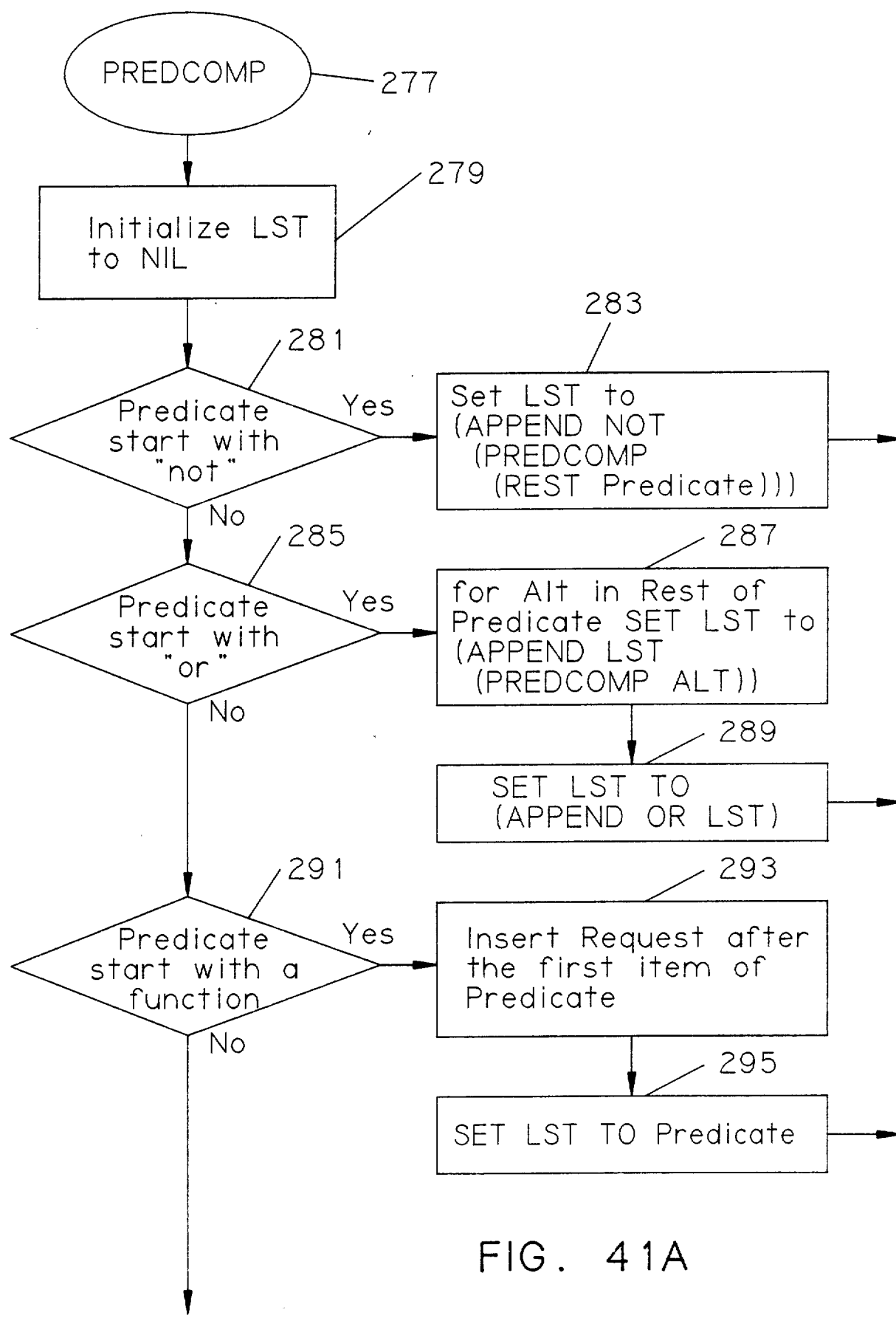
FIGS. 41A and 41B show a flow chart schematic diagram of compilation of the Predicate code in the subroutine of FIGS. 40A and 40B.
Figure 41B:
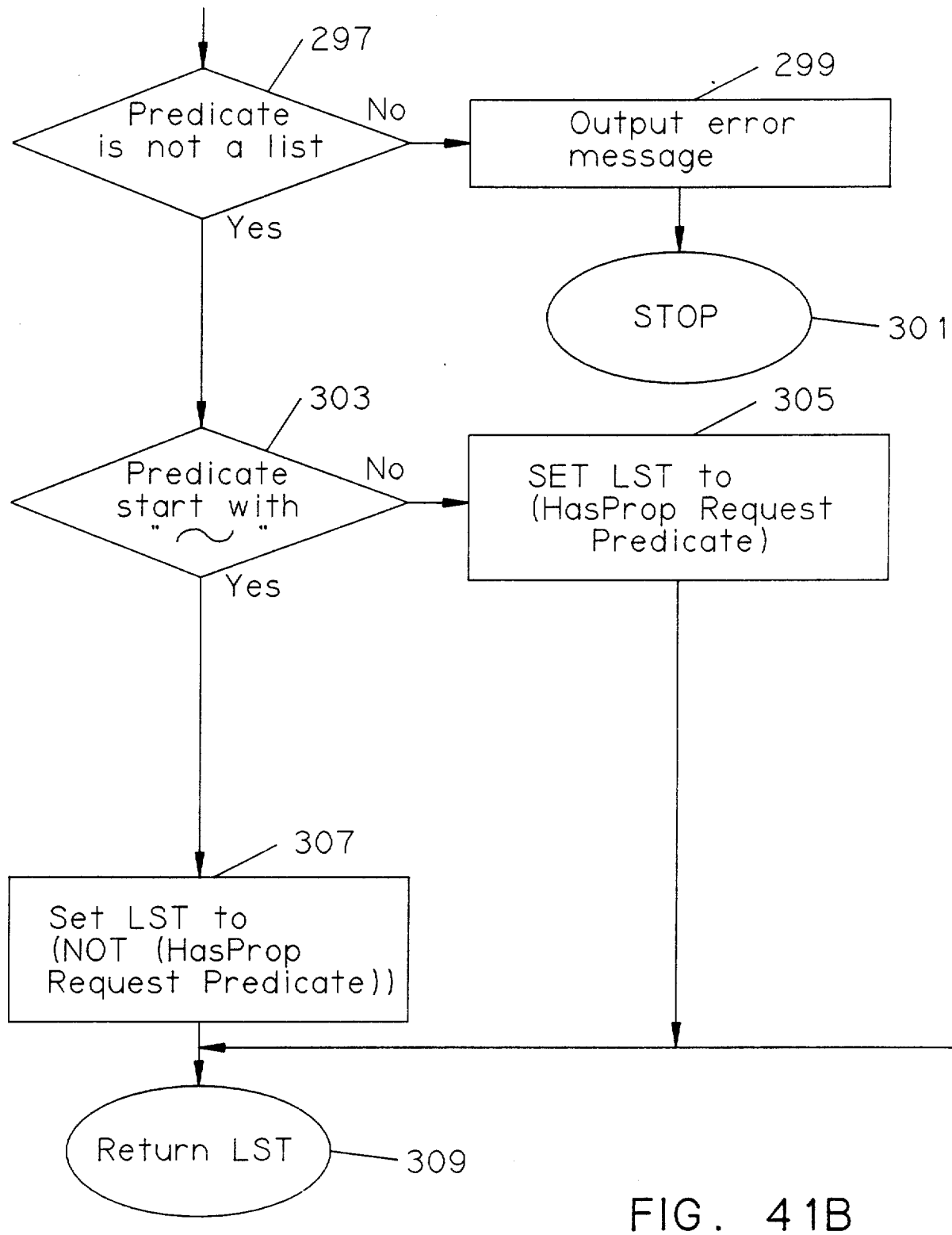

The RuleComp subroutine 233 (FIGS. 40A and 40B) is an instrumental part of the routine of FIG. 39. At 235, various local variables are initialized to NIL; the significance of these is apparent from the following discussion. At 237, all Predicates are fetched from the Context slot of the Rule being compiled. In the loop C—C at 239, 247, the system iterates through all Predicates, and at 245 applies PREDCOMP (see discussion of FIGS. 41A and 41B below) to each Predicate, adding the resulting Lisp code to PLST. When all Predicates for the rule are exhausted, 249 fetches all Action objects from the Action slot of the rule.

The major loop at D—D (251, 265 or 271 or 275) processes each Action of the Rule, by fetching the specification of the action Act in case the context test is true, and inserting 'Request in the appropriate item of Act 'Request refers to the object (Lisp code Requestor) which causes a rule to be examined at run time. At th time, it will be bound to the Configuration representing the state of the parse. On exhaustion of all actions, at 255 a function is constructed from PLST and ALST, and the function name constructed by concatenating the name of the rule with '-Comp. The function name thus created is returned at 257, exiting the Rule Comp subroutine.

The PREDCOMP subroutine 277 shown in FIG. 41 compiles the predicate part of the test. This routine examines Predicate (which should be a list) to see whether it begins with "not", "or", a function, or "~", assigning appropriate values to LST depending on the result (as shown in the respective branches of this subroutine). If Predicate is not a list, an error message is displayed. This subroutine returns the value of LST thus created.

Figure 42:
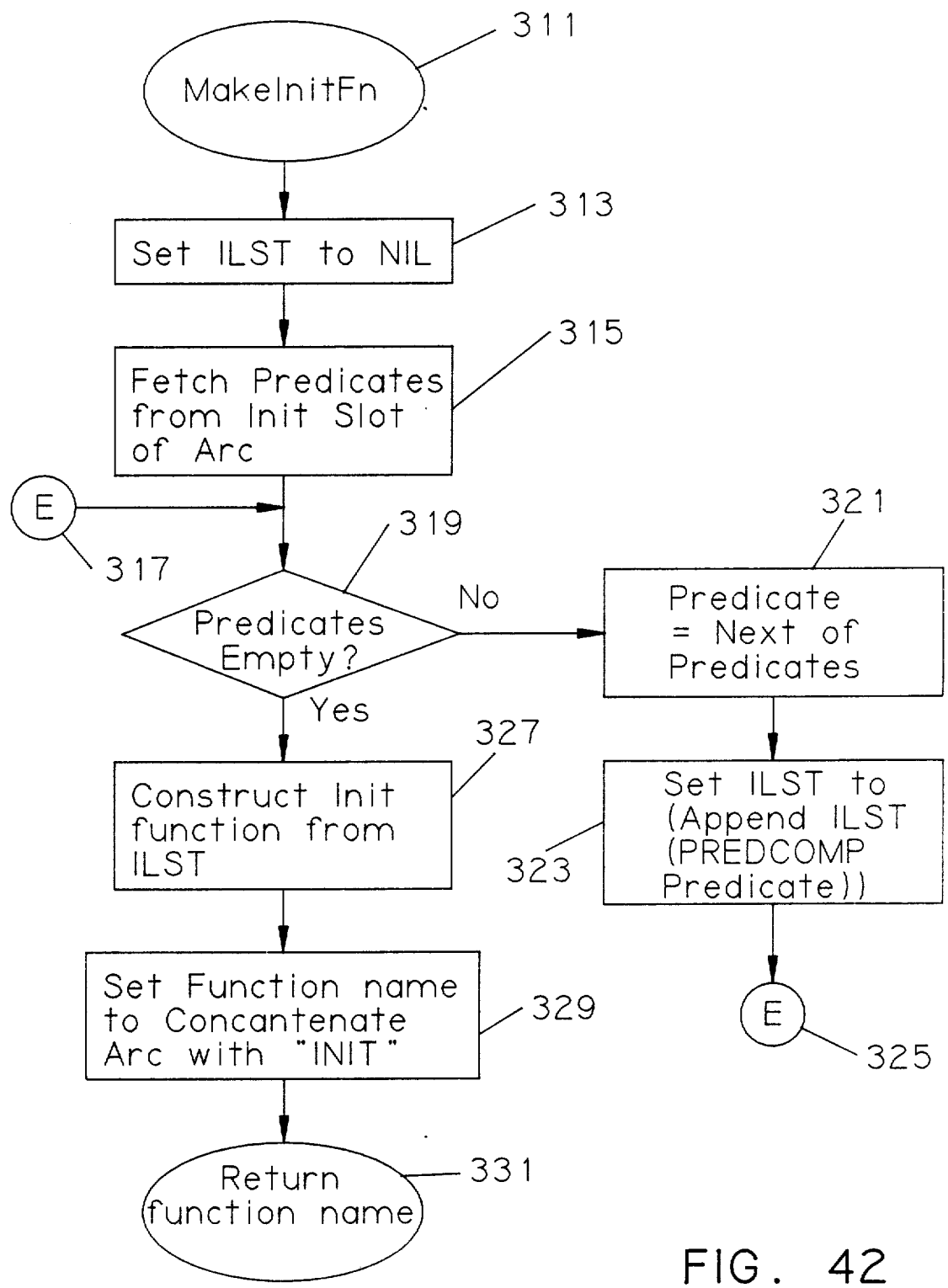
FIG. 42 is a flow chart schematic diagram of the construction of the initiation code in the routine of FIG. 39.
Figure 43A:
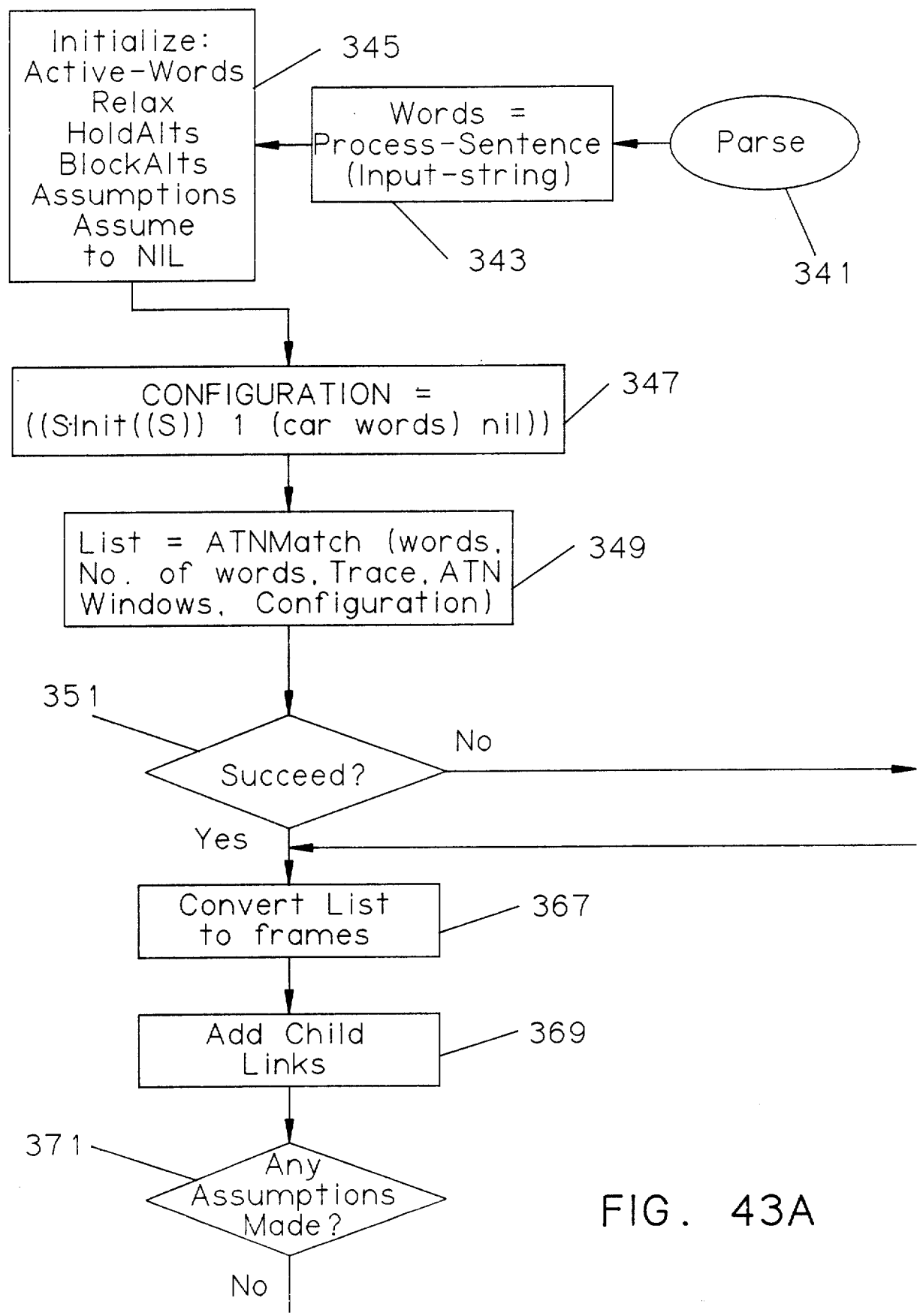
FIGS. 43A through 43D show a flow chart schematic diagram of the parse routine, for parsing natural language sentences.
Figure 43B:
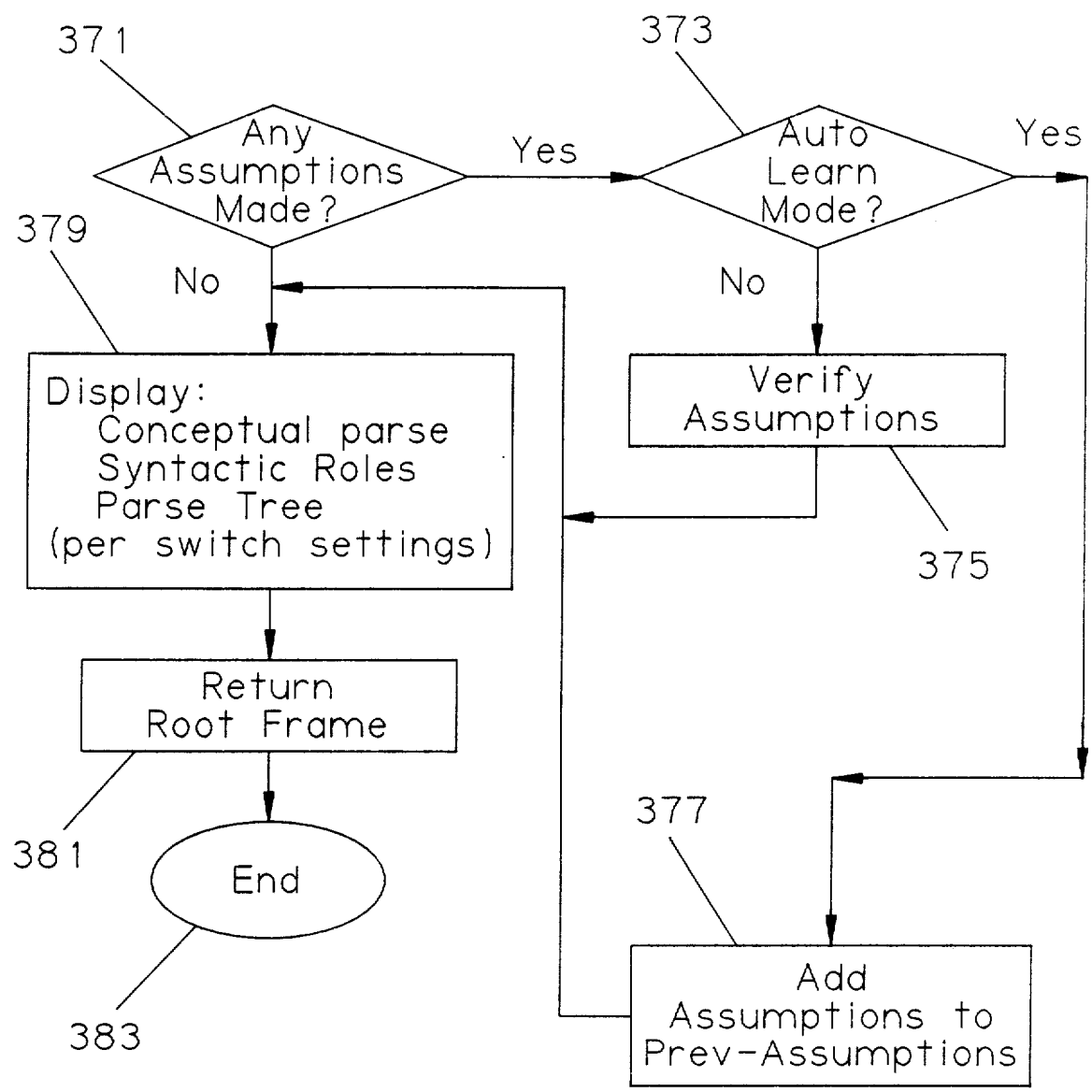
Figure 43C:
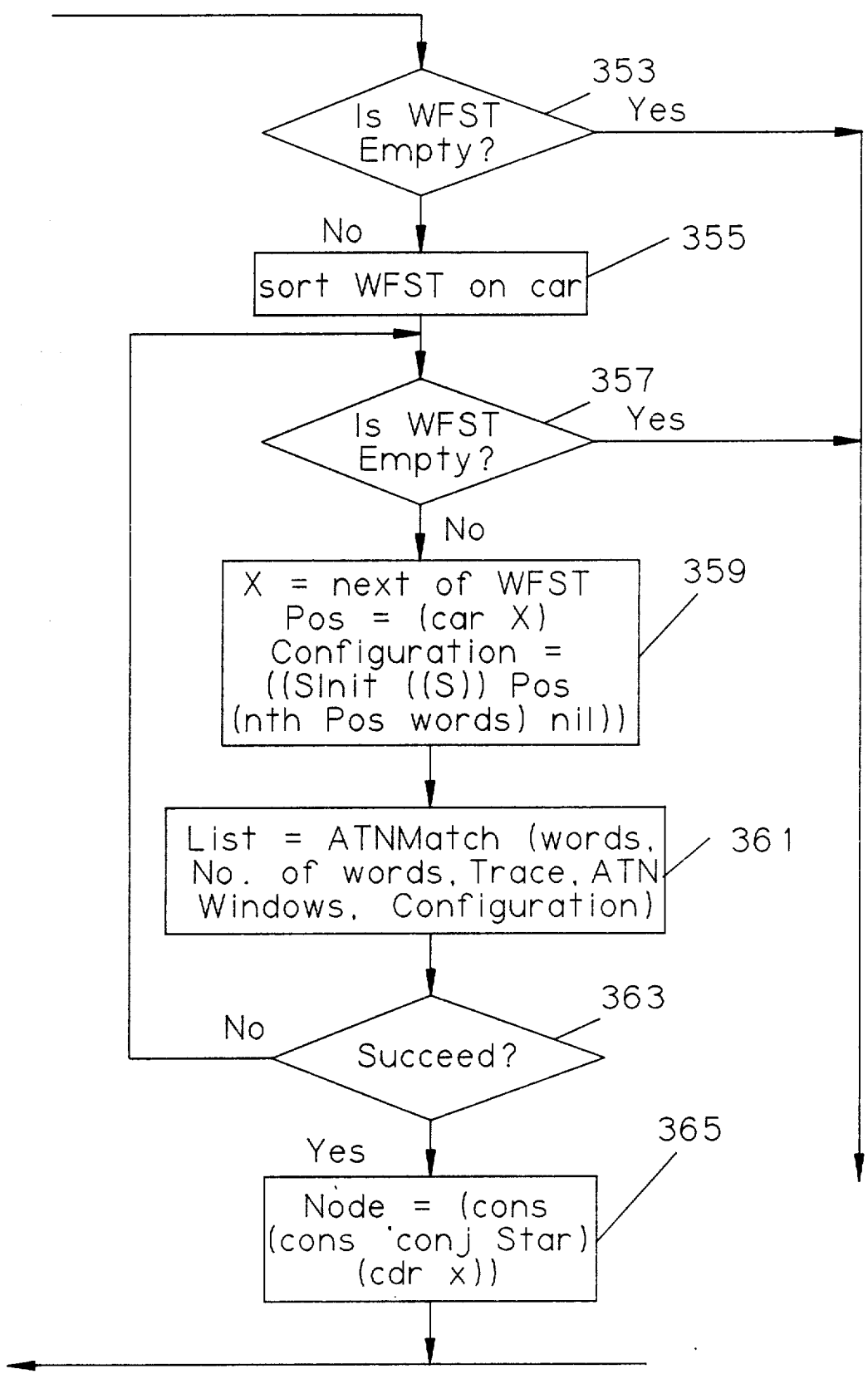
Figure 43D:
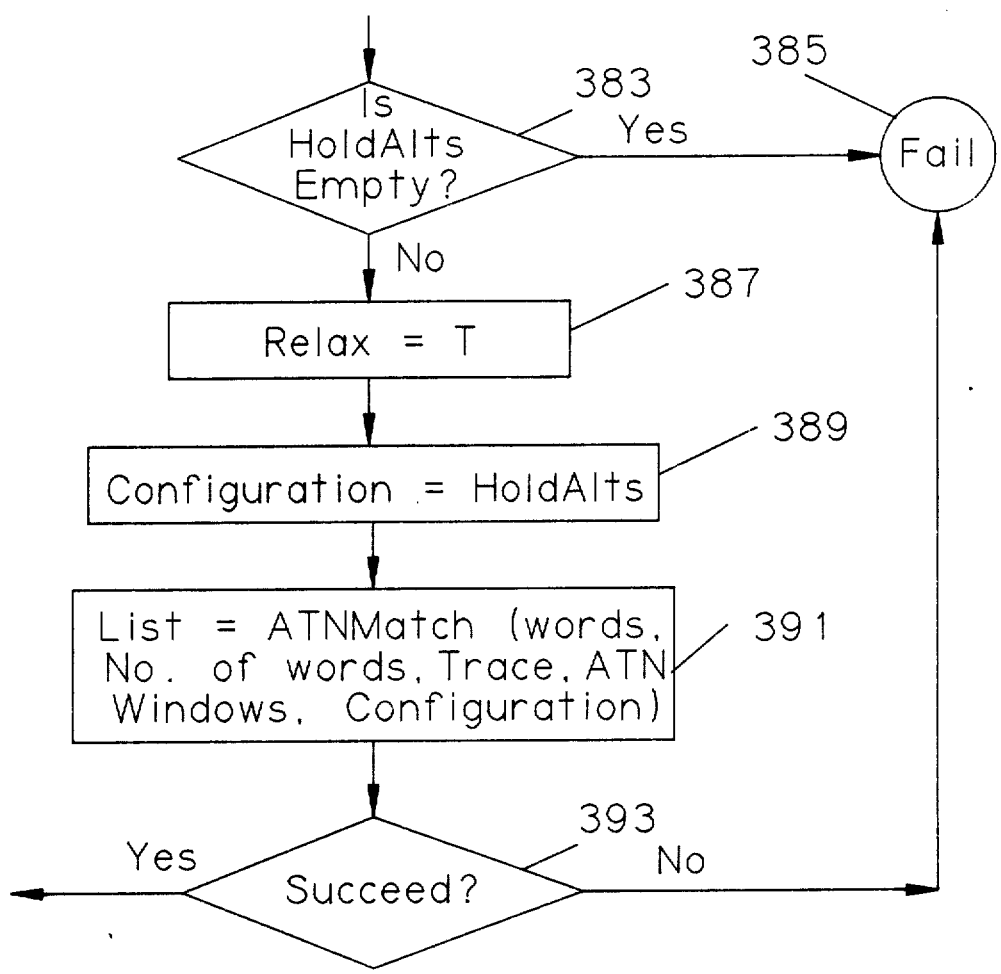
Figure 44A:
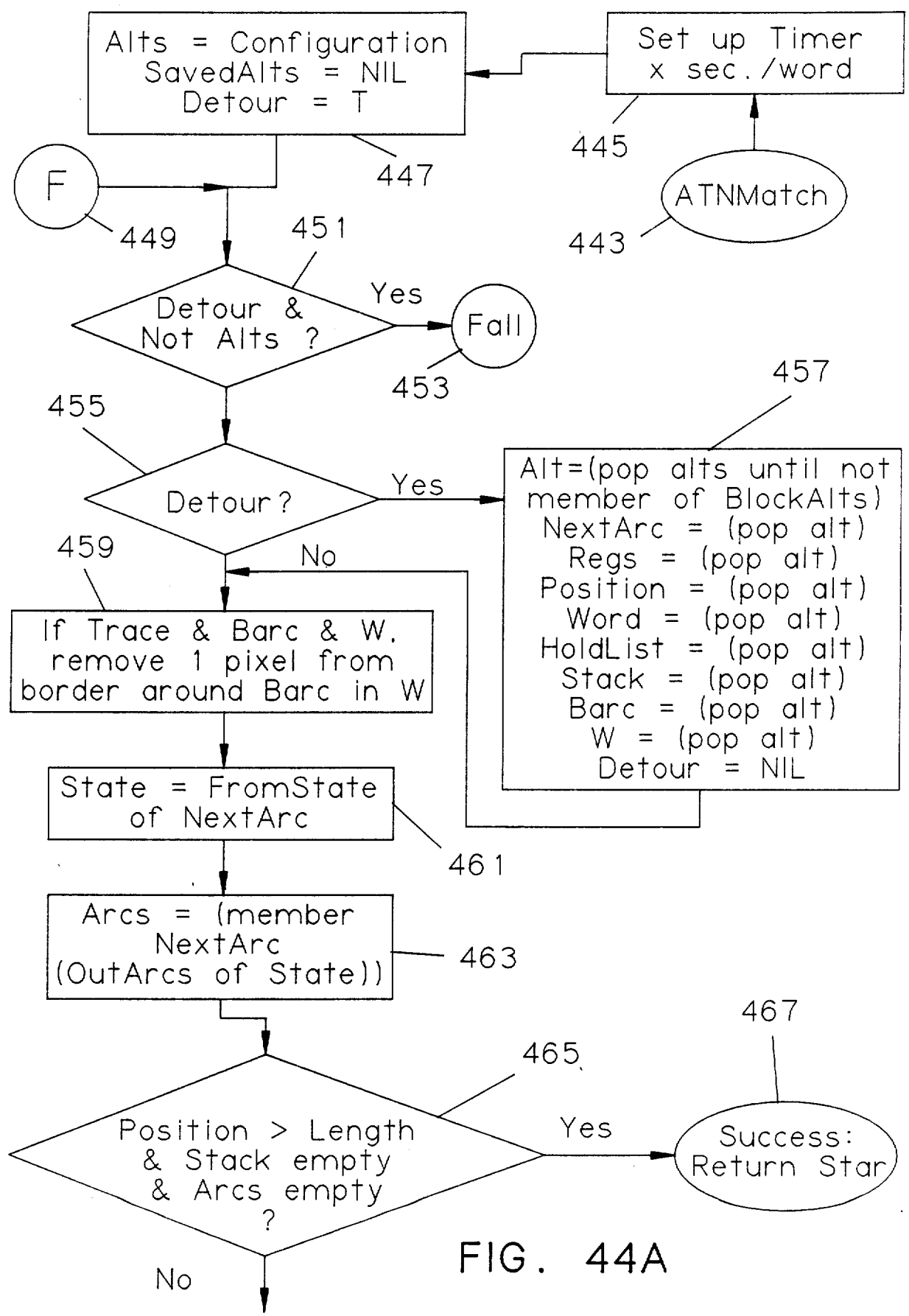
FIGS. 44A through 44C show a flow chart schematic diagram of a first part of the ATNMatch routine for interpreting natural language input.
Figure 44B:
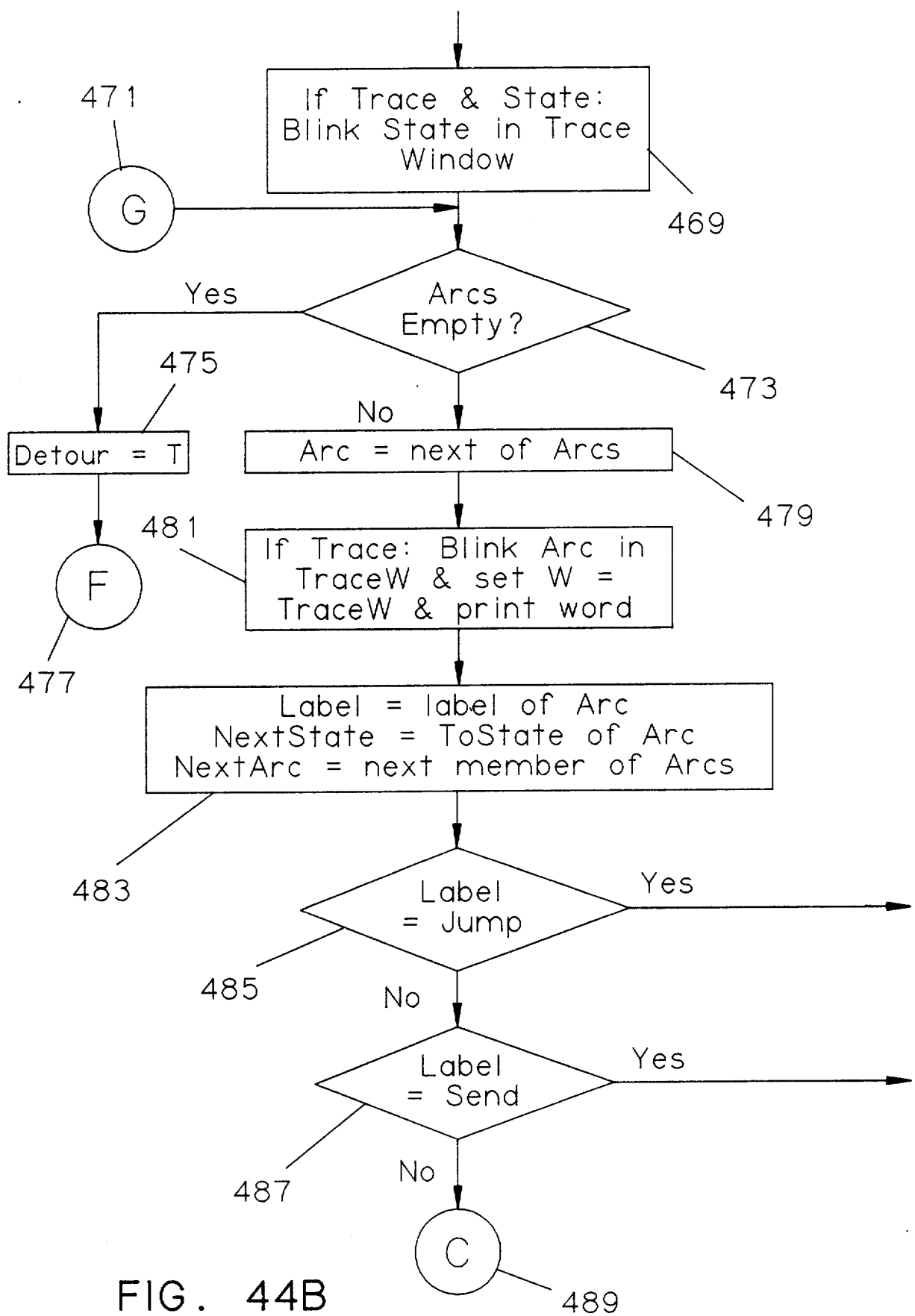
Figure 44C:
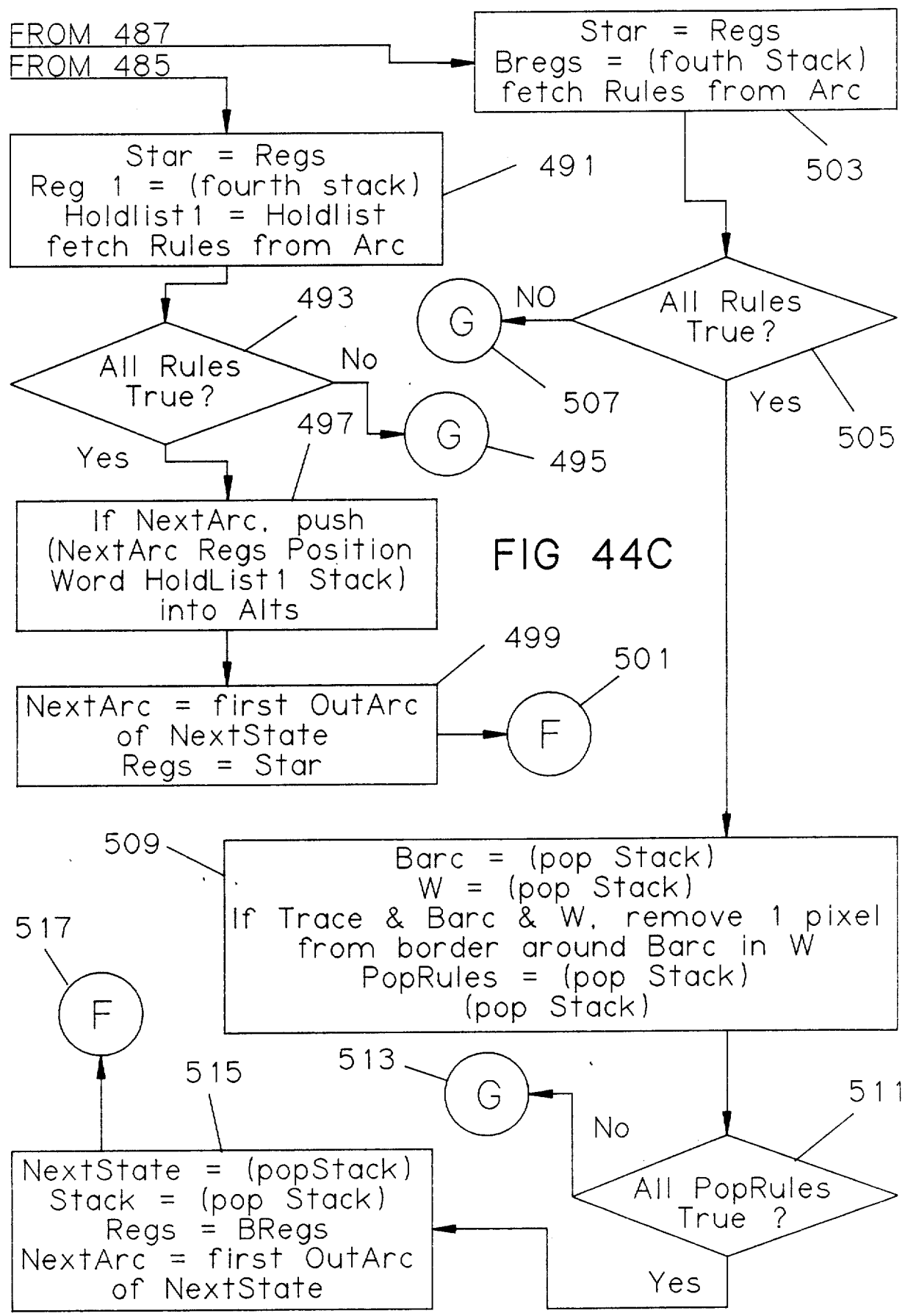

FIG. 42 shows the MakeInitFn subroutine 311 for compiling Lisp code for any initialization tests, which are run before traversing the arc (as opposed to Predicate tests, which are in the Context slot and are run after traversing the arc). This subroutine processes each of the Predicates in the Init slot of the Arc, constructing ILST by appending the value of the PREDCOMP functions for that Predicate to the value of ILST previously created in the subroutine (ILST is initialized to NIL at 313). When a Predicates are exhausted, the Init function is constructed from ILST, at 327, and the function name created by concatenating Arc with "-INIT" (at 329).

Figure 50:
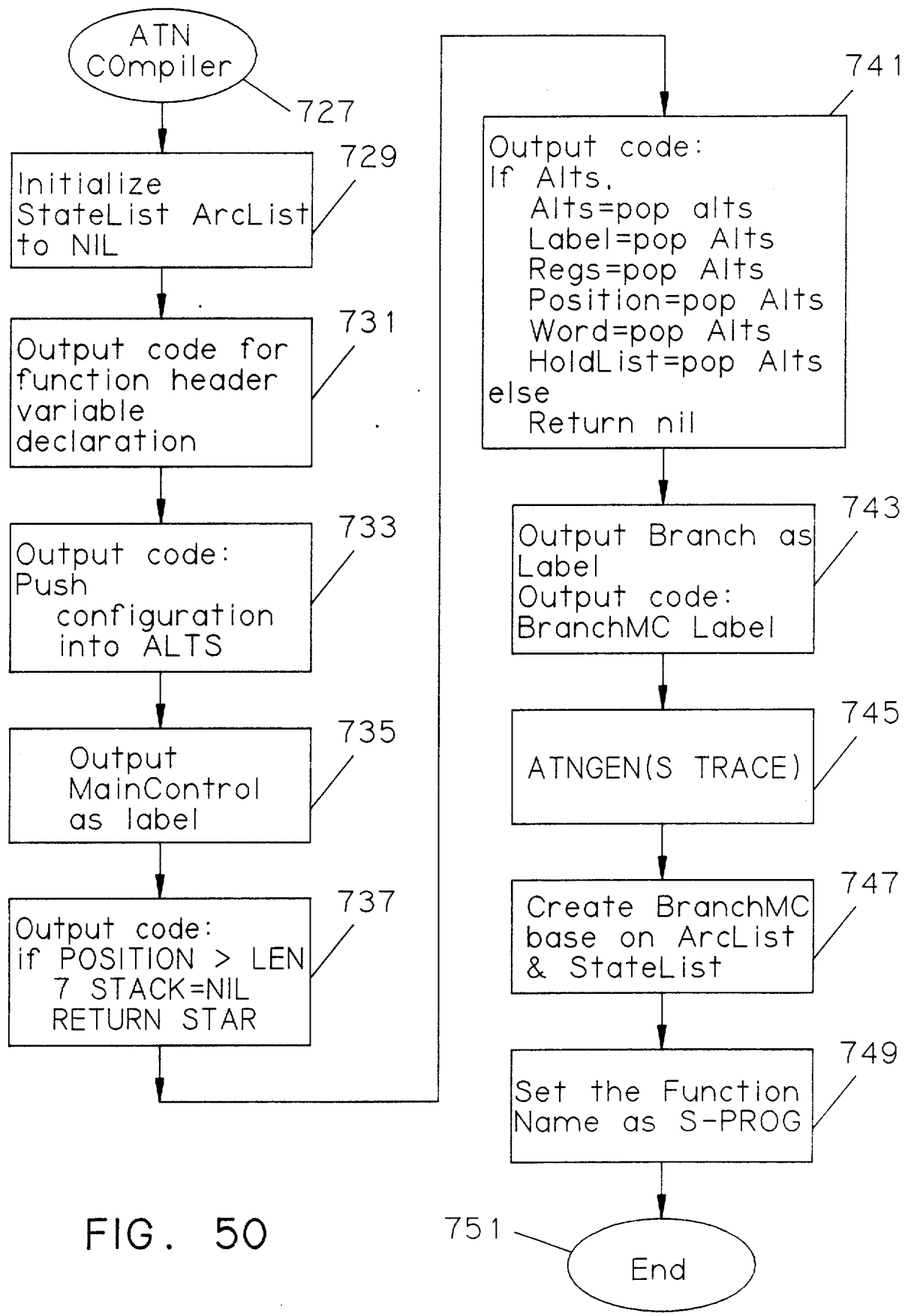
FIG. 50 is a flow chart schematic diagram of the ATN Compiler for compiling ATN graphs into Lisp code.
Figure 51A:
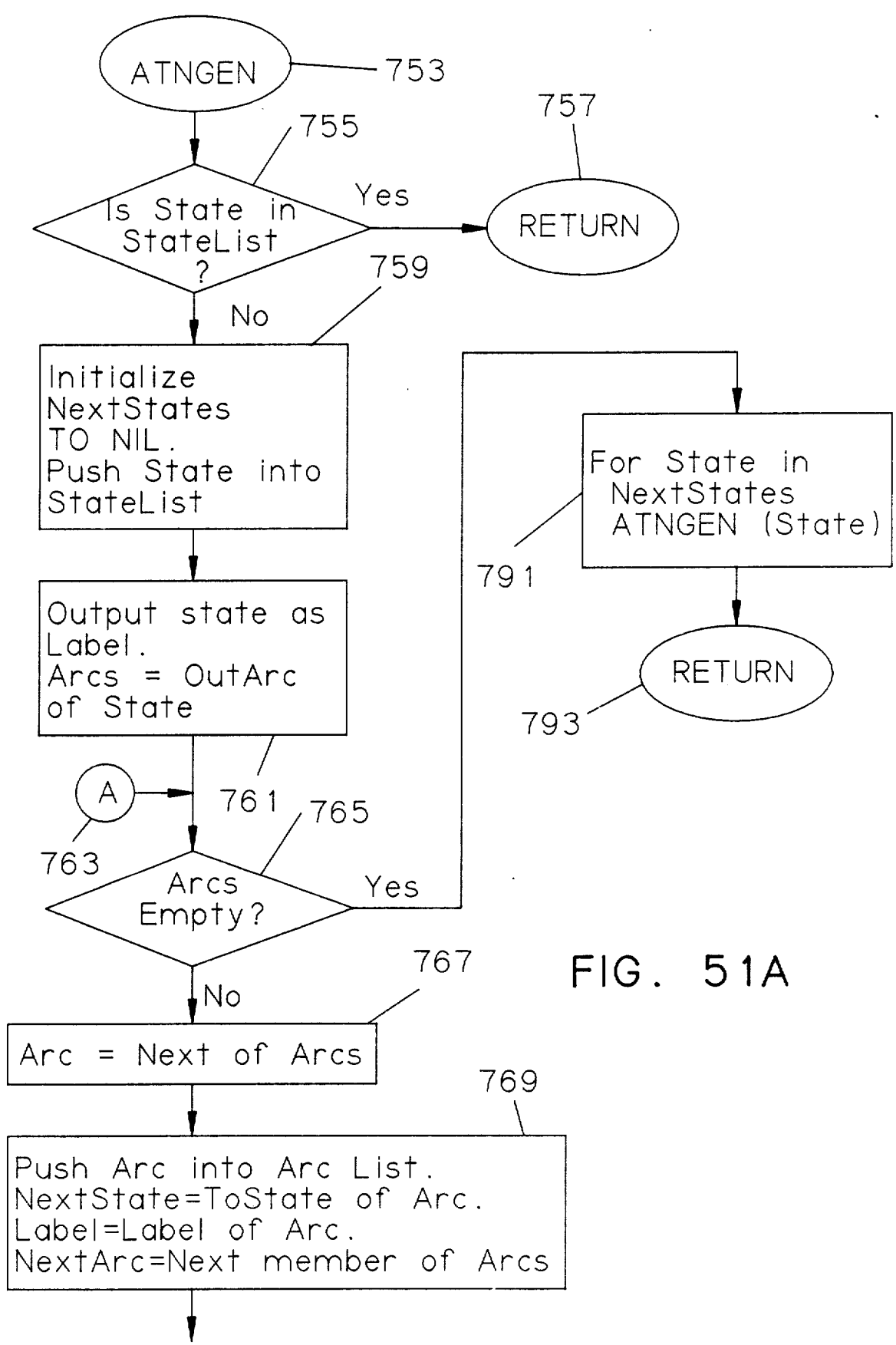
FIGS. 51A through 51C show a flow chart schematic diagram of first part of the ATNGEN function.
Figure 51B:
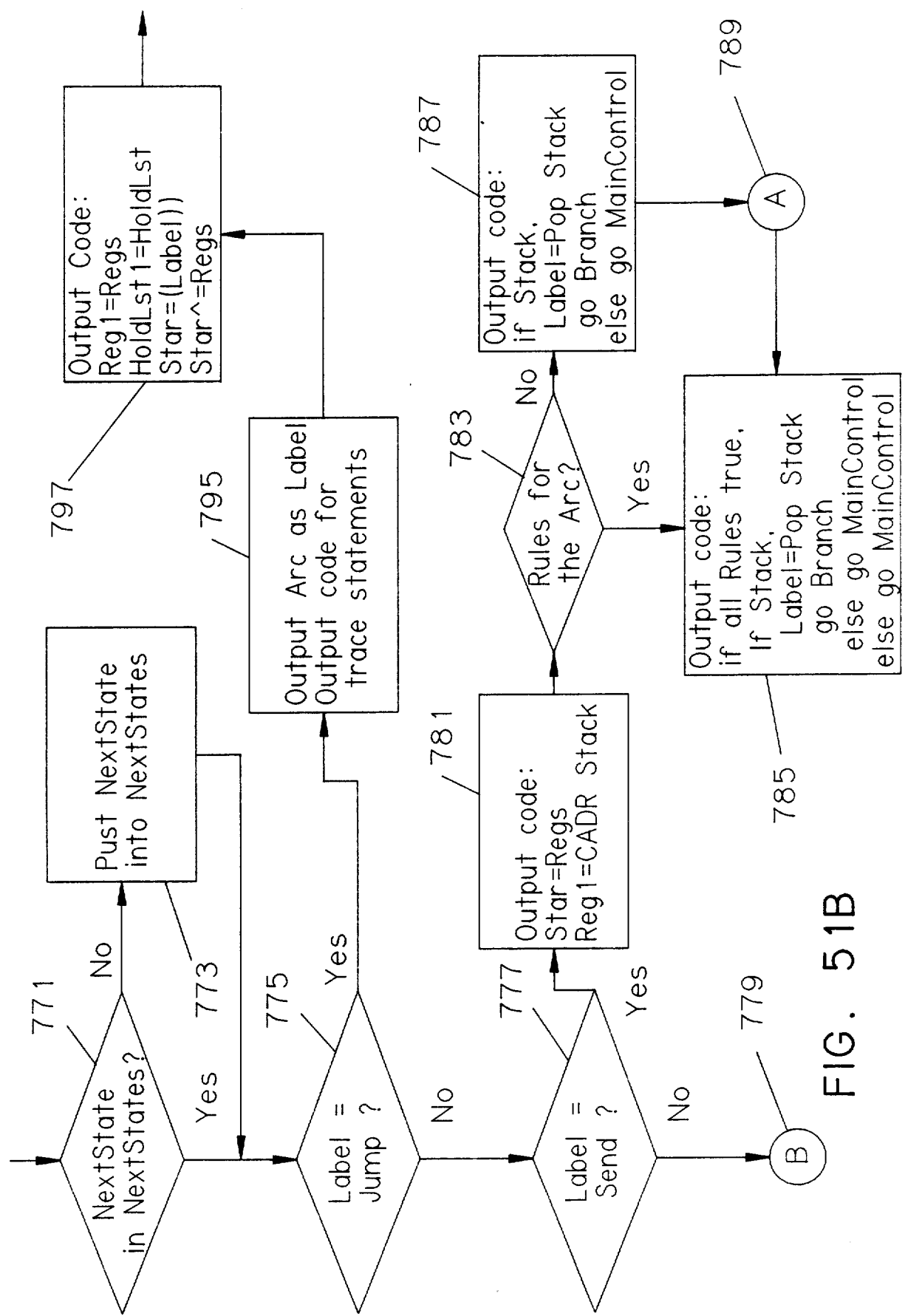
Figure 51C:
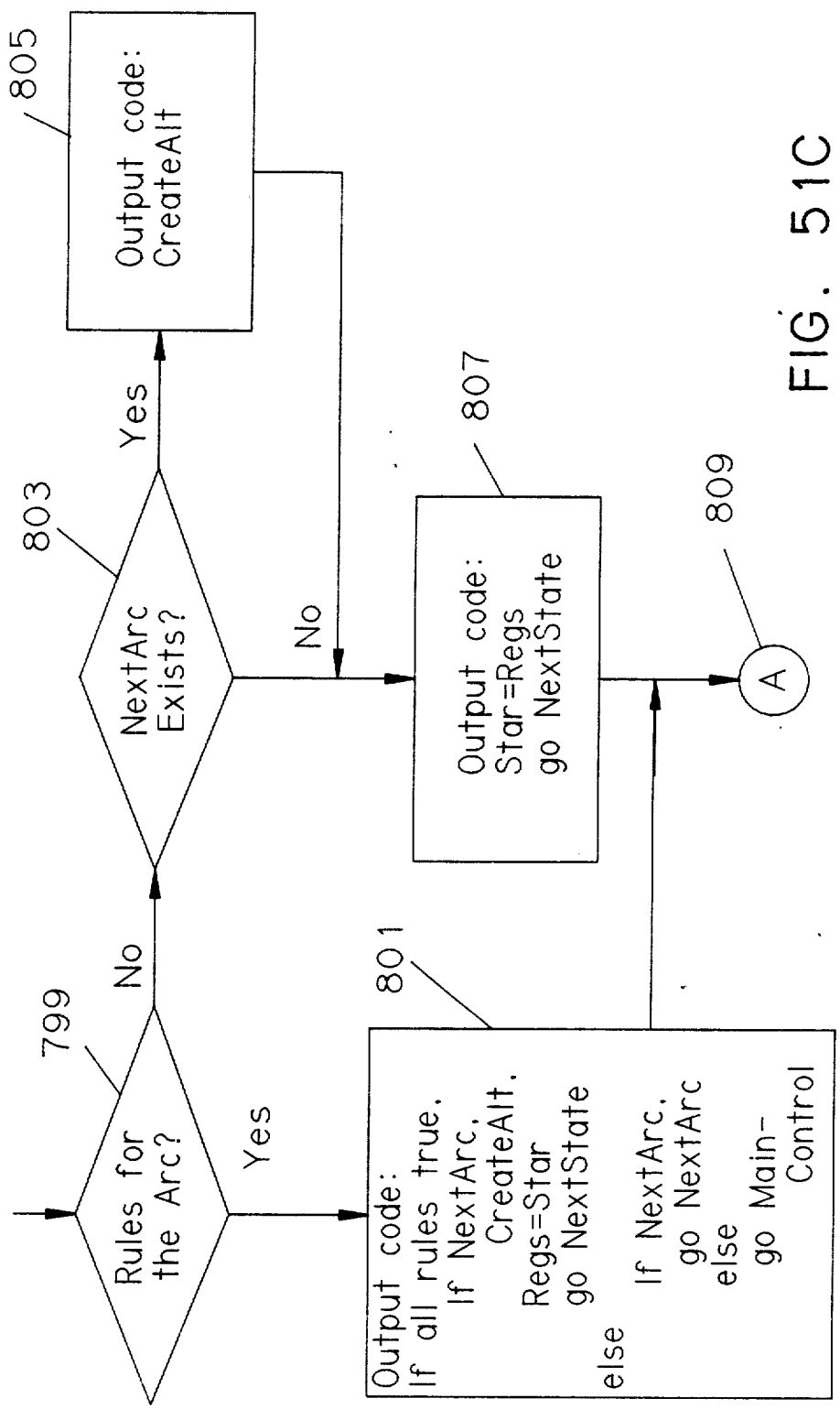
Figure 52A:
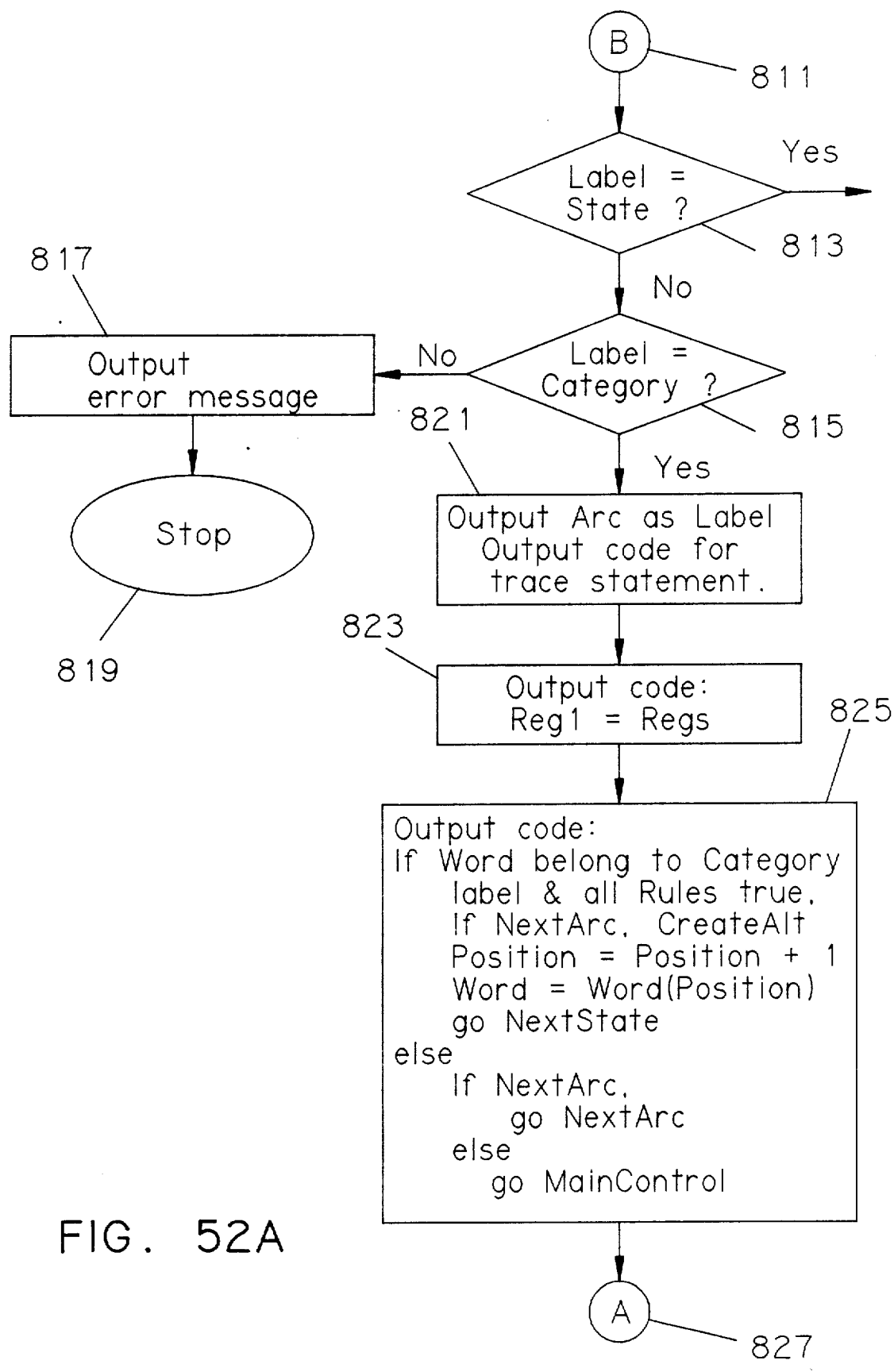
FIGS. 52A and 52B show a flow chart schematic diagram of the remainder of the ATNGEN function of FIGS. 51A through 51C.
Figure 52B:
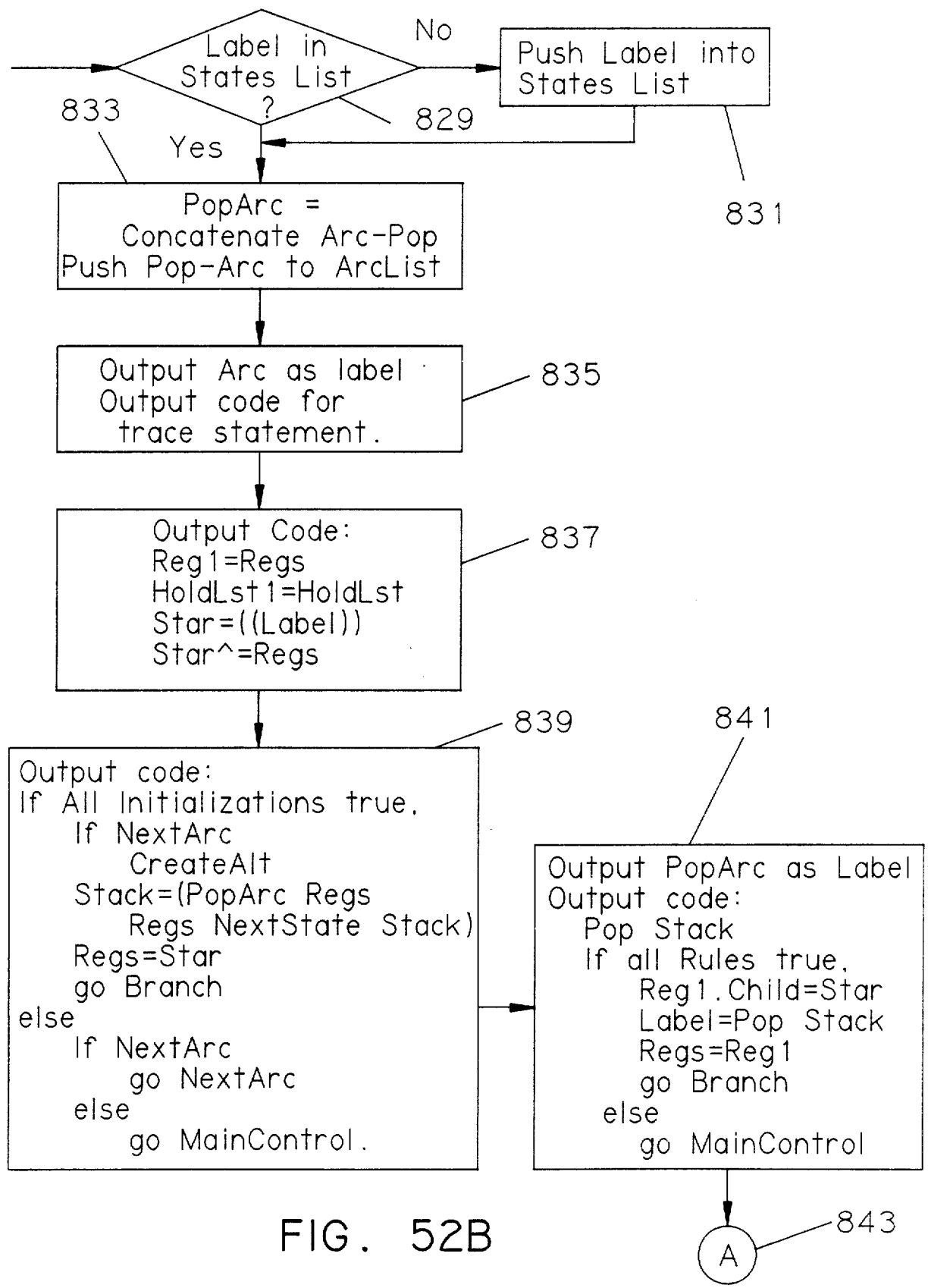
Figure 53A:
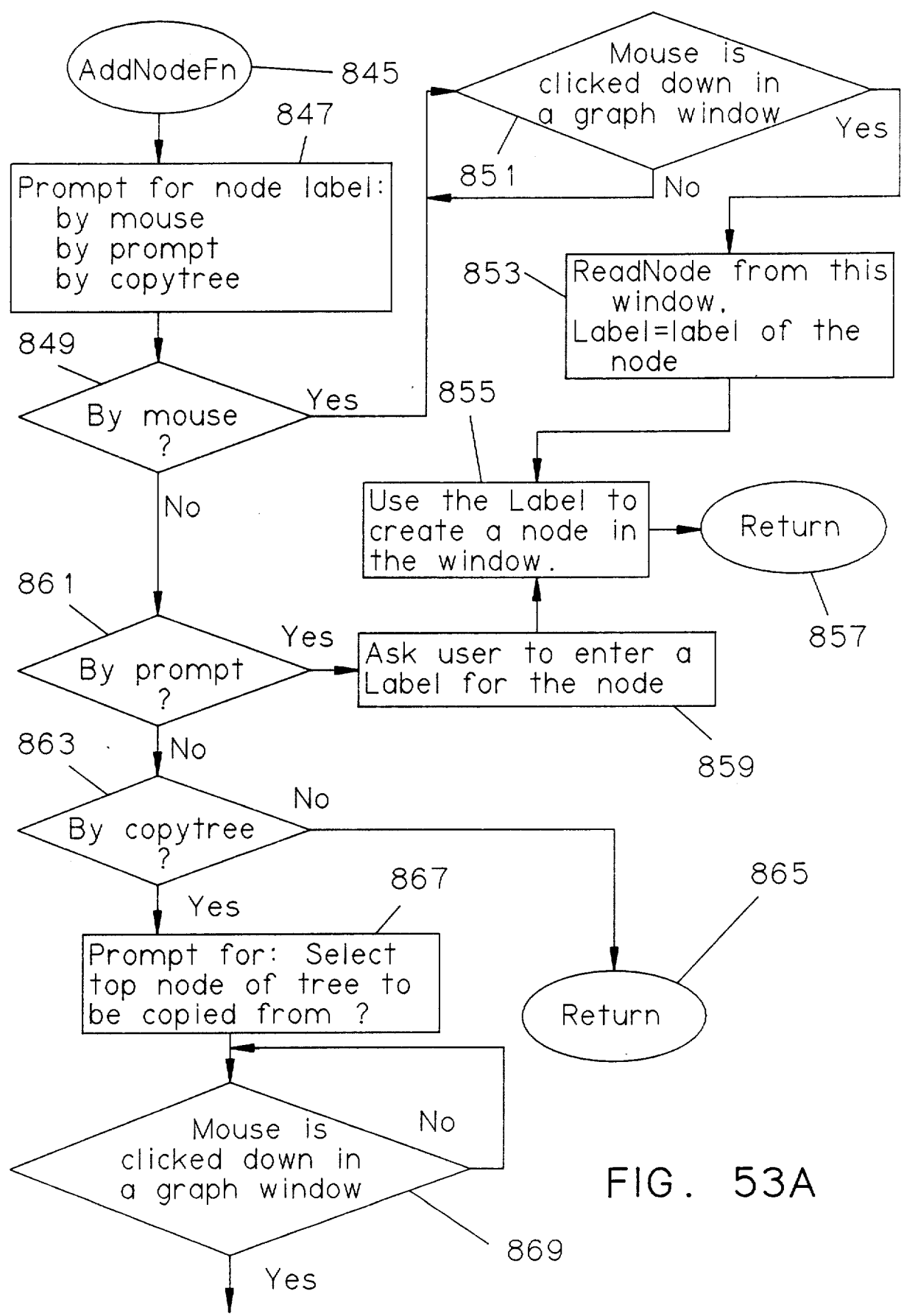
FIGS. 53A and 53B show a flow chart schematic diagram of the AddNodeFn function.
Figure 53B:
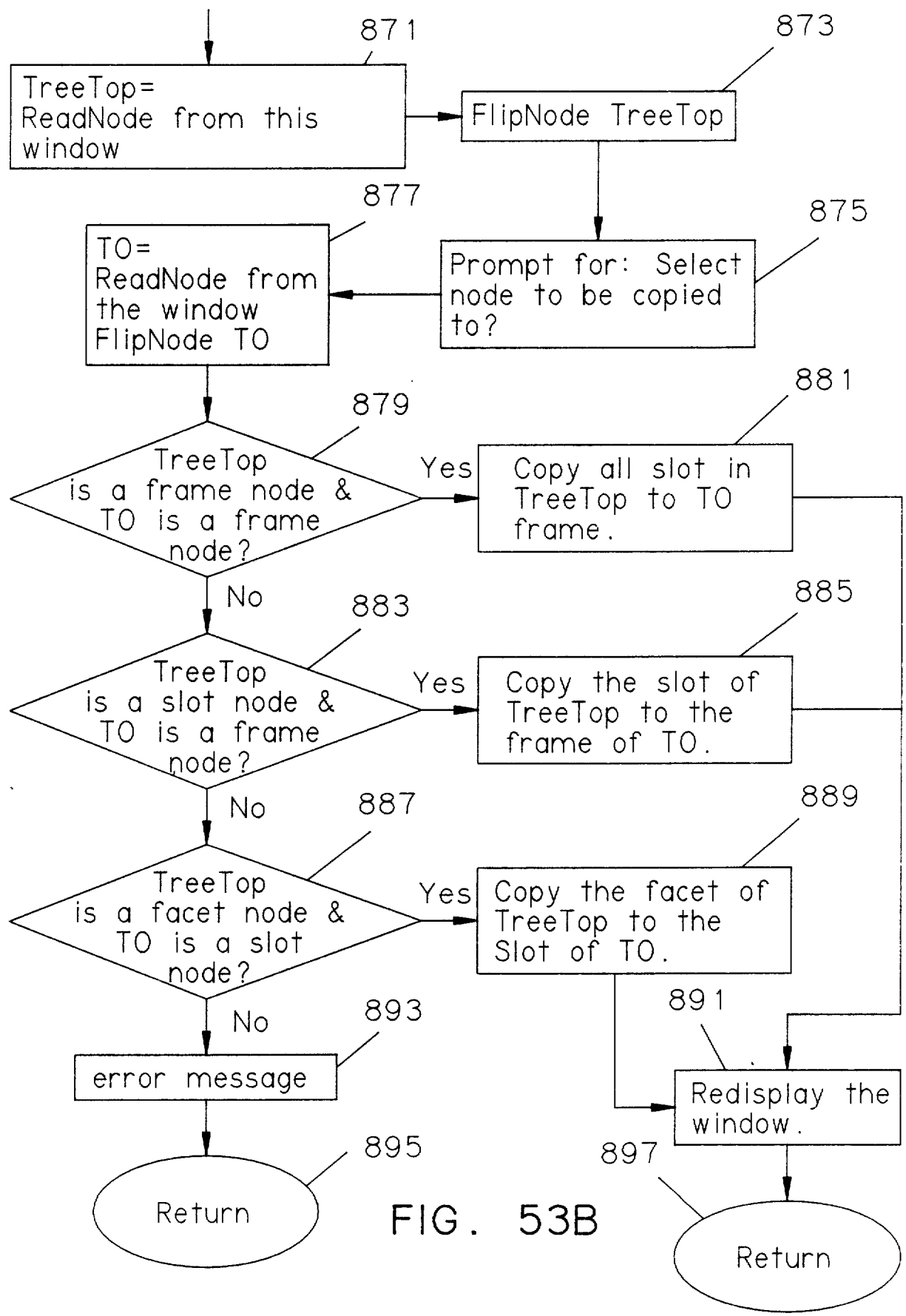
Figure 54A:
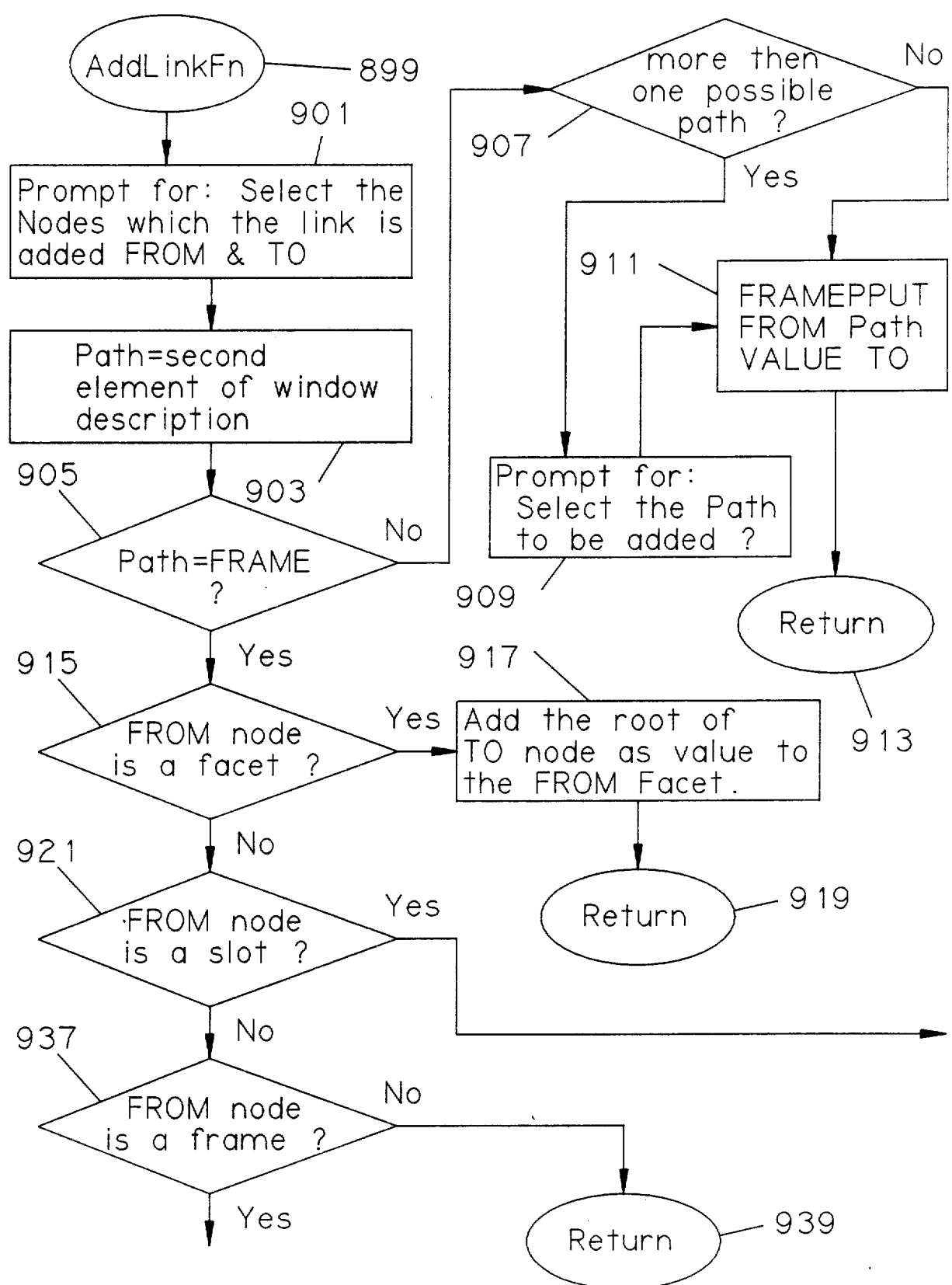
FIGS. 54A and 54B show a flow chart schematic diagram of the AddLinkFn function.
Figure 54B:
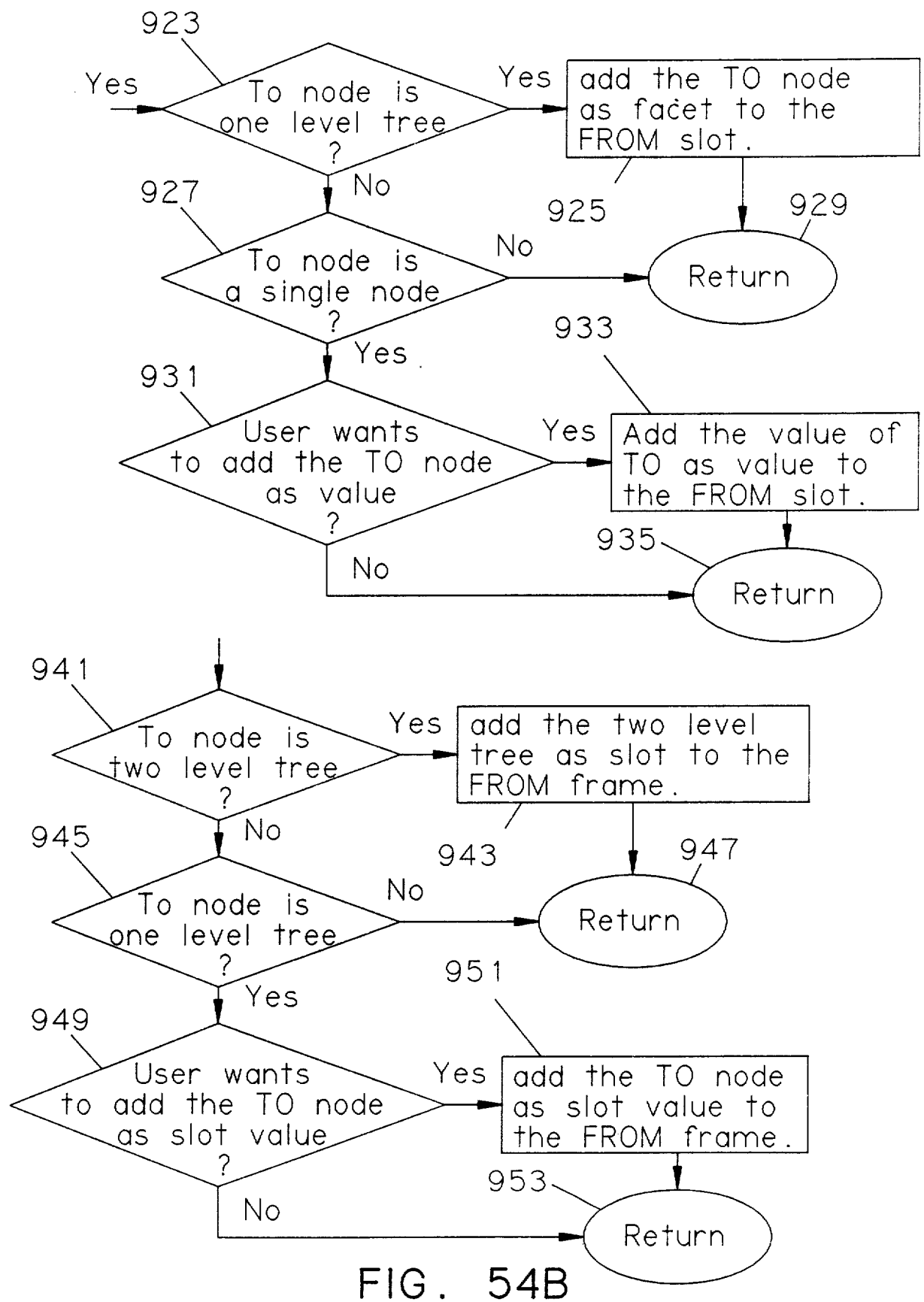
Figure 55A:
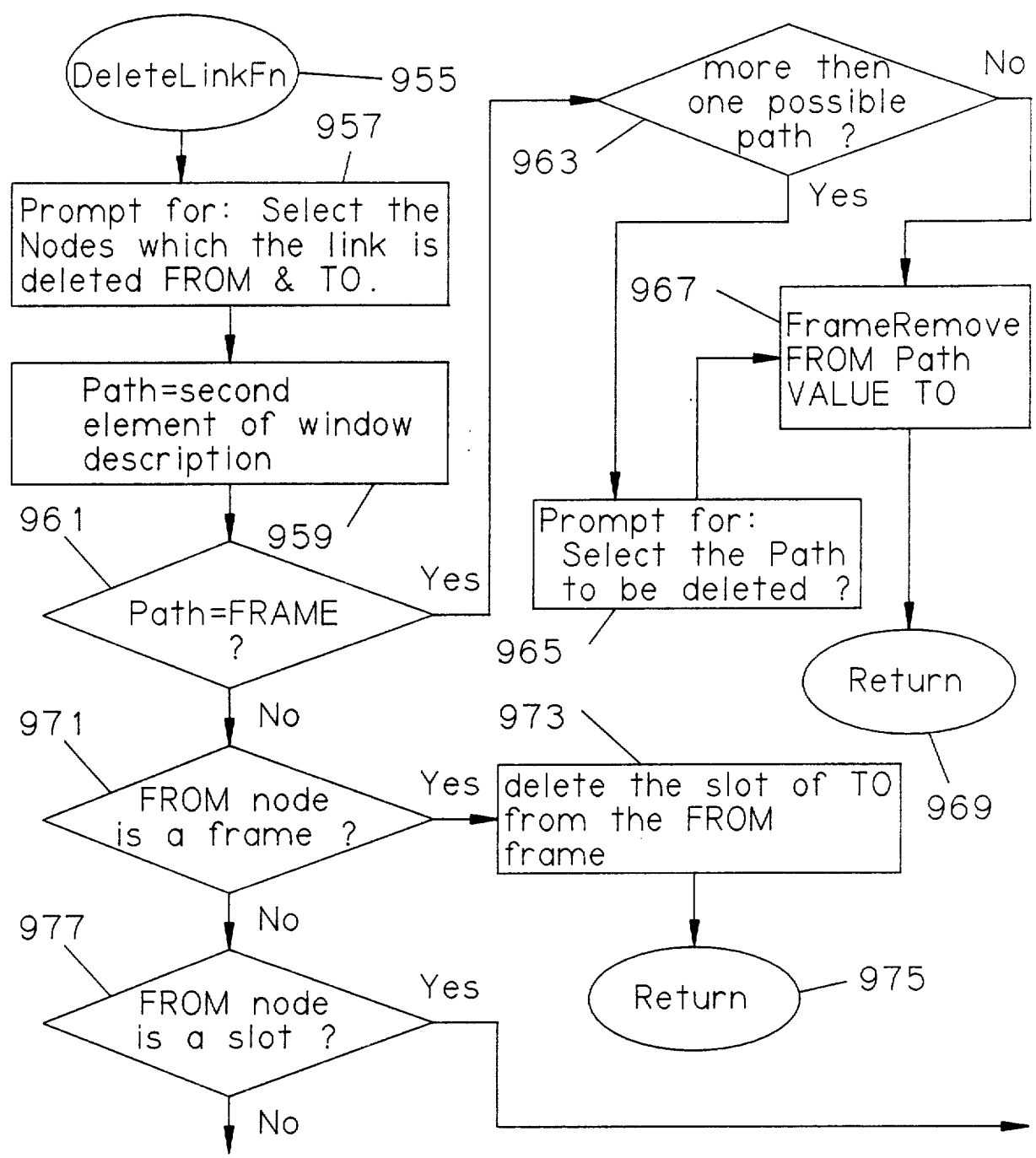
FIGS. 55A and 55B show a flow chart schematic diagram of the DeleteLinkFn function.
Figure 55B:
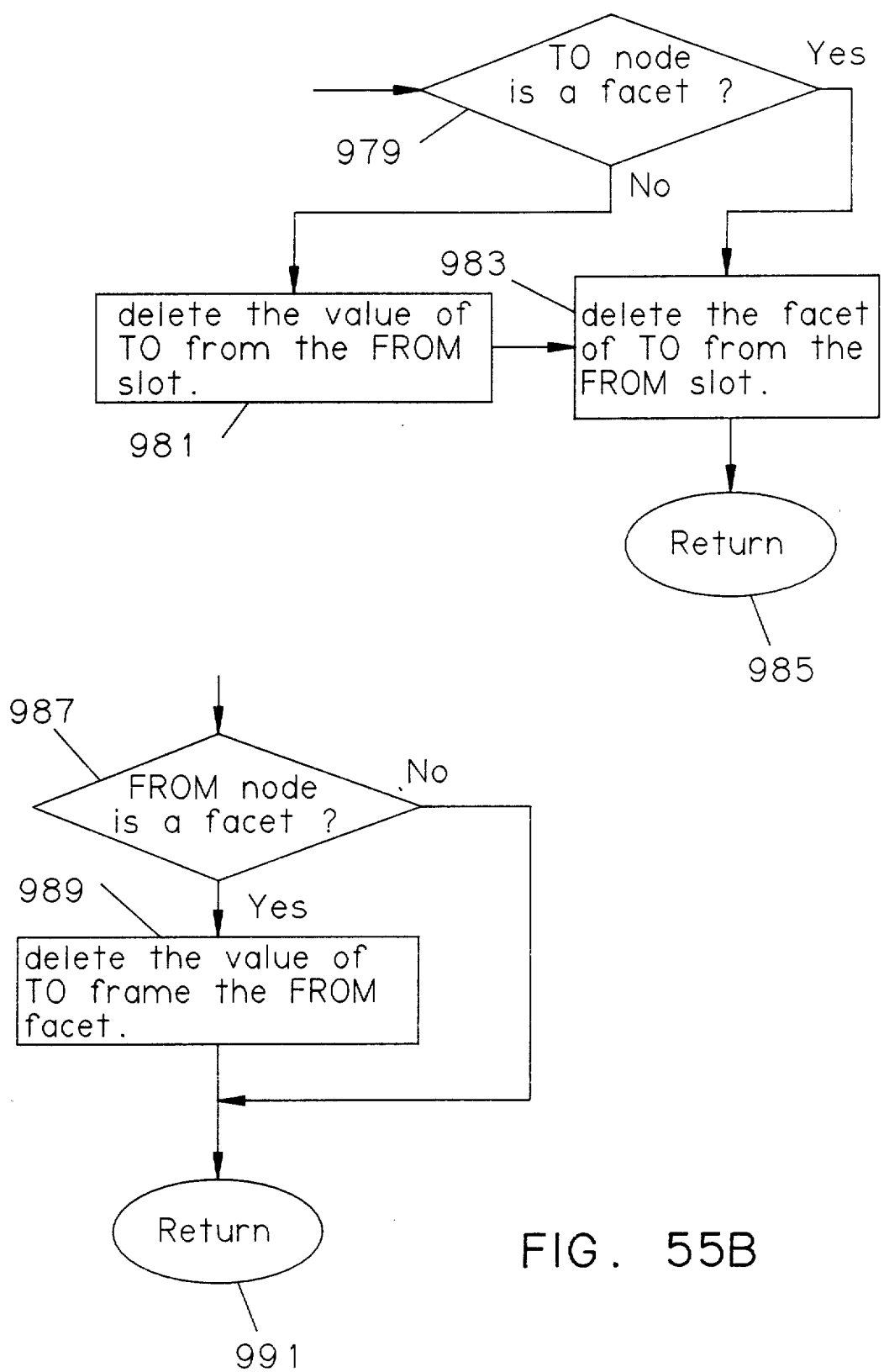

The ATN Compiler (727) of FIG. 50 complies the ATN graphs, as represented by PAKTUS objects, into Lisp code. This is not necessary, but it makes the resulting parser faster. The compiler maintains lists of the states and arcs of the ATNs as they are encountered. These are initialized to nil (729), a Lambda form is set up (731), the code to initialize ALTS is output (733), the label for the MainControl loop is added to the code list (735) and the code to test for completion of the parse is generated (737). Next, the code that tests whether any Alternatives remain and sets up the next one, after a branch back to MainControl, is added (741). The inner loop label is set to "Branch" in the code and a call to the BranchMacro is inserted with the variable Label as an argument (743). ATNGEN (FIGS. 51A through 52B, discussed below) is then called (745) with the distinguished node S (the starting node for any sentence parse). This generates the main body of code. Finally, the compiler generates the BranchMacro (749) based on the arcs and states that have been found in the ATN graphs, and stores the code for the entire set of ATNs in the function cell, of S-PROG.

Referring now to FIGS. 51A through 52B, the ATNGEN function (753) generates Lisp code corresponding to the specifications of the arcs leading out of a state. It also adds the state to the StateList (759) and the arcs from that state to the ArcList (769). The code which is generated is shown explicitly in the drawing. There are four cases, according to the arc type: jump (775), send (777), state label (813), or category (815). When the code for all arcs out of the current state has been generated (765), ATNGEN is called recursively to generate the code for all NextStates (791), i.e., all states to which the transition arcs just considered branch (769, 773).

3.5 Debugging Aids

Figure 8A:
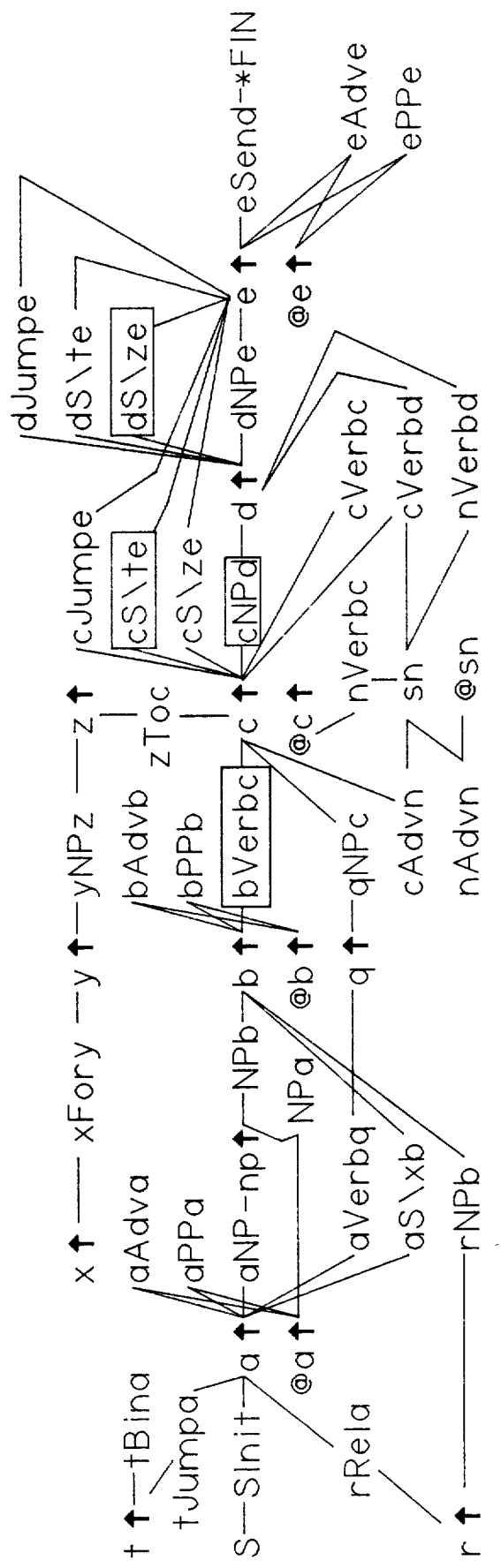

PAKTUS includes visual aids for debugging graphic programs. These are essential as the program gets large. The primary aid is a graphic trace of program execution. A snapshot of such a trace is shown in FIGS. 8A and 8B. The trace mechanism blinks each node of the program as it is considered and prints the current word of input. The speed of blinking is controlled by the user with the mouse, while the parse is in progress, through the "Blink Wait" window shown at the lower right of FIG. 8B, The setting shown is 100 milliseconds. (The exponent is shown in the title bar, and the gauge at the bottom indicates the mantissa, so the current setting is $1 \times 10^{22}$ milliseconds.) When debugging a program, one usually sets the blinking at about one millisecond initially, and then slows it to about one second when the parse is near the suspected bug. The tracer also boxes seek arcs as they are considered. These are recursive calls to the program. If a seek arc is entered again within a previous call, the border of its box is made one pixel thicker. The trace is easy to follow when the speed is appropriately controlled. This mechanism has demonstrated to be extremely useful in debugging a grammar.

In FIGS. 8A and 8B the moderately complex sentence "Reagan warned he is prepared to use warships stationed in the Arabian Sea to block the Iranian actions that would close the strait" is being parsed. This example shows a trace in progress as the program is five levels deep in recursive calls. English sentences do not often get much deeper. When the snapshot was taken, the word "would" was being tested against the arc bVerbc. (That word is printed several times in the typescript window at the top of FIG. 8A because it was previously considered for other arcs, such as bAdvb, but it failed their tests.) What the user has seen up to this point is as follows.

The S node is blinked as the parse begins, then each node as it is entered. "Reagan" is accepted as a noun phrase and "warned" as a verb, so the parse proceeds to state c ↑, which blinks. Several dead ends are pursued with "he is prepared . . . " until seek arc cS/te, which branches recursively to the bound clause entry state t ↑, is entered. It is boxed and remains so in the snapshot, since it has not yet been exited. When the clause "to use warships . . . " is encountered, the seek arc dS/ze is taken and boxed. Parsing branches to state z ↑. Before it is exited, that same arc is taken again, and its box is made thicker, for "to block the . . . ". The noun phrase beginning "the Iranian actions . . . " is under consideration for the cNPd arc, which is also boxed. Within the noun phrase, the relative clause "that would close..." causes the arc hS/rh to be considered. This calls the program recursively, beginning at state r ↑. The word "would" was being considered as a verb in that clause as the snapshot was taken.

Figure 9A:
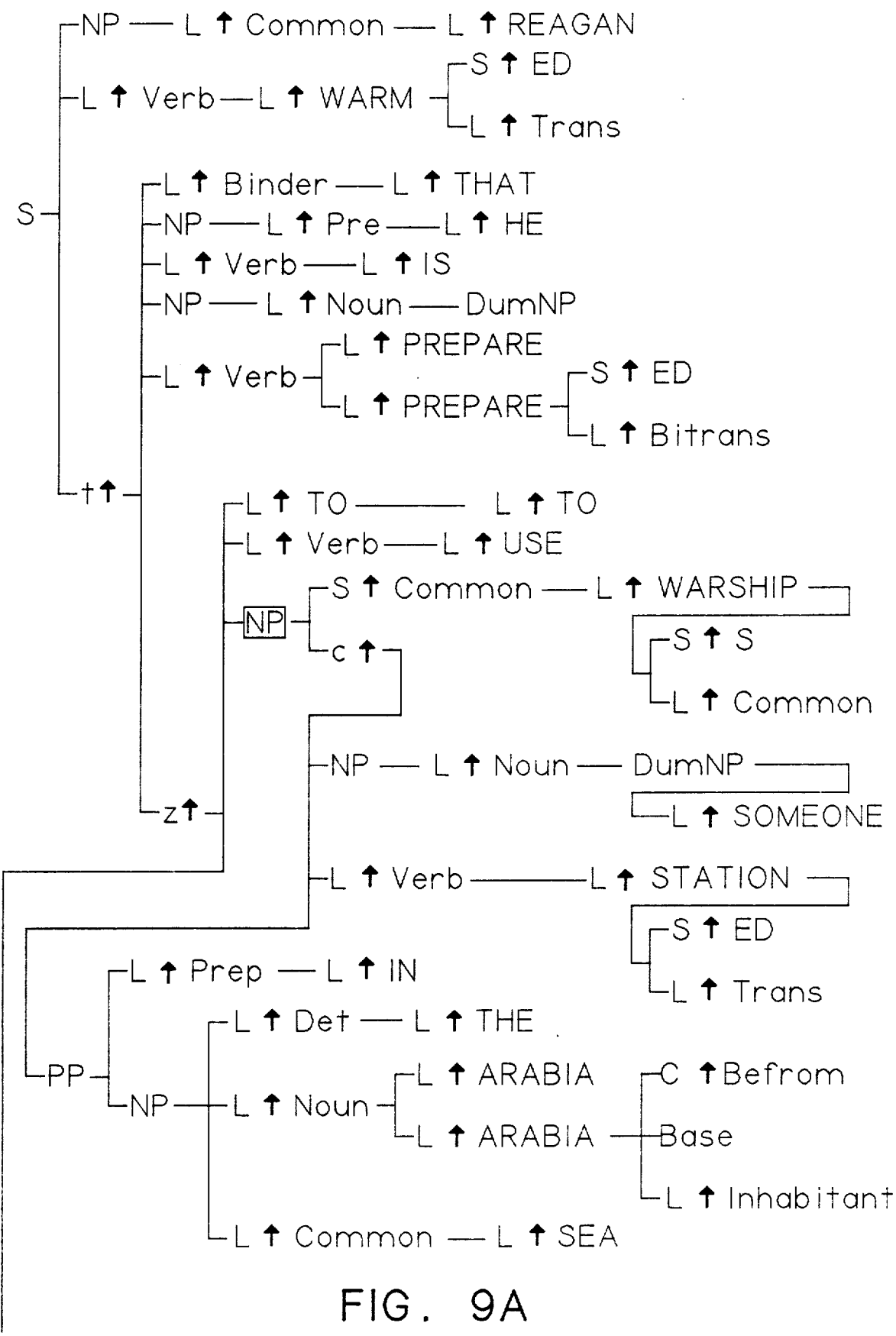
FIGS. 9A and 9B show the interaction with a graphic program trace.
Figure 9B:
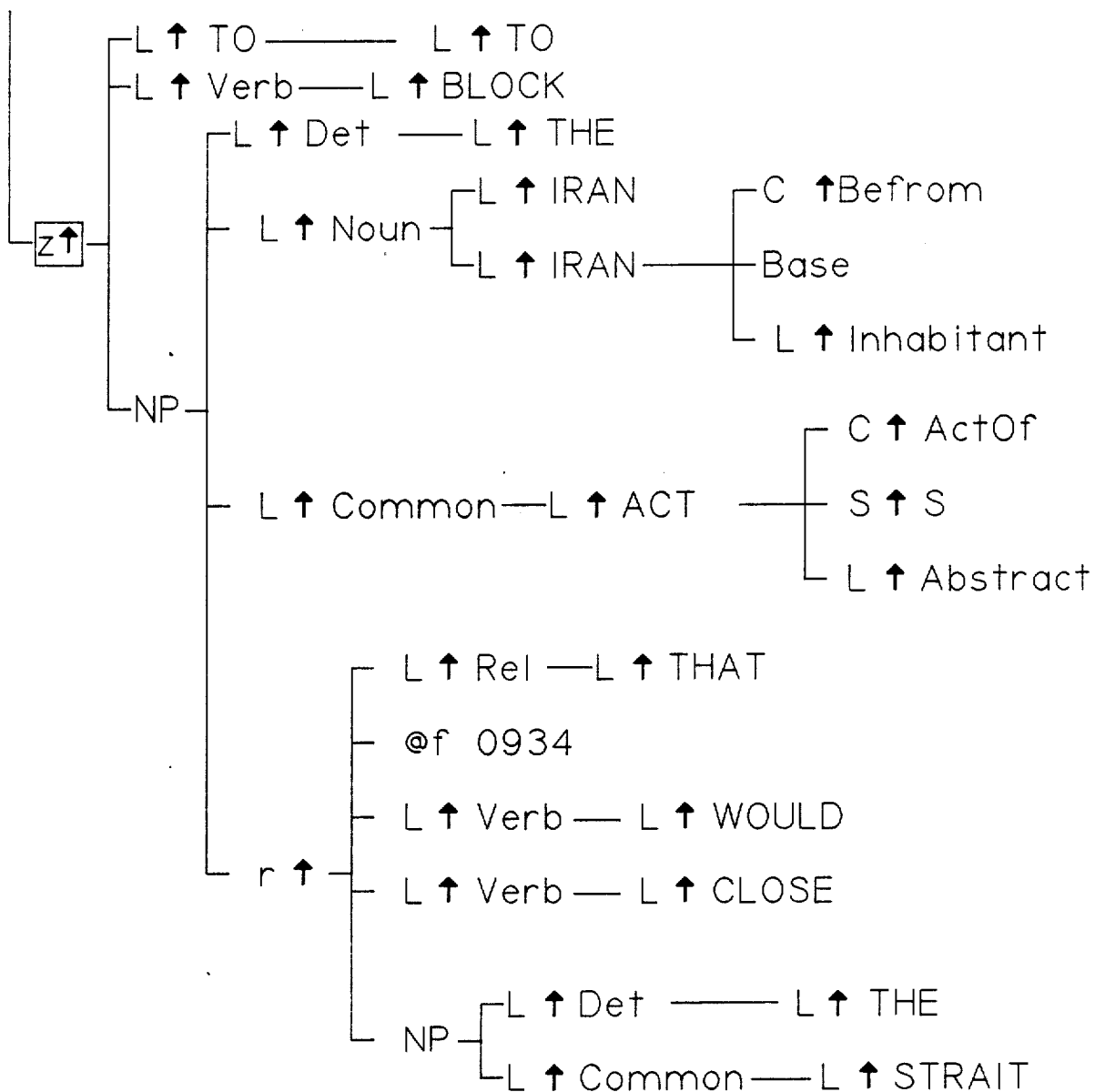

Another graphic debugging tool displays and allows interaction with the output of the parse. It is illustrated in FIGS. 9A and 9B. This figure shows a trace of the parse described in the preceding paragraph. It displays the branches that were taken from each state, beginning with S. The branches were taken in the order indicated by reading top to bottom.

The leaf nodes represent the individual words of input (which have been morphologically analyzed by PAKTUS). One can interact with this parse tree to inspect the results of the parse. In FIG. 9, the user has bugged the bottom z ↑ node, which holds the parse of the clause "to block the Iranian actions...". This has brought up a menu of that clause's registers, case roles (a case grammar is integrated into the ATN), and other variables. The user then bugged the R ↑ Instru (instrument) role, and in response PAKTUS has blinked the noun phrase "warships stationed in..." to identify it as the filler of that role (i.e., the warships are the instrument of the blocking).

3.6 Graphic Programming Examples

3.6.1 PAKTUS program for Simplified English Grammar

Figure 10A:
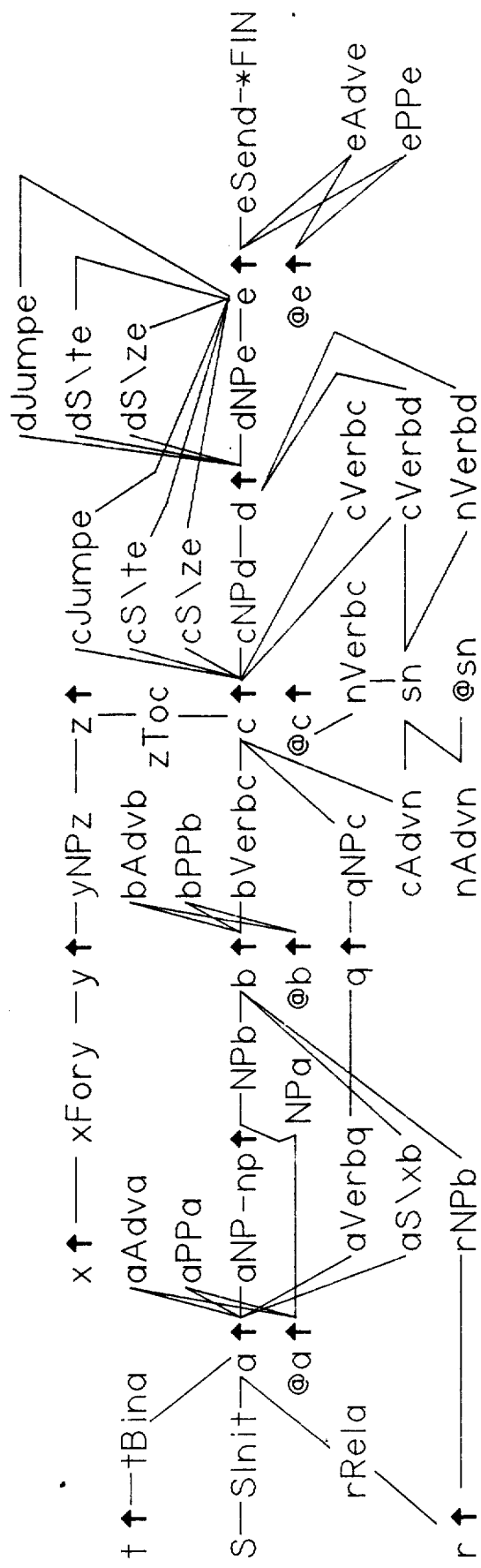
FIGS. 10A and 10B show a graphic program for a simple ATN grammar of English.
Figure 10B:
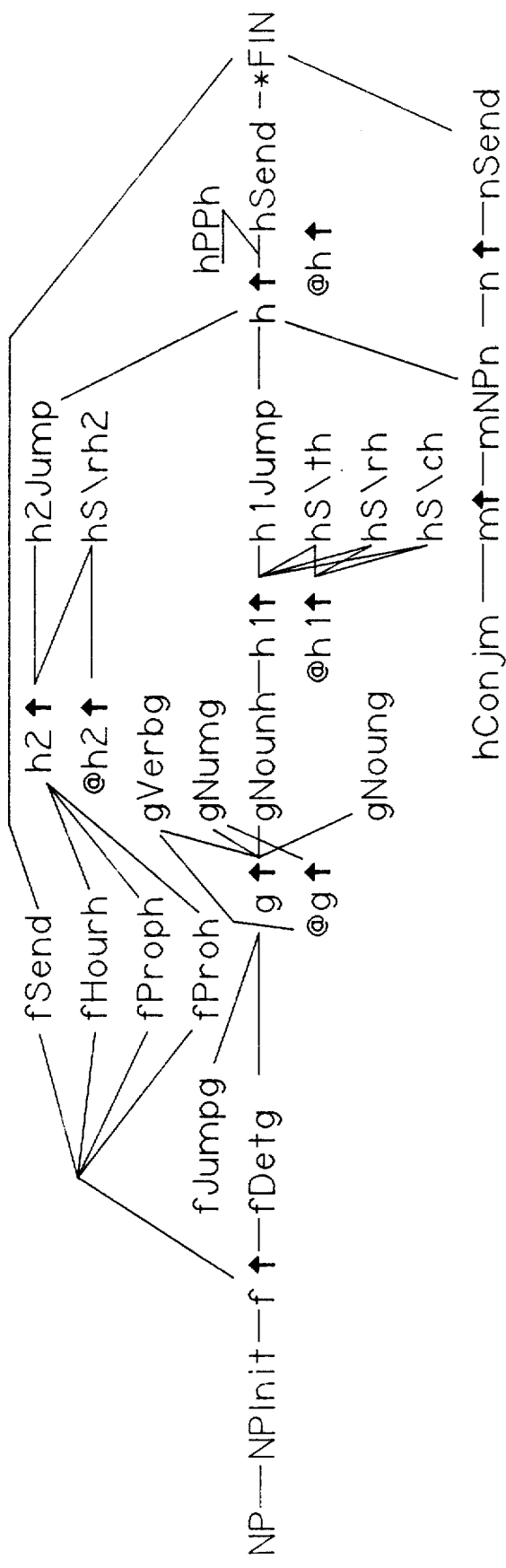

FIGS. 10A and 10B shows a PAKTUS program that implements a simple English grammar based on, but slightly different from, that presented in Appendix D of Winograd (1983). This program was created through interaction with three windows. It consists of a main program for clauses (shown in the top window) and subroutines for noun phrases and prepositional phrases (shown in the middle and bottom windows respectively). Except for the initial and terminal network states (S, NP, PP, and *FIN), state names are one- or two-character lower-case letters (followed by the symbol ↑ to distinguish them from atoms that might be used by Interlisp); and transition arc names usually are the concatenation of the source state, the word category or network branch, and the destination state. The names are purely a convenience for the programmer; they are not used by the system other than for unique identification. The PAKTUS interpreter applies the program to an input string, proceeding from the initial state S and applying the transitions until the final state, *FIN, of the S network is reached. The information used by the interpreter is contained within the nodes. All nodes are represented as frames. (See Winston and Horn (1984).)

Figure 11A:
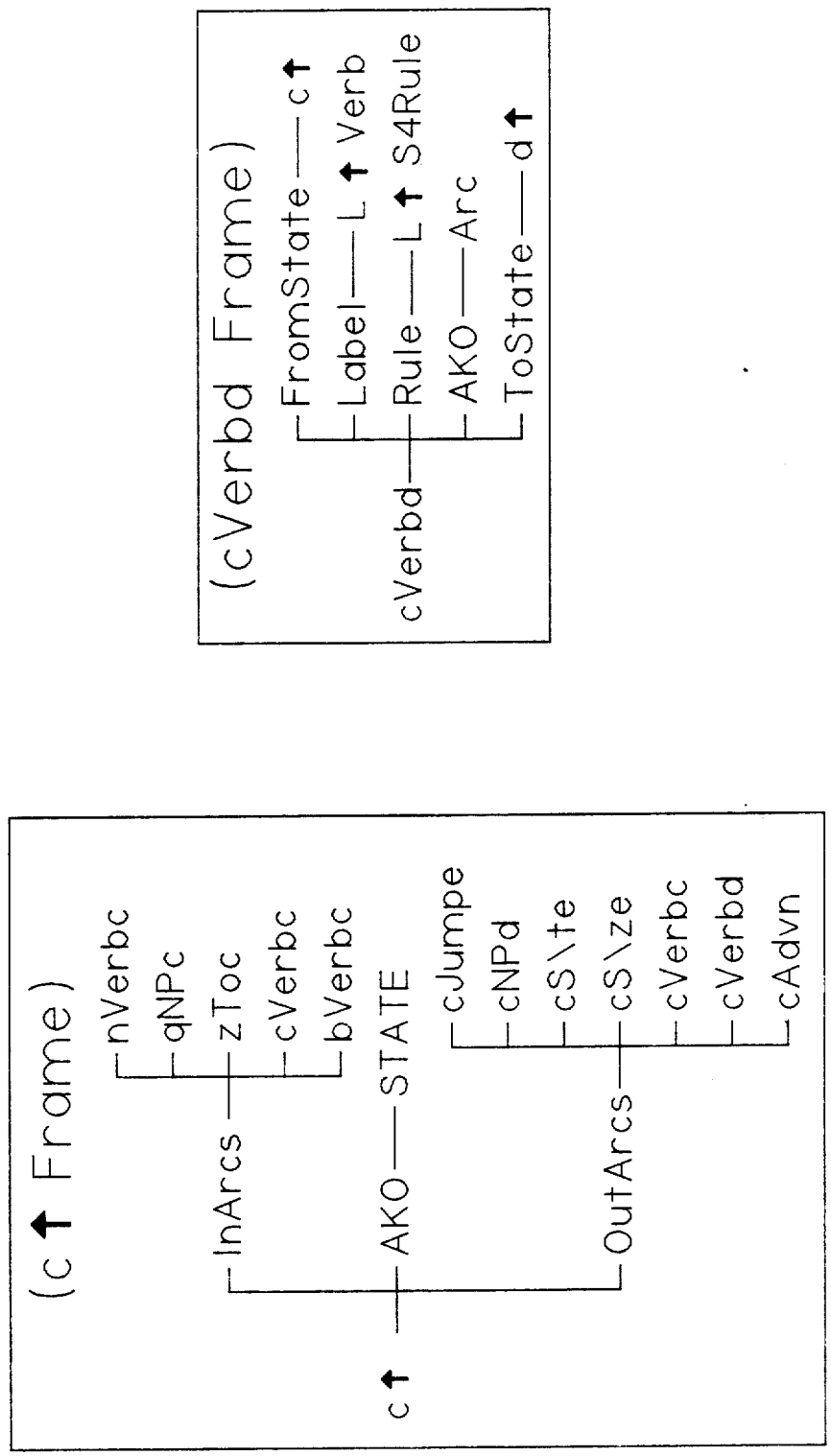
FIGS. 11A and 11B are interactive windows displaying a state, an arc, and a non-grammar rule.
Figure 11B:
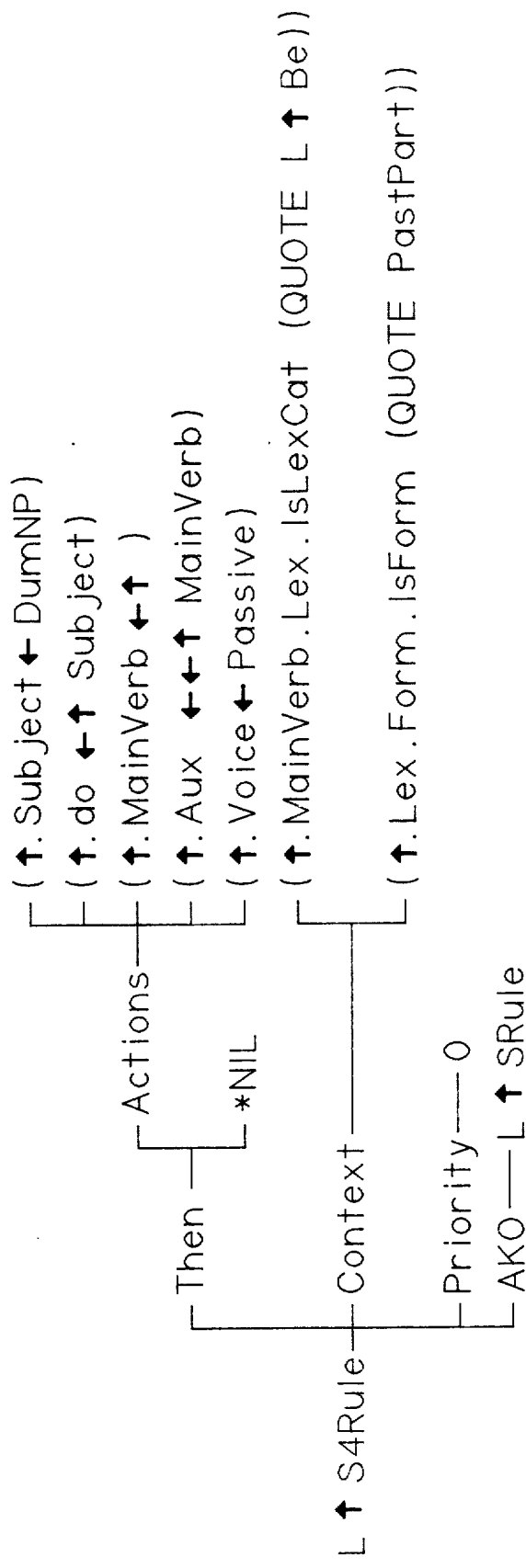

FIGS. 11A and 11B shows the state c ↑, the transition arc cVerbd and its rule L ↑ S4Rule, as displayed by PIKS. (The prefix "L ↑ " is simply a naming convention to distinguish these objects, preventing the information associated with them from interfering with Interlisp.) In each case, the name of the object appears at the left in its window, with slots and their values and other facets branching to the right. Non-value facets have one extra branch, headed by the facet name (e.g., in the L ↑ S4Rule window, the Actions facet of the Then slot).

Object c ↑ contains information about its class (it is A Kind Of STATE) and the transition arcs leading into and out of it. Arc cVerbd specifies a transition from state c to state d. It has Label L ↑ Verb, which means that this transition can be made only if the next word of input is a verb. Furthermore, the transition will occur only if its rule, L ↑ S4Rule, is successfully tested. That rule specifies the context in which arc cVerbd can be traversed, and the actions to be taken when the transition occurs. (The priority slot is managed automatically by PIKS and is not relevant here.) The context specifies that the lexical form of the current word should be past participle and the current main verb of the clause in which this transition is embedded should be a form of the verb "be" as in "Ben was advised to take the course". In that sentence, the cVerbd context holds when the word "advised" is read. The actions of L ↑ S4Rule set the voice of the clause to passive, move the current main verb ("was") into the auxiliary register, reset the main verb to the current word of input ("advised"), move the current subject ("Ben") over to the direct object register, and reset the subject to the dummy noun phrase ("somebody"). In other words, arc cVerbd recognizes the passive voice.

3.6.2 PAKTUS Grammar - Further Example

Figure 12A:
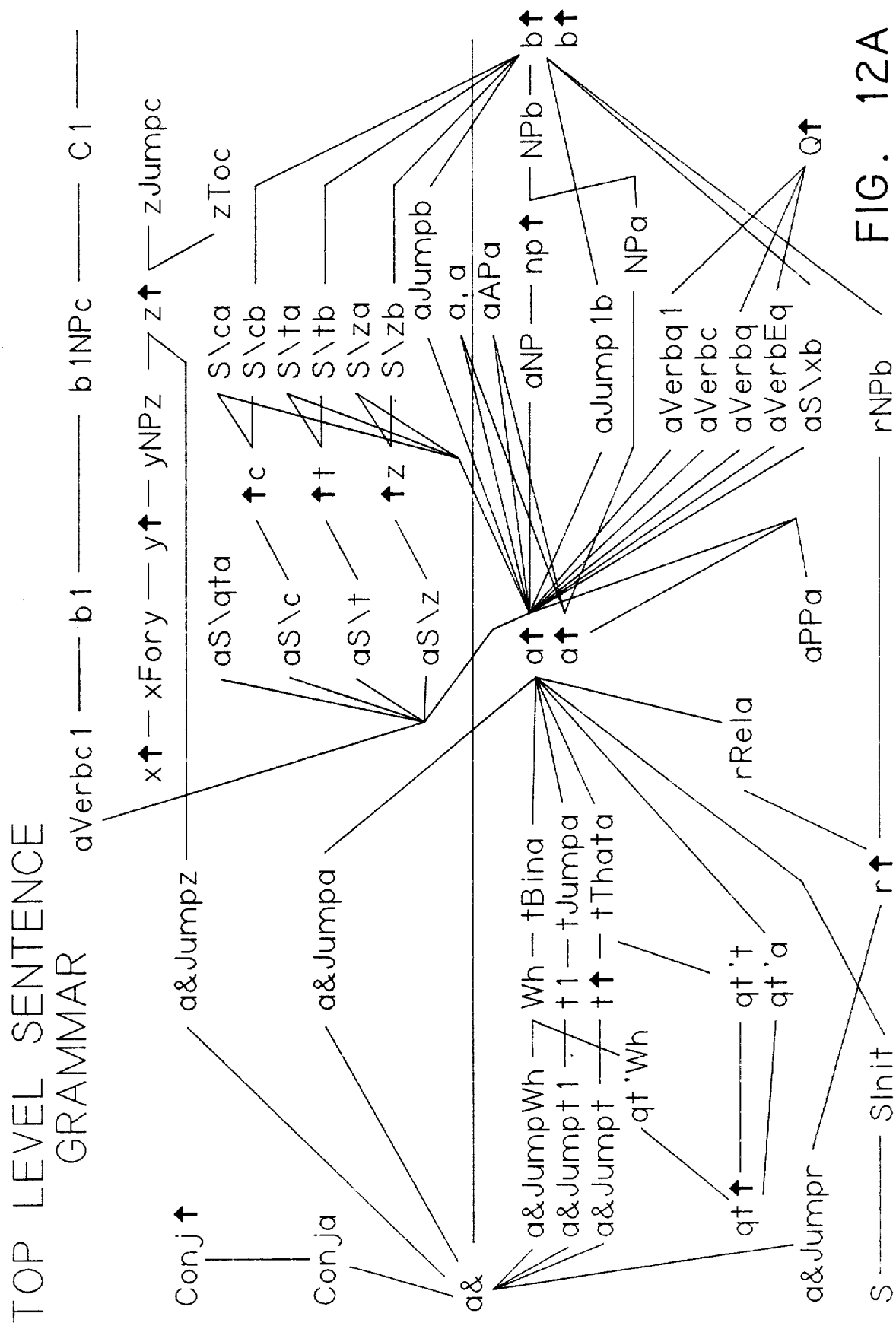
Figure 12B:
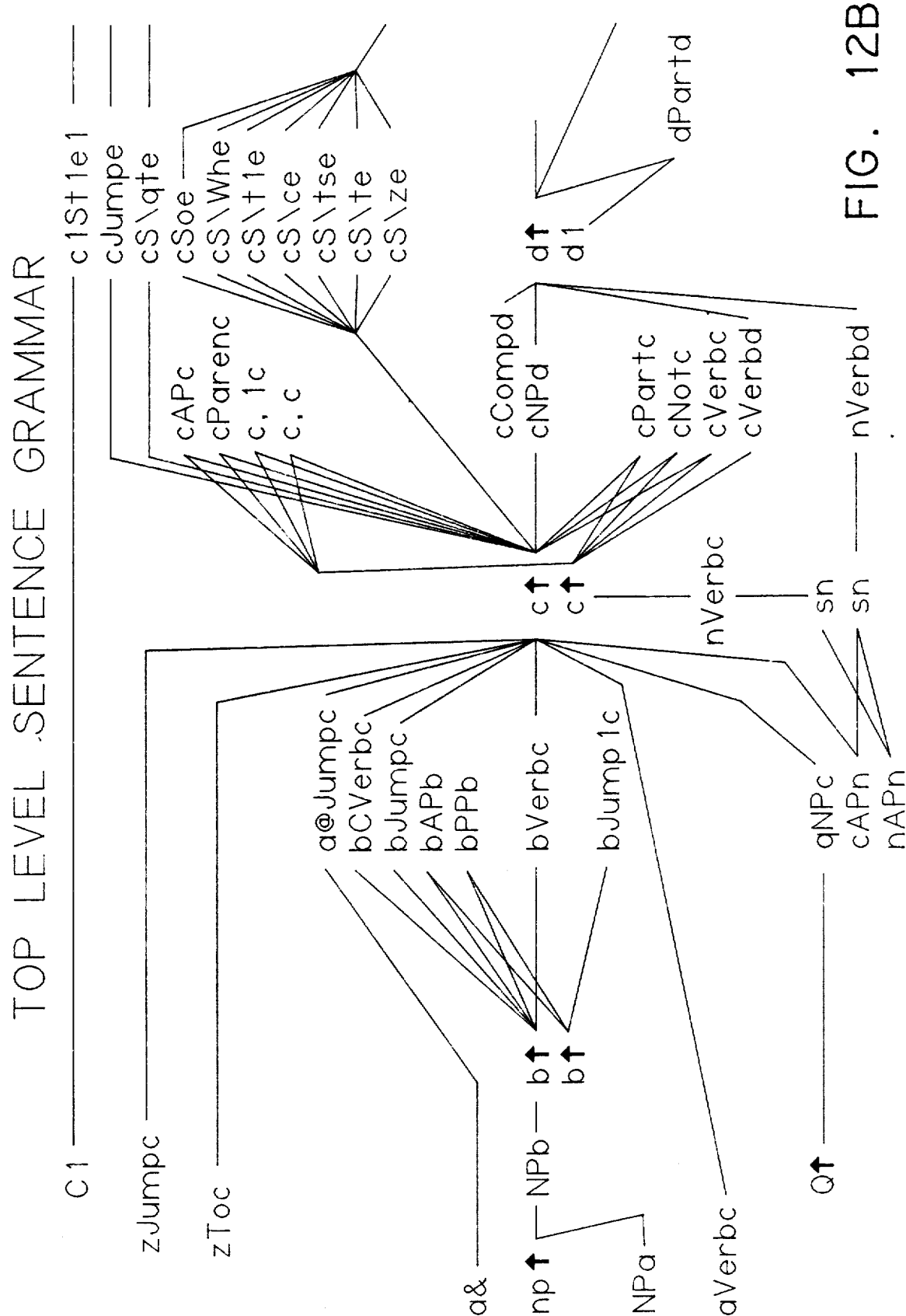
Figure 12C:
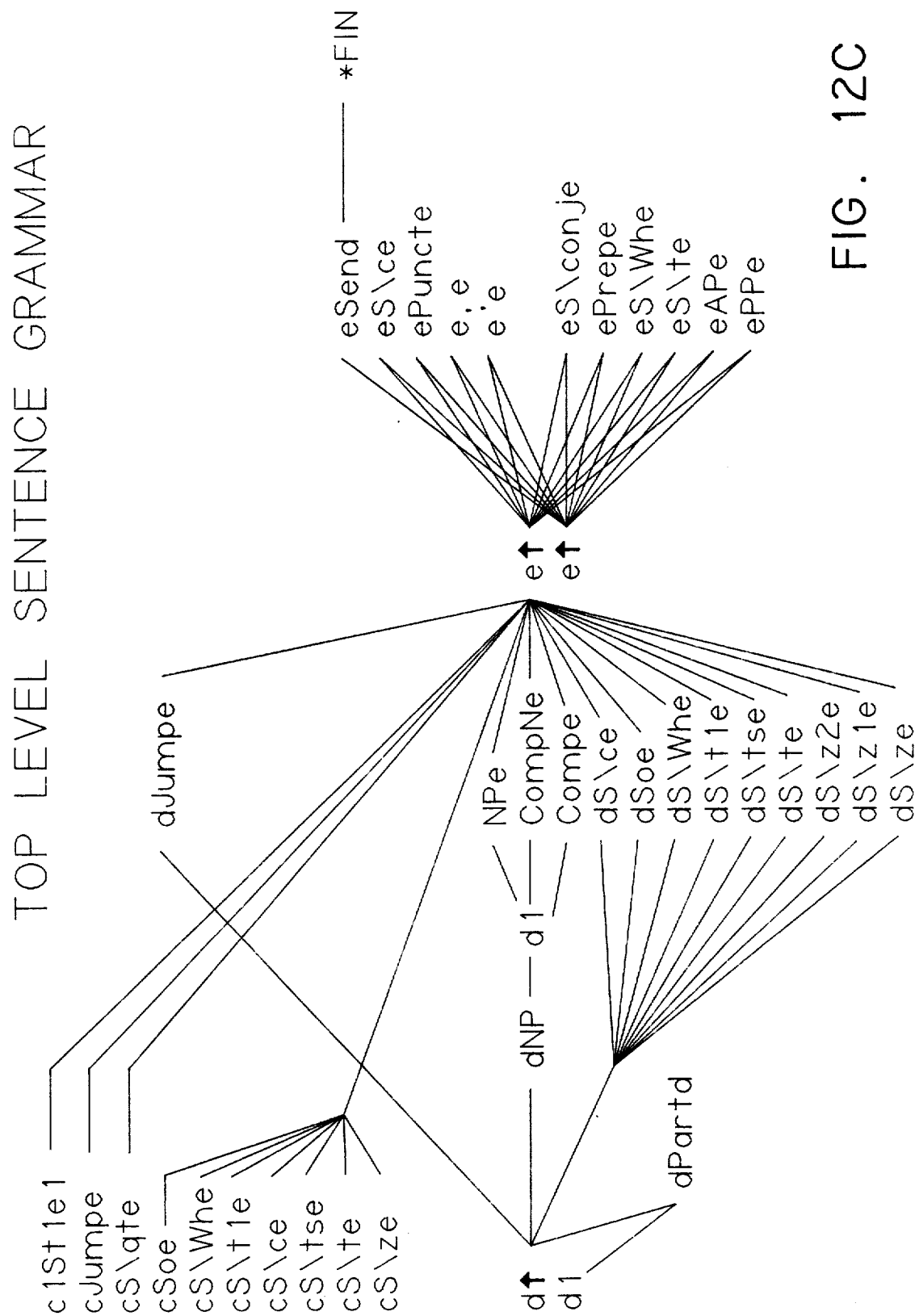
Figure 12D:
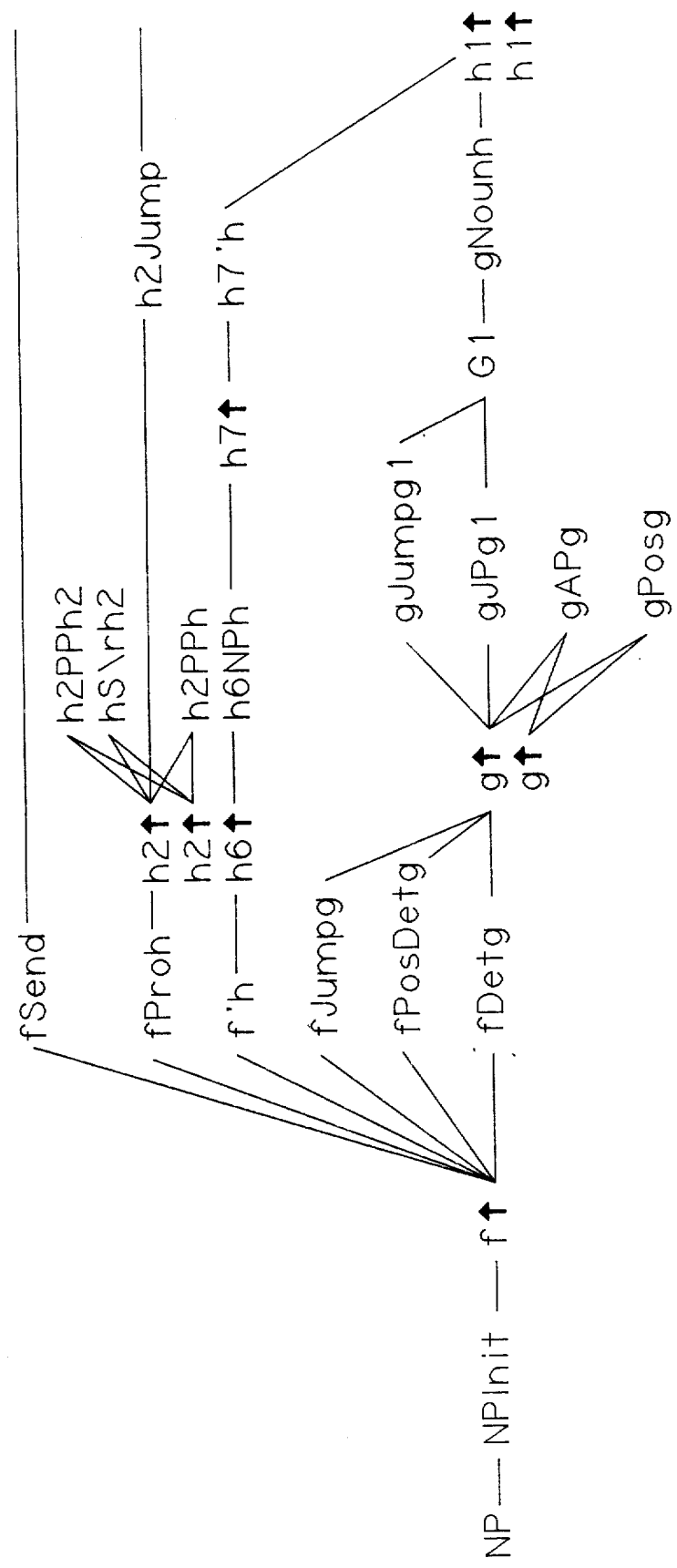
Figure 12E:
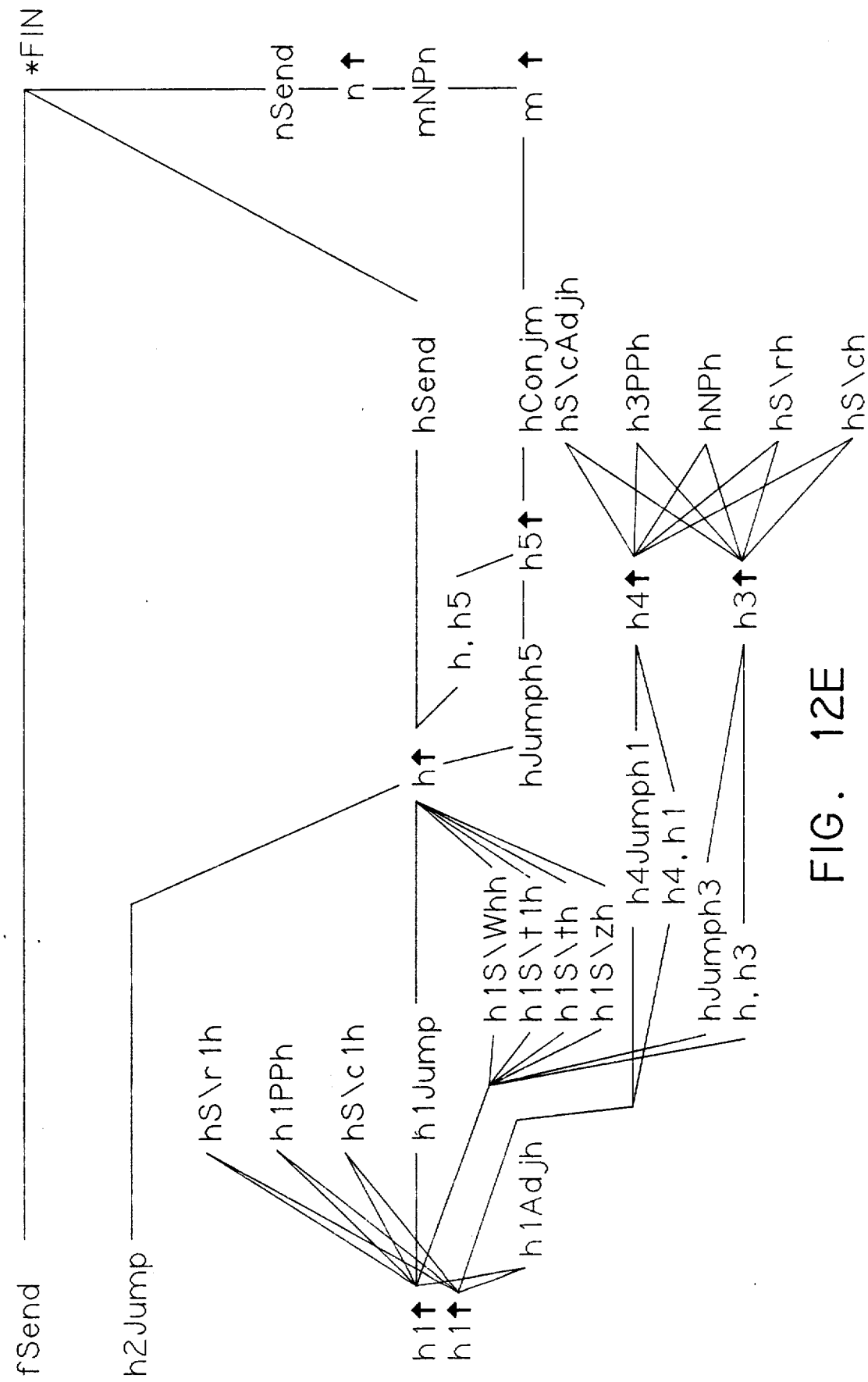
Figure 12G:
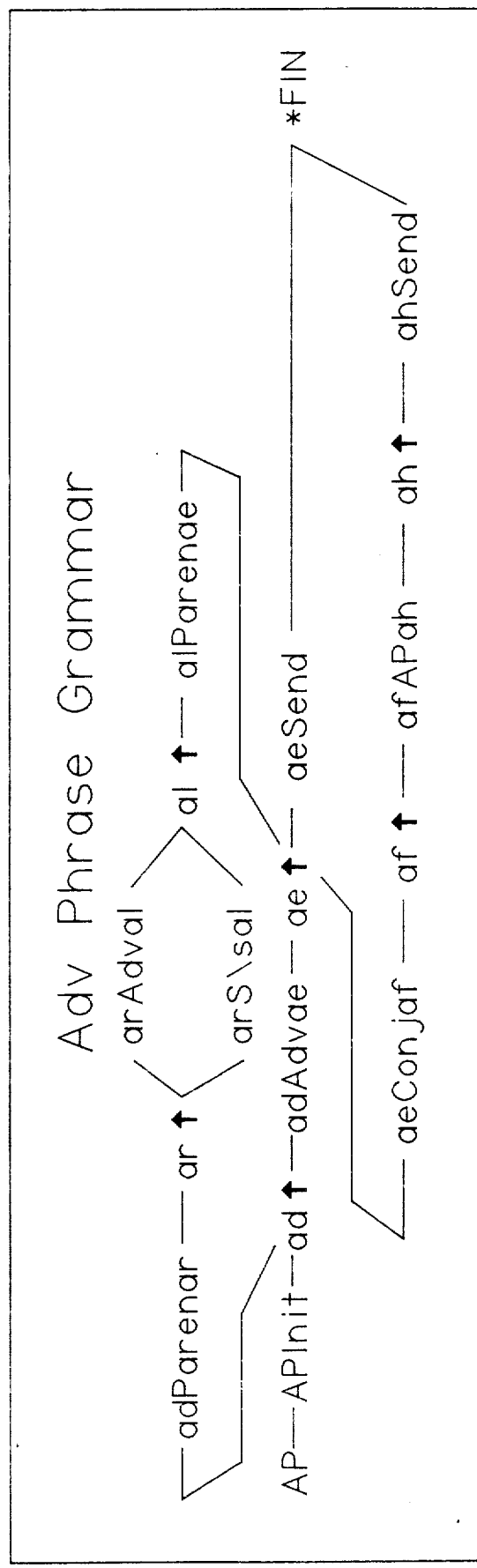
Figure 12H:
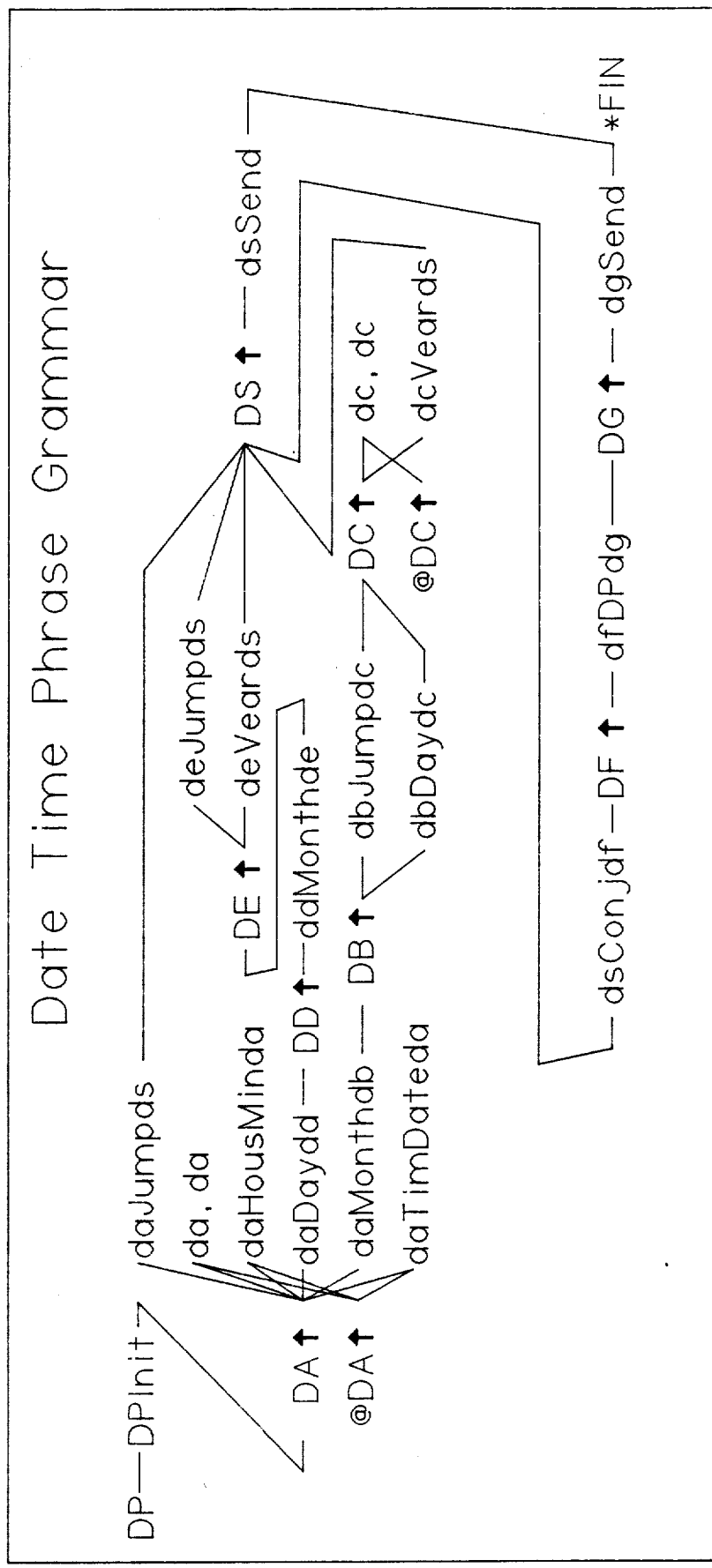

FIGS. 12A-12H show.PAKTUS grammar networks; FIGS. 12A, 12B and 12C show the left, middle and right sides, respectively, of the top level (sentence) network and FIGS. 12D and 12E, show the left and right sides, respectively, of the noun phrase network; FIGS. 12F through 12H shows four other primary ATN grammar networks. These networks include about 250 ATN arcs that specify the major features of English grammar. Each node in a window is an object representing a state or arc of the ATN. 3

.6.3 Grammar Development Example

As an example of programming in PAKTUS, the English grammar program of FIG. 10 will be extended. The program shown recognizes bound clauses introduced by a binder, such as the clause "she was at work" in "Carol said that she was at work". The binder "that" will be accepted by the tBina arc of the program. However, it will not recognize the bound clause in "Carol said she was at work" since the binder is absent. Such elision of the binder is common after verbs dealing with information (e.g., say, know, hear, see, write, indicate, etc.). The program can be extended to recognize this situation by adding a jump arc from state t to state a. The arc should have a rule that first tests whether the main verb of the major clause belongs conceptually to the class of information-related words. Figures 10-13 illustrate the grammar development technique of the invention as applied to this grammatical problem.

Figure 13:
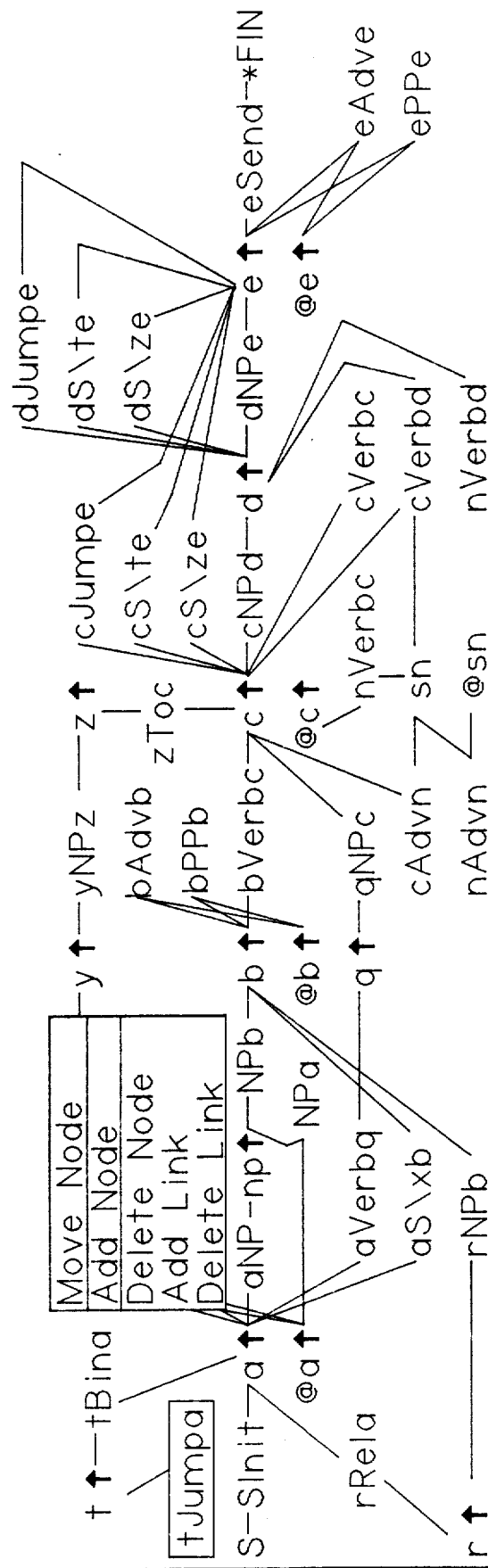
FIG. 13 shows the addition of new mode to an ATN graph.

FIG. 13 represents the initial actions involved in adding the desired arc to the program. First, the window background is bugged, which causes a menu of graph surgery options to pop up. "Add Node" is selected. (At this point, the menu disappears. In order to keep the number of figures small, however, several distinct but related interactions are depicted in a single figure. FIG. 10 consolidates four discrete user actions and four system actions.) The mouse process then opens a window which prompts for the new node label. The label "tJumpa" is typed by the user. The system then prompts (not shown in the figure) the user to position the node in the graph. The user moves the new node with the mouse to a position between states t ↑ and a ↑. At this point, tJumpa is just a name, having no structure associated with it.

In FIG. 14, tJumpa is linked into the program. First, the window background is bugged, and "Add Link" is selected from the pop-up menu. PAKTUS prompts the user to select the nodes to be linked. State t ↑ is bugged first, indicating it is the "from" node, then arc Jump is bugged, indicating it is the "to" node. Next, PAKTUS examines the graph in the window and determines that it contains two kinds of links: OutArcs (which are pointers to arcs leading out of a state) and ToStates (which point to the state to which an arc leads). PAKTUS then pops up a menu asking which is intended. The user selects OutArcs to indicate that tJumpa is an arc leading out of state t ↑. At this point PAKTUS stores the OutArcs link in t ↑, creates the object tJumpa, and stores within it the inverse link "FromState" which points back at t ↑. The user repeats this process (not shown) to add a ToState link from tJumpa to a ↑.

Figure 15A:
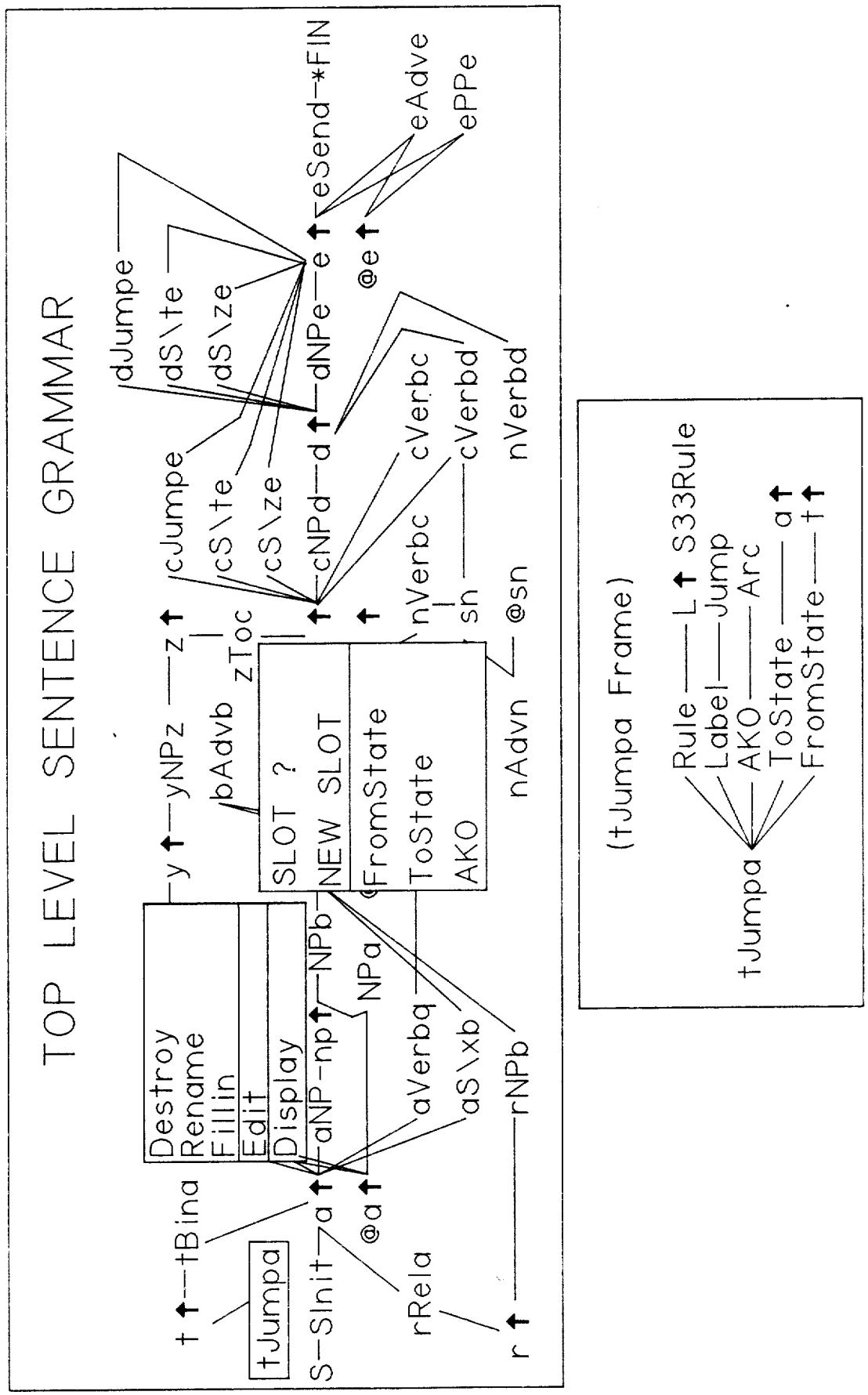

Next, Jump needs a label and a rule, so it is bugged, which is indicated by its being shaded, as shown in FIG. 15A. PAKTUS examines tJumpa to determine which operations on it are meaningful and constructs a menu of such option only some of which are shown in FIG. 15A and 15B). The "edit" option is selected. PAKTUS then notices that tJumpa does not belong to any class, so it prompts for one. The user types "arc" in response. (Information entered by the user is underlined in this and subsequent figures.) A menu of tJumpa's slots appears. NEWSLOT is selected, and the system asks for its name. The user enters "Label" as the slot and then "]" (equivalent to NIL in Interlisp) to accept the default facet (value). Finally, the label value of "Jump " is entered, and PAKTUS stores this information in tJumpa. The slot menu appears again (not shown), and another new slot, Rule, is filled with the value "L ↑ S33Rule". The use signals that the editing is now complete next time the slot menu appears, so PAKTUS displays the modified object in its own window (which it creates if it did not already exist).

Figure 16B:
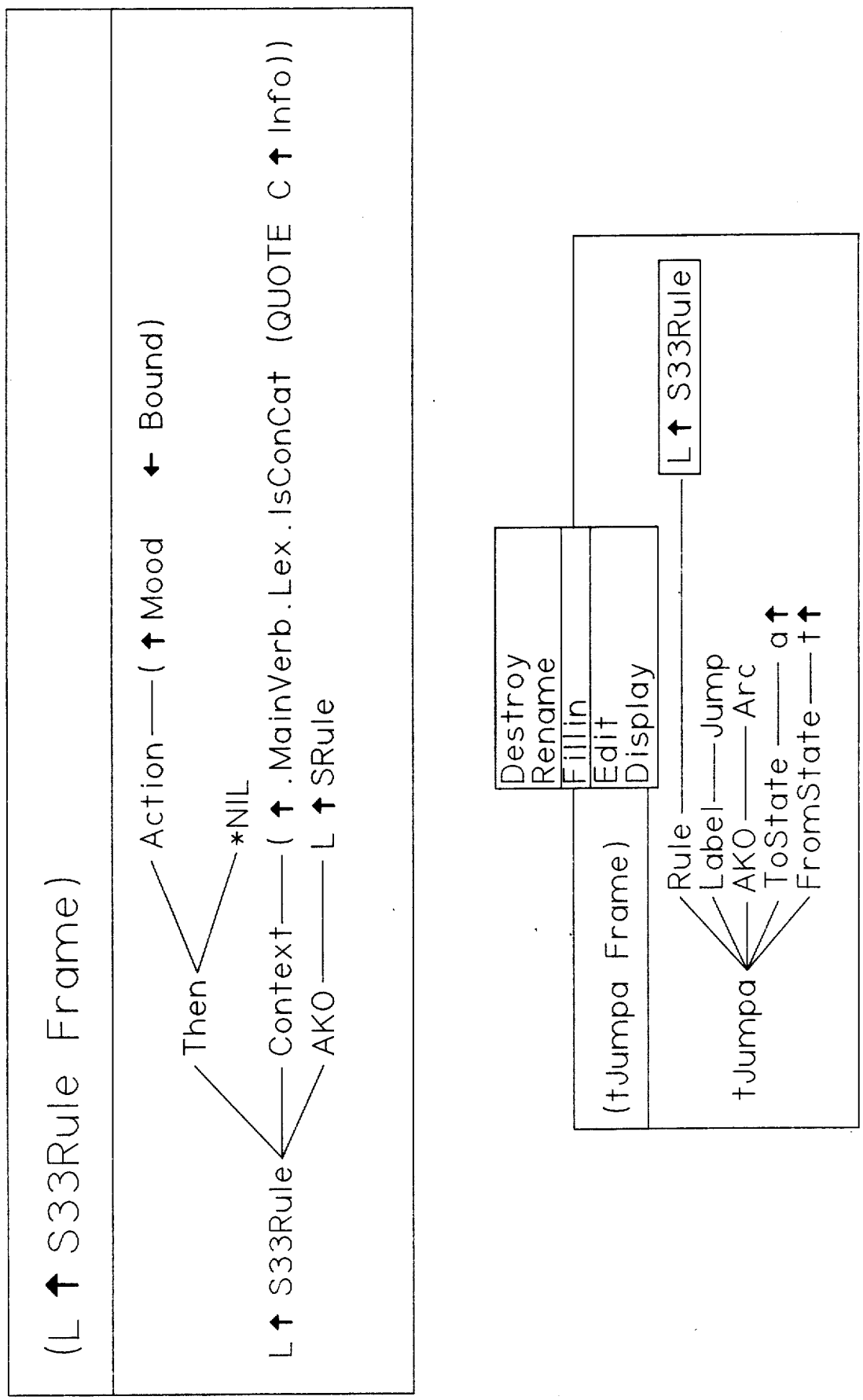

The final step is defining the rule, which is shown in FIG. 16 and 16B. First, L ↑ S33Rule is bugged in the tJumpa window, and the Fillin option is selected from the menu that pops up. PAKTUS must know what kind of object is being filled in. The user enters "L ↑ Rule " in response to the prompt. Now that PAKTUS knows that L ↑ S33Rule is a rule (since L ↑ SRule is already known to be one), it uses the rule template (not shown) to determine what needs to be filled in. After informing the user that the Context slot is currently empty, PAKTUS asks for values. The user enters "( ↑ .MainVerb-.Lex.IsConCat (QUOTE C ↑ Info))" which means that the word in the main verb register of the major clause belongs to the conceptual category C ↑ Info. (See the concurrently filed patent application entitled "Natural Language Understanding System" for a discussion of conceptual categories and their use in the PAKTUS ATN grammar.) PAKTUS has not seen the predicate ↑ .MainVerb.Lex.IsConCat before, but it recognizes the notation, so it generates LISP code for it and displays the code to the user. It then prompts for additional Context clauses, but there are none for this rule, so the user enters "]" (NIL) in response. The only other slot for which there is an entry is "Then". This has one action: "(*.Mood←Bound)" which means set the mood of the current clause to "bound". The rule is now complete, and PAKTUS displays it in a new window.

Certain predicates such as IsconCat are hand coded. A small number of these are usually defined early in the program (grammar) development process and are used frequently thereafter.

4. LEXICON

PAKTUS includes data bases of information about words (lexical information) and concepts (semantic information). This section deals primarily with the lexical component. The conceptual component is mentioned in a few places where it interfaces with the lexical one. It is fully discussed below at Section 5. Section 4.1 defines the current PAKTUS lexical categories and their associated features. The overall structure and operation of the lexicon is explained in section 4.2. Finally, section 4.3 explains how the lexicon is extended.

4.1 Lexical Categories and Associated Features

Lexical categories are groupings of words assembled according to their ability to participate in particular linguistic patterns. Some effort has gone into separating the lexical and semantic knowledge about words in PAKTUS. This is particularly true for verbs. Verb categories are distinguished solely on a syntactic basis and are few in number. Semantic information about verbs is contained in a separate network, with cross-links to the lexical network. For other word classes, especially nouns, the distinctions among subclasses tend to be more semantic. Syntactic information about nouns is illustratively separated from the semantic information by storing it as features of classes rather than by creating a separate class. For example, the preferred embodiment eliminates proper nouns as a distinct category. It is more desirable to mark such nouns with the feature "Namelike".

There are two kinds of word categories: open categories and closed categories. New words are added to open categories continually. These are the nouns, verbs, and adverbs. All other categories are closed. These are rarely extended. This section discusses the word categories and their associated syntactic features. Words also have semantic features. To distinguish these, they will be referred to as "properties", which are discussed in Section 5 below.

4.1.1 Nouns

Figure 17A:
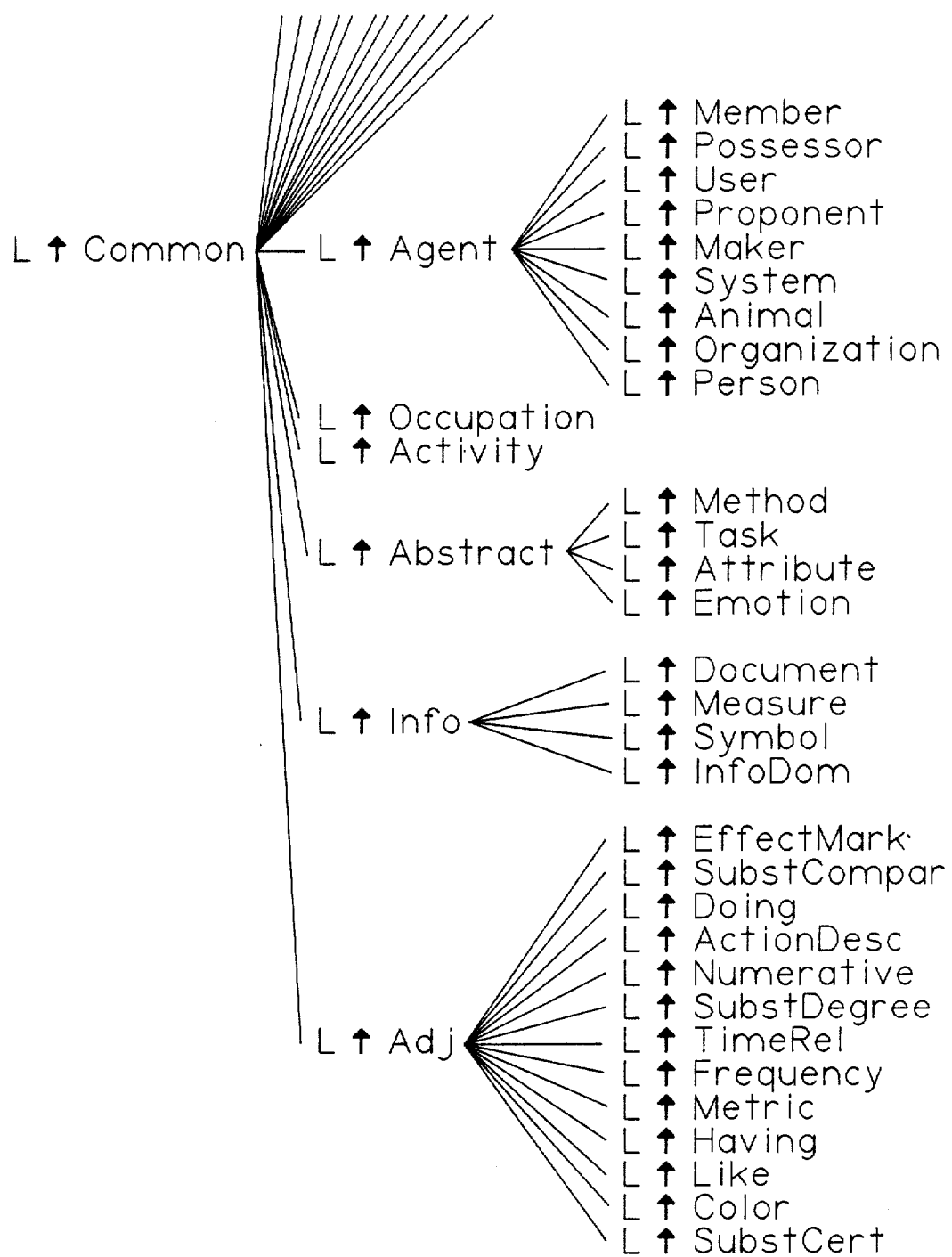
FIGS. 17A and 17B show an illustrative set of nominal categories.
Figure 17B:
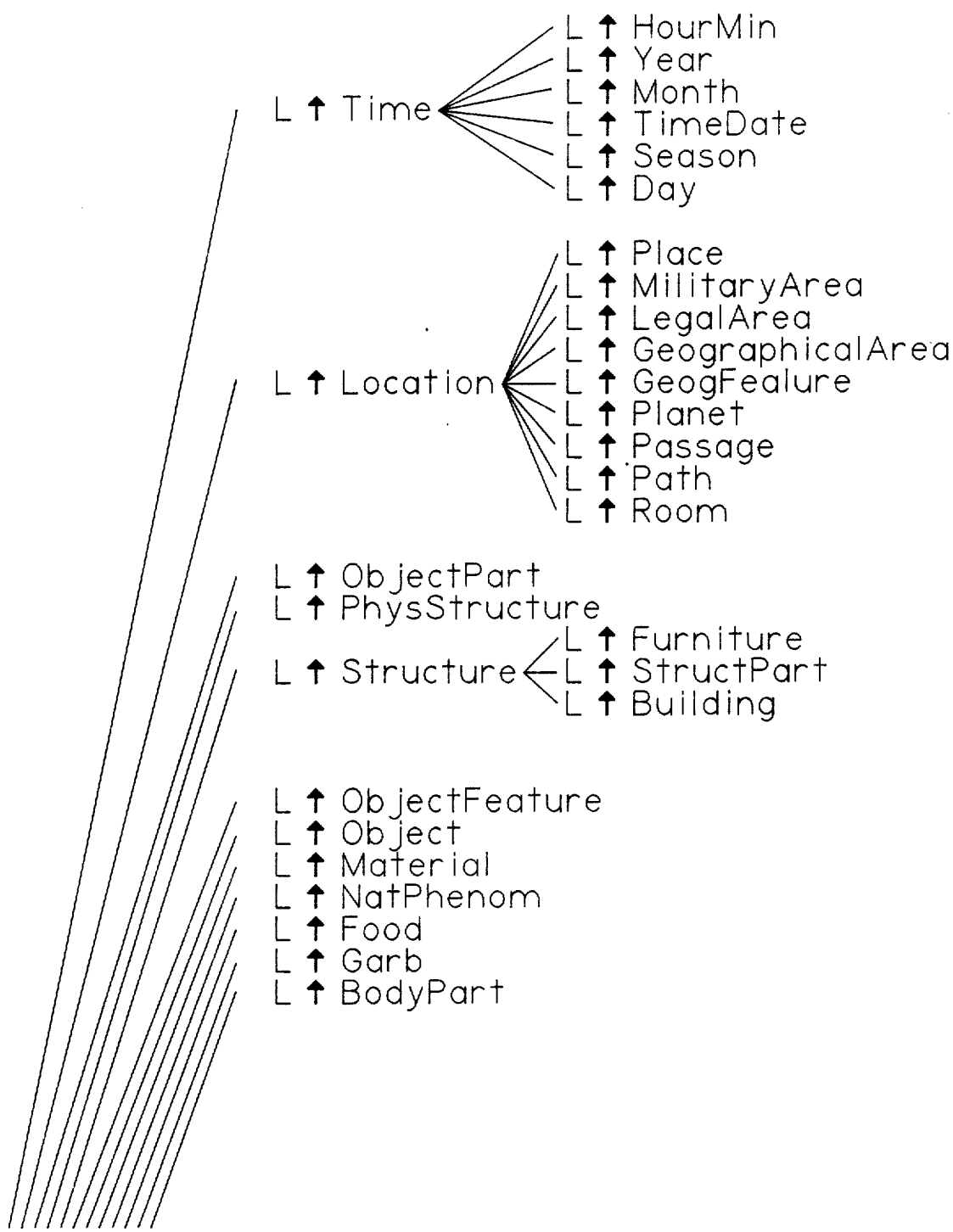

Nouns name things. Included in this category are proper nouns and common nouns. In PAKTUS, adjectives are a subclass of common nouns. An illustrative set of subclasses of common nouns is shown in FIGS. 17A and 17B. Some of these categories exist only as stubs to hold limited information for the morphological analysis subsystem. These can be identified by the absence of a KINDSOF slot. Note that the nominal classification system given here is illustrative only.

There are five features associated with nouns. These features, and their options and defaults, are described below. The abbreviation used by PAKTUS is enclosed in parentheses after each option if it is different. In some cases, a short description or example of the option is enclosed in square brackets.

Number may be singular (Sing) or plural (Pl). Singular is the default.

Case is subjective (Subj), objective (Obj), or possessive (Pos). The default is both subjective and objective.

Form is base (unmarked), plural-inflected (S ↑ S), or possessive-inflected (S ↑ S). The default is base. In addition, adjectives may have the Form comparative (S ↑ ER) or superlative (S ↑ EST).

Type includes count; mass; left adjoint of noun (LeftAdjOfN) [can appear as a modifier to the left of a noun]; right adjoint of noun (RightAdjOfN) [can appear as a modifier to the right of a noun - these are rare, but include adjectives like "enough" as in "it is long enough"]; group countable (GroupCount) [e.g., "committee"]; group uncountable (GroupUncount), [e.g., "the poor"]; vocative [e.g., "sir"]; plural [i.e., has no singular, like "police"]; singular [i.e., has no plural, as in "pandemonium"]; terminal [terminates a noun sequence - this tends to be application specific, like the word "duration" in text about message traffic]; and namelike [e.g., "Earth" - this feature may eliminate the need for the proper noun category] The default Types for common nouns are Count and LeftAdjOfN.

Some subclasses of Noun may have different options and defaults. The most notable exception is the adjective category. Options for adjectives are limited to LeftAdjOfN, RightAdjOfN, GroupUncount, and Plural, plus the additional options VerbComp [can appear as the complement of a linking verb] and NonGradable [no -er or -est Form]. Defaults for adjectives are LefAdjOfN and VerbComp.

Complement is usually associated with verbs, but a few nouns have this feature. Options available for nouns are to-infinitive clause (ToInf) [e.g., "eager to please"]; bound clause beginning with "that" (ThatClause) [e.g., "knowledge that ... "]; bound clause without a binder (zeroThat) [e.g., "the way I did it"]; bound clause beginning with a wh- word (WhClause) [e.g., "the reason why we came"]; infinitive clause preceded by a wh- word (WhToInf) [e.g., "I'm uncertain how to say it"]; and requiring a descriptive phrase (DescPhr) [e.g., "a ... buff"]. The default for nouns is that there is no complement.

4.1.2 Verbs

A preferred set of verb categories are shown in FIG. 18. These are strictly syntactic, not semantic. The auxiliaries are included here, although they form a closed category. The discussion here relates to the open verb categories. Verbs have two features: Form and Complement. Form may be infinitive (unmarked), third person singular (S ↑ S), present participle (PresPart), past (Past), past participle (PastPart), or both past and past participle (S ↑ ED) (all regular verbs have identical past and past participle forms). The verb Complement indicates which NPs or nounlike phrases can appear in the surface form of the proposition represented by the verb (i.e., in the spoken or written text, as opposed to the underlying meaning). It does not specify adverbials since they are relatively independent of the particular verb. It is critical that verb complements be correctly specified. They are used heavily by syntactic tests in the grammar, and they determine where constituents are placed in the intermediate structure that is later mapped into the canonical semantic case frames.

The verb categories embody general information about complementation. More specific complementation information is contained in the Complement feature. Since options and defaults vary systematically, these will be presented separately by category, along with a brief definition of each category. For a more complete discussion of these categories see chapter 10 of Quirk et al. (1985).

Intransitive verbs have no nounlike object on the surface. There may be an implied object, and many intransitive verbs also have transitive forms with the same meaning, but if it is acceptable to use the verb without explicating any object, then it should be classified as intransitive. (It can be classified as transitive also.) Complement options are: infinitive clause preceded by "to" (called ToInf in PAKTUS); clauses beginning with an "ing" form of a verb (ingForm); bound clause preceded by "that" (ThatClause); bound clause Without any binder (zeroThat); the word "so" or "not" (So); bound clause in the subjunctive mood (Subjunctive); bound clause beginning with a "wh" word (WhClause); infinitive clause preceded by a "wh-to" form (WhToInf); required adverbial (NeedsAdv), which is listed as a complement only when a particular verb requires an adverbial; and no complement (Zero). The default complement type for intransitive verbs is Zero. This may, of course, be overridden by the Complement slot of individual verbs.

Copula verbs associate the complement with the subject. Complementation options are: ToInf, ingForm, ThatClause, zeroThat, So Subjunctive, WhClause, WhToInf, noun phrase (NP), and adjective (Adj). The defaults are NP and Adj.

Monotrans verbs take one object that is independent of the subject. Complementation options are: ToInf, BareInf (infinitive not preceded by "to"), ingForm, ThatClause, zeroThat, So, Subjunctive, WhClause, WhToInf, PastPart, NP, and NeedsAdv. The default is NP.

Bitrans verbs take two independent objects. Complementation options are: ToInf, ThatClause, zeroThat, So, Subjunctive, WhClause, WhToInf, and NP. The default is NP.

TransCopula verbs take two objects, the second of which complements the first. The first object must be an NP. Options for the second (i.e., the complement) are: Adj, NP, and ToInf. The defaults are Adj and NP.

4.1.3 Other Categories

Determiners and pronouns have syntactic features. The remaining lexical categories (adverbs, prepositions, particles, conjunctions, relatives, binders, and punctuation) have no features. If they are classified into subcategories, this is on a purely semantic basis. Determiners have the features Num and Ques. Num options are Sing and Pl, and the default is both of these. Ques options are Yes and No. The default is No. Pronouns have features Person, Num, Ques, and Case. Person options are 1st, 2nd, and 3rd, and the default is 3rd although advantageously, this varies by subcategory. Num options are Sing and Pl, with Sing being the default. Ques may be Yes or No, the latter being the default. Case is Subj, Obj, or Pos, with a default of Subj and Obj.

4.2 Basic Structure and Operation of the Lexicon

This subsection explains what information is associated with individual words by PAKTUS and how that information is stored and managed. This is pertinent to the extension of an NLU system.

4.2.1 Information Associated with Words

Several types of word knowledge are represented in PAKTUS. All of this is stored on property lists of one of three types of atoms. The most basic type is the atom equal to the ordinary English token, in upper case. This is always referenced first by PAKTUS in seeking information about a word. These atoms may be a single word, or the concatenation of several words constituting an idiom, compound, phrasal verb, or verb-preposition. They hold property lists that name the atoms that hold PIKS frames that define the roots of individual senses of a word. They may also name other surface tokens with which the word combines to form a compound, idiom, etc. The frame-holding atoms are named according to a convention that concatenates the surface word with the lexical category to which it belongs. All lexical category names, by convention, begin with the characters "L ↑" to distinguish them from other types of objects. The third type of atom names a conceptual object that also holds its information in the Frame property. These are pointed at in the Concept slot of the lexical frames of some words, especially verbs. They are discussed in detail in section 5 below.

Every word in the lexicon has a "word parse" that is stored in the LParse property of the word and lists all known (to PAKTUS) senses of the surface word. Word parses are produced by the function ParseWord [Word] which takes an atom (a word) as its argument and returns the list of senses. For example, the word parse of "saw" is (SAWL ↑ Monotrans Past)) which lists four senses. Each sense of every word is either an atom or a list of the form (Root Category Form $Con_1 \ldots Con_n$). Atomic senses denote "primitive" words; i.e., those not derived from other words in the lexicon. The lists denote derived senses and consist of the Root from which the word is derived, the resulting word Category, the Form as defined in section 4.1, and zero or more conceptual relationships that specify how the derived word relates semantically to the Root.

In applicants' experience, the decision as to whether or not a word is a primitive root has been primarily pragmatic. If the word is not clearly derived from another word that is in current English usage, then it is considered primitive.

There are many noun-verb pairs, sometimes with the same spelling, where the noun refers to the act of, or object of, the verb (e.g., sleep/sleep, knowledge/know, etc.). Since meaning is ultimately represented in PAKTUS by case frames and other conceptual structures, and since verbs are more closely tied to case frames, the verb is defined as primitive for such pairs, with the noun derived from it. It is advisable to adhere to this convention when adding new entries to the lexicon. A significant exception to this occurs with mass nouns that may be used as verbs (e.g., paint, water, etc.). For these pairs, the noun is treated as primitive.

The information in the frame associated with a primitive word includes an AKO link to its category and may also include various features and properties that supplement or override those inherited from its ancestors. Features refer to the dimensions as defined in section 4.1. Properties refer to semantic characteristics such as Animate, Movable, etc. that are stored on the MODE facet of the AKO slot. Section 2.3.7 above explains how properties are processed. Properties are generally associated with nouns and are useful in assigning noun phrases to their proper roles in case frames (see section 5 below).

4.2.2 Storage and Management of Lexical Information

The PAKTUS lexicon is distributed over a number of files. One, called LEXCATOBS, contains the PIKS frames for all lexical categories. This file is loaded upon initialization of PAKTUS so all lexical categories are always present in virtual memory. The remaining lexical information is contained in six PIKS data bases. These are not loaded. Instead, information is swapped into memory as needed when individual words are first encountered.

Figure 38:
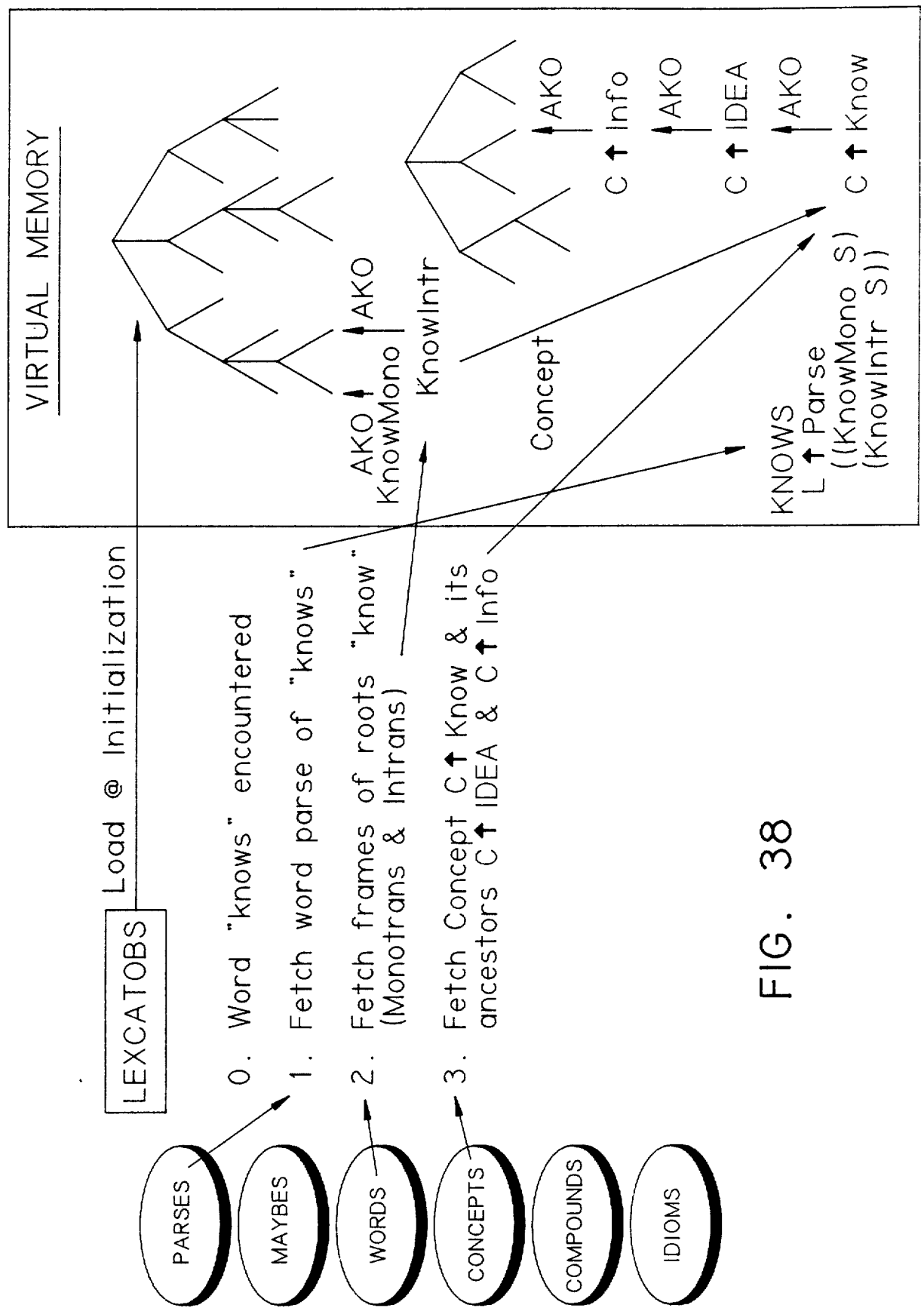
FIG. 38 illustrates the structure and operation of the PAKTUS lexicon.

An example is shown in FIG. 38. The tree at the left inside virtual memory represents the lexical categories. When the word "knows" is encountered for the first time (after initializing PAKTUS), its "word parse" is fetched from the data base PARSES and stored on the L ↑ Parse property of the atom KNOWS. PAKTUS then fetches the frames of the roots of the two senses of "knows" which are KNOWL ↑ Motrans and KNOWL ↑ Intrans. (The names and parse structure in FIG. 38 are abbreviated.) These frames are contained in the data base WORDS. Note that the word "knows" does not have a frame. Everything that needs to be known about it can be derived from its word parse and its roots.

Next, PAKTUS swaps into memory all objects reachable through the AKO and Concept slots of the roots, if these are not already present. The Concept objects are contained in the data base CONCEPTS. Finally, PAKTUS swaps in any compounds (e.g., UNITEDSTATES and UNITEDSTATESOFAMERICA would be fetched when the word "united" was first encountered); idioms, including phrasal verbs and verb prepositions (e.g., ASKFOR is fetched along with ASK); and "maybes" (possible but unlikely senses of words). In the example, "knows" has no compounds, idioms, or maybes.

Using PIKS data bases saves much time during initialization, avoids cluttering memory with unneeded word definitions, and provides for automatic updating when definitions are changed or new words are added. In most situations, it appears to the user as if all words are in memory, but the following notes should be kept in mind to avoid confusion.

Objects whose names are shown in PIKS Browser windows are not necessarily in virtual memory. When they are selected with the mouse, they are automatically fetched from the data bases.

A Browser window showing, for example, KINDSOF descendents of some concept (such as the top-level concept C ↑ Primitive) will not show any descendents whose AKO parent is not resident in memory.

Normally, any function that requires that an object's frame or a word's parse be resident in memory will directly or indirectly call one of a few low-level functions that automatically fetch any needed objects. For example, it is not necessary to bring any word definitions into memory before parsing a sentence, since this happens automatically. If, however, one writes a function that accesses a word parse or a frame that might not be in memory, the function should first invoke GetParse [Word] or GetFrame [Frame], respectively. These will fetch not only the particular word parse or frame, but also all roots and all AKO and Concept relatives not already in memory.

4.3 Extending the Lexicon

The invention provides for adding new entries or modifying existing ones to a basic or pre-existing lexicon. Advantageously, a "dictionary officer" (see FIG. 1) maintains the consistency of the system lexicon. The mode of lexicon extension ranges from fully autonomous recognition of inflected forms of known roots, through heuristically guided guesses to be confirmed later by the dictionary officer, to its being taught new words directly by the dictionary officer. In most cases, some interaction with the dictionary officer is required. This may occur as soon as the unfamiliar term is encountered or at some later time, depending on the mode of system operation (which may be determined, e.g., by a "switch" setting). Each of the lexicon extension methods is discussed in the following subsections.

4.3.1 Affixation

PAKTUS recognizes a prescribed set of "affixes'" (prefixes and suffixes) and knows how they ordinarily affect the lexical and semantic content of words to which they are added. It also has rules specifying how they alter the spelling when combined with a root (e.g., when adding -ly to a word ending in "y" first change the "y" to "i" as in happy →happily). A subset of these (-s, -'s, -er -est, -ly, -ed, -ing, and -th, along with their spelling variants) have completely predictable effects when added to certain word classes (e.g., -er always makes an adjective comparative, although it is less certain what it does to a verb) For this subset, PAKTUS derives the information about the inflected form when it is first encountered and keeps it in virtual memory. It does not ask the dictionary officer for confirmation of the derivation since there is no doubt, nor does it write the derived form permanently in the lexicon data base. This saves space with little or no cost in processing time.

For all affixation other than the simple inflections just discussed, PAKTUS requests verification of its derivations from the user. This is done via interaction as shown in FIG. 19, which shows the derivation of "dirty" from "dirt". PAKTUS has put up a menu of these derivations. The user may toggle an entry with the left mouse button. When it is displayed white-on-black, it is interpreted as an acceptable lexicon entry. No entry is actually made until OK is selected in the menu. One may also select an item with the middle button. This is interpreted as a possible but unlikely sense of the word, and PAKTUS stores it separately from the definite senses. (These unlikely senses might be considered by the parser if none of the definite senses fit the context.) In this case, both derivations are correct, so OK was selected and the menu disappeared. PAKTUS then asked whether there are any irregularly derived meanings for the word "dirty". Here, "irregular" simply means any non-primitive sense that PAKTUS did not derive. There are other meanings of "dirty", but the user did not care to teach them to PAKTUS then, so "]" (NIL) was given in response to the prompt. It is not necessary to give a complete word definition all at once. Other senses may be added to the lexicon later. Finally, PAKTUS requests any unlikely meanings, to which the user also gives a null reply. PAKTUS returns the complete word parse.

4.3.2 New Primitive Words

FIGS. 20 A through 20C shows the interaction used to enter a new primitive word. Actually, this shows the entry of two new primitives, which happen to have the same spelling. The word "general" was encountered by PAKTUS and not found in its lexicon, nor could it be morphologically derived. The mode of operation was such that PAKTUS asked to be taught the word. (The sequence of interactions proceeds from panels a through d in the figure. Each menu shown actually disappears before the next one pops up, but they are collected together in this figure.) The system first asked whether "general" is primitive (upper left of panel a). The user selected "yes" from the menu. Proceeding to the right across the top of panel a, PAKTUS then put up a menu of top-level lexical categories from which the user could select. The Noun category was selected, so a menu of its subcategories was put up next, and the user selected Common. Two subcategories of Common, Adj and Agent, were selected, and PAKTUS "walked down" the subcategories of each in turn (lower left and lower middle, respectively, of panel a). As an adjective, "general" was classified as SubstCompar (substantive comparative - it compares one substantive (a noun that is not generally used as an adjective) to others). Note that the category menus are in a suspended process until selected, so one may freely use the PIKS Browser (Section 2.4 above) to explore categories to help in making an appropriate choice during this categorization.

There were no subcategories below SubstCompar, and the user did not want to add a new one, so OK was selected and PAKTUS proceeded on to the Agent sense of "general". This was classified into the Person subcategory, but no further. Moving on to panel b, the first interaction appears at the lower right, and subsequent ones are stacked behind and slightly to the left in the order in which they appeared. PAKTUS requests specifications for five features: Complement, Case, Num, Type, and Concept. In each case, the inherited defaults are pre-selected. The user may accept or modify the selections, finally selecting OK when the specification is completed. In this example, neither sense of "general" ' has a complement (only a few nouns do, such as "eager" which takes a to-infinitive complement); both have the default cases subjective and objective; both are singular; the adjective form follows the default Types Left Adjoint of Noun and Verb Complement, whereas the substantive is Vocative in addition to the defaults of Count and left Adjoint of Noun; and, finally, neither denotes any particular Concept case frame. (These are generally associated with verbs, but some nouns, like "traffic" and "message", have case frames.) This completes the acquisition of knowledge about the two primitive senses of "general", and PAKTUS asks for a verification of the parse of that word, as shown in panel d. This provides an opportunity to reject any incorrect senses that might have been entered by mistake. In this case, however, both senses were correct and were accepted. Then PAKTUS asks for any irregular senses of the word. The interaction from this point is identical in form to that described above for "dirty" and is not repeated here.

4.3.3 Irregular Words

Figure 21A:
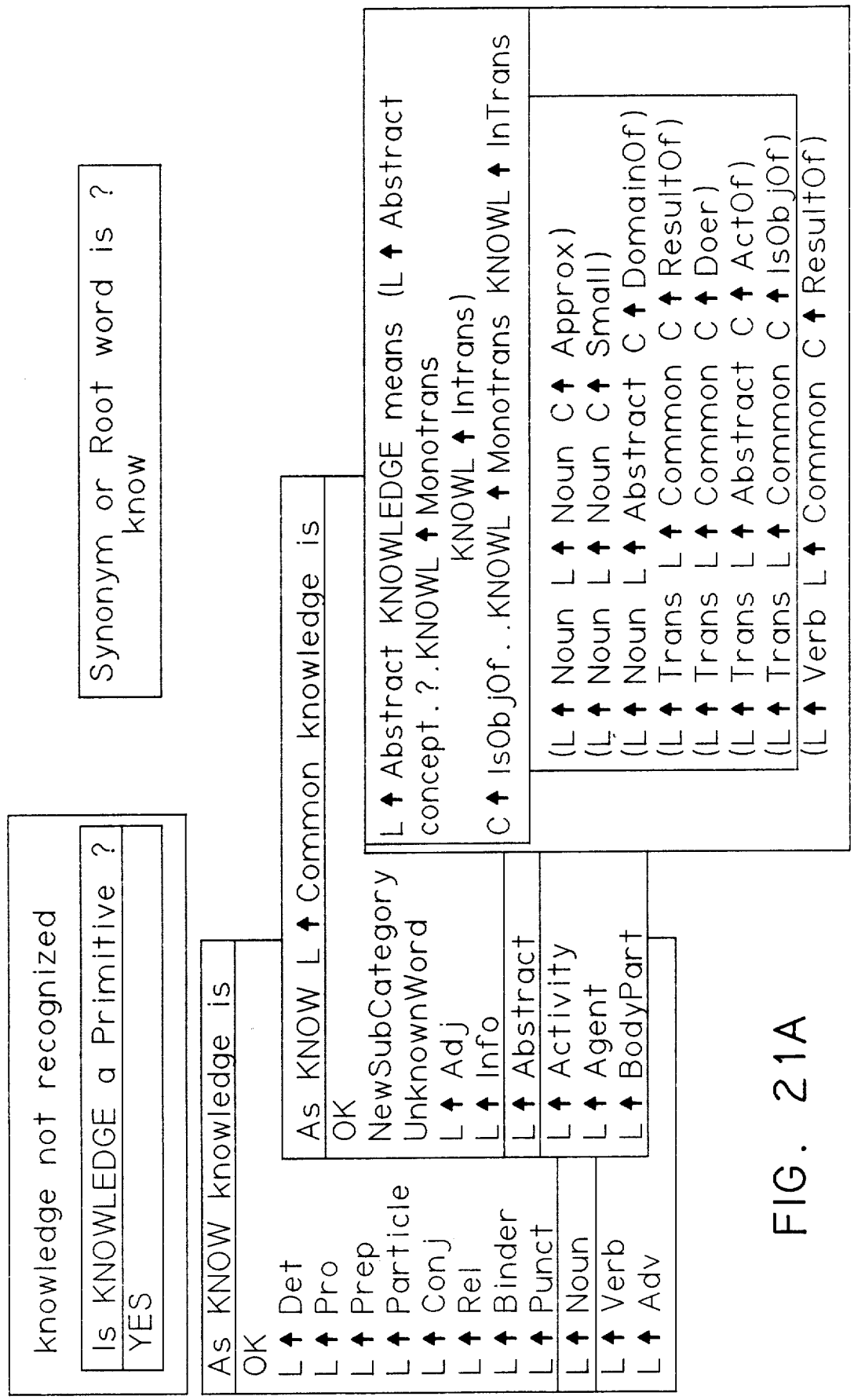

FIGS. 21A and 21B illustrates the interaction required to teach PAKTUS an irregular word. (A few intermediate menus have been omitted, but these were included in the example at subsection 4.3.2.) The word "knowledge" was encountered and not derivable from anything in the lexicon. The user indicated that its root is "know". Since "knowledge" is not synonymous with "know", OK was selected in the prompt menu without selecting either form of know. PAKTUS then obtained the classification of "knowledge" as an abstract noun, just as it does for primitive words. But then it did something different. It asked how "knowledge" is derived from "know" and offered a menu of plausible morphisms (only part of which is visible in the figure) based on its morphological knowledge and on the categories of the root (know) and result (knowledge). For example, at the bottom of the menu in FIG. 21A is the morphism: (L ↑ Verb L ↑ Common C ↑ ResultOf). PAKTUS offered this choice because it knows about a regular morphism that changes some verbs into nouns that represent the result of the action the verb denotes. (This morphism is associated with some suffixes, such as -ing, as in "building".)

Advantageously, PAKTUS offers some help in interpreting these morphisms. If the cursor remains on an item for more than about one second, an interpretation is printed in a window. In this case, the user paused on the morphism (L ↑ Trans L ↑ Common C ↑ IsObjOf) and was informed that this would be interpreted to mean that "knowledge" is the object of... know. The ". . . " indicates that there may be other intervening morphisms; a word need not be derived from its root by a single morphism. In this case, however, the selected morphism gives the complete derivation, so when PAKTUS asked for additional intervening morphisms (not shown in the figure), the user simply clicked the mouse with the cursor outside of the menu. Finally, the verification menu appears. PAKTUS offers the choice of derivations from both the intransitive and monotransitive forms of know. No harm would be done by accepting both, except for a small waste of space and processing time when the word is used, but there would not be any use for a derivation from the intransitive form so it is rejected. In general, it is probably more useful and economical, given such a choice of roots, to select the monotransitive one in preference to the intransitive or bitransitive.

4.3.4 Synonyms

In the case of an exact synonym of another word, the interaction begins like that for an irregular form but ends quickly. The user selects the synonymous root in the menu that asks whether the new word is identical with its "root" (see the menu at the top right of FIG. 21B) One cautionary note should be remembered before deciding whether a word is an exact synonym. It may well have the same meaning as the root, but the complementation may be different.

4.3.5 Modification of Existing Lexicon Entries

Existing entries for a word may be modified with the function VerifyParse [Word]. This function is invoked whenever a new word is learned. It controls the interaction beginning with the "Please verify parse of . . ." menu shown in FIGS. 20D and 21B. When it is invoked directly, it fetches the parse of the word from the lexicon. (The preceding sections describe the details of the interaction.)

Verbs have more inflected forms that other words. When one modifies a verb, all its inflected forms should also be checked for consistency. Advantageously, a function CheckVerb [Root] is provided to facilitate this. Root should be the uninflected (infinitive) form of the verb. When this function is used, PAKTUS "relearns" the verb completely: it acts at first as though it has no information about it. When it finally verifies the new word parse, however, it does fetch any previous senses and merges them with the new information, so one need not reenter any old senses that are still correct. On the other hand, one may at that point reject any old senses that are invalid. After the root is updated, PAKTUS re-derives or learns the -ed, -ing, and -s forms of the verb, first prompting the user for the correct spelling of each of these if there is any doubt.

If a new primitive sense of a non-verb is to be added to an existing word definition, another function Learn-Word [Word] may be used rather than VerifyParse. This operates like CheckVerb but does not ask about any inflected forms.

4.3.6 Semiautomatic Learning

If the system is in the appropriate mode when an unrecognizable word is encountered, PAKTUS guesses what it can about the word from the context in which it appears and store the guesses in temporary lists. Periodically, the function VerifyWords (see module 75, FIG. 1) should be run to complete and correct these guesses and enter the new words into the lexicon permanently. The interaction is essentially the same as that for the other learning modes described above, except that the guessed information will be preselected in the menus. A function ClearTBVs may be provided to erase these temporary lists and avoid the entry of these guesses into the lexicon.

5 CONCEPTUAL CASE FRAMES

The syntactic analysis of each clause provides a description of the elements of the clauses of a sentence (noun phrases, verb phrases, prepositional phrases, etc.) as well as an analysis of their functions in that particular structure (subject, direct object, modifier, etc.). It is the case frame processing which then takes this information and creates a language-independent representation of the concept, or "meaning", suggested by those elements when used in that particular syntactic pattern. PAKTUS is able to do this by using the case frame templates which are specified by the main verb of the clause. In the PAKTUS lexicon 60, all verbs and some nouns should indicate the templates which are associated with them by pointing to one or more concepts in the concept network. In the PAKTUS notation, the frame names in the concept network begin with "C ↑ ". (The terms "case frame template" and "concept frame" are used interchangeably in this patent application to refer to these PAKTUS objects).

The information stored in the concept network is based largely on the Case Grammar approach to semantic analysis. One of the underlying assumptions of Case Grammar is that the verb is central to the analysis and that its usage will specify the constellation of roles which the other elements in the clause may play. Subsection 5.1 describes principles underlying the specification of roles, while Subsection 5.2 gives a preferred set of roles for PAKTUS; these roles, with their sources, restrictions, and defaults, are the heart of the case frame templates in the concept network.

5.1 Role Specification

The purpose of assigning roles is to characterize the participants in a concept regardless of the way in which they appear in English (or any other language, for that matter). These roles are not only critical to the semantic capabilities of PAKTUS, they are inextricably connected to the transitivity system in the ATN grammar (section 3 above) and to the structure of the lexicon (section 4 above). The identification of specific roles answers such questions as:

Who or what performed some action or experienced some event, state, or change?

Was an instrument or tool used that could not have performed the action on its own?

Was someone or something acted upon, or affected by, the action?

Is there a location, a destination, or origin which is central to this concept?

Figure 57:
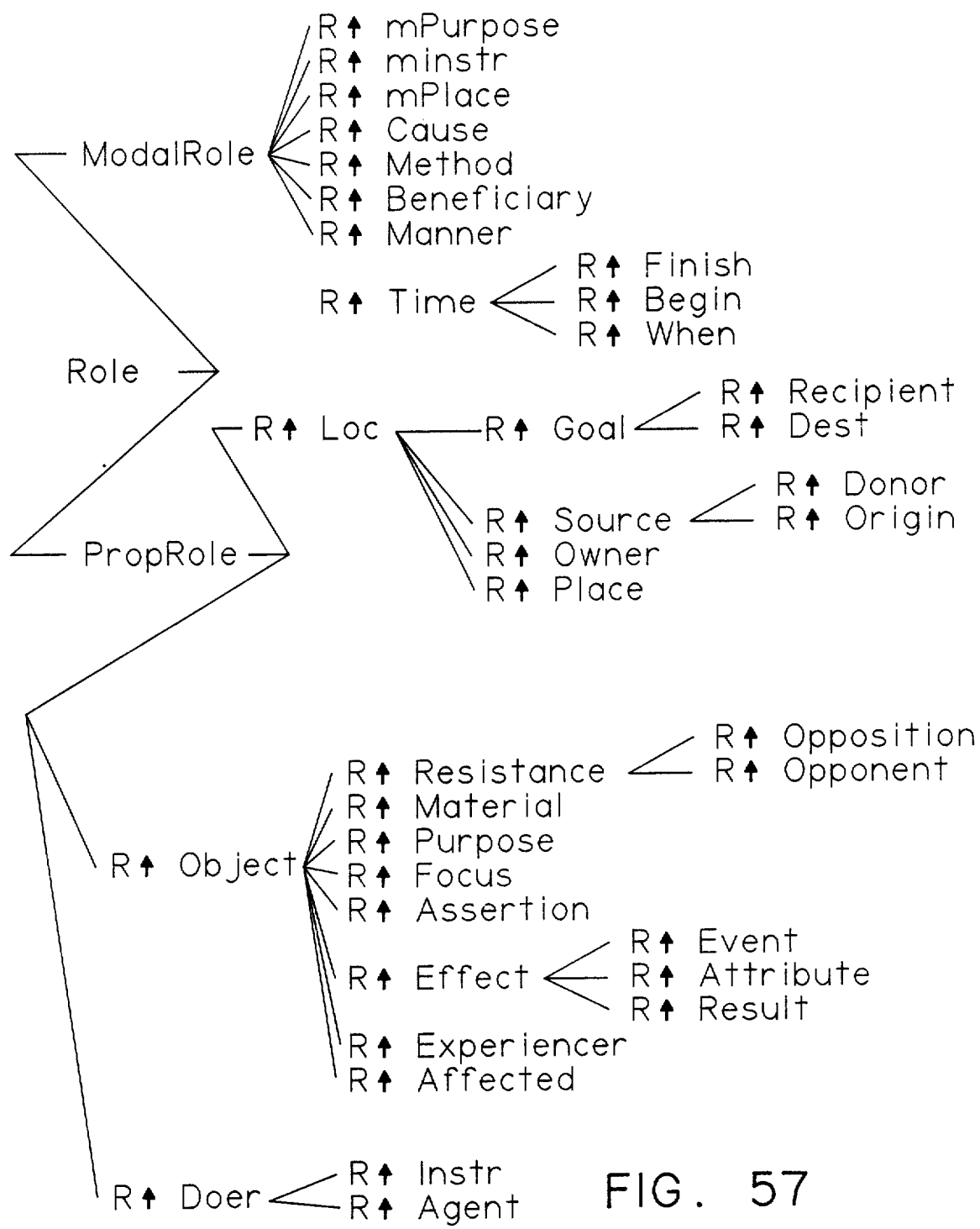
FIG. 57 is a schematic diagram of a network of case roles.

FIG. 57 shows a preferred set of case roles. These are organized into categories. (Only the leaf nodes of the figure represent roles that can appear in a case frame.) As one moves from left to right through this case role hierarchy, the justification for branching becomes more semantic, less syntactic. Before defining the roles, some general principles are explained below.

There are two kinds of roles: propositional roles and modal roles. The former are essential to the proposition represented by the clause, even though they may not always appear in the surface structure (i.e., the English text). For example, the verb "give" has three propositional case roles: Agent (who does the giving), Affected (the thing given), and Recipient (who receives it). The surface structure often omits the Recipient (Jack gave a book, but it is always understood to be present (the book must have been given to someone). Because they play such an essential role and are so intertwined with syntax, more emphasis is given to propositional roles.

Modal roles may be expressed in almost any sentence (typically as adverbials), but are not essential to the proposition. In fact, they often embody additional propositions. They also move around more freely within sentences and their grammar is relatively independent of that of the main proposition of a clause.

The purpose of case roles, and the case frames that contain them, is to map between syntactic and semantic structures. Accordingly, three things must be specified for each role: its meaning, a mapping from syntactic registers to the case role, and any constraints on entities that may fill it.

5.1.1 Meaning

Meaning depends on the type of semantics in the target system. For example, the target system may be a knowledge based system 165 (FIG. 1) based on rules whose antecedents are patterns with variables. In this event, the meaning of a case role is defined by the variable bindings that it effects in the rule patterns. The following examples give rather general specifications of meaning because the underlying NLU system was not targeted to any specific application. However, it is probable that any application of this technique would be in the general area of monitoring and assessing events in the real world. These events are assumed to be the products of decisions and actions by volitional agents. With this type of application in mind, some generally relevant case roles, along with a rough indication of their meaning, can be defined. The meaning of a specific occurrence of a case role is represented by its name together with the (conceptual) name of the case frame in which it appears.

5.1.2 Mapping

The mappings specify which syntactic registers fill the case roles. For example, the Agent role is often filled by the syntactic subject of a clause. Unlike meaning, the mappings are variable. While common defaults may be specified for each role, these may be overridden in specific case frame templates, or even in specific verbs. In PAKTUS, the mappings are specified in the "←" slot (of role objects) or facet (of the role slot of specific concepts or verbs). FIG. 25 shows that the default source of the Object roles is the direct object register, but the Focus role, which is in the Object category, may appear as the direct object or the object of the prepositions of or about. Another example is given in FIG. 26. The Recipient role may normally be found in either the indirect object or the direct object register. In the case of the ATRANS concept, however, it is usually found only in the indirect object register, but for the specific verb take, the Recipient is identical to the Agent. Another variable aspect of roles is whether or not they appear in the surface structure (text under analysis).

Figure 48A:
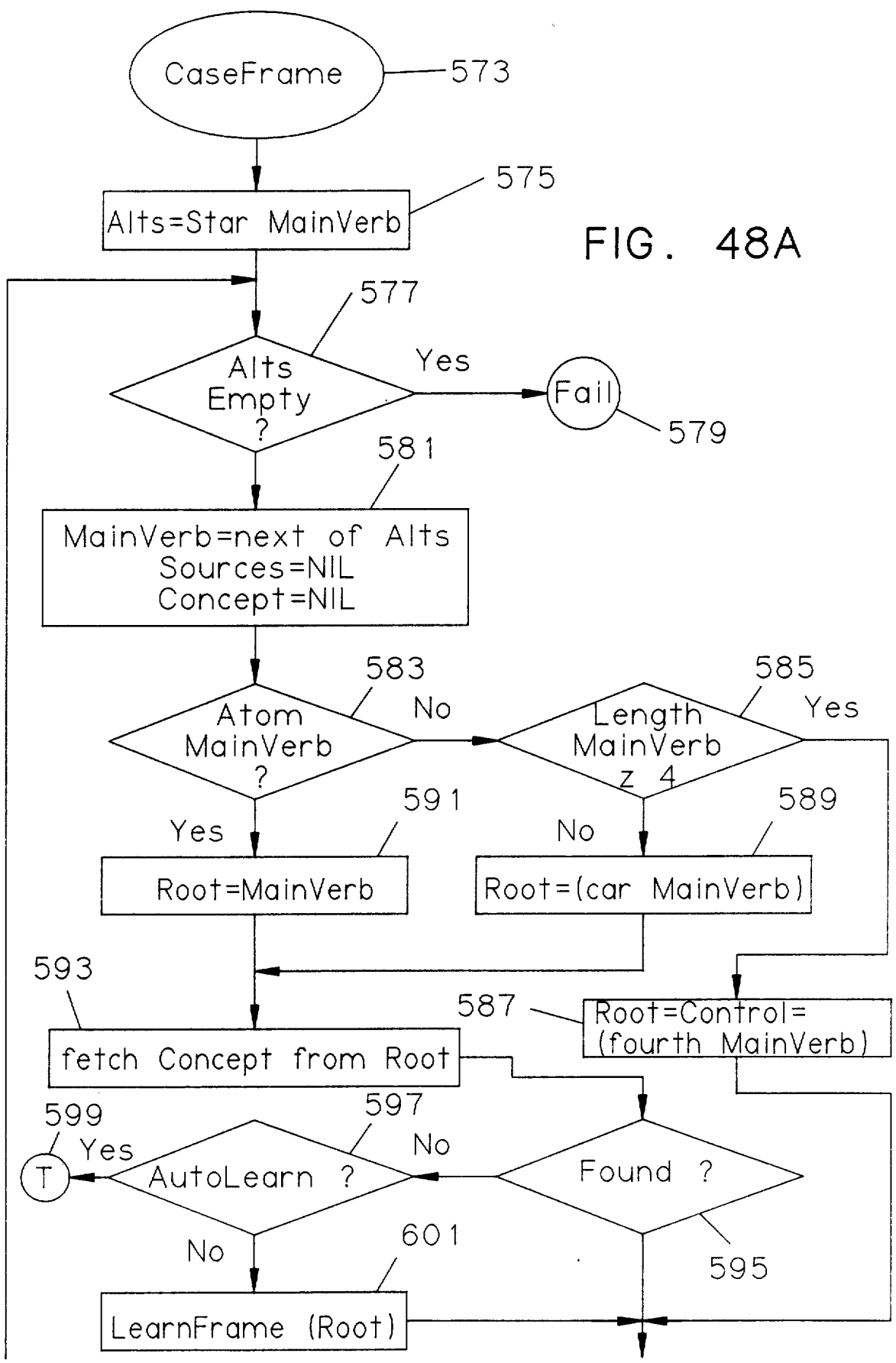
FIGS. 48A and 48B show a flow chart schematic diagram of the CaseFrame function.
Figure 48B:
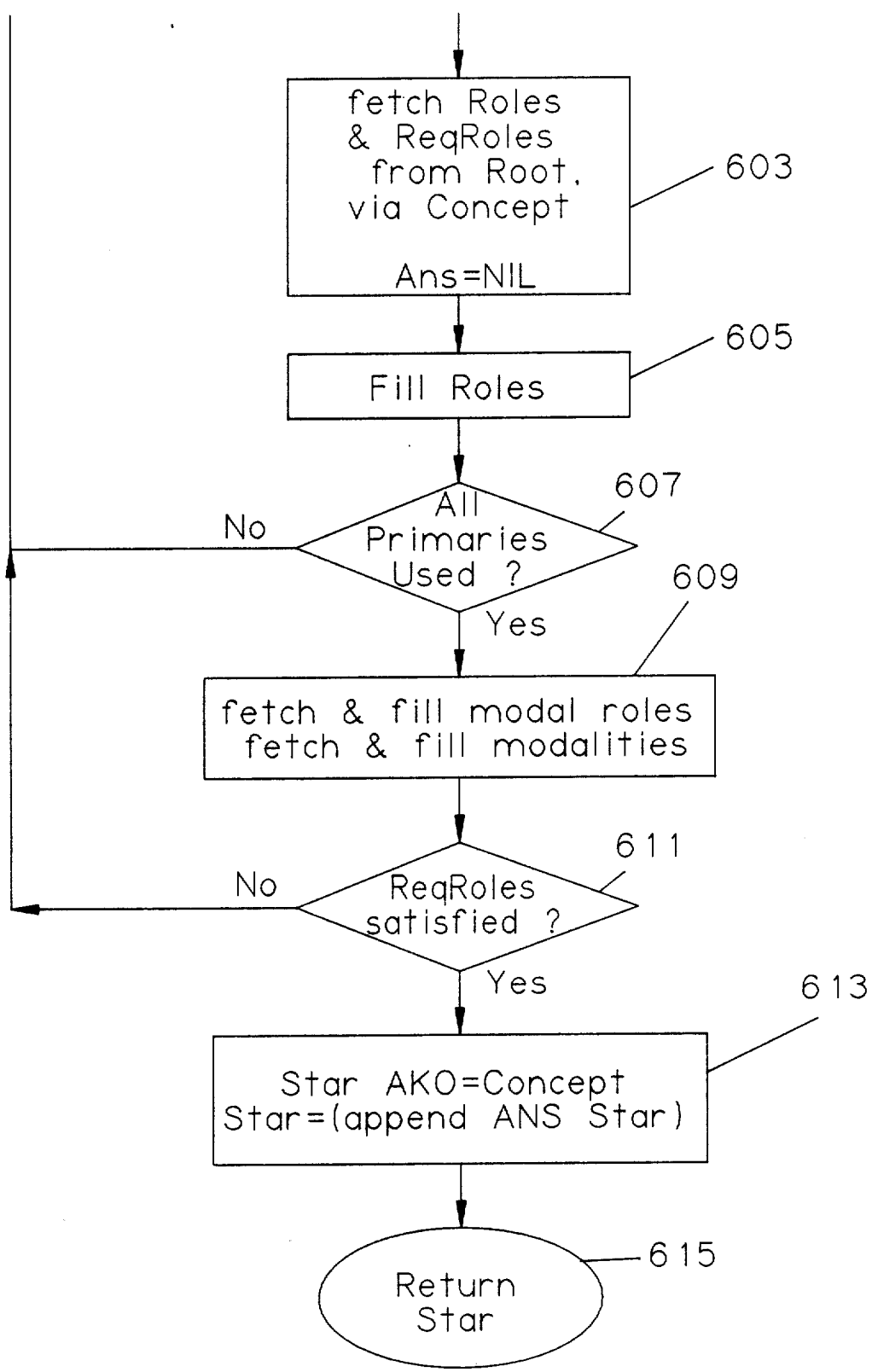
Figure 49A:
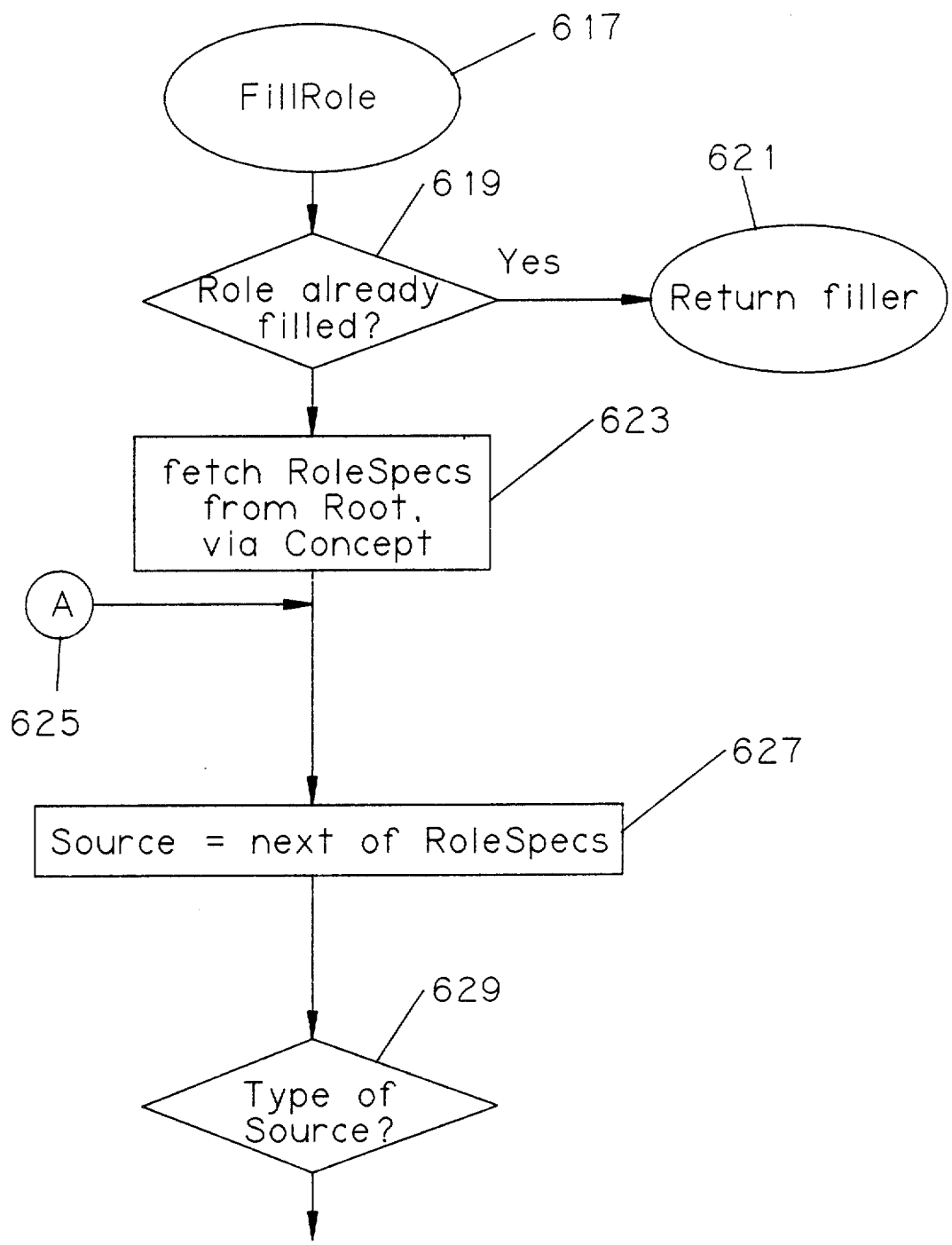
FIGS. 49A through 49F show a flow chart schematic diagram of the FillRole function.
Figure 49B:
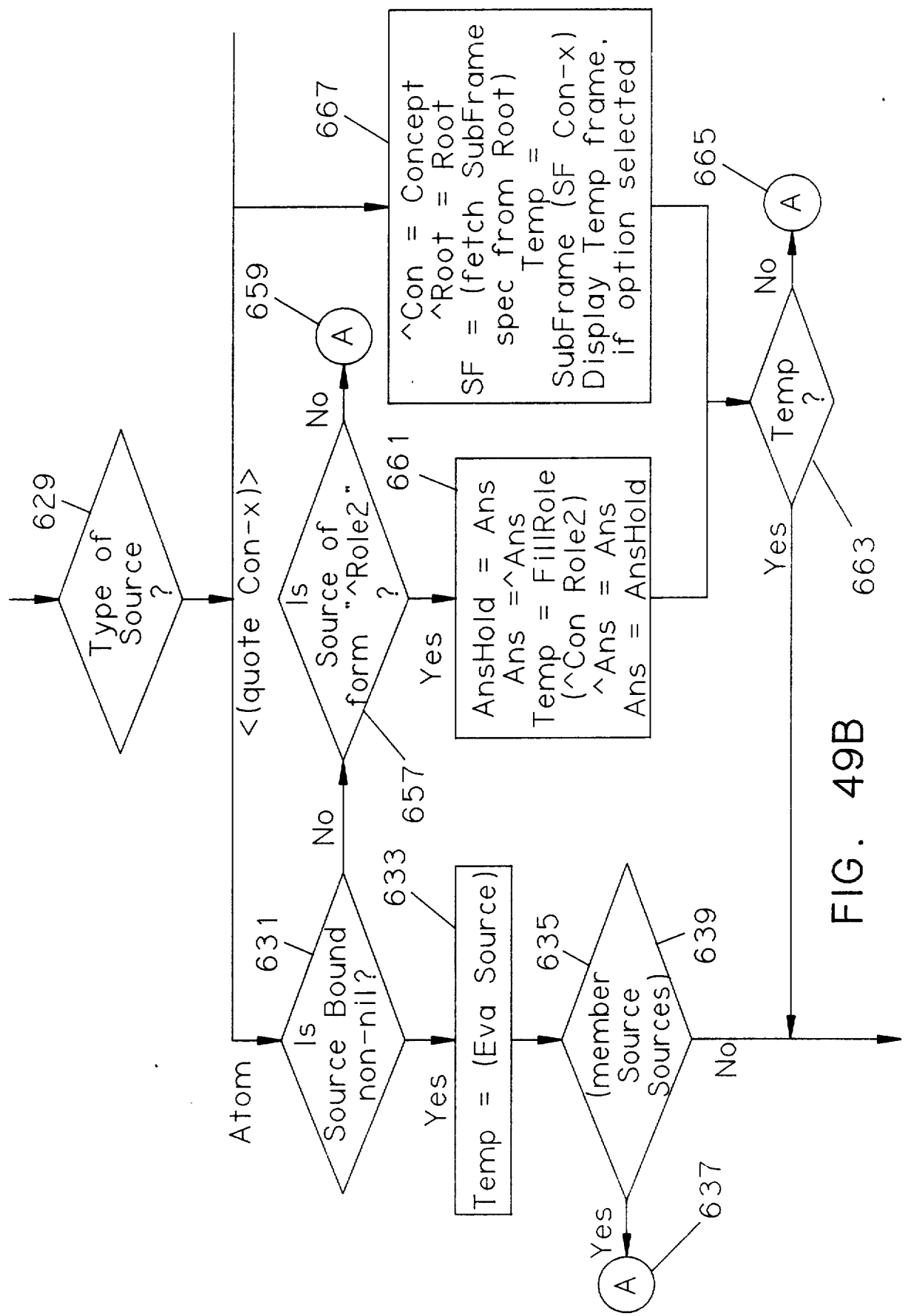
Figure 49C:
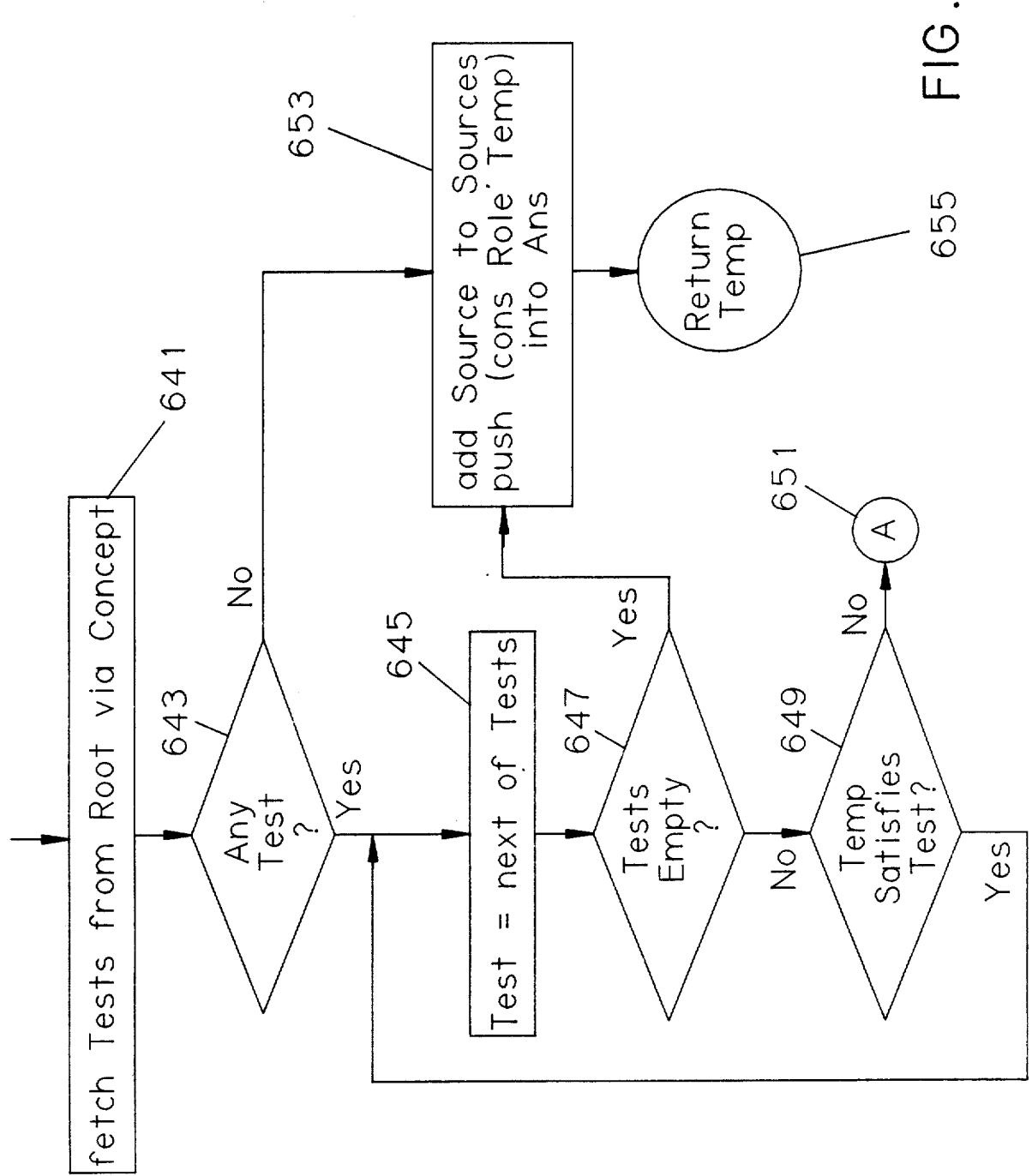
Figure 49D:
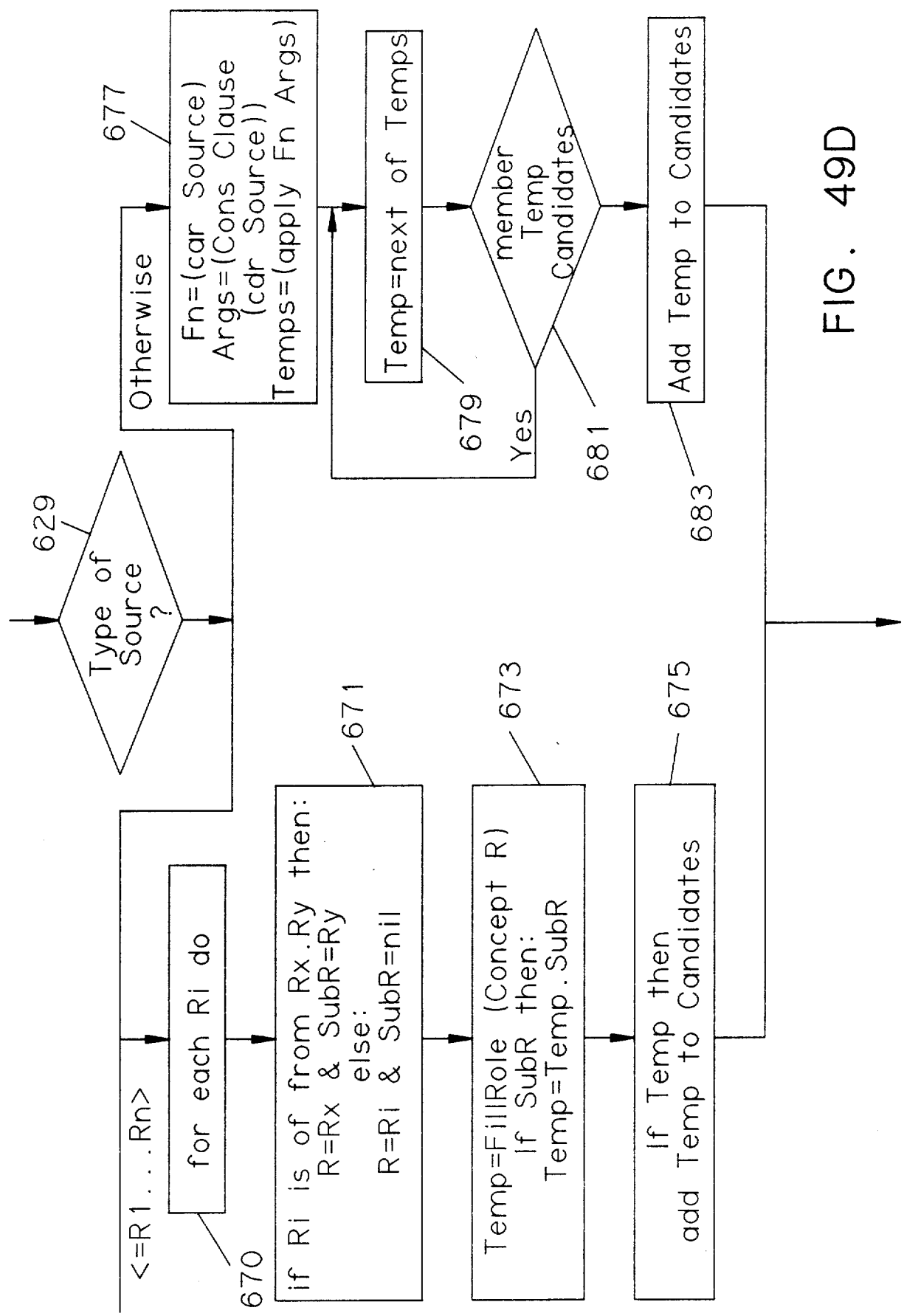
Figure 49E:
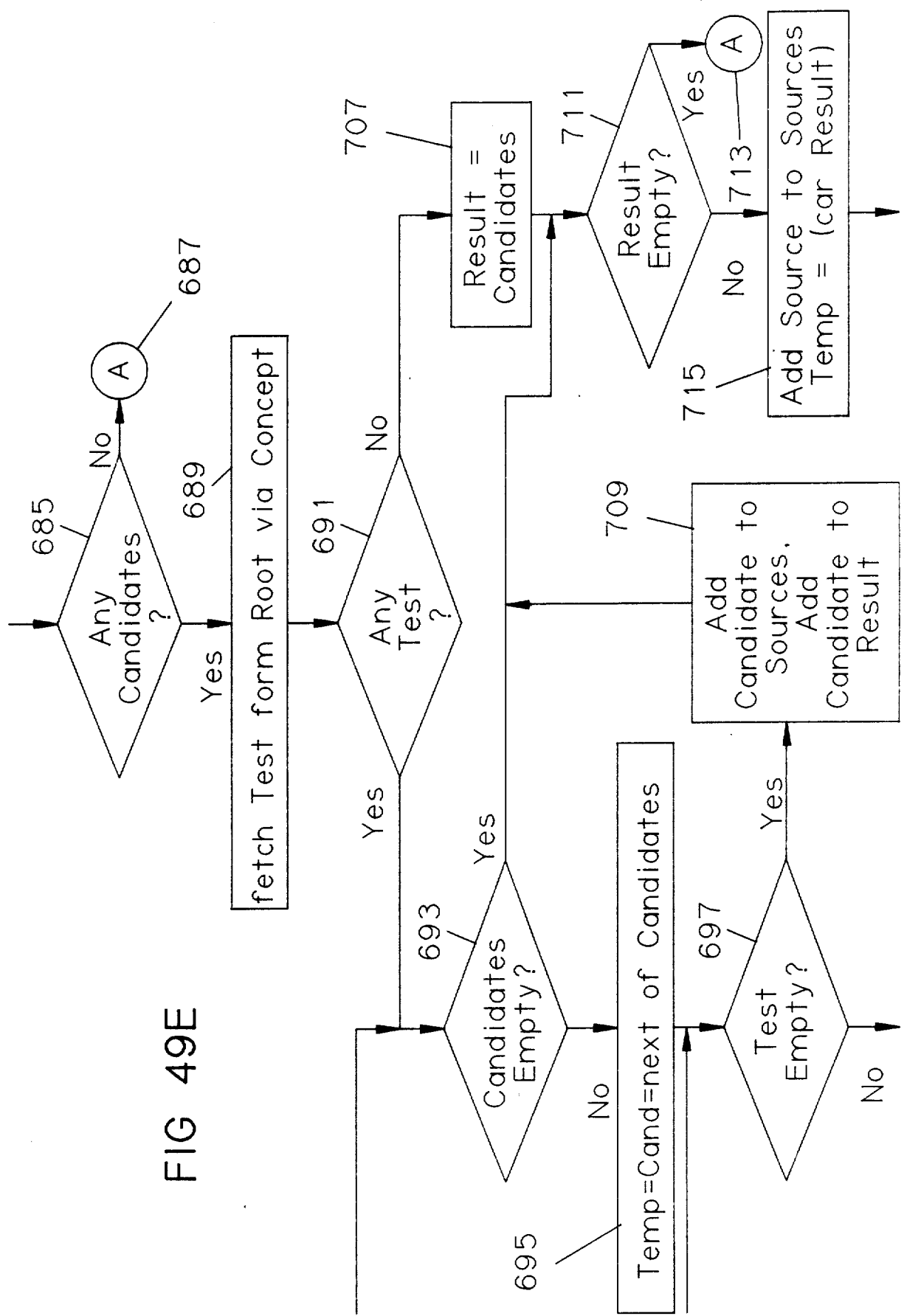
Figure 49F:
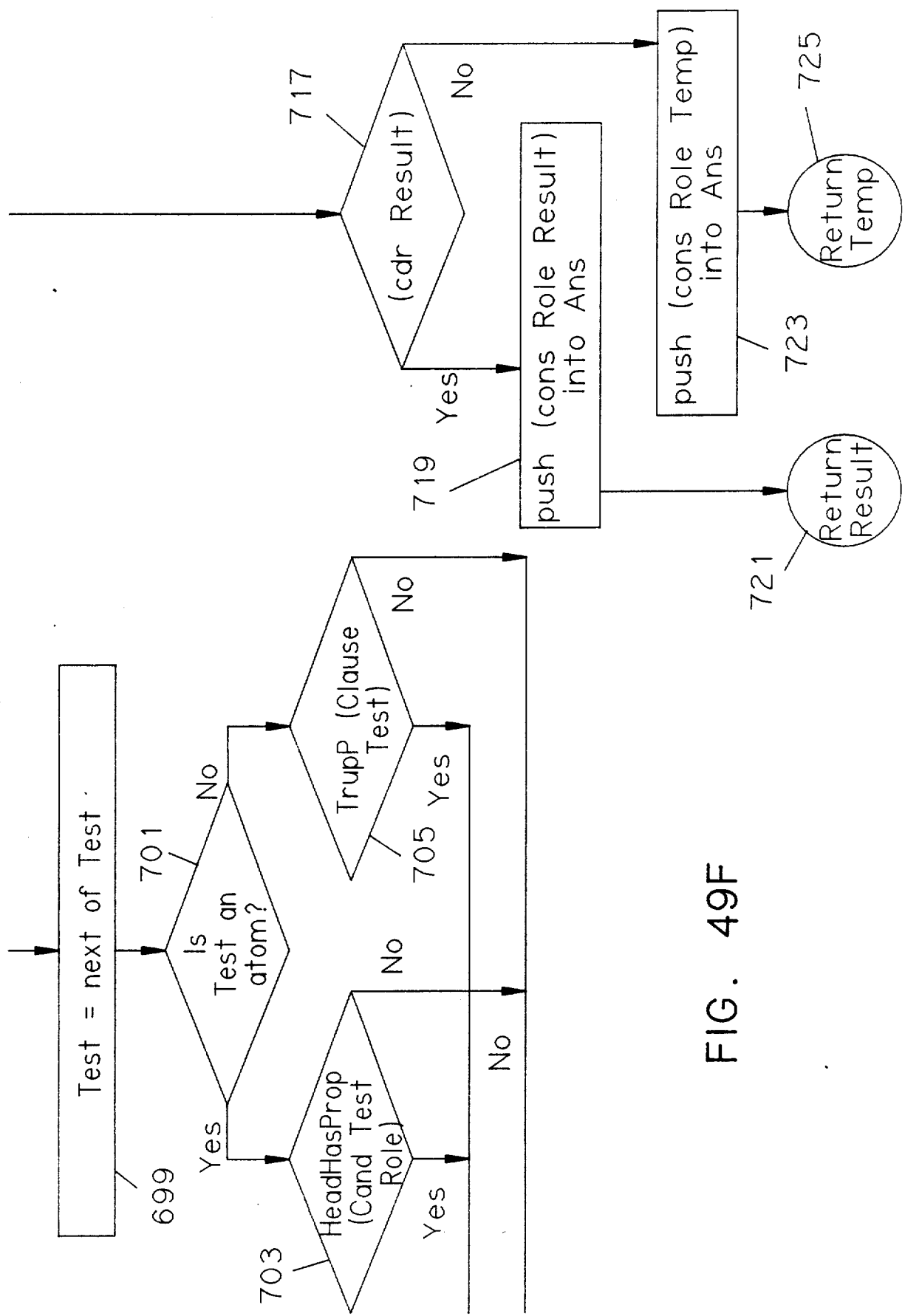

Now having reference to, the flow chart schematic diagram of FIGS. 48A and 48B the CaseFrame function 573 (FIG. 48) maps a configuration of syntactic registers into a semantic frame consisting of a concept and associated roles. The syntactic configuration of the current clause is bound to the global variable "Star". The main loop cycles from 577 through 611. On each cycle, a specific sense of the main verb is considered. The concept associated with that sense is fetched (593); if none is found, the system either asks the user to supply it (601) or returns immediately from CaseFrame (599). This feature provides the flexibility to enter new verbs without having to completely specify all their features. The specification can be completed at some convenient later time.

The set of propositional case roles is fetched from the verb sense or inherited from the associated concept or one of its ancestors in the AKO (A Kind Of) network (603). For each role, the function FillRole is called at 605 (see discussion of Figure 49, below) to attempt to map a syntactic register into it. The role names and their fillers are collected in the list ANS. When this has been done, it is required that all Primaries (subject, direct object, indirect object, complement, and propositional embedded clause) present in the clause have been mapped into some case role; otherwise the proposed case frame is rejected (607) and the next verb sense is considered, if any. Assuming that the Primaries have been used, then the modal roles are filled in (609). Finally, if the case frame template specified that some roles are required to be present in the surface structure but they are missing, then this case frame is rejected (611) and the next alternative is considered.

If a case frame was successfully instantiated, then ANS is appended to Star, Star is marked as AKO the Concept (613), and the resulting configuration returned (615). If no sense of the verb results in an acceptable case frame, the function returns nil (579), i.e., failure.

Now referring to FIGS. 49A through 49F the Fill-Role function (617) is called by CaseFrame and Noun-Frame to fill a case role from some syntactic register. If the role had already been filled (619) on a previous call, that filler is returned (621). Otherwise, the potential sources of fillers of this role are fetched from the word sense or its associated concept (623). The main loop (625, 631 or 651 or 659 or 665 or 687 or 713) considers each potential filler until one is found that satisfies all specified constraints. The filler specification may be an atom (631), a quoted concept name (667), a list of the form "(=R$_1$ ... R$_n$)" where each R$_j$ is another role name (669), or a functional form (677). If it is an atom, it should be the name of a syntactic register (e.g., Subject), whose binding, if it exists and is not already the source of some other role filler, is considered as the filler (633), or else it should be of the form ".Role 2" (657), in which case the filler of Role 2 in the case frame of which the current one is a subframe (667), is considered for filling the current role as well. If it is a quoted concept name (667), this role is filled by a subframe of the current frame, as specified in the current root word or concept. If it is of the form "(=R1 ... R$_n$)" (669), then each of the fillers of these other roles is considered as a candidate filler of the current role also; if one of these is of the form R$_x$.R$_y$, then the filler of role R$_y$ of the subframe that fills role R$_x$ of the current frame is a candidate filler of the current role. In the final case, the filler specification should be a list consisting of a function name and a set of arguments. The function is called with the bindings of these arguments along with the configuration, if any, of the phrase in which the current configuration (Star) is embedded. (The upper phrase is called "Clause" in the drawing, but may be a noun phrase, prepositional phrase, etc.) If this function application produces a potential filler that does not already fill a role in the current configuration, it is added to the list Candidates.

In all cases where candidate role fillers have been found, any constraints specified in the case frame template are tested (649, 703, 705) and the candidate is accepted only if all are satisfied. If this is true, the candidate is added to Sources (653, 709) to record its use as a role filler. In the first two cases (source specification was an atom or a quoted concept), the single filler is returned (655); in the other two cases, there may be a list of fillers (721) or a single filler (725).

5.1.3 Constraints

Constraints restrict what may fill a role. These are specified in the "@" slot or facet and, like the mappings, usually have defaults in the role objects, but these can be overridden in specific concepts or verbs. For example, as can be seen in FIG. 26, the head of a noun phrase that fills the Recipient role must normally be animate. A general rule that has been followed in establishing the roles is to distinguish between animate and inanimate entities whenever the capacity to make decisions is integral to the role in a proposition. Another rule has been to distinguish between clauses vs. NPs as role fillers.

5.1.4 Verb Types

A proper understanding of the case roles requires awareness of the different types of verb. Every verb expresses a proposition about the world. There are only two primitive things that can be described by propositions: states and state changes. Theoretically, everything that can be asserted about anything can be framed in terms of these two primitives. In fact, state changes are so important to people, that one even looks within them. Verbs therefore form three semantically distinct categories: stative verbs, which describe states of the world; process verbs, which focus on state changes as entities extending over a noticeable period of time; and action verbs, which focus on the outcome of state changes (the duration is short or of little interest).

5.2 PAKTUS Roles

5.2.1 Role Categories

The case role categories represent in a very general way the roles played by the participants in the concepts represented by verbs. They are usually reflected in the syntax. For example, a Doer usually appears as the subject of a clause (after normalization of passives) whereas the object (the central entity in any concept; the thing operated on) is often the direct object. The specific roles under a given category are distinguished principally on semantic grounds. For example, both Agent (the boy broke the window) and Instrument (the rock broke the window) appear on the surface as the Doer of an action, but the Agent acts of its own accord, whereas the Instrument is employed by some unmentioned Agent.

At the highest level, there are three types of case role: Object, Doer, and Locative. The Object is the most central role; every proposition has one, although it is sometimes implied by the verb rather than explicitly stated. The Object is the entity about which the proposition is concerned: the thing in the state, or undergoing the process or action indicated by the verb. The many semantically different roles an object may play are shown in FIG. 22 above, and are explained below. The default syntactic source of fillers of these roles is the direct object register, except as noted.

As the name suggests, the Doer is the proximate cause of the process or action. It is subdivided into Agent and Instrument, depending on the animacy of the filler. The default source is the Subject. the Locative roles specify location, in a very general sense. This may be location in space or abstract location of possession. (Location in time could also be included here, but it does not seem ever to be propositional.) It also includes Source and Goal subcategories for location changes.

5.2.1.1 Agent and Instrument

The Agent is the animate entity which deliberately causes a process or action. It is usually a person or animal, but may be an organization of people or any complex system that can be said to make decisions. An instrument appears syntactically like an agent, but does not act of its own accord. A useful syntactic test that distinguishes Instruments from Agents is that one can usually say He did it with (Instrument), but not He did it with (Agent) (with the meaning of "using" rather than "accompaniment"). Note that there is also a modal Instrument role. This is typically filled by the object of the preposition with.

5.2.1.2 Affected and Experiencer

These roles represent the entity "operated on". Any noun phrase may fill the Affected role. The Experiencer role is reserved for verbs in which an essential aspect of the proposition is that some mental activity is triggered in the object. For example, in I told the boy a story, it is implied that the boy mentally processed the story. The correct analysis of tell and related verbs is that the agent engages in some activity (speaking, etc.) which induces mental activity in the hearer.

The default source of the Experiencer are the subject and indirect object, if non-empty and animate; otherwise the direct object. The Affected source defaults to direct object, but an important exception is the copula, wherein the subject is the Affected.

5.2.1.3 Effects (Result, Attribute, Event)

Effects generally did not exist before the action specified by the verb took place. A Result role is filled by a noun phrase denoting an entity brought into existence by the action (She made me a cake). An Attribute is a property that an object did not previously have (She made me happy) or that was not previously present in the discourse (She is happy).

An Event is like a Result in that it owes its existence to the verb, but it is a state, process, or action rather than an object. It always appears as a clause (she made me cry) rather than a noun phrase.

5.2.1.4 Assertion, Focus, purpose

These correspond to mental activity that is intrinsic to the proposition. An Assertion is another proposition. It typically appears as the object of a mental verb (She saw that he was there) and is always a clause. Focus is like Assertion (She saw him), but is a noun phrase and may appear as the object of the prepositions about or of. Purpose indicates an action or process whose enablement is part of the proposition (They prepared to leave). It is always a clause. (Note that the more common purpose (often introduced by in order to) is modal.) Purpose might be adequately treated as an Assertion rather than as a separate role. Only a few verbs require it, prepare being the principal one.

5.2.1.5 Material

Material represents a substance consumed in the course of an action or process, as in they ate dinner. It seems semantically important to distinguish this from Affected, which is the role that would otherwise subsume it.

5.2.1.6 Resistance (Opponent and Opposition)

So far as applicants are aware, these roles have not appeared in prior art discussions of case grammar, but they are important if one is analyzing plans and actions of rational agents. The information they convey is, of course, implicit in the verbs to which they are appropriate, as in the battalion was completely demolished wherein the battalion is an Opponent as well as an Affected. The issue is essentially pragmatic: is the notion of Resistance important enough that it be labeled whenever it is present; or should the discourse analyzer be required to pull it out of the verb as needed?

The only difference between Opponent and Opposition is that the former is animate whereas the latter is not.

5.2.2 Modal Roles

An illustrative set of modal roles is briefly described below.

Time (When, Begin, Finish) might have been placed under the Locative category, but it does not seem ever to be propositional. (A time specification might appear in a propositional role, as in Monday is a holiday, but its role there is as an Affected, not as a Time; its being a Time is incidental to the proposition.) All three specific Time roles are constrained to be time specifications. The default source of When is the prepositional object of at or on. The source of Begin defaults to the object of from. Finish normally appears as the object of to, until, or till.

Manner is filled by the adverbs in the clause.

Beneficiary must be animate, and is the object of the preposition for. It is like Recipient except that it is not propositional. Almost any process or action may be done for some Beneficiary.

Accomplice (not shown in FIG. 51) is an animate entity which is an accompanying agent. It is usually the object of with.

Method indicates how something is accomplished. It often appears as an -ing clause following by.

Cause would generally be a conjoined clause (introduced by if, because, etc.) that specifies the cause of a state, process, or event.

mPlace indicates a location that is not essential to the proposition. The default source is the object of at, on, in, or between.

mInstr indicates an inanimate instrument whose role is only incidental. It is usually the object of with.

mPurpose is a non-propositional purpose that may be associated with almost any process or action. It is usually an infinitive clause introduced by to or in order to.

5.3 The Concept Network

Figure 22A:
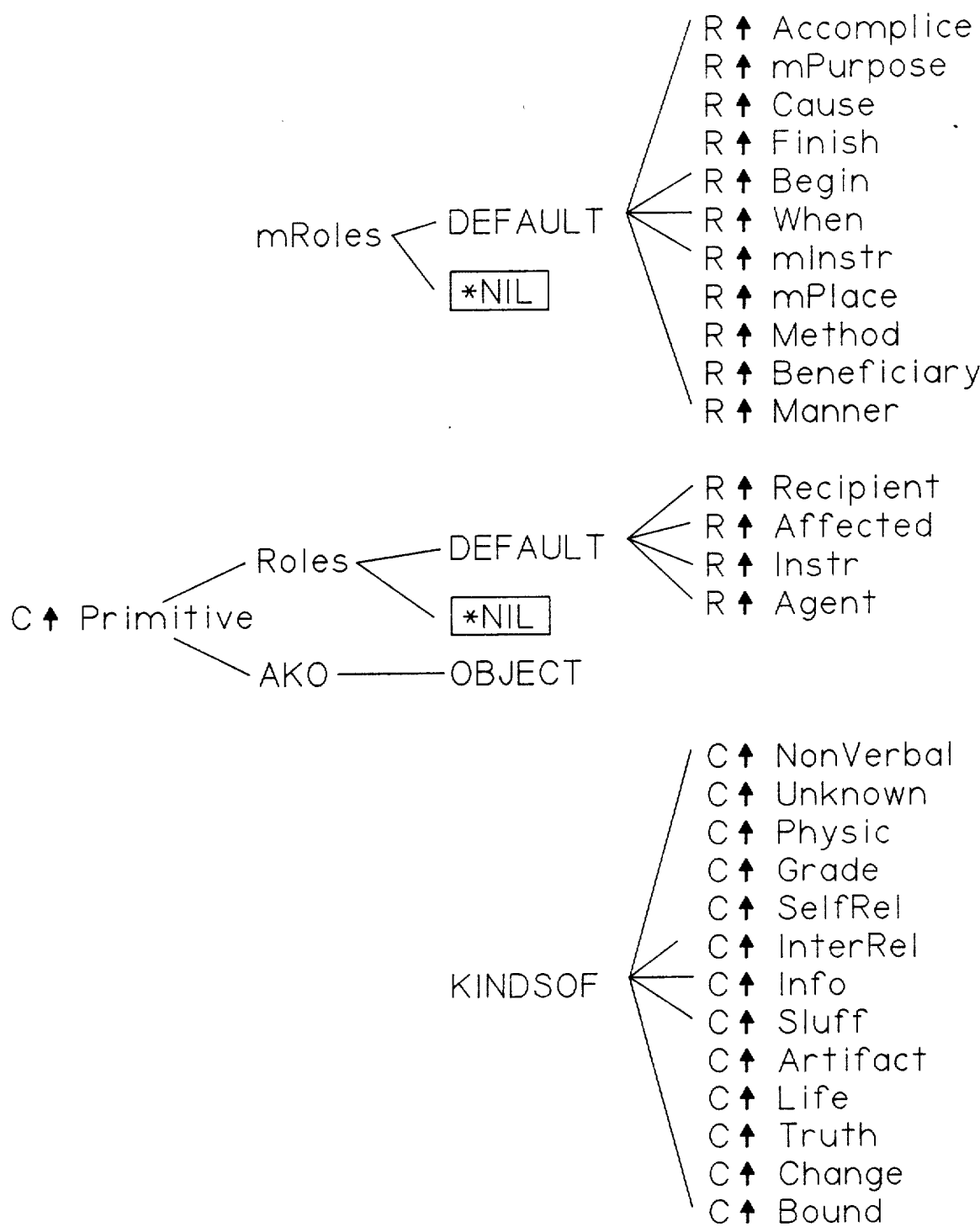
FIGS. 22A and 22B show a fragment of a concept network in accordance with the preferred embodiment.
Figure 22B:
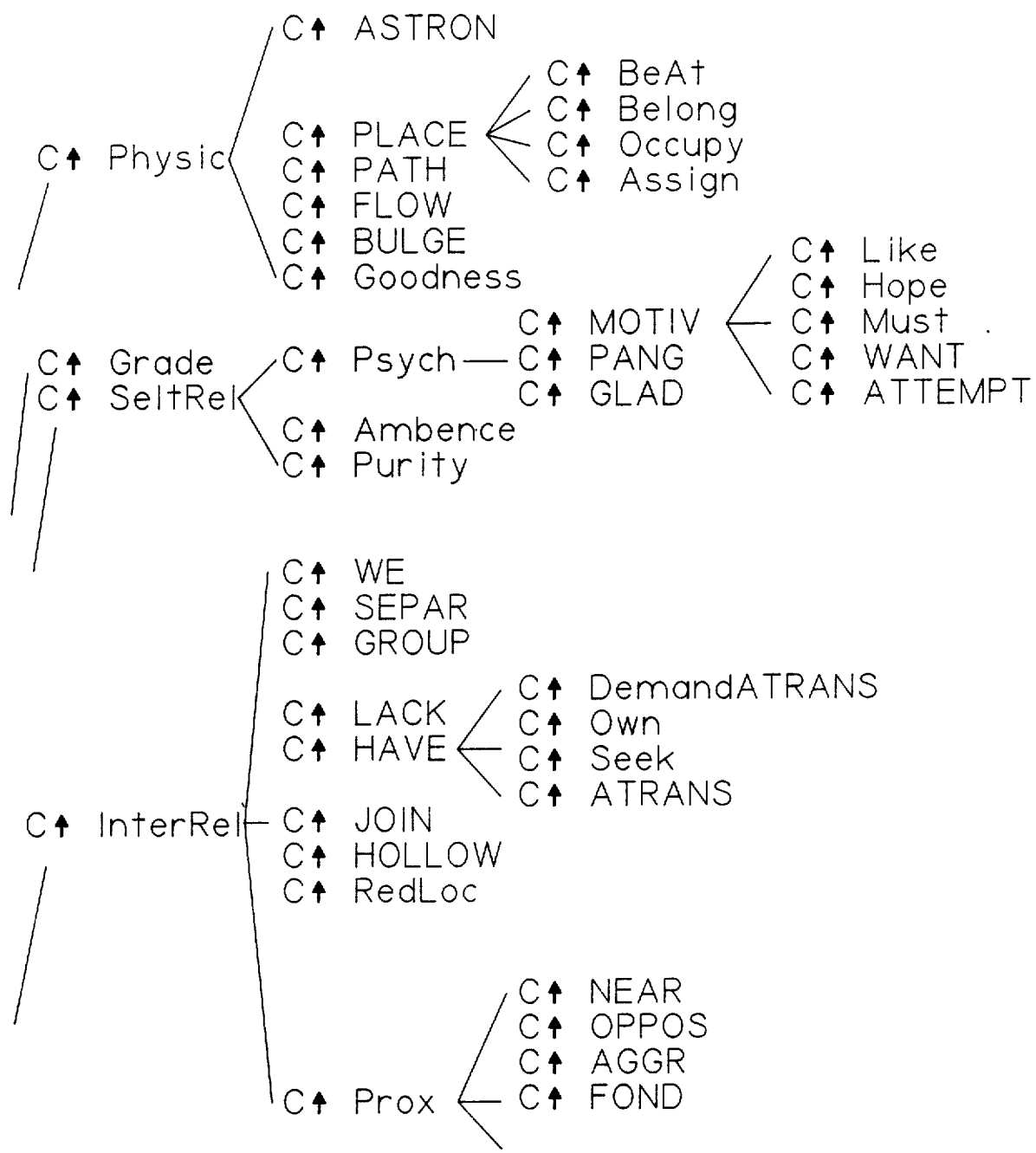

FIGS. 22A and 22B shows the root node, C ↑ Primitive, with the first level of concept partitioning and the default roles; a partial display of the concept network is given. This concept network might need to be slightly modified for particular applications. The invention provides suitable tools to effect such modifications in a straightforward manner.

The concept network makes use of many PIKS object-oriented programming features: inheritance, inverse links, message-passing capabilities, etc. (see Section 2 above). The structure is also hierarchical to the extent that some concepts are more inclusive, or primitive, while others are more specific and can inherit information from their more primitive AKO ancestor links. The link from the lexical item to the concept network is the Concept slot used in the lexicon; its inverse link in the concept network is LexForm.

Instantiation, manipulation, editing, etc. of the objects in the concept network may be accomplished with the PIKS Browser (Section 2.4 above), or with other interactive tools for this purpose. This makes it extremely easy to test and modify the specifications for a particular concept.

The simplest concept frame possible would have only a Lexform slot (indicating the lexical items which invoke it) and an AKO slot (showing the parent concept from which all other information would be inherited). The consequence of having such a concept frame would also be very simple: the only difference between it and its immediate parent would be the name of the concept frame which PAKTUS returns. The real need for concept specification, though, is (1) the ability to associate different lexical items which mean the same thing (e.g., "give" and "hand over") even when they exhibit different syntactic characteristics; and (2) the essential ability to distinguish different meanings of an ambiguous word by specifying the roles which must be present and other semantic constraints that must hold for each of its interpretations (e.g., "He made John a boat" and "He made John a deputy").

5.3.1 Case Frame Templates

The essential information about roles which is placed in the case frame template is:

Which propositional roles can participate in the concept being defined

Where the role fillers are to be found in the syntactic structure

What the restrictions are that determine whether or not a candidate role filler may participate in the concept.

Figure 23:
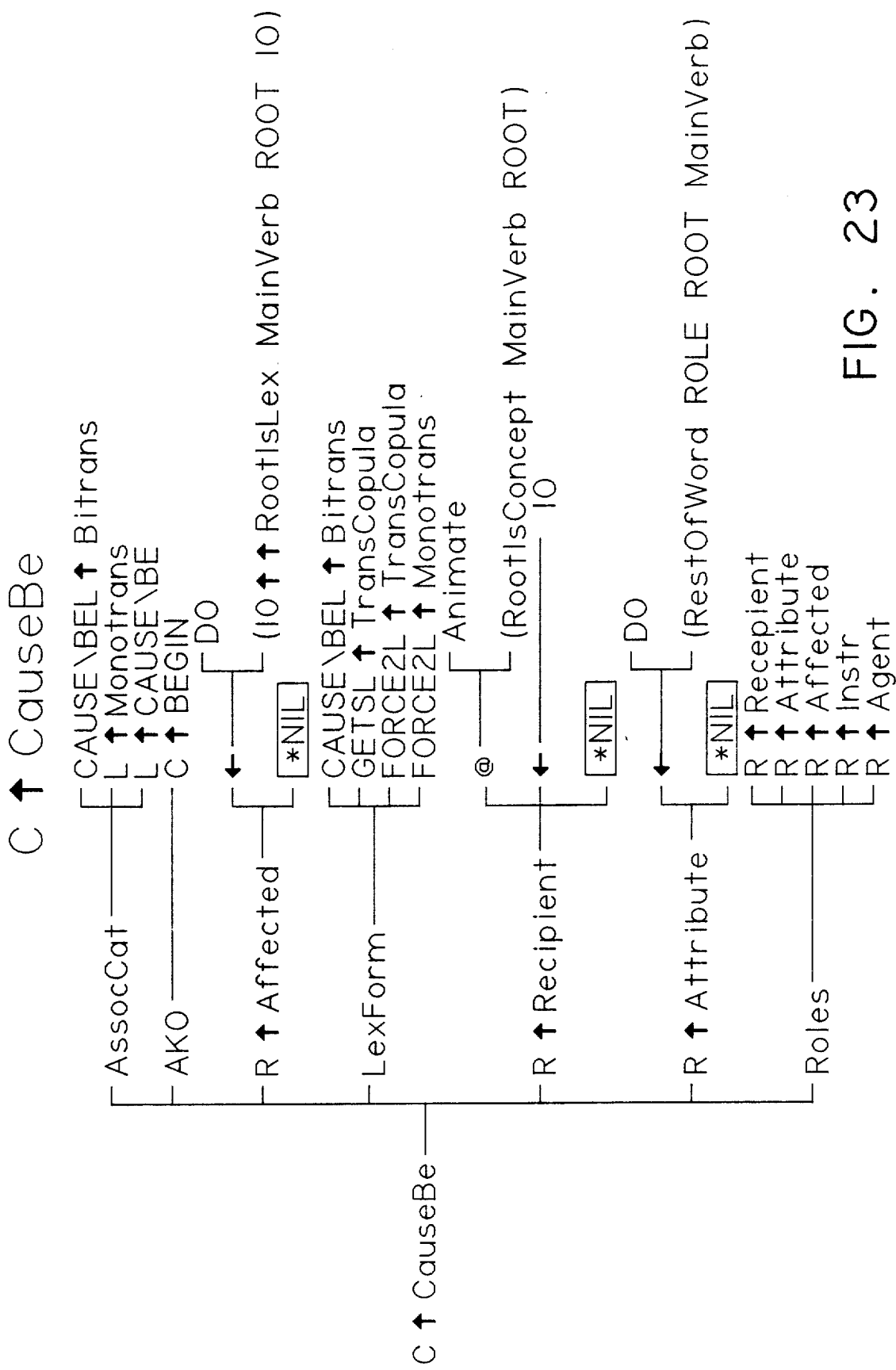
FIG. 23 is a screen image showing the CauseBe Concept Object.
Figure 24:
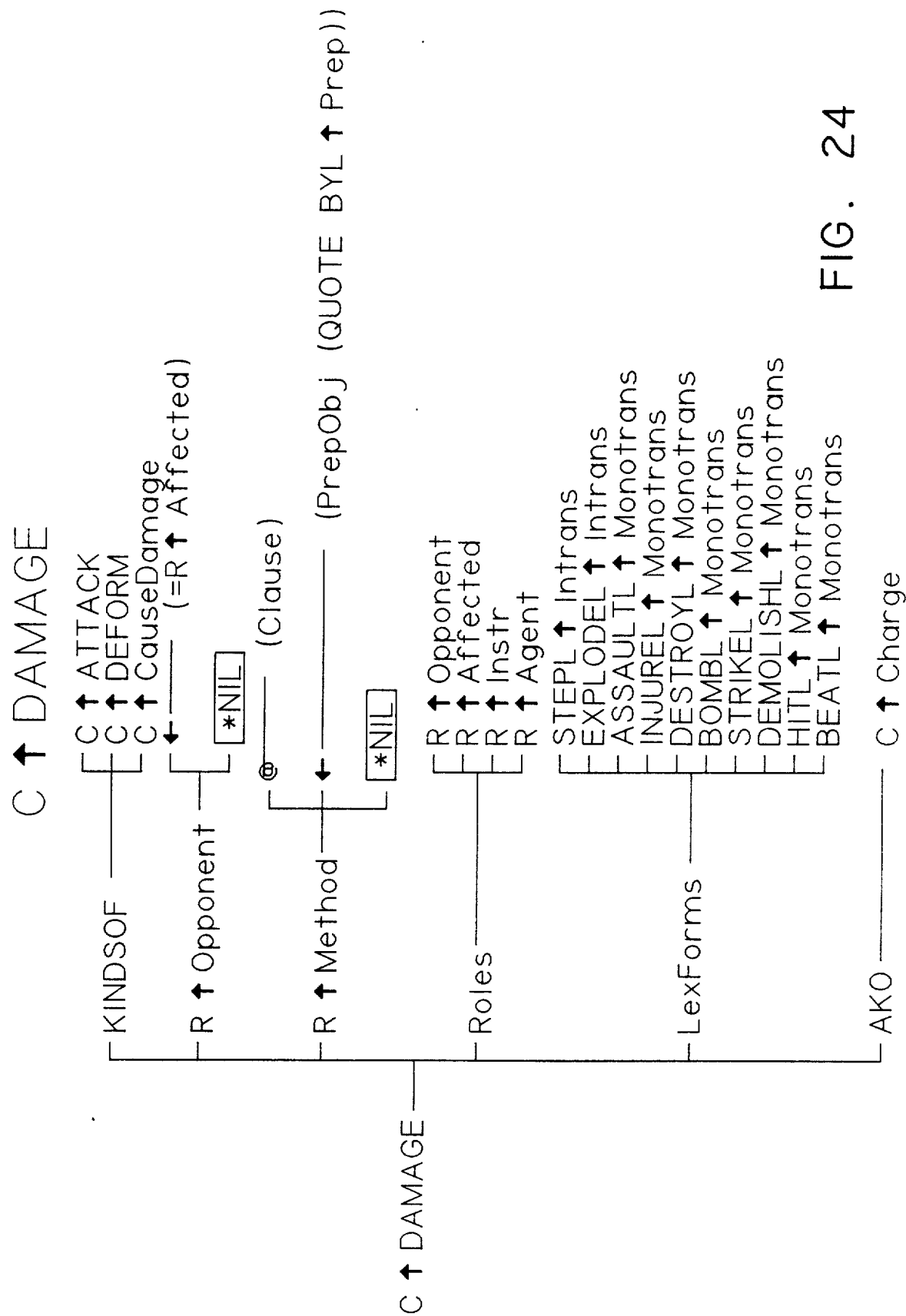
FIG. 24 is a screen image of the damage concept.

The ways in which these three kinds of information are represented in the concept frame are discussed below. Subsection 5.3.3 below presents a more detailed description of how PAKTUS actually interprets the objects in the concept frame as it tries to fill the roles for a particular concept using the syntactic constructions produced by the parser. Reference to FIGS. 23 and 24 will make the following discussion easier to follow.

The values on the Roles slot of a concept frame tell PAKTUS which roles participate in the concept defined. (Note that the role names are prefixed with "R ↑. Also note that the role set may currently be overridden in a particular lexical form of a concept.) The absence of a Roles slot will cause PAKTUS to search the AKO links for a parent concept which does specify a list of allowable roles. Conversely, the presence of the Roles slot overrides the inheritance and, therefore, all propositional roles which legitimately can participate in the concept must be specified in one frame.

For each role specified in the Roles slot, or inherited by default, information about where PAKTUS should look for candidates to fill that role may be specified. This information is stored as the value of the "←" facet of the slot named by the role. In the absence of this facet, PAKTUS will use the AKO link to search for sources specified in any parent concepts. Failing that, PAKTUS will use the default source specification found on the frame for that specific role.

Note that the source can be quite arbitrary in its specification. In the CauseBe concept frame (FIG. 23), the source for the Affected role will either be found as the non-NIL evaluation of a LISP expression or as the Direct Object of the parse which PAKTUS has produced. If both of these evaluate to NIL, the concept will be instantiated without that role being filled. When the source is specified by a user-defined function, however, that function must return the candidate(s) as a list.

In the DAMAGE concept frame (FIG. 24), the source for the Opponent role is specified as equivalent to the filler of the Affected role. The ability to define concurrent roles is essential for some verbs (e.g., the "sense" verbs such as "touch", "taste", etc. have the same filler for the Agent and Experiencer roles), and the "=" function provides this facility.

In many cases, the default constraints on a particular role filler must be overridden, or more carefully specified. The "@" facet of the particular role slot provides this capability. Again, this specification may be as complicated as needed. In FIG. 11, the filler of the modal role Method is restricted: it must return non-NIL from the user-defined function "Clause". Note also in FIG. 10 that the Recipient role must meet two qualifications in order to fill that role: it must return non-NIL from the function "RootIsConcept" and it must have the property Animate.

The simple property specifications are tested automatically by PAKTUS. They are defined on—or inherited through—the Mode facet of the AKO slot, and include such obvious semantic features as Concrete, Animate, Loc(atable), etc. Properties are used extensively in the determination of role fillers because they propagate quite naturally along the KINDSOF link and reflect characteristics which appear to be largely context free. In other words, if a lexical category is marked as Animate, those subcategories which it subsumes will by and large inherit this property without qualification. There are, of course, situations in which this is not the case, and there is a mechanism built into PAKTUS for handling these cases—a form of non-monotonic logic.

Properties may be entered manually from a Browser window using the AddNode and AddLink selections from the Browser right button menu, or the Edit Prompt selection from the left button menu. They may also be added functionally with FRAMEPUT The Mode facet, if it does not already exist for the lexical item, is added to the AKO slot, and its value is the property (or properties) which that node in the lexicon can legitimately pass on to its KINDSOF daughters in the structure. Inherited properties are overridden in a specific lexical item by placing a special form in the value of the Mode facet: ~[ParentPropogatingProperty][Property]. For example, the lexical item L ↑ Bird might be given the property CanFly; in order to override this property for the lexical entry for "penguin", its Mode facet would contain the value ~L ↑ BirdCanFly.

Several points are worth noting concerning the structure and operation of the concept frames and their slots in PAKTUS:

The source slots (left-arrow) for any particular role are logically ORed. In other words, the source will be the first of those specified on this facet that meets the restrictions, and these are evaluated in the order in which they are stored on the slot (which can be seen in the Browser window by reading from the bottom up).

The restrictions placed on candidate role-fillers (the @ facet) are ANDed by the rule system: the candidate must meet all the criteria.

Any particular concept may be instantiated (i.e., accepted as semantically valid) without necessarily filling all its roles. The principal reason for a concept to be rejected as a candidate is the inability of PAKTUS to find a role for one of the principal syntactic constructions, not the inability to fill a role. (In the preferred embodiment, these constituents are defined as Subject, Direct Object, Indirect Object, Proposition, and Complement.) In other words, all the roles which are fundamental to a particular concept may not be present in the surface structure: a role may, for example, occur in another clause or sentence, or it may be assumed from the discourse context. This phenomenon may be handled by the separate analysis module 130, or Domain Knowledge Templates 135 (see Section 6, below).

Because there are cases in which the legitimacy of a concept is determined by the mandatory appearance of a certain role in the clause, or because the presence of that role will assist in the disambiguation of competing concepts, there is a "Required" slot which allows this level of specificity.

5.3.2 Case Frame Instantiation

The case frame instantiating function, called Case-Frame, is invoked whenever a syntactically valid clause is parsed. A similar function, called NounFrame, is invoked when a noun phrase is completed, although only a few nouns have associated case frames. Case-Frame iterates through each sense of the Main Verb of the clause until a case frame is successfully filled out.

Assuming that the Main Verb does have (or inherit) a case frame template, CaseFrame attempts to fill the propositional roles specified. If any of the primary syntactic constituents can not find a role to play in the frame, it is rejected. Otherwise, the modal roles are filled next, with no requirements for what is or is not filled. Finally, any role requirements specified in the Required slot are tested. If none of these tests fails, the case frame is appended to the list of syntactic registers; otherwise, it is rejected. In one embodiment, the system accepts the first sense of the Main Verb which can be instantiated. Preferably, however, the system collects all plausible senses and passes them along to the discourse analyzer 130 for disambiguation.

The principal subprocess of case frame instantiation is case role filling. This is done by the function FillRole for both propositional and modal roles. An understanding of the details of this function will assist one in correctly specifying sources and constraints for case frames. FillRole first fetches the source specification and tests each candidate source in turn. A candidate may be the name of a syntactic register, in which case that register is considered if it has been filled and has not already been assigned to a case role. The registers known to FillRole are Subject, DO, IO, Comp, Prop, ?Elt, MainVerb, Mods, and Adv, so these may be specified as sources for case roles although the last three would normally be subjected to some additional processing to extract a source.

If the candidate is a quoted symbol, then that symbol is considered as a subframe of the main case frame. It should be a concept name. This permits more general conceptual structures, composed of collections of case frames organized around a top level frame.

If the candidate is of the form (=R ↑ Role), the filler of Role (another case role) is considered for the current role as well, if non-NIL. For example, the filler of the R ↑ Donor role of "give" is (=R ↑ Agent).

In any other case, the role source specification must be a list of the form (Fn arg$_1$ arg$_2$ ... arg$_n$ SourceName)

Fn is a user-specified function of the arguwhere ments (Parent arg$_1$ arg$_2$ ... arg$_n$) Parent is the register list one level above that of the clause for which the case frame is being filled. It is added to the argument list of the source specification by CaseFrame. The arguments arg$_1$ arg$_2$ ... arg$_n$ are as specified by the user. They will be EVALed so they must be quoted expressions or forms that use bindings available at run time to FillRole (i.e., SPECVARS). The variables whose bindings are available are the nine registers listed above plus Head and Desc if FillRole was called from NounFrame, and also Con (the concept associated with the Main Verb), ROLE (the name of the role being filled), and ROOT (the lexical root of the Main Verb). SourceName should be included if Fn consumes one of the five primary registers, and in that case should be the (unquoted) name of that register or another form that returns the contents of that register. This is necessary to inform CaseFrame that such a register has been consumed. This situation arises when the source might be a particular register, but must first be subjected to some special testing or other processing. See the R ↑ Affected role of the C ↑ CauseBe concept while using PAKTUS for an example. Fn should return a list of candidate fillers, even if there is only one. FillRole will not accept any candidate that already fills some other role. The first candidate that passes the testing described in the next paragraph is accepted as the filler.

Assuming a candidate role filler was found, FillRole then applies any tests associated with the role for the current case frame. If the test is an atom, it is assumed to be a property specification for the Head of the candidate, which in that case must be a noun phrase. The Head must have the indicated property, unless the first character of the atom is "~", in which case the Head must not have the property named after the "~". If the test is a list, it is passed as a predicate to TrueP along with Parent as the Requestor, and the candidate is accepted only if the result is non-NIL. The function in such a predicate may use freely any of the variables mentioned in the preceding paragraph, plus the variable TEMP, which will be bound to the candidate role filling structure.

5.3.3 Associating Verbs with Case Frames

Concept association and all case frame template specifications are acquired using the menus and prompts provided by PAKTUS when a new lexical item is learned, or at some later time convenient to the lexicon developer. This process was discussed in Section 4 to some extent, but is expanded here to include how the menu-driven interaction asks for and processes concept information.

Two notions of word definition should be kept in mind:

- Different uses of a word may be distinguished by syntactic categories (e.g., "intimate" may be used as a verb or as an adjective).
- A word may have different senses within the same category (e.g., a "mouse" may be an animal or part of a computer, but in both cases, it is a noun).

In assigning concepts to verbs, it is crucial that the various senses of a verb be distinguished if PAKTUS is to handle different uses of that verb. It is not necessary to enter more than one sense during an acquisition session; it is fairly easy to add distinctions at a later time if it is found that they are needed. The following discussion is therefore divided into the procedures for entering a completely new verb and those for adding a new sense and/or derived form to a word which is already known in some form.

5.3.3.1 Adding a New Lexical Item

PAKTUS can acquire new words when encountered, or the acquisition module can be manually invoked. Regardless of the method of invocation, the essential information acquired in the process is the same. FIG. 27 shows the initial menu interaction which PAKTUS provided when it first encountered the word "explore". As these menus are filled in (followed by selection of OK at the top), the syntactic information tells the system how "explore" will combine and interact with other lexical items in an English sentence.

Following the syntactic menus discussed in Section 4, PAKTUS will immediately begin to ask the user to supply the information necessary for the concept association. FIG. 28 is a snapshot of these menus, which specify not only the concepts and subconcepts associated with the verb "explore" but also the roles that will be specified for that verb. Temporarily placing the cursor over a concept (as indicated in the first menu, where C ↑ Info is outlined) will cause the system to display the subconcepts (if any) as an aid to making decisions about the proper conceptual path. Once a concept or subconcept is selected, however, the menu will disappear and the next menu will be shown.

The system will now display, in the TTY window, a series of questions concerning the sources and restrictions for the roles specified for the verb being defined. FIG. 28 shows the prompts generated by PAKTUS for the verb "explore". First the default specification (for both the source and restrictions) will be displayed, then PAKTUS will ask whether this default should be retained or overridden. Keying in the right bracket, "]", will accept the default; keying in a new source or restriction will cause the system to accept that information and to prompt for further specifications (e.g., other source candidates or restrictions on them).

Following the full specification of sources and restrictions, a menu will pop up to allow the user to specify a "Modality" for the item. The "Global Requirement" prompt which follows allows the user to specify mandatory conditions for particular roles with certain Boolean expressions allowed as follows:

The occurrence of an atom or list of atoms in this slot indicates that the role(s) must be present in the current clause.

Alternative mandatory roles may be ORed; for example, (OR role1 role2).

The presence of a role may also be forbidden by using (NOT role1).

The Global Requirement slot not only allows the user to be very specific in defining legitimate case frame instantiation, but also provides the vital ability to discriminate between different senses of the same lexical item based on what appear to be subtle syntactic differences.

5.3.3.2 Adding New Senses to an Existing Lexical Entry for a Verb

This process is necessary when a new, underived sense for a verb must be added to the lexicon. The underived, or irregularly derived, senses of a verb are distinguished from those which have a morphological relationship that follows the general rules of derivation. For example, "heat" and "reheat" exhibit a regular derivational relationship, while "move" and "remove" no longer bear this relationship to each other and would be entered as completely separate lexical items.

In particular, different concepts that share the same lexical form are considered in PAKTUS to be irregularly derived. The example presented here is the case of the verb "burn": "The house burned furiously" (C ↑ DAMAGE) and "The lamp burned brightly" (C ↑ EnableView). What is needed here is the ability to have the same sequence of characters—the token "BURN"—cause the system to consider the variety of concepts which it might represent. In order to distinguish the concepts, the initial entry for the item can be entered as it appears, with subsequent senses being entered with the numerals 2 through n appended to the root token, or as synthetic tokens suggestive of the meanings, and defined as primitive forms from which the initial entry is "irregularly derived". This convention was used in PAKTUS. In this way, all senses are associated through the English token they share, while remaining distinct in their individual case frame specifications and concept associations.

The menu-driven process for entering new senses is shown in FIGS. 30A and 30B. The function Verify-Parse is used to initiate the procedure and provides the added benefit of displaying a menu of the currently known senses of the verb. (More detailed information is available from the ShowLexDefs option on the background menu.) Selecting OK from this menu causes the prompting to begin for acquisition of additional senses. In this example, the sense of verb in "The lamp burned brightly" will be defined on the object BURN2. (Note: In order to prevent PAKTUS from creating a dummy "UnknownWord" parse for BURN2, the LearnByAsking switch must be on.)

Because PAKTUS has never seen the Root word "BURN2", the lexical acquisition process described above is initiated. The process of selecting from the menus and answering the prompts is exactly the same as entering a new item, except in this case the concept desired is a new Subconcept of the concept C ↑ VIEW: C ↑ EnableView. Because at this point there are no subconcepts defined for C ↑ VIEW, the only one which appears in the menu is the "NewSubConcept" choice. Selecting that item causes PAKTUS to prompt the user for the name of the new concept. After the new name is entered, the user is again given the option of defining yet another subconcept; clicking the mouse outside that menu will associate BURN2 with the new concept C ↑ EnableView. Completion of the definition of the roles for the new concept (see FIGS. 28 and 29) will be followed by a prompt asking if BURN is an exact synonym for BURN2.

This prompt is actually asking the user to verify that BURN2 should be associated with the token "BURN", and that it is not an inflected form (such as "burnt") or a conceptual relative (such as "fuel"). The correct response is to select OK from the associated menu which pops up at the same time that the prompt is displayed. The verification menu will now be displayed with the new sense added to the menu; selecting OK from this menu indicates the user's satisfaction with the entries defined.

The prompting which now appears is the result of the recursive nature of the process, allowing the user to further define alternative senses of the new entry. One of the prompts, however, is included to allow the user to define possible, but unlikely, senses of the lexical item. This facility provides the gateway for domain-dependent senses, slang usage, etc.

5.4 Meronymy, Word Experts, and Prepositional Phrase Attachment

Meronymic taxonomies classify the relationships that are distinguished between entities and their parts. What has been long thought of as a rather uncomplicated but poorly understood relation is now seen as a complex of relationships that was largely obscured by the ambiguity of the word "part". Recent theoretical work by Cruse (1986) and Winston, Chaffin, and Herrmann (1987) has done much to clarify thinking in this area, and significant insights stemming from these papers have been incorporated into PAKTUS.

Figure 47:
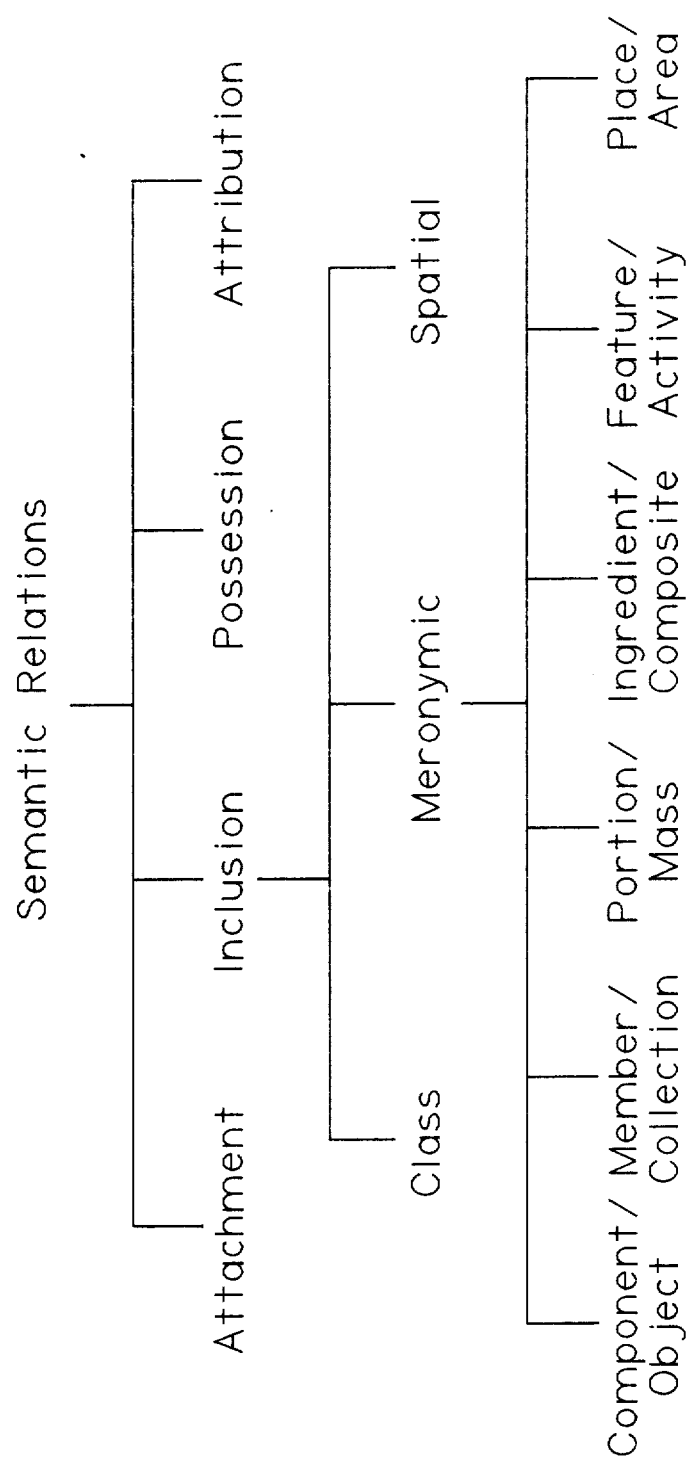
FIG. 47 is a schematic diagram of some PAKTUS semantic relations.

FIG. 47 (adapted from Winston, et al.) shows a summarized classification of the semantic relations represented in PAKTUS NLU systems. Distinguishing all of these relationships is critical from the point of view of both the lexicon and the analysis process, but the focus in this Section 5.4 is only on the leaves of the meronymic branch. Among other things, the specification of these "meronymies" allows PAKTUS to identify and correctly represent a variety of different nominal modifications. For example, the papyrus book, the library book, the book cover, the book manuscript, and so forth, each express a meronymous relation between the noun head and its modifier. In the first case, papyrus supplies the material, or "ingredient", from which the book is made. This is quite different from the second case, in which the Member/Collection relation is expressed. Likewise, the third example indicates a Component/Entity relation, while the last could be seen as a Feature/Activity relation. As is discussed below, this kind of information is also crucial in making proper judgments about prepositional phrase attachments.

Table 1, also adapted from Winston, et al., indicates how the character of the relation can help determine which meronymic relation is most apt for a given domain. In distinguishing between functional (+) and non-functional (−), one examines whether parts are or are not in a specific spatial/temporal position with respect to each other, which supports their functional role with respect to the whole. In distinguishing between homeomerous (+) and non-homeomerous (−), one looks to whether parts are or are not similar to each other and to the whole to which they belong. Separable (+) versus Inseparable (−) depends upon whether parts can or cannot be physically disconnected, in principle, from the whole to which they are connected.

Table 1 also includes the slot name (and the inverse link) used in the PAKTUS frame system to specify the relation. Once these relational links between specific items are added in the lexicon, PAKTUS can use the information to analyze and restructure difficult syntactic patterns of modification into useful formats. In particular, the correct treatment of prepositional phrase attachment has been made much more robust through the application of this technique.

The adverbial use of the PP is handled in PAKTUS by the case frame mechanism (described above). In this case, the PP fills a specific role in the concept specified by the predicate. Alternatively, when the PP modifies a noun, PAKTUS distinguishes between two different types of modification: deverbal, or conceptual, modification and nominal modification. Conceptual modification occurs when the noun is actually derived from a verb (or otherwise specifies conceptual roles, as the noun message does). The roles for these nouns are assigned in a manner very similar to the case frame mechanism used for the clause-level concepts, and is described elsewhere.

Nominal modification is the other, more common way in which PPs modify nouns, and it is here that the meronymy taxonomy and the preposition "word experts" come into play. After a PP is detected and analyzed by the parser, a message is passed to the preposition frame specified by the head of the PP, and the NO.ATTACH slot of that frame is searched for a function, or word expert, that will attempt to determine whether or not the PP modifies the noun which precedes it. Because many prepositions are quite flexible in performing a variety of semantic functions, applicants have found that the preposition itself is in the best position to discover its immediate function. Thus, every preposition has an associated word expert function that is used to inspect its syntactic environment interpretive clues; those prepositions that are not as yet well-defined inherit a temporary dummy function from the parent frame.

The word experts can use any of the general-purpose searching functions that are available in the PAKTUS environment, but, for the purposes of discovering any meronymous relations that are expressed in a nominal modification, several more specific functions have been written to facilitate this search. These functions are described below.

TABLE 1

| Relation | Slot/Inverse | Examples | Relation Elements | | |
| --- | --- | --- | --- | --- | --- |
| | | | Functional | Homeomerous | Separable |
| Component/Integral Object | Part-Of/Parts | door-house finger-hand | + | − | + |
| Member/Collection | Member-Of/Members | squad-platoon book-library | − | − | + |
| Portion/Mass | Portion-Of/Portions | round-ammunition slice-pie | − | + | + |
| Stuff/Object | Ingredient-In/Ingredients | cotton-shirt aluminum-airplane | − | − | − |
| Feature/Activity | Phase-Of/Phases | swallowing-eating irrigation-farming | + | − | − |
| Place/Area | Place/Area | oasis-desert beach-coast | − | + | − |

5.4.1 Prepositional Phrase Attachment and Word Experts

There are two ways in which a prepositional phrase (PP) most commonly makes its presence felt within a clause. On the one hand, it can provide some additional information about the predicate, such as when, how, or with whom a certain activity occurred. For example, He read the book in the evening. He read the book in secret. He read the book to the children. On the other hand, the PP may attach, or modify the noun phrase that it follows: a book of papyrus, the book from the library, the book with the gold cover, etc.

5.4.2 The General Searching Functions 5.4.2.1 IS PART.OF and CHECK.PARTS

These two functions combine to perform a search of the lexicon network in order to determine if one of the two arguments (A1 and A2) is a component of the other. IS PART.OF simply checks that the arguments passed to it are atoms and, if not, isolates the appropriate atoms from the arguments supplied. This function then calls CHECK.PARTS which checks the Parts slot of A1 for a match with A2, indicating that A2 is marked as a component part of A1. Failing the match, this function recurses up the network, performing the same check on all the parents of A1. Nested within this search of A1 is a similar search up the network from A2, since parts are also a kind of (AKO) other objects. This complexity is necessary to capture the relationship in such constructions as the feet of the men since feet are AKO L^BODY.PART, and men are persons is indicated by the Parts slot on the L^PERSON frame having the value L^BODY.PARTS.

If the search is successful, A1 is returned; an unsuccessful search returns NIL.

5.4.2.2 IS.MADE.OF

This function uses the same technique described above to determine whether or not A2 is an ingredient of A1. For example, by checking the ingredient slot of A1 for a match with A2 (possibly including a search of the inheritance net), this function can be used to label the relationship between the two NP's in a hull of high-carbon steel, a chair of solid oak, and so forth. Of course, the same technique is used for noun noun compounds: the brick schoolhouse, a gin martini, a gelatin capsule, etc.

5.4.2.3 X.OWNS.Y

As above, this function determines whether or not arguments A1 and A2 are marked in the lexicon as items which exhibit the non-meronymous relationship of possession. This relationship is distinguished from the others in the meronymy hierarchy, because it does not have the same close sense of being an inherent part. Nevertheless, it is a vital relationship to discover, and can be accomplished by searching the Has slot for possible possessions. This allows discovery of the underlying relationship expressed in such constructions as the boy with the red shirt, the products of Company Z, the mineral rights of foreign nations, etc.

5.4.2.4 * IS.PORTION.OF

This function operates just as those detailed above, except that it searches the Portion slot for a match, thus indicating that A2 is a portion of (or portion term for) A1. For example, this function allows the correct assignment of the relationship between the NP's in the following: a round of ammunition, a slice of pie, a hunk of clay, etc.

5.4.2.5 * IS.PHASE.OF

This function operates just as those detailed above, except that it searches the Phase slot for a match, thus indication that A2 is a phase of A1. For example, this function allows the correct determination of the relationship between the NP,s in the following: the strategy of war, the transmittal of a message, etc.

5.4.2.6 * IS.PLACE.OF

This function operates just as those detailed above, but its purpose is to determine that A2 is the inalienable location for A1 by searching the associated Place slots. This special relationship differs from the occasional location of an object in the sense that the one can best be defined only in terms of the other: an oasis in the desert, the baseline of a tennis court, etc.

5.4.2.7 * IS.MEMBER.OF

This function operates just as those detailed above, but its purpose is to determine whether or not argument A1 is a member of the collection A2 by searching the Members slot. As with many of these relationships, the preposition "word expert" or noun.phrase calling function must decide in which order to submit the argument to the function, since the same relationship can be expressed in a variety of ways. For example, all of the following express a membership relation: a ship from the fleet, a tanker in the fleet, a fleet of thirty ships, etc.

5.4.3 The Message Passing Function and the Word Expert Functions

It might be argued from a review of the functions above that it would be simpler to organize the knowledge about meronymous relationships and the functions which search them in such a way that one general function could perform all of the searches broken out above. I.E., why not have one function that takes two arguments, searches all slots in the list of meronymous relations, and returns a list of those relationships exhibited by the arguments? Although this sounds more efficient, perhaps, and might actually turn out to be functionally equivalent to the modularized approach taken here, there are two strong reasons for exercising care in performing these analyses.

First, the prepositions themselves often determine which of the possible relationships are legitimate in a given construction, and encoding this information actually makes for a smarter, more efficient search in most cases. Secondly, however, there is also a decided conflict that can arise in the transitivity of these meronymous relationships and it can not be ignored. The problem arises when different types of meronymous relationships are confused, and invalid conclusions can result.

For example, in an inheritance net the only way that fingers can be understood to be part of a person is through the relationships of fingers to hands and hands to persons. This transitivity of the parts relationship is crucial to the correct operation of the meronymous searching in an inheritance network. Problems in searching could arise, though, if multiple slots were being pursued up the network, as is the case in the following, incorrect deduction.

Fingers are parts of hands. [Component/Entity relation]

Hands are parts of a crew. [Member/Collection relation]

Fingers are parts of a crew. [Erroneous deduction]

For these reasons, the current arrangement of separate modular functions is seen as an important aspect of the meronymy analysis. In order to implement this philosophy, and to preserve the perspicuity of the code, message passing to the prepositions has been used. A general function, NP.PREFS.PP, is used to extract the head of the prepositional phrase and to notify the NP.ATTACH slot on that preposition's frame to activate the appropriate function. If the search succeeds, the necessary attachment procedure (e.g., register assignment) is performed. In addition, the prepositional phrase is passed up the ATN by the SEND.UP.MODS function in case there is the PP is also a candidate for filling a role at the clause level. Currently there is no provision for adjudicating multiple assignments of this kind, and they are simply treated as ambiguous rather than conflicting.

Various word experts that are defined for the assignment of nominal relationships are detailed below. All others will be modelled on these definitions, although the precise specifications are always subject to modification based on a particular domain. The word experts use the special variables (NP CLAUSE PPHEAD NPHEAD) declared in NP.PREFS.PP and are not therefore explicitly passed any arguments.

5.4.3.1 WX^OF—Word Expert for the preposition of

Of is one of the most promiscuous prepositions we have and expresses a wide variety of relationships. This word expert, therefore, performs several tests in order to determine which relation is currently most likely and it then makes the appropriate register adjustment. The tests and actions are listed below.

If the head of the NP is either a determiner, a number or a part designation (e.g., part, component, etc.), the putative head of the NP is moved to a new "Scope" register, and the head of the PP replaces it as the head of the NP. In this way, such misanalyzed noun phrases as two of the boys will be corrected to the proper assignment.

If the head of the PP passes IS.PART.OF/CHECK.PARTS, then it is assigned to a "Part.Of" register in the NP list.

If the head of the PP passes IS.MADE.OF, then it is assigned to a "Made.Of" register in the NP list. Note that the order of the arguments passed to IS MADE.OF is the reverse of that for IS.PART.0F (a house of stone versus the door of a house).

If the head of the PP either passes the X.OWNS.Y test or is a possessitive pronoun (a book of his), then the head is assigned to a "Owner" slot.

If the head of the NP is a kind of L Person, and the head of the PP is a kind of L Location, then the head of the PP is assigned to an "R Origin" role, indicating the source of the NP (the people of China, John Doe of GM, etc.).

The default is to assign the head of the PP to a "Domain" register.

5.4.3.2 WX^WITH—Word Expert for the preposition WITH

This word expert checks first to see whether the Component relation holds here and, if so, assigns the head of the PP to the "Parts" register. Note that this is the reverse of the inverse of the corresponding WX OF operation (the basement door of the house versus the house with the basement door).

Secondly, this function tests whether or not the X.OWNS.Y relationship holds, assigning the appropriate register if this is the case.

5.4.3.3 WX^ON—Word Expert for the preposition ON

This word expert checks the Component relation first (the wheel on the bicycle), and makes the appropriate assignment. The second test is a generic locative test, to see whether the head of the PP has the property "LOC", and if so, to move it to the modal role "R^PLACE". Obviously, this test can use some refinement, but it is hard to see how this might be done in a generic sense. In the broadest terms, almost anything can be a location and thereby serve as the object of the preposition on in this sense: hat on this head, head on the pillow, and so forth.

5.4.3.4 WX^IN—Word Expert for the preposition IN

As with on, this word expert makes the general assumption that a location is being referred to, and makes the same assignment as above if the head of the PP is marked for the property "LOC". Other refinements are definitely called for here; one of the first that might be seen is the ingredient-In/Ingredient relation: the steel in the armor, the hydrogen in the water, the almonds in the candy bar, etc.

6. CONCEPTUAL INTEGRATION

This section describes an advantageous set of pattern-matching tools that are used to produce instances of domain knowledge templates that integrate information from the filled-in case frame templates. We term this process conceptual integration. The approach uses key features of Dyer's parser from the BORIS system (Dyer 1983), and a PROLOG-like pattern-matching method adapted to the frame system. Depending on the state of development of an NLU system embodying the invention, the text may not be completely parsed into case frames. There might be noun phrases not assigned to roles, unattached prepositional phrases, and nouns that are not linked to the verbal concepts or roles they imply. Conceptual integration desirably should also include patterns that handle these cases, as a temporary measure to complete the parsing process.

6.1 Domain Knowledge Templates

Figure 31:
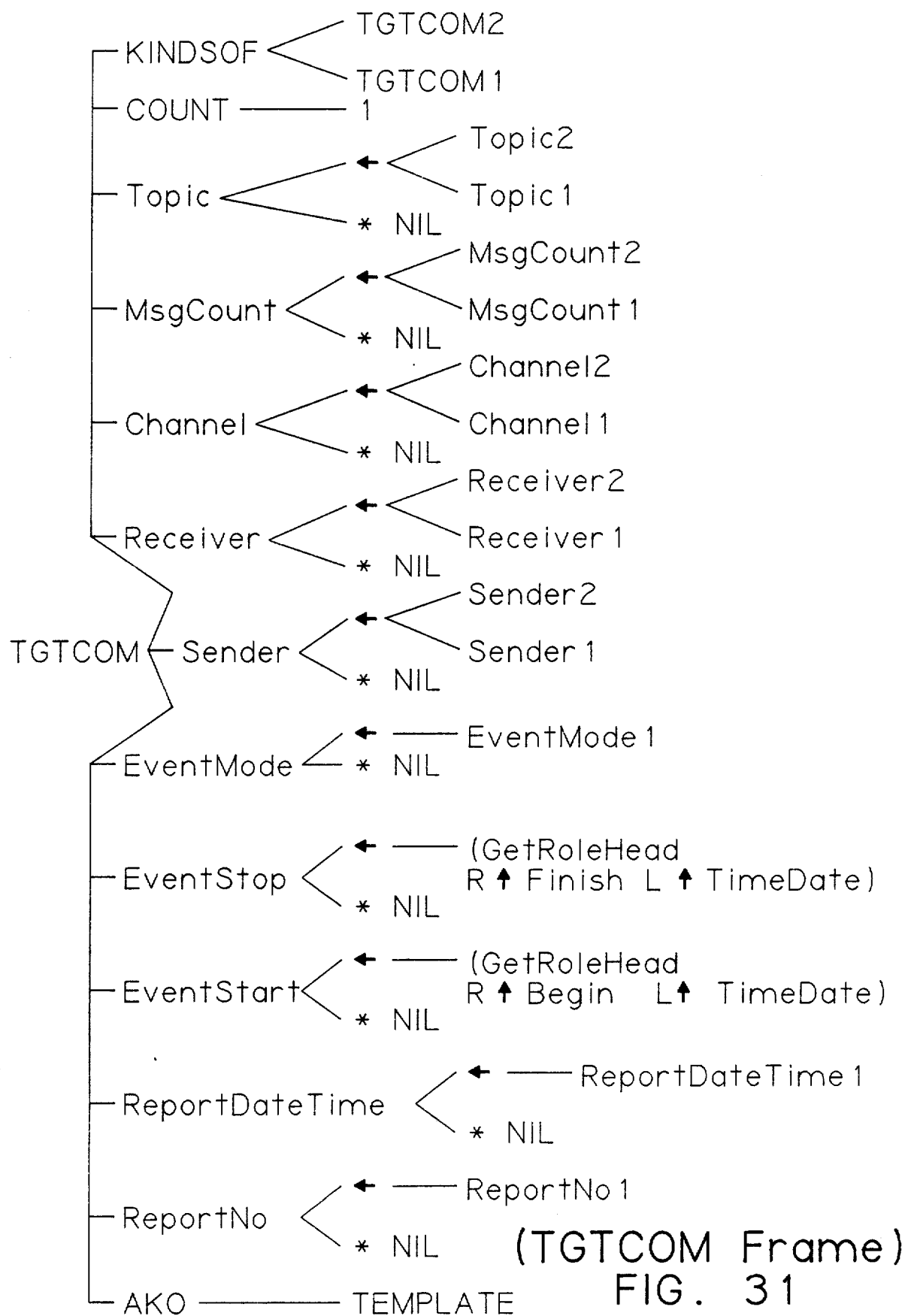
FIG. 31 is a screen image of a domain template master.
Figure 32:
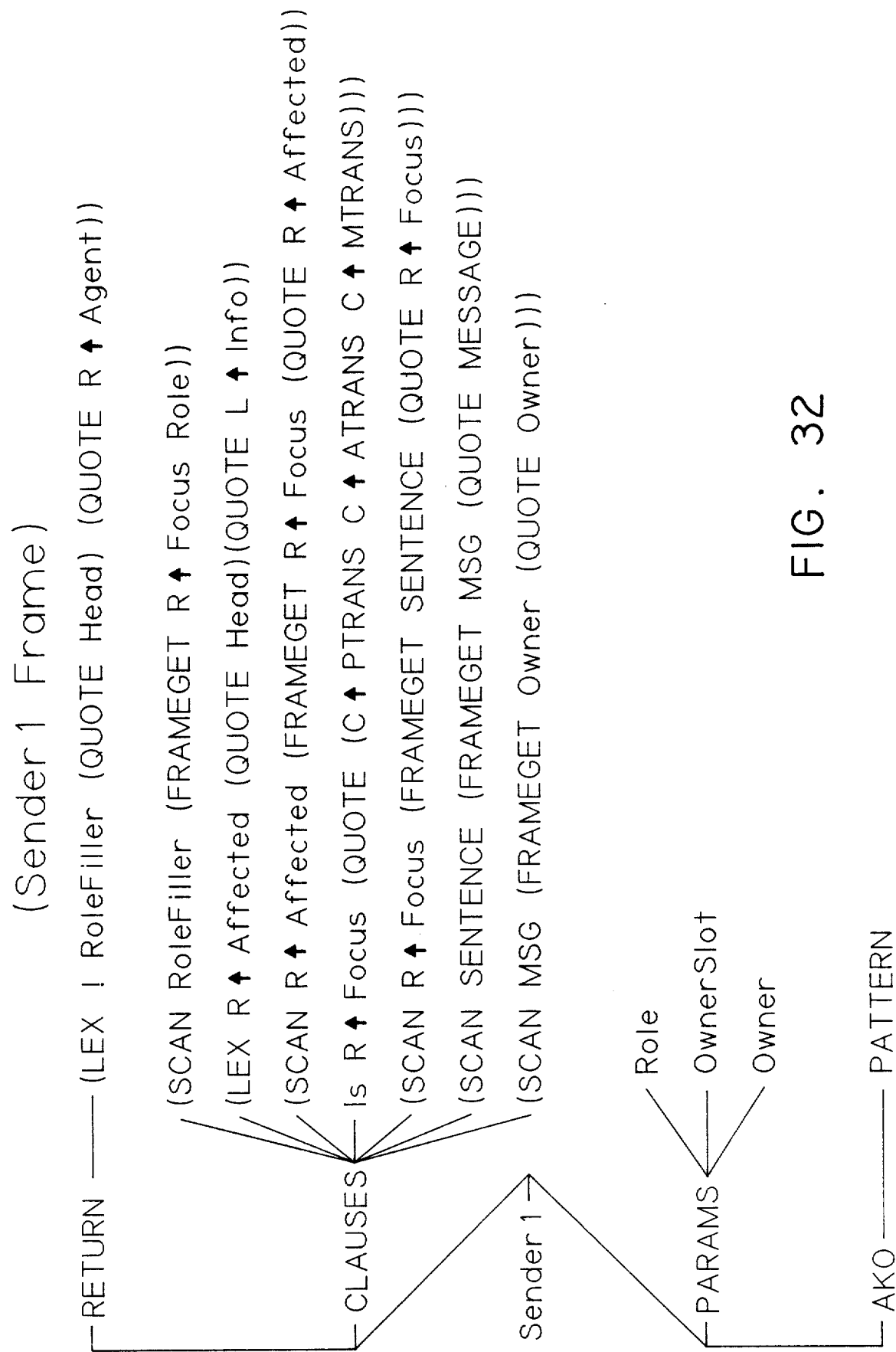
FIG. 32 shows a pattern specification for a message sender.
Figure 33:
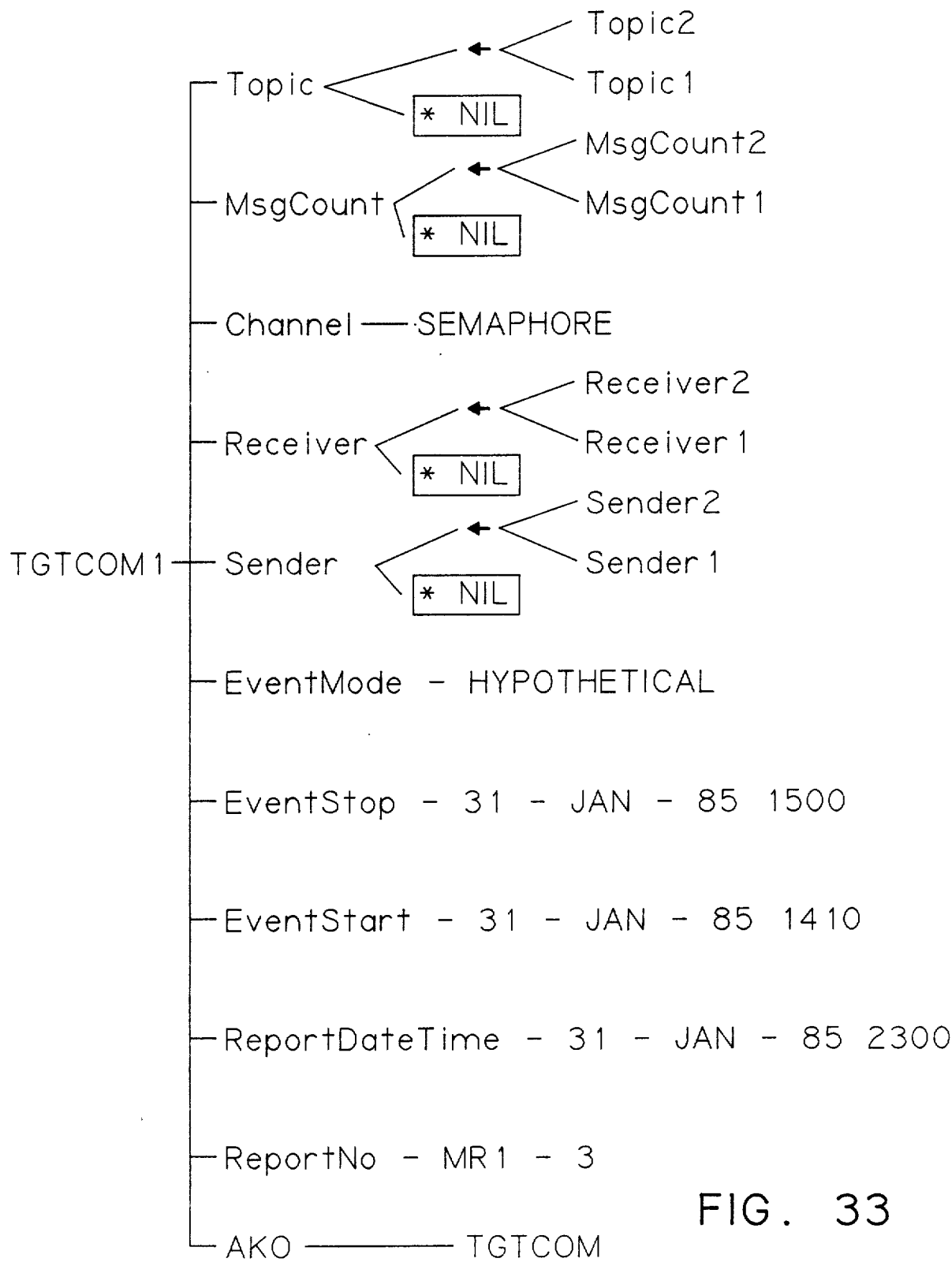
FIG. 33 shows an instance of a domain knowledge template.

Conceptual integration involves four additional types of objects: domain template masters, domain patterns, instances of templates, and an agenda. FIGS. 31, 32, and 33 show simplified examples of a domain template master, a pattern, and an instance of a domain template. In brief, first one must define domain template masters appropriate for the domain. These frames serve as masters from which to copy domain templates for actual use. The goal is to find the correct value(s) for each slot on the domain template; i.e., fill in the blanks. Each slot on the domain template initially contains a left-arrow facet, and the values of that facet are demons that are defined to locate the correct value(s). These demons are LISP functions that can be evaluated to return the value. Several demons can be attached to a slot, representing alternative searches to find the value(s). These demons are typically translated from PROLOG-like patterns, as described below.

When a domain template is spawned from the master, its slots are put on an agenda. The agenda object is a frame named GAPS, where each slot is an incomplete concept template, and each value is a blank on that template. A function scans the agenda and tries to fill each slot, in turn, by evaluating its demons. This is essentially forward chaining with rule groups. If a demon returns a non-NIL value, the value is put on the slot, all the demons for that slot are deleted, and the slot is removed from the agenda.

6.1.1 Defining Domain Template Masters

First, one defines domain templates to represent the desired output, and possibly others to represent useful intermediate concepts. These templates may have a wide variety of interpretations and uses. They may be considered as PROLOG patterns, or rules, where filling in the blanks corresponds to parameter binding, or unification. They can also be used as scripts, thematic abstraction units (TAUs), memory organization packets (MOPs), data base record definitions, or other conceptual structures. The blanks can be filled by names of case frames, other domain templates, entity tkens, etc. For example, a blank in a shopping-script template could be filled by a transportation template, with shared parameters.

These templates are PIKS frames and can be defined through normal PIKS methods. FIG. 31 shows the generic domain template to represent the essential data from a message about a target communication event. To build such a template, one defines a slot for each blank in the template and attaches appropriate demons on the left-arrow facets. These demons are the names of LISP functions that are evaluated to fill in the slot value with actual data from the case frames. The demon may be specified as either an atom or as a list where the CDR is the parameters. In both cases, the template name and slot name will be inserted as the first two parameters during evaluation. The COUNT slot is automatically managed to provide sequential numbers to generate domain template names.

6.1.2 Defining Demons

These LISP functions can be coded as needed, or can be generated from a pattern like the one shown in FIG. 32. This type of pattern is especially useful for searching a frame system, somewhat like a data base query. Clauses that begin with SCAN use the next atom as an iteration variable over the list defined by the third item. Subsequent SCAN clauses result in a depth-first search with backtracking, like PROLOG.

For example, the pattern, Sender1, defines the following search. Find a message that contains a sentence that has a focus that is some kind of movement. See if the thing affected by that movement is a lexical item that suggests information. Return the agent of that movement. If there is a message containing the sentence, "We intercepted message traffic from target 1", the pattern will recognize that "target 1" is the sender of a message. (Note: the noun "traffic" has an associated PTRANS case frame.)

To define a pattern, make a frame that is AKO PATTERN. Put any parameters on the PARAMS slot. Add CLAUSES to specify the search. A clause that begins With SCAN will be converted to a "for" loop where the iteration variable is the CADR of the clause and the iteration list is the CADDR of the clause. Subsequent clauses will be nested within the loop, with an implied AND. Any clause that does not begin with SCAN will be considered to be a LISP form. Finally, add a form on the RETURN slot that will be evaluated and returned if the search is successful. Use the CP function to translate the pattern into a LISP function with the same name as the frame. CP returns the function name. If it is desired to compile the LISP function, set SPECVARS to T, since local variables are referred to in nested subroutines.

A number of LISP functions have been defined for use as clauses for a prototypical application of PAKTUS to messages in the relocatable target domain. These are included in the MTAPATTERNS file. Many of them are useful in ether domains and patterns, but some of them are fairly specific. Of course, patterns can also call other patterns.

6.2 The Conceptual Integration Process

A LISP function called "CM" invokes all the functions needed for the complete process of reading text from a text file on disk, parsing it, spawning appropriate domain templates, filling in the domain templates, and selecting the most completely filled in domain template. The CM function also deletes any temporary frames left over from processing a previous message. Its process is described below.

First, CM deletes previous domain templates, sentence parses, and the agenda. It then calls the Spawn-Concept function to generate domain templates that are essentially copies of the domain template masters. The name of a specific template is generated using the value on the COUNT slot, which is then incremented. The SpawnConcept function also places each slot from the new template onto the agenda frame.

The FillGaps function scans through each slot on the agenda and EVALs each demon for each slot, in turn. This EVAL includes the domain template name and slot name as the first two parameters. If evaluation of the demon returns some non-NIL value, the value becomes the slot's value, the slot is deleted from the agenda, and all the slot's demons are deleted from the template. TGTCOM1 in FIG. 33 is a partially filled-in template. EventStart has been filled in, and Receiver still has active demons.

The agenda mechanism has several useful attributes. It allows demons to wait upon results of other demons, if necessary. For example, a complex concept may require completion of several constituent domain templates, and this process may recurse. Also, partial data will not halt the process. It is not necessary that all blanks be filled for the process to continue. Finally, this approach groups demons so that only relevant demons are placed on the agenda, and they are removed when their purpose is accomplished, even if by another demon.

After the FillGaps function finishes processing, the SelectTemplate function is called to select the domain template that is most completely filled in. The degree that a template is filled in is calculated by summing the weights of all the filled-in slots. The weights are obtained from the "weights" facets of the template master slots.

7. EXAMPLES OF TEXT PROCESSING

FIGS. 34-37 represent PAKTUS displays of several stages of processing of a message. This is a "sanitized" version of an actual classified Long Range Air message received at an U.S. Air Force I&W (indications and warnings) center. The free text component of the message as received by PAKTUS is:

ROUTINE TESTING OF COMMAND POST COMMUNICATIONS WITHIN SAC, 8 MARCH 1987.
DURING 8 MARCH 1987, ROUTINE TESTING OF COMMAND POST COMMUNICATIONS SERVING THE FOLLOWING WAS CONDUCTED:
THREE UNIDENTIFIED 15TH AIR FORCE AUTHORITIES;
1ST STRATEGIC AIR DIVISION;
THE COMMANDER, 8TH AIR FORCE.
IN ALL CASES PARTICIPANT APPEARED TO BE DEPLOYED IN OR CLOSE TO NORMAL LOCATION.

Figure 34:
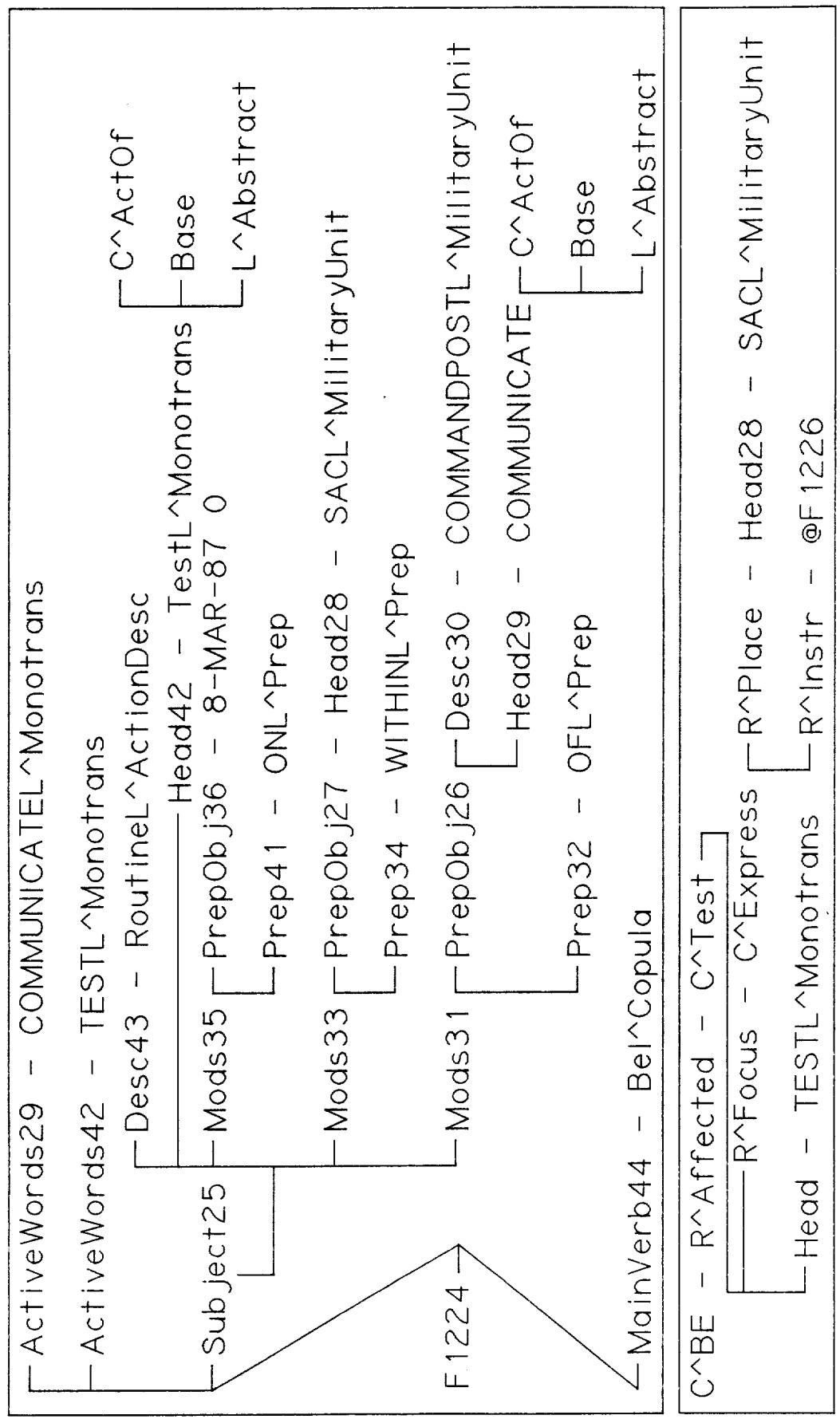
FIG. 34 is a window image of a major syntactic registers (top panel) and conceptual frame (bottom panel) for example text.

The message consists of a "header" phrase summarizing the subject of the message, and two sentences that are the body of the message. The list of three communicants is processed as a conjunction in the first sentence. FIG. 34 represents actual window images produced automatically from the results of the parse. Windows like these are intended for use by NLU system developers; the I&W analyst has no need to use them. The following points will help to interpret the graphs:

Symbols like F1224 are generated to label syntactic and other objects. These objects contain the configurations of syntactic registers and conceptual role fillers and relations generated by the parser. For example, F1224 is the label of the object that represents the top-level phrase in FIG. 34.

C^ designates a concept; e.g., C Express is the concept embodied by the verb communicate. Concepts are associated with all verbs and with those words that are closely derived from a verb, such as communications or testing. They are also associated with adjectives and some substantives.

R^ designates a semantic role in a concept; e.g., R^Instr is the instrument role of a concept.

L^ designates a lexical category; e.g., L^Abstract is the lexical category of abstract nouns.

Words are represented by their root and their lexical category; e.g., SACL^MilitaryUnit.

The graphs depict major syntactic roles and conceptual frames; they are summaries that do not display much of the detail available. For example, the conceptual graphs show only the head and qualifiers (i.e., relative clauses) of each noun phrase, although descriptors and determiners have been identified by the parser and are stored in the appropriate objects.

The parse of the first phrase, ROUTINE TESTING OF COMMAND POST COMMUNICATIONS WITHIN SAC, 8 MARCH 1987, is shown in FIG. 34. The top panel is a summary of the syntactic analysis. Words have been assigned to lexical categories and to syntactic registers such as main verb, subject, complement, modifiers, etc. Since this input is not a valid sentence, the parser switched to a "relaxed mode" and assumed that the verb BE was implied (in the sense of "happen"). The syntactic analysis shows that the subject is the abstract, derived noun, testing, described by routine, and modified by three prepositional phrases (the parser assumed that ON was implied before the date). —

The bottom panel of FIG. 34 shows a summary of the conceptual analysis of the first "sentence" (Descriptors, determiners, etc are not shown, but have not been forgotten bY the system). This represents the logical form of the sentence independent of the surface structure. The sentence has been mapped into an instance of the BE concept with a Test as the thing affected. The focus of the Test concept is the concept Express (i.e., communicate). The place of the Express is SAC. In other words, there Was a test of communications at SAC. Note that underlying concepts of the nouns TESTING and COMMUNICATIONS have been elaborated and the roles identified, even though they are not verbs.

Figure 35B:
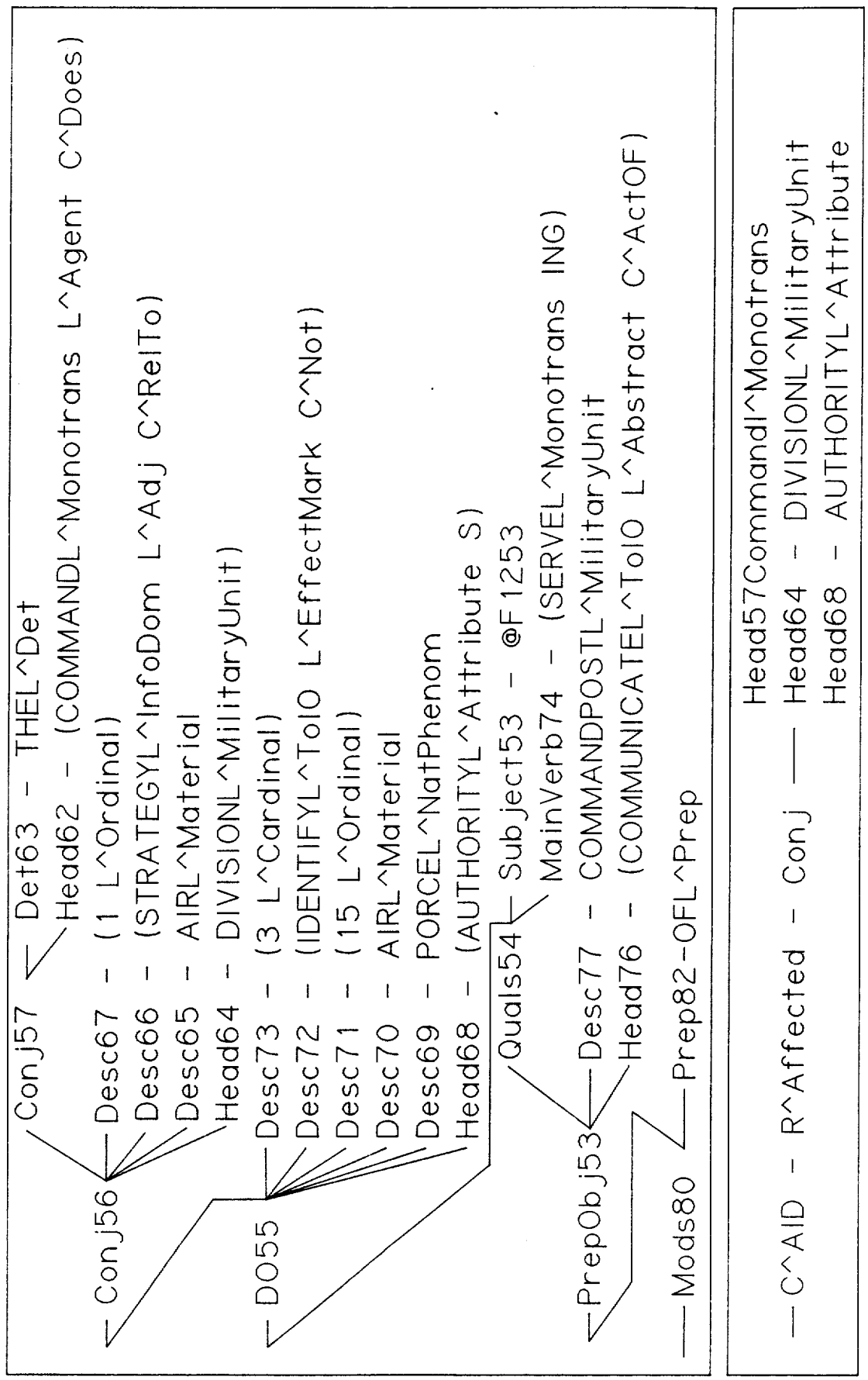
Figure 36:
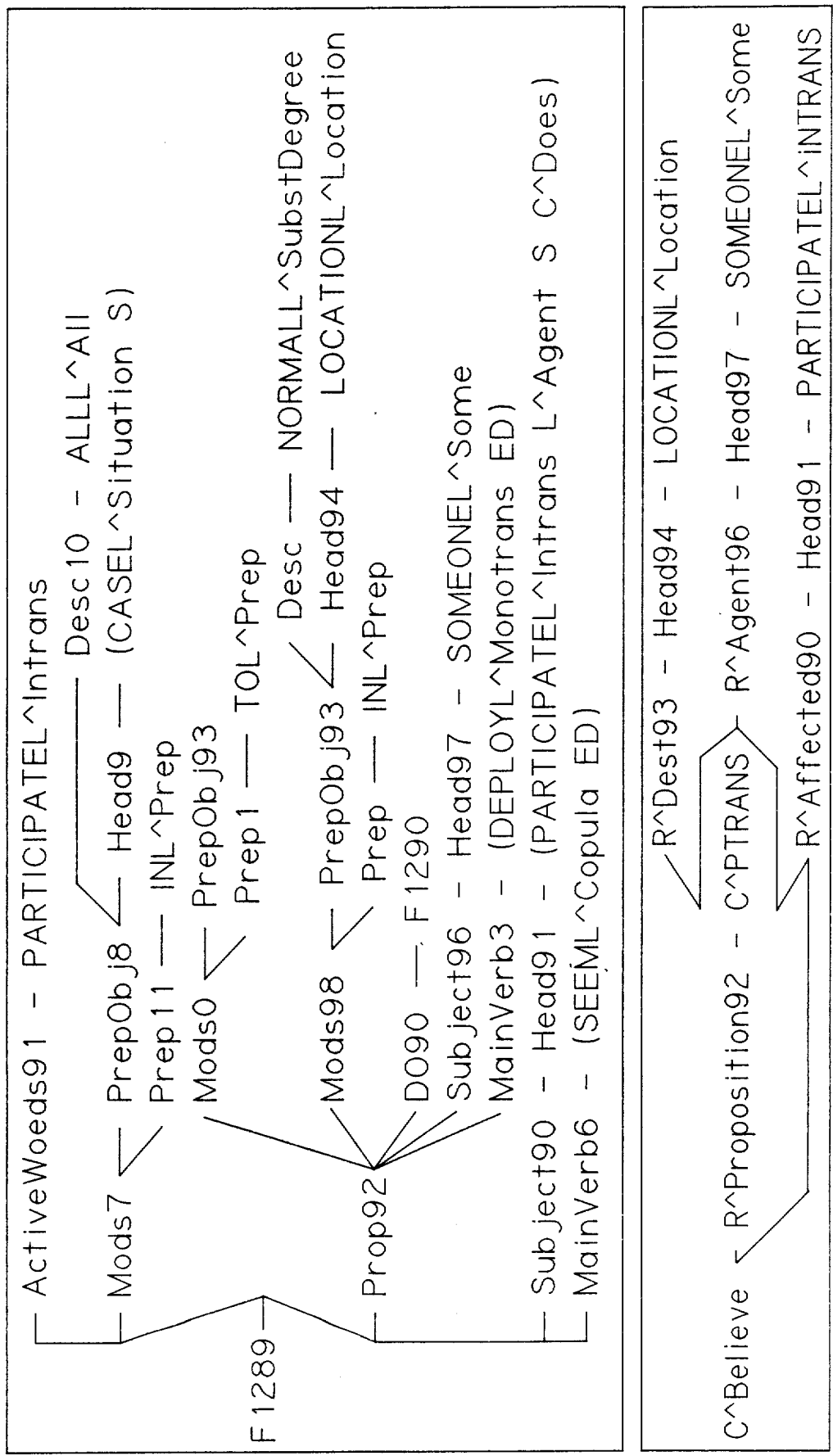
FIG. 36 is a window image corresponding to that of FIG. 34, for a third sentence.
Figure 37:
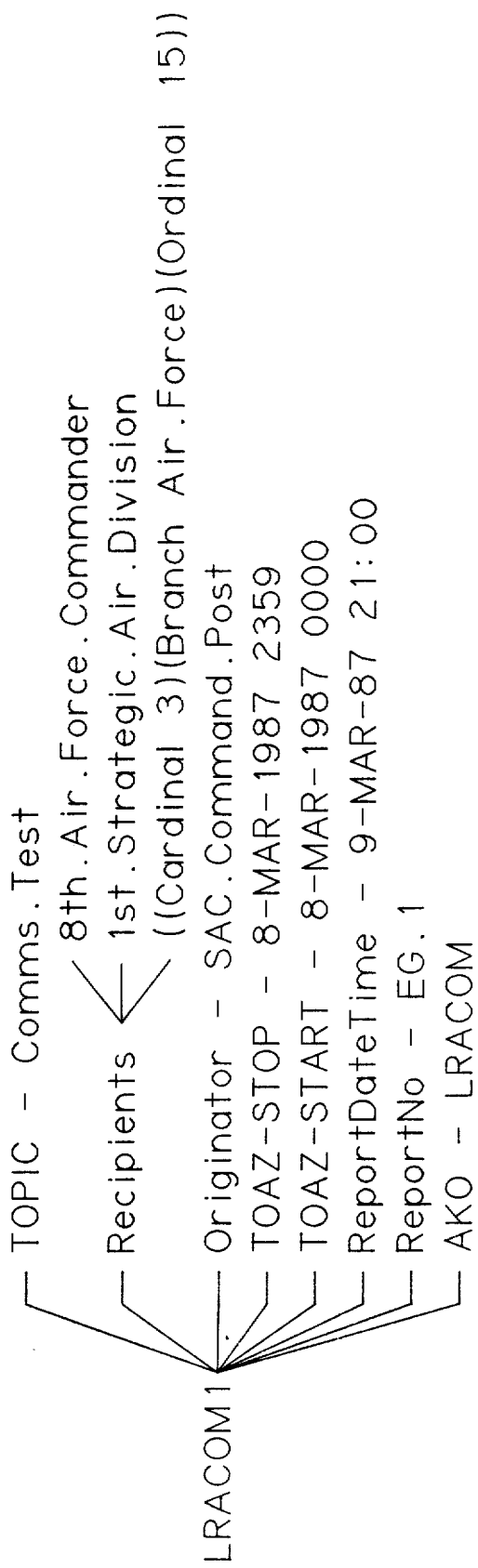
FIG. 37 is a data structure computed from the messages of FIGS. 34 through 36.

FIGS. 35A, 35B and 36 show the conceptual analyses of the second and third sentences. Conduct is the main verb of the second sentence. Because the passive voice was used, the subject is shown as the dummy agent SOMEONE. The direct object is routine testing, which is modified by of communications. This is in turn qualified by serving. The direct object of serving is the conjunction of three noun phrases corresponding to the list of communicants.

The prepositional phrase, during <date>, modifies the predicate.

Note that five words have been marked as "active words". Instances of these words include elaborating detail based on their morphology. For example, the decomposition of COMMANDER specifies that this is an agent who does command (see the upper right portion of the panel). Similarly, STRATEGIC is related to strategy, UNIDENTIFIED is not identified, and COMMUNICATIONS are acts of communicating.

The conceptual frame for this sentence is shown in the lower panel. Interpreting this graph from left to right, an Act occurred on 8-MAR-87 that affected a Test. The focus of the Test was an Express (communication). The Express is qualified as being an Aid (serving) for AUTHORITIES, DIVISION, and COMMANDER. In other words, someone acted to test communications that aid AUTHORITIES, DIVISION, and COMMANDER.

FIGS. 35A and 35B shows the major syntactic roles and conceptual frame for the last sentence of the message. These graphs can be interpreted similarly to those of the previous sentences. Note that the meaning of APPEARED has been correctly recognized as Believe in this context, and DEPLOY transgetes to PTRANS (Physical TRANSfer). Thus, the interpretation of the sentence may be paraphrased as: it was believed that someone PTRANSed the participants (Agents who do participate) to normal location.

FIG. 36 shows the completed data structure that could be transmitted to an I&W knowledge base or used to generate a data base update. the Originator was located by finding an organization that modifies (i.e., is a left adjunct of) a communication: i.e., COMMAND POST COMMUNICATIONS, and combining this with the place of the organization, in this case, SAC, to get SAC.Command.Post. The topic was located by noting that this Was a Test of an Express (communication), and therefore is a Comms.Test.

We claim:

1. A method of processing natural language text, comprising
  providing electronically encoded data representative of the natural language text,
  lexically processing the electronically encoded data with reference to a lexicon data base, said lexicon data base being comprised of lexical entries all including syntactic category data and semantically significant lexical entries including one or more concepts, to produce lexical specifications,
  interpreting the lexical specifications with reference to an electronic representation of an Augmented Transition Network to produce configuration data, said configuration data including one or more concepts obtained from the lexical specifications, and
  semantically processing the configuration data with reference to case frame templates each identified with a respective concept, to produce case frames in accordance with the concepts included in said configuration data.

2. A method as defined in claim 1 wherein the semantically significant lexical entries are comprised of entries representing verbs.

3. A method as defined in claim 1 wherein the semantically significant lexical entries are comprised of entries representing adjectives.

4. A method as defined in claim 1 wherein the semantically significant lexical entries are comprised of entries representing nouns which suggest verbs.

5. A method as defined in claim 1 wherein said configuration data assigns said syntactic category data to syntactic registers.

6. A method as defined in claim 1 wherein each of the case frame templates includes one or more roles associated with the case frame template's concept.

7. A method as defined in claim 6 wherein the roles may include propositional roles and modal roles.

8. A method as defined in claim 6, wherein each of the case frame templates identifies propositional roles which can participate in the case frame, a mapping between the roles and syntactic data to identify roles sources in configuration data, and restrictions on which roles may participate in the case frame.

9. A method as defined in claim 6 wherein at least some of said lexical entries are further comprised of semantic features, and said semantic features are used to restrict the participation of roles in a case frame.

10. A method as defined in claim 1 wherein the providing, lexically processing, interpreting, and semantically processing steps are effected in sequence.

11. A method as defined in claim 1 further comprising the step of semantically analyzing case frames in accordance with configuration data corresponding to a partial interpretation of a sentence of said natural language text.

12. A method as defined in claim 11 further comprising the step in the event said case frames are semantically unacceptable of returning to a prior, semantically acceptable partial interpretation of the sentence.

13. A method as defined in claim 1 further comprising the step of looking ahead in the lexical specifications after partially completing the interpreting step to control the further conduct of the interpreting step.

14. A method as defined in claim 13 wherein the step of looking ahead includes a semantic analysis of the lexical specifications.

15. A method as defined in claim 1 further comprising the step after said semantic processing step of conceptually integrating information from the case frames.

16. A method as defined in claim 15 wherein the conceptually integrating step comprises filling in domain knowledge templates.

17. A method as defined in claim 1, wherein at least some of the lexical entries are further comprised of syntactic features, said syntactic features being used in the interpreting step.

18. A method as defined in claim 1 wherein at least some of the lexical entries are further comprised of semantic features, said semantic features being used in said semantic processing step to instantiate case frames.

19. A method as defined in claim 1 wherein the case frames are conceptually integrated by filling in domain knowledge templates, further comprising the step of adding to or modifying the domain knowledge templates.

20. A method for developing natural language processing systems of the type wherein the following steps are effected:
providing electronically encoded data representative of the natural language text,
lexically processing the electronically encoded data with reference to a lexicon, said lexicon being comprised of lexical entries wherein semantically significant lexical entries include one or more concepts, to produce lexical specifications,
interpreting the lexical specifications with reference to an electronic representation of an ATN grammar specification to produce configuration data, said configuration data including concepts obtained from the lexical specifications, and
semantically processing the configuration data with reference to case frame data base containing case frame templates each identified with a respective concept, to produce case frames in accordance with the concepts included in said configuration data;
said method comprising the step of modifying one or more of the lexicon data base, ATN grammar specification, and case frame data base.

21. A method as defined in claim 20 wherein the modifying step comprises adding a further entry to the lexicon data base in response to user input.

22. A method as defined in claim 20 wherein the modifying step comprises learning a new word from the natural language text from context, without human intervention.

23. A method as defined in claim 22 wherein the modifying step comprises recognizing inflected forms of a known root word.

24. A method as defined in claim 22 wherein the modifying step comprises morphologically analyzing the word, and may be followed by a human verification of the morphological analysis.

25. A method of processing natural language text, comprising
providing electronically encoded data representative of the natural language text,
lexically processing the electronically encoded data with reference to a lexicon data base, said lexicon data base being comprised of lexical entries all including syntactic category data and semantically significant lexical entries including one or more concepts, to produce lexical specifications,
interpreting the lexical specifications with reference to an electronic representation of a grammar specification to produce output data representative of a grammatical parse of the natural language text, said output data including concepts obtained from the lexical specifications, and
semantically processing the output data with reference to case frame templates each identified with a respective concept and including one or more roles associated with such concept, to produce case frames in accordance with the concepts included in said configuration data.

26. A method as defined in claim 25 wherein the semantically significant lexical entries are comprised of entries representing verbs.

27. A method as defined in claim 25 wherein the semantically significant lexical entries are comprised of entries representing adjectives.

28. A method as defined in claim 25 wherein the semantically significant lexical entries are comprised of entries representing nouns which suggest verbs.

29. A method as defined in claim 25 Wherein said configuration data assigns said syntactic category data to syntactic registers.

30. A method as defined in claim 25 wherein the roles may include propositional roles and modal roles.

31. A method as defined in claim 25, wherein each of the case frame templates identifies propositional roles which can participate in the concept, a mapping between the roles and syntactic data to identify roles sources in output data, and restrictions on which roles may participate in the concept.

32. A method as defined in claim 25, wherein at least some of the lexical entries are further comprised of syntactic features, said syntactic features being used in the interpreting step.

33. A method as defined in claim 25 wherein at least some of said lexical entries are further comprised of semantic features, and said semantic features are used to restrict the participation of roles in a case frame.

34. A method as defined in claim 25 wherein the providing, lexically processing, interpreting, and semantically processing steps are effected in sequence.

35. A method as defined in claim 25 further comprising the step of semantically analyzing case frames in accordance with configuration data corresponding to a partial interpretation of a sentence of said natural language text.

36. A method as defined in claim 25 further comprising the step of semantically analyzing case frames in accordance with configuration data corresponding to a partial interpretation of a sentence of said natural language text.

37. A method as defined in claim 25 further comprising the step of looking ahead in the lexical specifications after partially completing the interpreting step to control the further conduct of the interpreting step.

38. A method as defined in claim 25 further comprising the step after said semantic processing step of conceptually integrating information from the case frames.

39. Apparatus for processing natural language text, comprising
    means for providing electronically encoded data representative of the natural language text;
    lexicon data base means comprising a plurality of lexical entries, wherein said lexical entries are comprised of syntactic category data and semantically significant lexical entries are also comprised of one or more concepts;
    means for lexically processing the electronically encoded data by reference to the lexicon data base means to produce lexical specifications;
    parser means for interpreting the lexical specifications with reference to an Augmented Transition Network grammar specification to produce configuration data, said configuration data including concept data obtained from the lexical specifications;
    case frame means for providing a plurality of case frame templates each identified with a respective concept; and
    means for semantically processing the configuration data by reference to the case frame means to produce case frames in accordance with the concepts included in the configuration data.

40. Apparatus as defined in claim 39 wherein the semantically significant lexical entries are comprised of entries representing verbs.

41. Apparatus as defined in claim 39, wherein the semantically significant lexical entries are comprised of entries representing adjectives.

42. Apparatus as defined in claim 39, wherein the semantically significant lexical entries are comprised of entries representing nouns which suggest verbs.

43. Apparatus as defined in claim 39 wherein said configuration data assigns said syntactic category data to syntactic registers.

44. Apparatus as defined in claim 39 wherein each of the case frame templates includes one or more roles associated with the case frame template's concept.

45. Apparatus as defined in claim 44 wherein the roles may include propositional roles and modal roles.

46. Apparatus as defined in claim 44, wherein each of the case frame templates identifies propositional roles Which can participate in the concept, a mapping between the roles and syntactic data to identify roles sources in configuration data, and restrictions on which roles may participate in the concept.

47. Apparatus as defined in claim 44 wherein at least some of the lexical entries are further comprised of semantic features, and said semantic features are used to restrict the participation of roles in a case frame.

48. Apparatus as defined in claim 39 wherein at least some of the lexical entries are further comprised of semantic features, said semantic features being used by said semantic processing means to instantiate case frames.

49. Apparatus as defined in claim 39 wherein at least some of the lexical entries are further comprised of syntactic features, said syntactic features being used by said parser means.

50. Apparatus as defined in claim 39 wherein the lexical processing, parser, and semantically processing means operate in sequence.

51. Apparatus as defined in claim 39 wherein the parser means includes means for looking ahead in the lexical specifications after partially completing the parse of a sentence to control the further course of the parse.

52. Apparatus as defined in claim 39 further comprising means for conceptually integrating the case frames.

53. Apparatus as defined in claim 52 wherein the conceptually integrating means is comprised of domain knowledge templates.

54. Apparatus as defined in claim 39 wherein said case frame means comprises a concept network, and means for retrieving information from the concept network and lexicon to constitute case frame templates.

55. Apparatus for processing natural language text, comprising
    means for providing electronically encoded data representative of the natural language text;
    lexicon data base means comprising a plurality of lexical entries, wherein said lexical entries are comprised of syntactic category data and semantically significant lexical entries are also comprised of one or more concepts;
    means for lexically processing the electronically encoded data by reference to the lexicon data base means to produce lexical specifications;
    parser means for interpreting the lexical specifications with reference to an electronically encoded grammar specification to produce output data representative of a grammatical parse of the natural language text, said output data including concepts obtained from the lexical specifications;
    case frame means for providing a plurality of case frame templates each identified with a respective concept and including one or more roles; and
    means for semantically processing the configuration data by reference to the case frame means to produce case frames in accordance with the concepts included in the configuration data.

56. Apparatus as defined in claim 55 wherein the semantically significant lexical entries are comprised of entries representing verbs.

57. Apparatus as defined in claim 55 wherein the roles may include propositional roles and modal roles.

58. Apparatus as defined in claim 55, wherein each of the case frame templates identifies propositional roles which can participate in the concept, a mapping between the roles and syntactic data to identify roles sources in configuration data, and restrictions on which roles may participate in the concept.

59. Apparatus as defined in claim 55 further comprising means for conceptually integrating the case frames.

60. Apparatus as defined in claim 55 wherein the conceptually integrating means is comprised of domain knowledge templates.

61. Apparatus as defined in claim 55 wherein at least some of the lexical entries are further comprised of semantic features, and said semantic features are used to restrict the participation of roles in a case frame.

62. Apparatus as defined in claim 55 wherein at least some of the lexical entries are further comprised of syntactic features, said syntactic features being used by said parser means.

63. Apparatus as defined in claim 55 wherein the lexicon data base means, parser means, and case frame means are data structures comprised of objects.

64. Apparatus as defined in claim 63 wherein said object based data structures are distributed between permanent memory and virtual memory.

65. Apparatus as define in claim 63 wherein the objects comprise frames.

* * * * *